United States Patent
Guzman et al.

(10) Patent No.: US 10,878,782 B1
(45) Date of Patent: Dec. 29, 2020

(54) TECHNIQUES FOR MANAGING DISPLAY USAGE

(71) Applicant: Apple Inc., Cupertino, CA (US)

(72) Inventors: Aurelio Guzman, San Jose, CA (US); Giovanni M. Agnoli, San Mateo, CA (US); Kevin Will Chen, Sunnyvale, CA (US); Alan C. Dye, San Francisco, CA (US); Nicholas Felton, Sunnyvale, CA (US); Stephen O. Lemay, Palo Alto, CA (US); Yiqiang Nie, San Francisco, CA (US); Matthew J. Sundstrom, Campbell, CA (US); Jacob Z Weiss, Sunnyvale, CA (US); Christopher Wilson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,281

(22) Filed: Sep. 26, 2019

Related U.S. Application Data

(60) Provisional application No. 62/897,959, filed on Sep. 9, 2019.

(51) Int. Cl.
  *G09G 5/37* (2006.01)
  *G09G 5/10* (2006.01)
(52) U.S. Cl.
  CPC ............... *G09G 5/37* (2013.01); *G09G 5/10* (2013.01); *G09G 2320/046* (2013.01); *G09G 2320/0626* (2013.01); *G09G 2330/021* (2013.01); *G09G 2354/00* (2013.01)
(58) Field of Classification Search
  CPC ...... G06F 1/163; G06F 1/3265; G06F 1/3287; G06F 1/3218; G06F 1/3262; G06F 3/147; G09G 2330/021; G09G 2354/00; G09G 2360/08; G06T 13/00
  See application file for complete search history.

(56) References Cited

U.S. PATENT DOCUMENTS

| | | |
|---|---|---|
| 3,148,500 A | 9/1964 | Hayes |
| 4,205,628 A | 6/1980 | Null |
| 5,124,959 A | 6/1992 | Yamazaki et al. |
| 5,208,790 A | 5/1993 | Sato |
| 5,220,541 A | 6/1993 | Vuilleumier |
| 5,455,808 A | 10/1995 | Grupp et al. |

(Continued)

FOREIGN PATENT DOCUMENTS

| | | |
|---|---|---|
| AU | 2010249319 A1 | 6/2012 |
| AU | 2015101019 A4 | 9/2015 |

(Continued)

OTHER PUBLICATIONS

Advisory Action received for U.S. Appl. No. 14/846,511, dated Oct. 22, 2019, 5 pages.

(Continued)

*Primary Examiner* — Sing-Wai Wu
(74) *Attorney, Agent, or Firm* — Dentons US LLP

(57) ABSTRACT

The present disclosure generally relates managing display usage. In some embodiments, a device modifies various aspects of a displayed user interface as the device transitions from operating in a first device mode to operating in a second device mode. In some embodiments, the modifications involve altering the content included in a user interface and varying how the content is displayed.

27 Claims, 64 Drawing Sheets

(56) References Cited

U.S. PATENT DOCUMENTS

| | | |
|---|---|---|
| 5,500,835 A | 3/1996 | Born |
| 5,508,979 A | 4/1996 | Eisenegger |
| 5,659,693 A | 8/1997 | Hansen et al. |
| 5,825,353 A | 10/1998 | Will |
| 5,845,257 A | 12/1998 | Fu et al. |
| 5,892,519 A | 4/1999 | Hirai |
| 5,986,655 A | 11/1999 | Chiu et al. |
| 5,999,195 A | 12/1999 | Santangeli |
| 6,043,818 A | 3/2000 | Nakano et al. |
| 6,128,012 A | 10/2000 | Seidensticker, Jr. et al. |
| 6,160,767 A | 12/2000 | Ho |
| 6,279,018 B1 | 8/2001 | Kudrolli et al. |
| 6,359,839 B1 | 3/2002 | Schenk et al. |
| 6,441,824 B2 | 8/2002 | Hertzfeld |
| 6,449,219 B1 | 9/2002 | Hepp et al. |
| 6,452,597 B1 | 9/2002 | Goldberg et al. |
| 6,477,117 B1 | 11/2002 | Narayanaswami et al. |
| 6,496,780 B1 | 12/2002 | Harris et al. |
| 6,525,997 B1 | 2/2003 | Narayanaswami et al. |
| 6,539,243 B1 | 3/2003 | Kimura et al. |
| 6,539,343 B2 | 3/2003 | Zhao et al. |
| 6,549,218 B1 | 4/2003 | Gershony et al. |
| 6,556,222 B1 | 4/2003 | Narayanaswami |
| 6,683,653 B1 | 1/2004 | Miyake et al. |
| 6,690,623 B1 | 2/2004 | Maano |
| 6,728,533 B2 | 4/2004 | Ishii |
| 6,809,724 B1 | 10/2004 | Shiraishi et al. |
| 6,871,076 B2 | 3/2005 | Samn |
| 7,203,380 B2 | 4/2007 | Chiu et al. |
| 7,257,254 B2 | 8/2007 | Tunney |
| 7,302,650 B1 | 11/2007 | Allyn et al. |
| 7,378,954 B2 | 5/2008 | Wendt |
| 7,479,949 B2 | 1/2009 | Jobs et al. |
| 7,515,509 B2 | 4/2009 | Klein |
| 7,515,903 B1 | 4/2009 | Cast |
| 7,619,615 B1 | 11/2009 | Donoghue |
| 7,751,285 B1 | 7/2010 | Cain |
| 7,773,460 B2 | 8/2010 | Holt |
| 7,843,769 B2 | 11/2010 | Ishida et al. |
| 7,898,542 B1 | 3/2011 | Yu et al. |
| 7,907,476 B2 | 3/2011 | Lee |
| 8,238,876 B2 | 8/2012 | Teng et al. |
| 8,245,143 B2 | 8/2012 | Yach et al. |
| 8,462,997 B2 | 6/2013 | Pettit et al. |
| 8,595,649 B2 | 11/2013 | Sherrard et al. |
| 8,725,842 B1 | 5/2014 | Al-Nasser |
| 8,847,903 B2 | 9/2014 | Stokes et al. |
| 8,854,925 B1 | 10/2014 | Lee et al. |
| 8,938,394 B1 | 1/2015 | Faaborg et al. |
| 8,948,819 B2 | 2/2015 | Yun et al. |
| 8,963,894 B2 | 2/2015 | Klassen et al. |
| 9,070,092 B2 | 6/2015 | Chou et al. |
| 9,082,314 B2 | 7/2015 | Tsai |
| 9,141,270 B1 | 9/2015 | Stuart et al. |
| 9,152,211 B2 | 10/2015 | Gunn et al. |
| 9,152,212 B2 | 10/2015 | Gunn |
| 9,173,052 B2 | 10/2015 | Hauser et al. |
| 9,197,738 B2 | 11/2015 | Peev et al. |
| 9,239,605 B1 | 1/2016 | Nanda et al. |
| 9,459,781 B2 | 10/2016 | Wilson et al. |
| 9,547,425 B2 | 1/2017 | Wilson et al. |
| 9,568,891 B2 | 2/2017 | Adams et al. |
| 9,582,165 B2 | 2/2017 | Wilson et al. |
| 9,600,178 B2 | 3/2017 | Yun et al. |
| 9,609,230 B1 | 3/2017 | Bakshi et al. |
| 9,635,255 B1 | 4/2017 | Baldwin |
| 9,753,436 B2 | 9/2017 | Ely et al. |
| 9,794,397 B2 | 10/2017 | Min et al. |
| 10,304,347 B2 | 5/2019 | Wilson et al. |
| 10,620,590 B1 | 4/2020 | Guzman et al. |
| 10,684,592 B2 | 6/2020 | Chang et al. |
| 2002/0054066 A1 | 5/2002 | Kikinis et al. |
| 2002/0054541 A1 | 5/2002 | Hall |
| 2002/0059623 A1 | 5/2002 | Rodriguez et al. |
| 2002/0131331 A1 | 9/2002 | Molander |
| 2003/0002391 A1 | 1/2003 | Biggs |
| 2003/0027621 A1 | 2/2003 | Libby et al. |
| 2003/0067497 A1 | 4/2003 | Pichon |
| 2003/0164847 A1 | 9/2003 | Zaima et al. |
| 2003/0214885 A1 | 11/2003 | Powell et al. |
| 2003/0229900 A1 | 12/2003 | Reisman |
| 2004/0001105 A1 | 1/2004 | Chew et al. |
| 2004/0017733 A1 | 1/2004 | Sullivan |
| 2004/0021699 A1 | 2/2004 | Fildebrandt |
| 2004/0047244 A1 | 3/2004 | Iino et al. |
| 2004/0066710 A1 | 4/2004 | Yuen et al. |
| 2004/0075700 A1 | 4/2004 | Liu et al. |
| 2004/0168107 A1 | 8/2004 | Sharp et al. |
| 2004/0192332 A1 | 9/2004 | Samn |
| 2004/0218472 A1 | 11/2004 | Narayanaswami et al. |
| 2004/0225966 A1 | 11/2004 | Besharat et al. |
| 2004/0243547 A1 | 12/2004 | Chhatrapati et al. |
| 2004/0266491 A1 | 12/2004 | Howard et al. |
| 2005/0041667 A1 | 2/2005 | Miller et al. |
| 2005/0052446 A1 | 3/2005 | Plut |
| 2005/0094492 A1 | 5/2005 | Rosevear |
| 2005/0139852 A1 | 6/2005 | Chen et al. |
| 2005/0156873 A1 | 7/2005 | Walter et al. |
| 2005/0200611 A1 | 9/2005 | Goto et al. |
| 2005/0272462 A1 | 12/2005 | Okamoto |
| 2005/0278757 A1 | 12/2005 | Grossman et al. |
| 2006/0007785 A1 | 1/2006 | Fernandez et al. |
| 2006/0035628 A1 | 2/2006 | Miller et al. |
| 2006/0085765 A1 | 4/2006 | Peterson et al. |
| 2006/0092770 A1 | 5/2006 | Demas |
| 2006/0128419 A1 | 6/2006 | Shimizu et al. |
| 2006/0214935 A1 | 9/2006 | Boyd et al. |
| 2007/0004451 A1 | 1/2007 | Anderson |
| 2007/0006096 A1 | 1/2007 | Kim et al. |
| 2007/0055947 A1 | 3/2007 | Ostojic et al. |
| 2007/0057775 A1 | 3/2007 | O'reilly et al. |
| 2007/0094330 A1 | 4/2007 | Russell |
| 2007/0101279 A1 | 5/2007 | Chaudhri et al. |
| 2007/0146344 A1 | 6/2007 | Martin et al. |
| 2007/0211042 A1 | 9/2007 | Kim et al. |
| 2007/0236475 A1 | 10/2007 | Wherry |
| 2007/0239754 A1 | 10/2007 | Schnitman |
| 2007/0261537 A1 | 11/2007 | Eronen et al. |
| 2007/0279190 A1 | 12/2007 | Lugt et al. |
| 2007/0287140 A1 | 12/2007 | Liebowitz |
| 2008/0082930 A1 | 4/2008 | Omernick et al. |
| 2008/0127268 A1 | 5/2008 | Bergeron et al. |
| 2008/0130421 A1 | 6/2008 | Akaiwa et al. |
| 2008/0150959 A1 | 6/2008 | Marui |
| 2008/0151700 A1 | 6/2008 | Inoue et al. |
| 2008/0167834 A1 | 7/2008 | Herz et al. |
| 2008/0168396 A1 | 7/2008 | Matas et al. |
| 2008/0186808 A1 | 8/2008 | Lee |
| 2008/0192021 A1 | 8/2008 | Lim et al. |
| 2008/0201647 A1 | 8/2008 | Lagerstedt et al. |
| 2008/0215240 A1 | 9/2008 | Howard et al. |
| 2008/0224988 A1 | 9/2008 | Whang |
| 2008/0246778 A1 | 10/2008 | Ham et al. |
| 2008/0270934 A1 | 10/2008 | Firebaugh et al. |
| 2009/0012988 A1 | 1/2009 | Brown |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0066533 A1 | 3/2009 | Park et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0164923 A1 | 6/2009 | Ovi |
| 2009/0178007 A1 | 7/2009 | Matas et al. |
| 2009/0178008 A1 | 7/2009 | Herz et al. |
| 2009/0199130 A1 | 8/2009 | Tsern et al. |
| 2009/0249247 A1 | 10/2009 | Tseng et al. |
| 2009/0259958 A1 | 10/2009 | Ban |
| 2009/0264116 A1 | 10/2009 | Thompson |
| 2009/0279392 A1 | 11/2009 | Scott et al. |
| 2009/0284389 A1 | 11/2009 | Klassen et al. |
| 2009/0287470 A1 | 11/2009 | Farnsworth et al. |
| 2009/0300146 A1 | 12/2009 | Park et al. |
| 2009/0305732 A1 | 12/2009 | Marcellino et al. |

(56) References Cited

U.S. PATENT DOCUMENTS

| | | |
|---|---|---|
| 2009/0312059 A1 | 12/2009 | Pratt et al. |
| 2009/0319467 A1 | 12/2009 | Berg et al. |
| 2009/0327886 A1 | 12/2009 | Whytock et al. |
| 2010/0026640 A1 | 2/2010 | Kim et al. |
| 2010/0060586 A1 | 3/2010 | Pisula et al. |
| 2010/0064255 A1 | 3/2010 | Rottler et al. |
| 2010/0069035 A1 | 3/2010 | Johnson |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0124152 A1 | 5/2010 | Lee |
| 2010/0146437 A1 | 6/2010 | Woodcock et al. |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0205563 A1 | 8/2010 | Haapsaari et al. |
| 2010/0217657 A1 | 8/2010 | Gazdzinski |
| 2010/0223563 A1 | 9/2010 | Green |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0281374 A1 | 11/2010 | Schulz et al. |
| 2011/0003616 A1 | 1/2011 | Gorsica et al. |
| 2011/0003621 A1 | 1/2011 | Atsumi |
| 2011/0003665 A1 | 1/2011 | Burton et al. |
| 2011/0004835 A1 | 1/2011 | Yanchar et al. |
| 2011/0025719 A1 | 2/2011 | Yanase |
| 2011/0029870 A1 | 2/2011 | May et al. |
| 2011/0061010 A1 | 3/2011 | Wasko et al. |
| 2011/0070924 A1 | 3/2011 | Kim |
| 2011/0076992 A1 | 3/2011 | Chou et al. |
| 2011/0078624 A1 | 3/2011 | Missig et al. |
| 2011/0083111 A1 | 4/2011 | Forutanpour et al. |
| 2011/0098928 A1 | 4/2011 | Hoffman et al. |
| 2011/0109540 A1 | 5/2011 | Milne et al. |
| 2011/0117902 A1 | 5/2011 | Chang et al. |
| 2011/0128311 A1 | 6/2011 | Wakatsuki et al. |
| 2011/0138329 A1 | 6/2011 | Wells et al. |
| 2011/0151415 A1 | 6/2011 | Darling |
| 2011/0157046 A1 | 6/2011 | Lee et al. |
| 2011/0166777 A1 | 7/2011 | Chavakula |
| 2011/0173221 A1 | 7/2011 | Ahiakpor et al. |
| 2011/0179372 A1 | 7/2011 | Moore et al. |
| 2011/0182151 A1 | 7/2011 | Geyer et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0218765 A1 | 9/2011 | Rogers |
| 2011/0230986 A1 | 9/2011 | Lafortune et al. |
| 2011/0234152 A1 | 9/2011 | Frossen et al. |
| 2011/0261079 A1 | 10/2011 | Ingrassia et al. |
| 2011/0281342 A1 | 11/2011 | Porsch et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0028707 A1 | 2/2012 | Raitt et al. |
| 2012/0059787 A1 | 3/2012 | Brown et al. |
| 2012/0062470 A1 | 3/2012 | Chang |
| 2012/0079375 A1 | 3/2012 | Ogino et al. |
| 2012/0084729 A1 | 4/2012 | Lin |
| 2012/0092383 A1 | 4/2012 | Hysek et al. |
| 2012/0098639 A1 | 4/2012 | Ijas |
| 2012/0110438 A1 | 5/2012 | Peraza et al. |
| 2012/0116550 A1 | 5/2012 | Hoffman et al. |
| 2012/0117507 A1 | 5/2012 | Tseng et al. |
| 2012/0124499 A1 | 5/2012 | Tsai |
| 2012/0154156 A1 | 6/2012 | Kuntzel |
| 2012/0182226 A1 | 7/2012 | Tuli |
| 2012/0197523 A1 | 8/2012 | Kirsch |
| 2012/0231849 A1 | 9/2012 | Yamashita |
| 2012/0243735 A1 | 9/2012 | Wu |
| 2012/0254804 A1 | 10/2012 | Sheha et al. |
| 2012/0254810 A1 | 10/2012 | Heck et al. |
| 2012/0288139 A1 | 11/2012 | Singhar |
| 2012/0297346 A1 | 11/2012 | Hoffknecht et al. |
| 2012/0304084 A1 | 11/2012 | Kim et al. |
| 2012/0319984 A1 | 12/2012 | Borovsky et al. |
| 2012/0324390 A1 | 12/2012 | Tao |
| 2013/0007665 A1 | 1/2013 | Chaudhri et al. |
| 2013/0021236 A1 | 1/2013 | Bender |
| 2013/0030892 A1 | 1/2013 | Liu et al. |
| 2013/0044072 A1 | 2/2013 | Kobayashi et al. |
| 2013/0050263 A1 | 2/2013 | Khoe et al. |
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler et al. |
| 2013/0111579 A1 | 5/2013 | Newman et al. |
| 2013/0116967 A1 | 5/2013 | Akcasu et al. |
| 2013/0132888 A1 | 5/2013 | Tijssen |
| 2013/0141371 A1 | 6/2013 | Hallford et al. |
| 2013/0147825 A1 | 6/2013 | Martin et al. |
| 2013/0162611 A1 | 6/2013 | Lim et al. |
| 2013/0176293 A1 | 7/2013 | Pantfoerder |
| 2013/0185813 A1 | 7/2013 | Shim et al. |
| 2013/0191785 A1 | 7/2013 | Rampson et al. |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0232443 A1 | 9/2013 | Ryu et al. |
| 2013/0239060 A1 | 9/2013 | Kang et al. |
| 2013/0254705 A1 | 9/2013 | Mooring et al. |
| 2013/0316763 A1 | 11/2013 | Kader |
| 2013/0318437 A1 | 11/2013 | Jung et al. |
| 2013/0318466 A1 | 11/2013 | Estrada et al. |
| 2013/0326418 A1 | 12/2013 | Utsuki et al. |
| 2013/0345980 A1 | 12/2013 | Van Os et al. |
| 2014/0013414 A1 | 1/2014 | Bruck |
| 2014/0022183 A1 | 1/2014 | Ayoub et al. |
| 2014/0037109 A1 | 2/2014 | Ban |
| 2014/0047525 A1 | 2/2014 | Bonhoff |
| 2014/0055495 A1 | 2/2014 | Kim et al. |
| 2014/0059493 A1 | 2/2014 | Kim |
| 2014/0074570 A1 | 3/2014 | Hope et al. |
| 2014/0082533 A1 | 3/2014 | Kelley |
| 2014/0094224 A1 | 4/2014 | Lozovoy |
| 2014/0101169 A1 | 4/2014 | Kurata et al. |
| 2014/0126336 A1 | 5/2014 | Goeller et al. |
| 2014/0129959 A1 | 5/2014 | Battles et al. |
| 2014/0139454 A1 | 5/2014 | Mistry et al. |
| 2014/0139637 A1 | 5/2014 | Mistry et al. |
| 2014/0143678 A1 | 5/2014 | Mistry et al. |
| 2014/0143737 A1 | 5/2014 | Mistry et al. |
| 2014/0155031 A1 | 6/2014 | Lee et al. |
| 2014/0157189 A1 | 6/2014 | Morita |
| 2014/0157321 A1 | 6/2014 | Kurita |
| 2014/0173439 A1 | 6/2014 | Gutierrez et al. |
| 2014/0189578 A1 | 7/2014 | Shuttleworth et al. |
| 2014/0189584 A1 | 7/2014 | Weng et al. |
| 2014/0192244 A1 | 7/2014 | Ishihara et al. |
| 2014/0200691 A1 | 7/2014 | Lee et al. |
| 2014/0201655 A1 | 7/2014 | Mahaffey et al. |
| 2014/0229752 A1 | 8/2014 | Lee |
| 2014/0244165 A1 | 8/2014 | Bells |
| 2014/0245161 A1 | 8/2014 | Yuen et al. |
| 2014/0245177 A1 | 8/2014 | Maklouf |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0256298 A1 | 9/2014 | Moss et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282103 A1 | 9/2014 | Crandall |
| 2014/0282153 A1 | 9/2014 | Christiansen et al. |

(56) References Cited

U.S. PATENT DOCUMENTS

| | | |
|---|---|---|
| 2014/0282254 A1 | 9/2014 | Feiereisen et al. |
| 2014/0285699 A1 | 9/2014 | Kato |
| 2014/0289660 A1 | 9/2014 | Min |
| 2014/0293755 A1 | 10/2014 | Geiser et al. |
| 2014/0304664 A1 | 10/2014 | Lee et al. |
| 2014/0310618 A1 | 10/2014 | Venkatesh |
| 2014/0317543 A1 | 10/2014 | Kim |
| 2014/0320434 A1 | 10/2014 | Pantel |
| 2014/0325384 A1 | 10/2014 | Kobayashi |
| 2014/0325408 A1 | 10/2014 | Leppanen et al. |
| 2014/0328151 A1 | 11/2014 | Serber |
| 2014/0344723 A1 | 11/2014 | Malik et al. |
| 2014/0347275 A1 | 11/2014 | Kim et al. |
| 2014/0359477 A1 | 12/2014 | Chen |
| 2014/0362105 A1 | 12/2014 | Kocienda et al. |
| 2014/0380229 A1 | 12/2014 | Volodin et al. |
| 2015/0002735 A1 | 1/2015 | Moskovchenko |
| 2015/0022438 A1 | 1/2015 | Hong |
| 2015/0055197 A1 | 2/2015 | Romanoff et al. |
| 2015/0058651 A1 | 2/2015 | Choi et al. |
| 2015/0062130 A1 | 3/2015 | Ho |
| 2015/0067596 A1 | 3/2015 | Brown et al. |
| 2015/0071043 A1 | 3/2015 | Kubota |
| 2015/0083970 A1 | 3/2015 | Koh et al. |
| 2015/0100621 A1 | 4/2015 | Pan |
| 2015/0105125 A1 | 4/2015 | Min et al. |
| 2015/0106752 A1 | 4/2015 | Yang |
| 2015/0111558 A1 | 4/2015 | Yang |
| 2015/0113468 A1 | 4/2015 | Clark |
| 2015/0117162 A1 | 4/2015 | Tsai |
| 2015/0143234 A1 | 5/2015 | Norris, III |
| 2015/0160806 A1 | 6/2015 | Fey et al. |
| 2015/0160812 A1 | 6/2015 | Yuan et al. |
| 2015/0160856 A1 | 6/2015 | Jang et al. |
| 2015/0172438 A1 | 6/2015 | Yang |
| 2015/0185703 A1 | 7/2015 | Tanaka |
| 2015/0185995 A1 | 7/2015 | Shoemaker et al. |
| 2015/0194137 A1 | 7/2015 | Wyatt |
| 2015/0205509 A1 | 7/2015 | Scriven et al. |
| 2015/0207922 A1 | 7/2015 | Kobayashi et al. |
| 2015/0217163 A1 | 8/2015 | Amis et al. |
| 2015/0248235 A1 | 9/2015 | Offenberg et al. |
| 2015/0254875 A1 | 9/2015 | Zhang |
| 2015/0262548 A1 | 9/2015 | Lin |
| 2015/0277545 A1 | 10/2015 | Flowers et al. |
| 2015/0286372 A1 | 10/2015 | Swindell et al. |
| 2015/0286391 A1 | 10/2015 | Jacobs et al. |
| 2015/0301506 A1 | 10/2015 | Koumaiha |
| 2015/0301608 A1 | 10/2015 | Nagaraju et al. |
| 2015/0346694 A1 | 12/2015 | Hoobler et al. |
| 2015/0355830 A1 | 12/2015 | Chaudhri et al. |
| 2015/0365892 A1* | 12/2015 | Ma ................... H04W 52/0209 455/574 |
| 2015/0379476 A1 | 12/2015 | Chaudhri et al. |
| 2016/0004345 A1 | 1/2016 | Imana |
| 2016/0004393 A1 | 1/2016 | Faaborg et al. |
| 2016/0018872 A1 | 1/2016 | Tu et al. |
| 2016/0022202 A1 | 1/2016 | Peterson et al. |
| 2016/0027420 A1 | 1/2016 | Eronen |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0044091 A1 | 2/2016 | Doumet |
| 2016/0048283 A1 | 2/2016 | Yang et al. |
| 2016/0054710 A1 | 2/2016 | Jo et al. |
| 2016/0054892 A1 | 2/2016 | Kim et al. |
| 2016/0058375 A1 | 3/2016 | Rothkopf |
| 2016/0062450 A1 | 3/2016 | Han et al. |
| 2016/0062540 A1 | 3/2016 | Yang et al. |
| 2016/0062570 A1 | 3/2016 | Dascola et al. |
| 2016/0062589 A1 | 3/2016 | Wan et al. |
| 2016/0062630 A1 | 3/2016 | Anzures et al. |
| 2016/0077718 A1 | 3/2016 | Kwon et al. |
| 2016/0085397 A1 | 3/2016 | Jain |
| 2016/0091867 A1 | 3/2016 | Mansour et al. |
| 2016/0098137 A1 | 4/2016 | Kim et al. |
| 2016/0134737 A1 | 5/2016 | Pulletikurty |
| 2016/0162112 A1 | 6/2016 | Lee et al. |
| 2016/0188179 A1 | 6/2016 | Roh |
| 2016/0188181 A1 | 6/2016 | Smith |
| 2016/0205241 A1 | 7/2016 | Atsumi |
| 2016/0205244 A1 | 7/2016 | Dvortsov |
| 2016/0205267 A1 | 7/2016 | Vaughn et al. |
| 2016/0261675 A1 | 9/2016 | Block et al. |
| 2016/0266548 A1 | 9/2016 | Akiyama |
| 2016/0283094 A1 | 9/2016 | Choi |
| 2016/0320756 A1 | 11/2016 | Lee et al. |
| 2016/0327911 A1 | 11/2016 | Eim et al. |
| 2016/0327915 A1 | 11/2016 | Katzer et al. |
| 2016/0342327 A1 | 11/2016 | Chi et al. |
| 2016/0357354 A1 | 12/2016 | Chen et al. |
| 2016/0358311 A1 | 12/2016 | Chen et al. |
| 2017/0046024 A1 | 2/2017 | Dascola et al. |
| 2017/0053542 A1 | 2/2017 | Wilson et al. |
| 2017/0061934 A1 | 3/2017 | Shin |
| 2017/0068407 A1 | 3/2017 | Wilson et al. |
| 2017/0070716 A1 | 3/2017 | Park et al. |
| 2017/0075305 A1 | 3/2017 | Ryu et al. |
| 2017/0075563 A1 | 3/2017 | Bauer et al. |
| 2017/0109011 A1 | 4/2017 | Jiang |
| 2017/0123571 A1 | 5/2017 | Huang et al. |
| 2017/0123603 A1 | 5/2017 | Chang |
| 2017/0123640 A1 | 5/2017 | Wilson et al. |
| 2017/0134321 A1 | 5/2017 | Ushio et al. |
| 2017/0160898 A1 | 6/2017 | Lee et al. |
| 2017/0269715 A1 | 9/2017 | Kim et al. |
| 2017/0269742 A1 | 9/2017 | Xu et al. |
| 2017/0277136 A1* | 9/2017 | Minami ................ G06F 1/3296 |
| 2017/0287312 A1 | 10/2017 | Schofield et al. |
| 2017/0300013 A1 | 10/2017 | Satou et al. |
| 2017/0322658 A1 | 11/2017 | Lee et al. |
| 2017/0325196 A1 | 11/2017 | Cho et al. |
| 2017/0357329 A1 | 12/2017 | Park et al. |
| 2017/0357358 A1 | 12/2017 | Teutschler et al. |
| 2017/0357426 A1* | 12/2017 | Wilson ................ G06F 3/04812 |
| 2017/0357427 A1 | 12/2017 | Wilson et al. |
| 2017/0358276 A1 | 12/2017 | Mese et al. |
| 2018/0011450 A1 | 1/2018 | Stackowski |
| 2018/0024619 A1 | 1/2018 | Kasuo et al. |
| 2018/0033311 A1 | 2/2018 | Berggren |
| 2018/0052428 A1 | 2/2018 | Abramov |
| 2018/0067633 A1 | 3/2018 | Wilson et al. |
| 2018/0081515 A1 | 3/2018 | Block et al. |
| 2018/0088797 A1 | 3/2018 | Mcatee et al. |
| 2018/0136810 A1 | 5/2018 | Martin et al. |
| 2018/0150212 A1 | 5/2018 | Chen et al. |
| 2018/0275739 A1 | 9/2018 | Minami et al. |
| 2018/0329587 A1 | 11/2018 | Ko et al. |
| 2018/0336866 A1 | 11/2018 | Triverio et al. |
| 2018/0343023 A1 | 11/2018 | Park et al. |
| 2018/0374429 A1 | 12/2018 | Nakamura |
| 2019/0069244 A1 | 2/2019 | Jeon et al. |
| 2019/0121300 A1 | 4/2019 | Peterson et al. |
| 2019/0212707 A1 | 7/2019 | Minami et al. |
| 2019/0213037 A1 | 7/2019 | Kim et al. |
| 2019/0250813 A1 | 8/2019 | Block et al. |
| 2019/0279520 A1 | 9/2019 | Wilson et al. |
| 2019/0281154 A1 | 9/2019 | Choi et al. |
| 2019/0339860 A1 | 11/2019 | Chen et al. |
| 2020/0050332 A1 | 2/2020 | Yang et al. |
| 2020/0125037 A1 | 4/2020 | Jo et al. |
| 2020/0133206 A1 | 4/2020 | Jo et al. |
| 2020/0249632 A1 | 8/2020 | Olwal et al. |
| 2020/0279539 A1 | 9/2020 | Triverio et al. |

FOREIGN PATENT DOCUMENTS

| | | |
|---|---|---|
| CA | 2781636 A1 | 7/2010 |
| CA | 2986980 A1 | 5/2019 |
| CH | 707412 A2 | 6/2014 |
| CN | 1337638 A | 2/2002 |
| CN | 1397904 A | 2/2003 |

(56) References Cited

FOREIGN PATENT DOCUMENTS

| | | |
|---|---|---|
| CN | 1536511 A | 10/2004 |
| CN | 1870796 A | 11/2006 |
| CN | 1932590 A | 3/2007 |
| CN | 1997957 A | 7/2007 |
| CN | 101273324 A | 9/2008 |
| CN | 101382438 A | 3/2009 |
| CN | 101432722 A | 5/2009 |
| CN | 101505320 A | 8/2009 |
| CN | 101627349 A | 1/2010 |
| CN | 101702112 A | 5/2010 |
| CN | 101819486 A | 9/2010 |
| CN | 101981987 A | 2/2011 |
| CN | 102687176 A | 9/2012 |
| CN | 103019567 A | 4/2013 |
| CN | 103281419 A | 9/2013 |
| CN | 103399480 A | 11/2013 |
| CN | 103562832 A | 2/2014 |
| CN | 103607660 A | 2/2014 |
| CN | 103853328 A | 6/2014 |
| CN | 103902165 A | 7/2014 |
| CN | 104487929 A | 4/2015 |
| CN | 104501043 A | 4/2015 |
| CN | 104978904 A | 10/2015 |
| CN | 105260049 A | 1/2016 |
| CN | 105388966 A | 3/2016 |
| CN | 105389107 A | 3/2016 |
| CN | 105430154 A | 3/2016 |
| CN | 105677179 A | 6/2016 |
| CN | 205608658 U | 9/2016 |
| CN | 106056848 A | 10/2016 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1750242 A2 | 2/2007 |
| EP | 1832969 A2 | 9/2007 |
| EP | 1855170 A2 | 11/2007 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2312512 A1 | 4/2011 |
| EP | 2413577 A2 | 2/2012 |
| EP | 2423810 A1 | 2/2012 |
| EP | 2426902 A1 | 3/2012 |
| EP | 2565602 A1 | 3/2013 |
| EP | 2600215 A1 | 6/2013 |
| EP | 2738640 A2 | 6/2014 |
| EP | 2942932 A1 | 11/2015 |
| EP | 3056949 A1 | 8/2016 |
| EP | 3376342 A1 | 9/2018 |
| EP | 3401770 A1 | 11/2018 |
| GB | 2475669 A | 6/2011 |
| JP | 8-110955 A | 4/1996 |
| JP | 9-251084 A | 9/1997 |
| JP | 11-160470 A | 6/1999 |
| JP | 11-232013 A | 8/1999 |
| JP | 2001-318852 A | 11/2001 |
| JP | 2002-507718 A | 3/2002 |
| JP | 2002-271451 A | 9/2002 |
| JP | 2003-196593 A | 7/2003 |
| JP | 2003-296246 A | 10/2003 |
| JP | 2005-339017 A | 12/2005 |
| JP | 2006-287949 A | 10/2006 |
| JP | 2009-147889 A | 7/2009 |
| JP | 2010-124181 A | 6/2010 |
| JP | 2010-257051 A | 11/2010 |
| JP | 3168099 U | 6/2011 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2014-123197 A | 7/2014 |
| JP | 2014-519126 A | 8/2014 |
| JP | 2014-216868 A | 11/2014 |
| JP | 2015-210587 A | 11/2015 |
| KR | 20-0425314 Y1 | 9/2006 |
| KR | 10-2008-0058246 A | 6/2008 |
| KR | 102013-0109466 A | 10/2013 |
| KR | 10-2014-0025552 A | 3/2014 |
| KR | 10-2014-0064687 A | 5/2014 |
| KR | 10-2015-0038711 A | 4/2015 |
| KR | 10-2015-0081140 A | 7/2015 |
| KR | 10-2017-0076452 A | 7/2017 |
| KR | 10-2017-0082698 A | 7/2017 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | 201419115 A | 5/2014 |
| WO | 2001/71433 A1 | 9/2001 |
| WO | 2002/054157 A1 | 7/2002 |
| WO | 2006/012343 A2 | 2/2006 |
| WO | 2006/112641 A1 | 10/2006 |
| WO | 2007/018881 A2 | 2/2007 |
| WO | 2007/043222 A1 | 4/2007 |
| WO | 2007/124364 A2 | 11/2007 |
| WO | 2009/146857 A2 | 12/2009 |
| WO | 2010/017627 A1 | 2/2010 |
| WO | 2011/000893 A1 | 1/2011 |
| WO | 2012/021507 A2 | 2/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169849 A2 | 11/2013 |
| WO | 2013/169875 A2 | 11/2013 |
| WO | 2013/169882 A2 | 11/2013 |
| WO | 2014/024366 A1 | 2/2014 |
| WO | 2014/078114 A1 | 5/2014 |
| WO | 2014/105278 A1 | 7/2014 |
| WO | 2014/189197 A1 | 11/2014 |
| WO | 2015/034965 A1 | 3/2015 |
| WO | 2015/163536 A1 | 10/2015 |
| WO | 2016/022203 A1 | 2/2016 |
| WO | 2016/022205 A1 | 2/2016 |
| WO | 2016/022496 A2 | 2/2016 |
| WO | 2016/036427 A1 | 3/2016 |
| WO | 2016/036472 A1 | 3/2016 |
| WO | 2016/039587 A1 | 3/2016 |
| WO | 2016/099097 A1 | 6/2016 |
| WO | 2016/144563 A1 | 9/2016 |
| WO | 2017/000522 A1 | 1/2017 |
| WO | 2017/027526 A1 | 2/2017 |

OTHER PUBLICATIONS

Applicant Initiated Interview Summary received for U.S. Appl. No. 15/713,544, dated Oct. 24, 2019, 4 pages.
Final Office Action received for U.S. Appl. No. 15/554,204, dated Oct. 31, 2019, 22 pages.
Final Office Action received for U.S. Appl. No. 15/798,235, dated Oct. 18, 2019, 25 pages.
Notice of Acceptance received for Australian Patent Application No. 2015298710, dated Oct. 8, 2019, 3 pages.
Notice of Allowance received for Korean Patent Application No. 10-2018-7022101, dated Oct. 14, 2019, 4 pages (1 page of English Translation and 3 pages of Official Copy).
Office Action received for Australian Patent Application No. 2018201089, dated Oct. 11, 2019, 4 pages.
Search Report and Opinion received for Danish Patent Application No. PA201970598, dated Oct. 31, 2019, 9 pages.
Brief Communication regarding Oral Proceedings received for European Patent Application No. 17206177.2, dated Nov. 21, 2019, 5 pages.

(56) References Cited

OTHER PUBLICATIONS

Extended European Search Report received for European Patent Application No. 17810723.1, dated Nov. 12, 2019, 9 pages.
International Preiiminary Report on Patentability received for PCT Patent Application No. PCT/US2018/032164, dated Nov. 21, 2019, 11 pages.
International Search Report and Written Opinion received for PCT Patent Application No. PCT/US2019/030770, dated Oct. 31, 2019, 23 pages.
Notice of Allowance received for Chinese Patent Application No. 201510483268.X, dated Nov. 6, 2019, 2 pages (1 page of English translation and 1 page of Official copy).
Notice of Allowance received for U.S. Appl. No. 15/355,956, dated Nov. 22, 2019, 29 pages.
Notice of Allowance received for U.S. Appl. No. 15/881,544, dated Nov. 7, 2019, 5 pages.
Office Action received for Korean Patent Application No. 10-2019-7029673, dated Nov. 5, 2019, 10 pages (4 pages of English Translation and 6 pages of Official Copy).
Search Report and Opinion received for Danish Patent Application No. PA201970599, dated Nov. 8, 2019, 12 pages.
Andro Dollar, "Huawei Watch GT Always on Mode UPDATE is finally here!", Online Available at: https://www.youtube.com/watch?v=AJw_FIAf7v4, Jun. 6, 2019 4 pages.
Internet Blog Post, "[PC] Pre-Customization of Black Desert's Characters", Online Available at: https://blog.naver.com/hsh6051/220209813968, Dec. 14, 2014, 41 pages (21 pages of English translation and 20 pages of Official Copy).
Zephyrnix, "Steam's In-Game Home menu", Online Available at: https://www.youtube.com/watch?v=jLoRFiPkcUw, see 0;00-1;06, Feb. 15, 2011, 3 pages.
Advisory Action received for U.S. Appl. No. 14/815,898, dated Aug. 30, 2016, 3 pages.
Advisory Action received for U.S. Appl. No. 14/841,606, dated Feb. 28, 2019, 3 pages.
Advisory Action received for U.S. Appl. No. 14/846,511, dated Sep. 19, 2018, 8 pages.
"AdyClock—Night Alarm Clock", App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Android Central, "BeWeather weather app for Android", Available online at: https://www.youtube.com/watch?v=G2EY2K-XkSI, Sep. 1, 2011, 1 page.
Android Central, "Changing the Watchface on your Android Wear device", Retrieved from: https://www.youtube.com/watch?v=YYwFe2K_qil, Jul. 2, 2014, 4 pages.
APK ROOT, "Butterfly 3D Live Wallpaper 1.0 APK", Available at: http://net-suckga-ilauncher2.apk-dl.com/butterfly-3d-live-wallpaper, Feb. 26, 2013, 7 pages.
Applicant-Initiated Interview Summary received for U.S. Appl. No. 15/554,204, dated Oct. 11, 2019, 5 pages.
Avdonin, Nikita, "Astroviewer 3D", Available at: https://www.youtube.comjwatch?v=zY0tslx3JHY/, Nov. 5, 2013, 2 pages.
Bogdanov, Alexei, "SKMEI 1016", XP054977588, Available online at URL: https://www.youtube.com/watch?v=E4q4Fug05Fw>, Jun. 21, 2014, 2 pages (Official Copy only) {See Communication under 37 CFR § 1.98(a) (3)}.
Bond, John-Michael, "The 4 Best Free Flashlight Apps for Android and iOS", Online Available at: https://www.dailydot.com/debug/best-free-flashlight-apps/, Apr. 2, 2017, 8 pages.
Castellini, Rick, "Google Earth", Retrieved from: https://www.youtube.com/watch?v=bgjMSBXsFZQ>, Feb. 12, 2013, 3 pages.
Certificate of Examination received for Australian Patent Application No. 2018101947, dated Feb. 18, 2019, 2 pages.
Clark, Josh, "Designing Great iPhone Apps", O'Reilly Japan Co., O'Reilly Tim, vol. 1, May 24, 2012, 5 pages (Official Copy only) {See Communication under 37 CFR § 1.98(a) (3)}.

Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Corrected Notice of Allowance received for U.S. Appl. No. 14/815,879, dated Sep. 21, 2017, 2 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Corrected Notice of Allowance received for U.S. Appl. No. 15/798,257, dated Jun. 12, 2019, 2 pages.
Cyr, Jim, "Apple Watch—Customize Modular Watch Face", Available online at: https://www.youtube.com/watch?v=02W93HbKIK8, May 13, 2015, 2 pages.
Decision on Acceptance received for Australian Patent Application No. 2015298710, dated Jul. 19, 2019, 18 pages.
Decision on Opposition received for Australian Patent Application No. 2015298710, dated Aug. 9, 2019, 4 pages.
Decision on Opposition received for Australian Patent Application No. 2015298710, dated Aug. 20, 2018, 20 pages.
Decision to Grant received for Danish Patent Application No. PA201770387, dated Aug. 30, 2018, 2 pages.
Decision to Grant Received for Danish Patent Application No. PA201770397, dated Feb. 6, 2018, 2 pages.
Decision to Refuse received for European Patent Application No. 15730924.6, dated Mar. 15, 2019, 12 pages.
"Deluxe Moon—Guide", available online at: https://web.archive.org/web/20130520161057/http://www.lifewaresolutions.com/deluxe_moon_guide_ip.html, May 20, 2013, 5 pages.
"Digital alarm clock app for Android", Goggle play store digital alarm clock description page, Mar. 25, 2015, 3 pages.
Disrapptive, "Flashlight for Android Wear", Online Available at: https://www.youtube.com/watch?v=HVNxxUI57BM, Jul. 10, 2014, 5 pages.
EBPMAN Tech Reviews, "LG G3 Tips: How to customize the clock face", Available online at: https://www.youtube.com/watch?v=evraMWFb1fY, Jul. 25, 2014, 1 page.
European Search Report received for European Patent Application No. 17206177.2, dated Apr. 30, 2018, 4 pages.
Evgenyevich, Sergey, "Earth & Moon in HD Gyro 3D", Available at https://www.youtube.com/watch?v=IRwNcaSYrIs/, Dec. 1, 2013, 2 pages.
Extended European Search Report received for European Patent Application No. 16762356.0, dated Nov. 9, 2018, 10 pages.
Extended European Search Report received for European Patent Application No. 16837432.0, dated Mar. 11, 2019, 10 pages.
Extended European Search Report received for European Patent Application No. 17853656.1, dated Jul. 3, 2019, 9 pages.
Extended European Search Report received for European Patent Application No. 18172554.0, dated Aug. 3, 2018, 10 pages.
Feist, Jonathan, "Android customization—how to create a custom clock widget using Zooper Widget", Available Online at: https://www.androidauthority.com/zooper-widget-clock-366476/, May 15, 2014, 10 pages.
Feldman, Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, dated Feb. 26, 2018, 20 pages.
Final Office Action received for U.S. Appl. No. 14/815,890, dated May 14, 2019, 22 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/821,667, dated Apr. 26, 2018, 13 pages.

(56) References Cited

OTHER PUBLICATIONS

Final Office Action received for U.S. Appl. No. 14/841,606, dated Sep. 7, 2018, 34 pages.
Final Office Action received for U.S. Appl. No. 14/846,511 dated May 10, 2018, 21 pages.
Final Office Action received for U.S. Appl. No. 14/846,511, dated Jun. 5, 2019, 24 pages.
Final Office Action received for U.S. Appl. No. 15/713,544, dated Jul. 19, 2019, 20 pages.
Final Office Action received for U.S. Appl. No. 15/791,829, dated Mar. 7, 2019, 23 pages.
Final Office Action received for U.S. Appl. No. 15/798,235, dated Oct. 9, 2018, 45 pages.
Final Office Action received for U.S. Appl. No. 15/881,544, dated Jan. 29, 2019, 14 pages.
Final Office Action received for U.S. Appl. No. 14/815,879, dated Mar. 24, 2016, 46 pages.
First Action Interview received for U.S. Appl. No. 14/815,890, dated Aug. 12, 2016, 3 pages.
"Fitbit surge Fitness Watch", Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda, Kazuhiro, "Xperia Z1 Perfect Manual", Sotec Co., Ltd., No. 1, Nov. 15, 2013, pp. 217-218.
Gazer, "iPhone 4S Super Manual", Shuwa System Co., SAITO Kazukuni, vol. 1, Jun. 6, 2013, 7 pages (Official Copy only) {See Communication under 37 CFR § 1.98(a) (3)}.
Geary, David, "Programming HTML5 Canvas", O'Reilly Japan, Inc., No. 1, Jul. 23, 2014, pp. 327-330.
Geek, "How to Put the Day of the Week into the Windows Taskbar Clock", Available online at: https://www.howtogeek.com/194103/how-to-put-the-day-of-the-week-into-the-windows-taskbar-clock/, 2014, 3 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
"Google Earth on Android—AndroidCentral.com", Available online at :- https://www.youtube.com/watch?v=1WxN1RunrE4, Feb 22, 2010, 1 page.
Gottabemobile, "How to Change Watch Faces on Android Wear", Available online at URL: https://www.youtube.com/watch?v=B8iRGkGq6a8, Jul. 9, 2014, 4 pages.
Haidar, Rawand, "How to Use Android Wear Smartwatch as a Flashlight!", Available online at: https://howto.highonandroid.com/android-wear-tutorials/how-to-use-android-wear-smartwatch-as-a-flashlight-flashlight-app/, Sep. 13, 2015, 6 pages.
Hollywoodfrodo, "Free Flashlight Android App by Asus Best Flashlight App on Google Play", Online Available at: https://www.youtube.corn/watch?v=K_kFa7PoVsc>, Sep. 9, 2016, 3 pages.
"Huawei Watch FAQs-en_us-V2.8", Online available at: https://maplindownloads.s3-eu-west-1.amazonaws.com/A27WH-9512.pdf, Apr. 11, 2016, 135 pages.
Intention to Grant received for Danish Patent Application No. PA201570496, dated Feb. 17, 2016, 6 pages.
Intention to Grant received for Danish Patent Application No. PA201770387, dated Apr. 4, 2018, 2 pages.
Intention to Grant received for Danish Patent Application No. PA201770387, dated May 24, 2018, 2 pages.
Intention to Grant received for Danish Patent Application No. PA201770397, dated Aug. 18, 2017, 7 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Preliminary Report on Patentability received for PCT Patent Application No. PCT/US2016/035090, dated Dec. 14, 2017, 14 pages.
International Preliminary Report on Patentability received for PCT Patent Application No. PCT/US2016/037686, dated Mar. 1, 2018, 12 pages.
International Preliminary Report on Patentability received for PCT Patent Application No. PCT/US2017/034834, dated Dec. 20, 2018, 9 pages.
International Preliminary Report on Patentability received for PCT Patent Application No. PCT/US2017/049793, dated Apr. 4, 2019, 15 pages.
International Search Report and Written Opinion received for PCT Patent Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/034607, dated Dec. 1, 2015, 23 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/053353, dated May 9, 2016, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion received for PCT Patent Application No. PCT/US2017/049793, dated Dec. 27, 2017, 19 pages.
International Search Report and Written Opinion received for PCT Patent Application No. PCT/US2018/032164, dated Oct. 18, 2018, 16 pages.

(56) References Cited

OTHER PUBLICATIONS

International Search Report and Written Opinion received for PCT Patent Application No. PCT/US2018/032385, dated Aug. 3, 2018, 14 pages.
Invitation to Additional Fees and Partial International Search Report received for PCT Patent Application No. PCT/US2015/034604, dated Sep. 4, 2015, 6 pages.
Invitation to Additional Fees and Partial International Search Report received for PCT Patent Application No. PCT/US2015/034606, dated Sep. 9, 2015, 6 pages.
Invitation to Pay Additional Fee received for European Patent Application No. 15747595.5, dated Feb. 9, 2018, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional fees received for PCT Patent Application No. PCT/US2015/053353, dated Jan. 21, 2016, 7 pages.
Invitation to Pay Additional fees received for PCT Patent Application No. PCT/US2015/054223, dated Mar. 9, 2016, 9 pages.
Invitation to Pay Additional Fees received for PCT Patent Application No. PCT/US2016/035090, dated Jul. 15, 2016, 2 pages.
Invitation to Pay Additional Fees received for PCT Patent Application No. PCT/US2017/049793, dated Nov. 3, 2017, 2 pages.
Invitation to Pay Additional Fees received for PCT Patent Application No. PCT/US2018/032164, dated Aug. 21, 2018, 10 pages.
Invitation to Pay Additional Fees received for PCT Patent Application No. PCT/US2019/030770, dated Jul. 26, 2019, 12 pages.
ISO 9241-13:1998, "Ergonomic requirements for office work with visual display terminals (VDTs)", Part 13: User guidance, International Standard ISO, Zuerich, CH, vol. 9241-13, Jul. 15, 1998, 40 pages.
Kenney, Briley, "How to Customize a Smartwatch and other Personalization Questions", Available online at: https://smartwatches.org/learn/customize-smartwatch/, Jan. 23, 2014, 3 pages.
"Kidizoom Smartwatch", Available online at URL: https://www.vtechnl.com/media/downloads/Kidizoom-Smart-Watch.pdf, Jun. 24, 2014, 23 pages.
"Link to Wayback Machine with link to Google Play showing different layouts of complications associated with a clock face", Available online at: https://play.google.com/store/apps/details?id=com.levelup.beautifulwidgets.free&hl=da , Sep. 9, 2013, 6 pages.
"Living Earth", Available at: http://www.livingearthapp.com/, 2014, 6 pages.
Minutes of Oral Proceedings received for European Patent Application No. 15730924.6, dated Mar. 13, 2019, 4 pages.
"MS Excel 2013", Jan. 29, 2013, 2 pages.
Nerdtalk, "The Best Android Clock Widgets", Available at: https://www.youtube.com/watch?v=E1bAprWByfU, Apr. 25, 2011, 1 page.
"New, but unsigned—Easy StopWatch for Symbian", XP55393563, Available online at: http://www.allaboutsymbian.com/flow/item/19490_New_but_unsigned-Easy_StopWatc.php, Mar. 15, 2014, 15 pages.
"Night Display (Alarm Clock) App", Google Play Store Night Display (Alarm Clock) Description page, Available at: https://web.archive.org/web/20141007124222/https://play.google.com/store/apps/details?id=com.srk.nighttimedisplay&hl=en, Oct. 7, 2014, pp. 1-3.
Non-Final Office Action received for U.S. Appl. No. 15/554,204, dated Apr. 17, 2019, 19 pages.
Non-Final Office Action received for U.S. Appl. No. 14/815,879, dated Dec. 15, 2016, 33 pages.
Non-Final Office Action received for U.S. Appl. No. 14/815,879, dated Nov. 6, 2015, 35 pages.
Non-Final Office Action received for U.S. Appl. No. 14/815,890, dated Dec. 18, 2018, 21 pages.
Non-Final Office Action received for U.S. Appl. No. 14/815,890, dated Jun. 6, 2017, 19 pages.
Non-Final Office Action received for U.S. Appl. No. 14/815,890, dated Oct. 19, 2015, 5 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Non-Final Office Action received for U.S. Appl. No. 14/821,667, dated Feb. 4, 2019, 13 pages.
Non-Final Office Action received for U.S. Appl. No. 14/821,667, dated Jul. 14, 2017, 12 pages.
Non-Final Office Action received for U.S. Appl. No. 14/839,889, dated Mar. 7, 2017, 26 pages.
Non-Final Office Action received for U.S. Appl. No. 14/841,606, dated Dec. 7, 2017, 30 pages.
Non-Final Office Action received for U.S. Appl. No. 14/841,606, dated May 8, 2019, 28 pages.
Non-Final Office Action received for U.S. Appl. No. 14/846,511 dated Oct. 27, 2017, 15 pages.
Non-Final Office Action received for U.S. Appl. No. 14/846,511, dated Nov. 30, 2018, 22 pages.
Non-Final Office Action received for U.S. Appl. No. 15/183,663, dated Jul. 9, 2018, 13 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 15/421,865, dated Mar. 21, 2019, 18 pages.
Non-Final Office Action received for U.S. Appl. No. 15/713,544, dated Jan. 24, 2019, 16 pages.
Non-Final Office Action received for U.S. Appl. No. 15/791,829, dated Nov. 8, 2018, 18 pages.
Non-Final Office Action received for U.S. Appl. No. 15/798,235, dated Apr. 24, 2019, 25 pages.
Non-Final Office Action received for U.S. Appl. No. 15/798,235, dated Mar. 14, 2018, 58 pages.
Non-Final Office Action received for U.S. Appl. No. 15/881,544, dated Jun. 7, 2018, 15 pages.
Notice of Acceptance received for Australian Patent Application No. 2016229847, dated Sep. 12, 2018, 3 pages.
Notice of Allowance received for Chinese Patent Application No. 201510481525.6, dated May 27, 2019, 2 pages (1 page of English Translation and 1 page of Official Copy).
Notice of Allowance received for Chinese Patent Application No. 201510483305.7, dated Jan. 8, 2019, 3 pages (1 page of English Translation and 2 pages of Official Copy).
Notice of Allowance received for Chinese Patent Application No. 201510484514.3, dated Jun. 6, 2019, 2 pages (1 page of English Translation and 1 page of Official Copy).
Notice of Allowance received for Chinese Patent Application No. 201520594249.X, dated Jul. 12, 2016, 4 pages (2 pages of English Translation and 2 pages of Official Copy).
Notice of Allowance received for Chinese Patent Application No. 201810037665.8, dated Jul. 9, 2019, 4 pages (1 page of English Translation and 3 pages of Official Copy).
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Japanese Patent Application No. 2017-505450, dated Mar. 9, 2018, 10 pages (7 pages of English Translation and 3 pages of Official Copy).
Notice of Allowance received for Japanese Patent Application No. 2017-505847, dated May 20, 2019, 4 pages (1 page of English Translation and 3 pages of Official Copy).
Notice of Allowance received for Japanese Patent Application No. 2017-545918, dated Jul. 22, 2019, 4 pages (1 page of English Translation and 3 pages of Official Copy).
Notice of Allowance received for Japanese Patent Application No. 2018-074971, dated Apr. 23, 2019, 4 pages (1 page of English Translation and 3 pages of Official Copy).

(56) References Cited

OTHER PUBLICATIONS

Notice of Allowance received for Korean Patent Application No. 10-2017-7005939, dated Mar. 30, 2018, 5 pages (2 pages of English Translation and 3 pages of Official Copy).
Notice of Allowance received for Taiwanese Patent Application No. 104124962, dated Jul. 27, 2017, 3 pages (Official Copy only) {See Communication under 37 CFR § 1.98(a) (3)}.
Notice of Allowance received for Taiwanese Patent Application No. 104124963, dated Sep. 28, 2017, 5 pages (1 page of English Translation of Search report and 4 pages of Official Copy).
Notice of Allowance received for Taiwanese Patent Application No. 104124995, dated Jul. 27, 2017, 3 pages (Official Copy only) {See Communication under 37 CFR § 1.98(a) (3)}.
Notice of Allowance received for Taiwanese Patent Application No. 104124997, dated Jun. 16, 2017, 5 pages (1 page of English Translation of Search report and 4 pages of Official Copy).
Notice of Allowance received for Taiwanese Patent Application No. 104124998, dated Mar. 31, 2017, 3 pages (Official Copy only) {See Communication under 37 CFR § 1.98(a) (3)}.
Notice of Allowance received for Taiwanese Patent Application No. 104134740, dated Dec. 8, 2016, 5 pages (1 page of English Translation of Search Report and 4 pages of Official Copy).
Notice of Allowance received for U.S. Appl. No. 14/815,879, dated Jun. 26, 2017, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/821,667, dated Jun. 12, 2019, 9 pages.
Notice of Allowance received for U.S. Appl. No. 14/839,889, dated Oct. 30, 2017, 16 pages.
Notice of Allowance received for U.S. Appl. No. 15/183,663, dated Jan. 17, 2019, 6 pages.
Notice of Allowance received for U.S. Appl. No. 15/791,829, dated Oct. 4, 2019, 9 pages.
Notice of Allowance received for U.S. Appl. No. 15/798,257, dated May 22, 2019, 14 pages.
Notice of Allowance received for U.S. Appl. No. 15/881,544, dated Jun. 26, 2019, 6 pages.
Nova, "Tour of the Solar System", Retrieved from: http://www.pbs.org/wgbh/nova/space/tour-solar-system.html, May 24, 2013, 14 pages.
Obara, Yuuta, "iPhone Application Selection for University Students", Shuwa System Co., Saito Kazukuni, vol. 1, May 16, 2013, 4 pages (Official Copy only) {See Communication under 37 CFR § 1.98(a) (3)}.
Octoba, "Just Install It—Utilizing Method for Android Application Business", ASCII Media Works Co. Takano Kiyoshi, vol. 1, Apr. 25, 2013, 6 pages (Official Copy only) {See Communication under 37 CFR § 1.98(a) (3)}.
Office Action received for Danish Patent Application No. PA201570499, dated Nov. 1, 2017, 6 pages.
Office Action received for European Patent Application No. 15730924.6, dated Dec. 12, 2017, 8 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101019, dated Feb. 12, 2016, 4 pages.
Office Action received for Australian Patent Application No. 2015101020, dated Oct. 26, 2015, 8 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2015298710, dated Nov. 6, 2018, 4 pages.
Office Action received for Australian Patent Application No. 2015298710, dated Sep. 24, 2018, 4 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2016229847, dated Jul. 3, 2018, 4 pages.
Office Action received for Australian Patent Application No. 2017277813, dated Jun. 11, 2019, 3 pages.
Office Action received for Australian Patent Application No. 2018100179, dated Jun. 4, 2018, 4 pages.
Office Action received for Australian Patent Application No. 2018100179, dated Nov. 20, 2018, 7 pages.
Office Action received for Australian Patent Application No. 2018100179, dated Sep. 14, 2018, 4 pages.
Office Action received for Australian Patent Application No. 2018206770, dated Apr. 30, 2019, 4 pages.
Office Action received for Australian Patent Application No. 2018206770, dated Jul. 16, 2019, 5 pages.
Office Action received for Australian Patent Application No. 2018206770, dated Jul. 25, 2018, 5 pages.
Office Action received for Australian Patent Application No. 2018206770, dated Mar. 5, 2019, 3 pages.
Office Action received for Australian Patent Application No. 2018279037, dated Jun. 18, 2019, 5 pages.
Office Action received for Chinese Patent Application No. 201520595384.6, dated Mar. 25, 2016, 3 pages (1 page of English Translation and 2 pages of Official copy).
Office Action received for Chinese Patent Application No. 201510479088.4, dated Mar. 12, 2018, 20 pages (6 pages of English Translation and 14 pages of Official Copy).
Office Action received for Chinese Patent Application No. 201510479088.4, dated May 7, 2019, 6 pages (3 pages of English Translation and 3 pages of Official Copy).
Office Action received for Chinese Patent Application No. 201510481525.6, dated Aug. 29, 2018, 10 pages (5 pages of English Translation and 5 pages of Official copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Apr. 16, 2019, 6 pages (3 pages of English Translation and 3 pages of Official Copy).
Office Action received for Chinese Patent Application No. 201510483268.X, dated Dec. 1, 2017, 11 pages (5 pages of English Translation and 6 pages of Official Copy).
Office Action received for Chinese Patent Application No. 201510483268.X, dated Oct. 19, 2018, 10 pages (5 pages of English Translation and 5 pages of Official Copy).
Office action received for Chinese Patent Application No. 201510483305.7, dated Aug. 31, 2018, 10 pages (5 pages of English Translation and 5 pages of Official copy).

(56) References Cited

OTHER PUBLICATIONS

Office action received for Chinese Patent Application No. 201510483305.7, dated Dec. 1, 2017, 13 pages (5 pages of English Translation and 8 pages of Official Copy).
Office Action received for Chinese Patent Application No. 201510484514.3, dated Apr. 4, 2018, 12 pages (5 pages of English Translation and 7 pages of Official Copy).
Office Action received for Chinese Patent Application No. 201510484514.3, dated Dec. 24, 2018, 13 pages (6 pages of English Translation and 7 pages of Official Copy).
Office Action received for Chinese Patent Application No. 201520594249.X, dated Mar. 25, 2016, 3 pages (1 page of English Translation and 2 pages of Official copy).
Office Action received for Chinese Patent Application No. 201520595384.6, dated Dec. 30, 2016, 2 pages (Official Copy only) {See Communication under 37 CFR § 1.98(a) (3)).
Office Action received for Chinese Patent Application No. 201520595384.6, dated Jul. 22, 2016, 3 pages (1 page of English Translation and 2 pages of Official Copy).
Office Action received for Chinese Patent Application No. 201520595385.0, dated Dec. 30, 2016, 2 pages (Official Copy only) {See Communication under 37 CFR § 1.98(a) (3)}.
Office Action received for Chinese Patent Application No. 201520595385.0, dated Jul. 22, 2016, 3 pages (1 page of English Translation and 2 pages of Official Copy).
Office Action received for Chinese Patent Application No. 201520595385.0, dated Mar. 25, 2016, 3 pages (1 page of English Translation and 2 pages of Official copy).
Office Action received for Chinese Patent Application No. 201520595408.8, dated Dec. 9, 2015, 4 pages (2 pages of English Translation and 2 pages of Official Copy).
Office Action received for Chinese Patent Application No. 201520595408.8, dated Dec. 30, 2016, 2 pages (Official Copy only) {See Communication under 37 CFR § 1.98(a) (3)}.
Office Action received for Chinese Patent Application No. 201520595408.8, dated Jul. 25, 2016, 3 pages (1 page of English Translation and 2 pages of Official Copy).
Office Action received for Chinese Patent Application No. 201520595408.8, dated Mar. 25, 2016, 3 pages (1 page of English Translation and 2 pages of Official copy).
Office Action received for Chinese Patent Application No. 201520595538.1, dated Dec. 30, 2016, 2 pages (Official Copy only) {See Communication under 37 CFR § 1.98(a) (3)}.
Office Action received for Chinese Patent Application No. 201520595538.1, dated Jul. 22, 2016, 3 pages (1 page of English Translation and 2 pages of Official copy).
Office Action received for Chinese Patent Application No. 201520595538.1, dated Mar. 25, 2016, 3 pages (1 page of English Translation and 2 pages of Official copy).
Office Action received for Chinese Patent Application No. 201680047983.1, dated Mar. 18, 2019, 18 pages (6 pages of English Translation and 12 pages of Official Copy).
Office Action received for Chinese Patent Application No. 201810037665.8, dated Dec. 7, 2018, 10 pages (5 pages of English Translation and 5 pages of Official Copy).
Office Action received for Chinese Patent Application No. 201810467061.7, dated Aug. 15, 2019, 13 pages (7 pages of English Translation and 6 pages of Official Copy).
Office Action received for Chinese Patent Application No. 201810467061.7, dated Feb. 22, 2019, 19 pages (10 pages of English Translation and 9 pages of Official Copy).
Office Action Received for Chinese Patent Application No. 201520594249.X, dated Dec. 9, 2015, 4 pages (2 pages of English Translation and 2 pages of Official Copy).
Office Action Received for Chinese Patent Application No. 201520595384.6, dated Dec. 9, 2015, 4 pages (2 pages of English Translation and 2 pages of Official Copy).
Office Action Received for Chinese Patent Application No. 201520595385.0, dated Dec. 9, 2015, 4 pages (2 pages of English Translation and 2 pages of Official Copy).
Office Action Received for Chinese Patent Application No. 201520595538.1, dated Dec. 9, 2015, 4 pages (2 pages of English Translation and 2 pages of Official Copy).
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570497, dated Oct. 24, 2017, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 26, 2017, 5 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Jun. 19, 2018, 4 pages.
Office Action received for Danish Patent Application No. PA201570499, dated Nov. 3, 2015, 7 pages.
Office Action Received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201770387, dated Feb. 1, 2018, 3 Pages.
Office Action received for Danish Patent Application No. PA201770791, dated Jan. 31, 2018, 8 pages.
Office Action received for Danish Patent Application No. PA201770791, dated Jul. 13, 2018, 2 pages.
Office Action received for Danish Patent Application No. PA201770791, dated Jun. 11, 2019, 3 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for European Patent Application No. 15730925.3, dated Apr. 12, 2018, 8 pages.
Office Action received for European Patent Application No. 15747595.5, dated Apr. 15, 2019, 4 pages.
Office Action received for European Patent Application No. 15747595.5, dated Jun. 27, 2018, 8 pages.
Office Action received for European Patent Application No. 17206177.2, dated May 15, 2018, 6 pages.
Office Action received for European Patent Application No. 18172554.0, dated Jul. 12, 2019, 10 Pages.
Office Action received for European Patent Application No. 15730925.3, dated Feb. 27, 2019, 5 pages.
Office Action received for German Patent Application No. 112015003083.2, dated Mar. 9, 2018, 12 pages (5 pages of English Translation and 7 pages of Official Copy).
Office Action received for Japanese Patent Application No. 2017-505450, dated Jun. 20, 2017, 8 pages (4 pages of English Translation and 4 pages of Official Copy).

(56) References Cited

OTHER PUBLICATIONS

Office Action received for Japanese Patent Application No. 2017-505842, dated Feb. 22, 2019, 11 pages (6 pages of English Translation and 5 pages of Official Copy).
Office Action received for Japanese Patent Application No. 2017-505842, dated Sep. 9, 2019, 7 pages (3 pages of English Translation and 4 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2017-545918, dated Sep. 14, 2018, 12 pages (7 pages of English Translation and 5 pages of Official copy).
Office Action received for Japanese Patent Application No. 2018-074971, dated Jan. 28, 2019, 6 pages (3 pages of English Translation and 3 pages of Official Copy).
Office Action received for Japanese Patent Application No. 2018-537840, dated Jul. 8, 2019, 15 pages (8 pages of English Translation and 7 pages of Official copy).
Office Action received for Korean Patent Application No. 10-2017-7005939, dated Jun. 30, 2017, 6 pages (2 pages of English Translation and 4 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2017-7024570, dated Sep. 28, 2018, 14 pages (6 pages of English Translation and 8 pages of Official copy).
Office Action received for Korean Patent Application No. 10-2018-7018904, dated Aug. 20, 2019, 8 pages (3 pages of English Translation and 5 pages of Official Copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2018-7022101, dated Jul. 9, 2019, 10 pages (5 pages of English Translation and 5 pages of Official Copy).
Office Action received for Netherland Patent Application No. 2015239, dated Oct. 28, 2016, 13 pages (5 pages of English Translation and 8 pages of Official Copy).
Office Action received for Netherland Patent Application No. 2015245, dated Jan. 24, 2017, 11 pages (1 page of English Translation and 10 pages of Official Copy).
Office Action Received for Taiwanese Patent Application No. 104124962, dated Nov. 29, 2016, 6 pages (3 pages of English Translation and 3 pages of Official Copy).
Office Action received for Taiwanese Patent Application No. 104124998, dated Nov. 29, 2016, 6 pages (3 pages of English Translation and 3 pages of Official Copy).
Office Action received for Taiwanese Patent Application No. 104124963, dated Jan. 5, 2017, 11 pages (5 pages of English Translation and 6 pages of Official Copy).
Office Action received for Taiwanese Patent Application No. 104124995, dated Dec. 1, 2016, 6 pages (3 pages of English Translation and 3 pages of Official Copy).
Office Action received for Taiwanese Patent Application No. 104124997, dated Dec. 8, 2016, 12 pages (5 pages of English Translation and 7 pages of Official Copy).
Office Action received for Taiwanese Patent Application No. 104126627, dated Nov. 29, 2016, 9 pages (4 pages of English Translation and 5 pages of Official Copy).
Office Action received for Taiwanese Patent Application No. 104126627, dated Aug. 30, 2018, 22 pages (9 pages of English Translation and 13 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104126627, dated Oct. 16, 2017, 7 pages (3 pages of English Translation and 4 pages of Official Copy).
Office Action received for Taiwanese Patent Application No. 104132636, dated Dec. 13, 2018, 26 pages (9 pages of English Translation and 17 pages of Official Copy).
Office Action received for Taiwanese Patent Application No. 104132636, dated Mar. 23, 2017, 25 pages (10 pages of English Translation and 15 pages of Official copy).
Office Action received for Taiwanese Patent Application No. 104132636, dated Oct. 31, 2017, 10 pages (4 pages of English Translation and 6 pages of Official Copy).
Omar Romero, "Sony Smartwatch 2 Custom Watchfaces Tutorial", Retrieved From: https://www.youtube.com/watch?v=8odbxqwSQR8, May 1, 2014, 2 pages.
"Online Alarm Clock", https://web.archive.org/web/20150505081746/http://www.online-stopwatch.com/online-alarm-clock, May 5, 2015, 2 pages.
"Pentax K20D Operating Manual", http://www.ricoh-imaging.eu/en/operating-manuals-download.html, 2008, pp. 173-174.
Pre-Interview First Office Action received for U.S. Appl. No. 14/815,890, dated May 26, 2016, 4 pages.
Rehman, A, "Install Android 4.2 Gesture-Based Keyboard & Clock App on Jelly Bean 4.1 or Higher", Excerpts from, Available online at: http://www.addictivetips.com/android/install-android-4-2-keyboard-clock-app-apk-on-jelly-bean-4-1-x/, Nov. 3, 2012, 4 pages.
Restriction Requirement received for U.S. Appl. No. 14/815,890, dated Feb. 22, 2016, 5 pages, 5 pages.
"Reuse Animations—Synfig Animation Studio", Available online at: https://wiki.synfig.org/index.php?title=Doc:Reuse_Animations&oldid=18173, May 20, 2013, 5 pages.
Search Report and Opinion received for Danish Patent Application No. PA201770387, dated Oct. 12, 2017, 8 pages.
Search Report and Opinion Received for Netherland Patent Application No. 2015232, dated Jan. 25, 2017, 9 pages (1 page of English Translation and 8 pages of Official Copy).
Search Report and Opinion received for Netherlands Patent Application No. 2015242, dated Jul. 4, 2017, 20 pages (10 pages of English Translation of Search Opinion and 10 pages of official copy).
Search Report and Opinion received for Netherlands Patent Application No. 2018531, dated Jul. 27, 2017, 14 pages (6 pages of English Translation and 8 pages of Official Copy).
Search Report received for Danish Patent Application No. 201570768, dated Mar. 17, 2016, 11 pages.
Shiota, Shinji, "Windows 7 Dojo", Weekly ASCII, Ascii Mediaworks Inc., vol. 798, Aug. 31, 2010, 3 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
Sony, "Live View™ micro display", Extended User Guide, Aug. 2010, 27 pages.
Sony, "Sony SmartWatch", User Guide, Dec. 2011, 18 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, dated Jun. 13, 2018, 10 pages.
Summons to Attend Oral Proceedings received for European Patent Application No. 15730925.3, dated Oct. 2, 2019, 8 pages.
Summons to Attend Oral Proceedings received for European Patent Application No. 17206177.2, dated Jun. 3, 2019, 8 pages.
Sun Set, "Sun Set solar image clock", Available at: https://web.archive.orgjweb/20140719005410/http://www.sunsetclock.com/, 2013, 5 pages.
Talkandroid, "Android Wear walkthrough", Available online at: https://www.youtube.com/watch?v=4xntpZac4sw, Jun. 30, 2014, 1 page.
"The Simply Alarm app for Pebble", Available online at: https://web.archive.org/web/20150517070400/http://www.rebootsramblings.ca/n/sahhelp/https://www.youtube.com/watch?v=IVp1scQPw08, May 17, 2015, 1 page.
"Tropical Fish 14", Available online at: https://www.turbosquid.com/3d-models/tropical-fish-3d-model/388510, Feb. 4, 2008, 2 pages.

(56) References Cited

OTHER PUBLICATIONS

Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
"UIKit User Interface Catalog: Page Controls", Available online at: https://web.archive.org/web/20140703123442/https://developer.apple.com/library/ios/documentation/userexperience/conceptual/UIKitUICatalog/UIPageControl.html, Dec. 16, 2013, 4 pages.
"Ultitorch For", Online Available at: https://apkgk.com/com.qasq.torchpro, Jan. 8, 2016, 4 pages.
Viticci, Frederico, "Checking Time Zones with Living Earth—MacStories", Available at: https://www.macstories.net/reviews/checking-time-zones-with-living-earth/, Dec. 11, 2013, pp. 1-5.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Whitwam, Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Xperia ZL2 SOL25, "Instruction Manual", Detailed version, KDDI Corporation, No. 1, vol. 1, Jun. 2014, 4 pages.
Zukerman, Erez, "6 Beautiful, Interesting & Versatile Timer Apps [Android]", available at: http://www.makeuseof.com/tag/beautiful-interesting-versatile-timer-apps-android/, May 18, 2012, 5 pages.
Applicant Initiated Interview Summary received for U.S. Appl. No. 15/713,544, dated Apr. 6, 2020, 7 pages.
Final Office Action received for U.S. Appl. No. 16/585,721, dated Apr. 1, 2020, 28 pages.
Non-Final Office Action received for U.S. Appl. No. 16/389,722, dated Apr. 3, 2020, 15 pages.
Notice of Allowance received for Japanese Patent Application No. 2018-537840, dated Mar. 19, 2020; 4 pages (1 page of English Translation and 3 pages of Official Copy).
Notice of Allowance received for U.S. Appl. No. 15/798,235, dated Apr. 1, 2020, 8 pages.
Office Action received for Australian Patent Application No. 2017277813, dated Mar. 20, 2020, 4 pages.
Office Action received for Australian Patent Application No. 2019208225, dated Mar. 20, 2020, 3 pages.
Office Action received for Japanese Patent Application No. 2019-511611, dated Feb. 28, 2020, 4 pages. (2 pages of English Translation and 2 pages of Official Copy).
Applicant-Initiated Interview Summary received for U.S. Appl. No. 15/421,865, dated Feb. 3, 2020, 5 pages.
Applicant-Initiated Interview Summary received for U.S. Appl. No. 15/554,204, dated Jan. 31, 2020, 3 pages.
Applicant-Initiated Interview Summary received for U.S. Appl. No. 15/798,235, dated Feb. 3, 2020, 3 pages.
Final Office Action received for U.S. Appl. No. 15/405,122, dated Jan. 21, 2020, 36 pages.
Office Action and Search Report received for Danish Patent Application No. PA201970598, dated Jan. 28, 2020, 6 pages.
Office Action received for Australian Patent Application No. 2018279037, dated Jan. 17, 2020, 4 pages.
Office Action received for Danish Patent Application No. PA201970599, dated Jan. 23, 2020, 6 pages.
Phandroid, "New Android Wear Wrist Gestures in Marshmallow", Available online at: https://www.youtube.com/watch?v=0WhKuklpQ9A, Feb. 11, 2016, 3 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Big Phil TV, "Gear S3 Watch faces with great always on display(A O D)", Available online at: https://www.youtube.com/watch?v=2cxMnrMiGU8, Apr. 5, 2017, 3 pages.
Cengic, Suad, "Samsung Gear S3—Display Always on! Cool!", Available online at: https://www.youtube.com/watch?v=ceeDinbPwOY, Mar. 10, 2017, 3 pages.
Corrected Notice of Allowance received for U.S. Appl. No. 15/355,956, dated Jan. 3, 2020, 2 pages.
Corrected Notice of Allowance received for U.S. Appl. No. 15/791,829, dated Jan. 16, 2020, 2 pages.
Droid Life, "How to: Use Always-on Apps with Android Wear", Available online at: https://www.youtube.com/watch?v=_-xYB9EBTaA, Jun. 26, 2015, 3 pages.
Non-Final Office Action received for U.S. Appl. No. 16/584,445, dated Dec. 26, 2019, 19 pages.
Non-Final Office Action received for U.S. Appl. No. 16/585,721, dated Dec. 27, 2019, 25 pages.
Non-Final Office Action received for U.S. Appl. No. 14/846,511 dated Jan. 7, 2020, 25 pages.
Office Action received for European Patent Application No. 16837432.0, dated Jan. 10, 2020, 7 pages.
Cancellation of Oral Proceedings received for European Patent Application No. 17206177.2, dated Dec. 4, 2019, 2 pages.
Final Office Action received for U.S. Appl. No. 15/421,865, dated Dec. 2, 2019, 19 pages.
International Preliminary Report on Patentability received for PCT Patent Application No. PCT/US2018/032385, dated Nov. 28, 2019, 10 pages.
Non-Final Office Action received for U.S. Appl. No. 15/713,544, dated Dec. 11, 2019, 19 pages.
Office Action received for Australian Patent Application No. 2017330211, dated Dec. 5, 2019, 3 pages.
Office Action received for Chinese Patent Application No. 201680047983.1, dated Nov. 28, 2019, 9 pages (4 pages of English Translation and 5 pages of Official Copy).
Search Report and Opinion received for Danish Patent Application No. PA201970597, dated Dec. 18, 2019, 10 pages.
Search Report and Opinion received for Danish Patent Application No. PA201970596, dated Dec. 4, 2019, 11 pages.
Brief Communication regarding Oral Proceedings received for European Patent Application No. 15730925.3, dated Feb. 18, 2020, 7 pages.
Intention to Grant received for Danish Patent Application No. PA201770791, dated Feb. 19, 2020, 2 pages.
Intention to Grant received for European Patent Application No. 15747595.5, dated Feb. 17, 2020, 8 pages.
Intention to Grant received for European Patent Application No. 17206177.2, dated Feb. 24, 2020, 8 pages.
Intention to Grant received for European Patent Application No. 18172554.0, dated Feb. 17, 2020, 8 pages.
Office Action received for Korean Patent Application No. 10-2019-7005734, dated Feb. 24, 2020, 13 pages (7 pages of English Translation and 6 pages of Official Copy).
Advisory Action received for U.S. Appl. No. 15/554,204, dated Mar. 12, 2020, 3 pages.
Applicant Initiated Interview Summary received for U.S. Appl. No. 16/584,445, dated Mar. 17, 2020, 5 pages.
Applicant-Initiated Interview Summary received for U.S. Appl. No. 16/585,721, dated Mar. 13, 2020, 5 pages.
Examiners Answer to Appeal Brief received for U.S. Appl. No. 14/815,890, dated Mar. 20, 2020, 16 pages.
Notice of Allowance received for Japanese Patent Application No. 2017-505842, dated Mar. 16, 2020, 4 pages (1 page of English Translation and 3 pages of Official Copy).
Office Action received for Chinese Patent Application No. 2018104670617, dated Feb. 18, 2020, 12 pages (6 pages of English Translation and 6 pages of Official Copy).
Office Action received for Danish Patent Application No. PA201970596, dated May 6, 2020, 4 pages.

(56) References Cited

OTHER PUBLICATIONS

Office Action received for Danish Patent Application No. PA201970599, dated May 27, 2020, 4 pages.
Advisory Action received for U.S. Appl. No. 15/421,865, dated Apr. 16, 2020, 7 pages.
Advisory Action received for U.S. Appl. No. 16/582,020, dated Aug. 3, 2020, 4 pages.
Android Tips, "Create a Minimal Lock Screen with WidgetLocker", Online Available at: http://appstap192.blogspot.com/2012/01/create-minimal-lock-screen-with.html, Jan. 18, 2012, 6 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018, 3 pages.
Applicant Initiated Interview Summary received for U.S. Appl. No. 14/846,511, dated Apr. 20, 2020, 4 pages.
Applicant Initiated Interview Summary received for U.S. Appl. No. 16/389,722, dated Jul. 7, 2020, 5 pages.
Applicant Initiated Interview Summary received for U.S. Appl. No. 16/582,020, dated Jul. 14, 2020, 5 pages.
Applicant Initiated Interview Summary received for U.S. Appl. No. 16/582,020, dated Mar. 25, 2020, 5 pages.
Applicant Initiated Interview Summary received for U.S. Appl. No. 16/585,399, dated Mar. 25, 2020, 3 pages.
Applicant-Initiated Interview Summary received for U.S. Appl. No. 15/405,122, dated May 21, 2020, 5 pages.
Applicant-Initiated Interview Summary received for U.S. Appl. No. 16/585,714, dated Jul. 20, 2020, 5 pages.
Applicant-Initiated Interview Summary received for U.S. Appl. No. 16/585,721, dated Aug. 31, 2020, 5 pages.
Barbosa Jonathan, "Weather Clock 2.1 for Android", APKPure, Online Available at: https://apkpure.com/weather-clock/com.urbandroid.wclock, Oct. 15, 2015, 3 pages.
Brightness on lock screen, Online Available at: https://www.reddit.com/r/galaxys10/comments/b4d5fb/brightness_on_lock_screen/, 2019, 1 page.
Corrected Notice of Allowance received for U.S. Appl. No. 15/554,204, dated Aug. 19, 2020, 3 pages.
Dan, "Get This Look: 'Minimal' Zooper Widget", Online Available at: https://www.androidguys.com/featured/customize/get-look-minimal-zooper-widget/, Mar. 7, 2014, 2 pages.
Decision to Grant received for Danish Patent Application No. PA201770791, dated Jul. 7, 2020, 2 pages.
Decision to Grant received for European Patent Application No. 15747595.5, dated Jul. 16, 2020, 2 pages.
Decision to Grant received for European Patent Application No. 17206177.2, dated Aug. 6, 2020, 2 pages.
Decision to Grant received for European Patent Application No. 18172554.0, dated Jul. 30, 2020, 2 pages.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.
European Search Report received for European Patent Application No. 20172197.4, dated Jul. 28, 2020, 4 pages.
Extended European Search Report received for European Patent Application No. 20180900.1, dated Sep. 18, 2020, 7 pages.
Final Office Action received for U.S. Appl. No. 14/846,511, dated Aug. 11, 2020, 25 pages.
Final Office Action received for U.S. Appl. No. 15/713,544, dated May 20, 2020, 14 pages.
Final Office Action received for U.S. Appl. No. 16/582,020, dated Apr. 28, 2020, 31 pages.
Intention to Grant received for European Patent Application No. 15730925.3, dated May 28, 2020, 10 pages.
International Search Report and Written Opinion received for PCT Patent Application No. PCT/US2020/030079, dated Sep. 4, 2020, 18 pages.
Invitation to Pay Additional Fees received for PCT Patent Application No. PCT/US2020/030079, dated Jul. 14, 2020, 12 pages.
Looking for a launcher that changes the default homescreen or widgets based on Wi-Fi, location, or other context., Online Available at: https://www.reddit.com/r/androidapps/comments/351u90/looking_for_a_launcher_that_changes_the_default/, 2015, 2 pages.
Minutes of Oral Proceedings received for European Patent Application No. 15730925.3, dated May 26, 2020, 11 pages.
Non-Final Office Action received for U.S. Appl. No. 15/405,122, dated Sep. 24, 2020, 30 pages.
Non-Final Office Action received for U.S. Appl. No. 15/421,865, dated Oct. 7, 2020, 20 pages.
Non-Final Office Action received for U.S. Appl. No. 16/418,786, dated Apr. 24, 2020, 16 pages.
Non-Final Office Action received for U.S. Appl. No. 16/582,020, dated Jan. 13, 2020, 39 pages.
Non-Final Office Action received for U.S. Appl. No. 16/585,399, dated Jan. 23, 2020, 28 pages.
Non-Final Office Action received for U.S. Appl. No. 16/585,714, dated Apr. 16, 2020, 18 pages.
Non-Final Office Action received for U.S. Appl. No. 16/659,507, dated Oct. 7, 2020, 16 pages.
Notice of Acceptance received for Australian Patent Application No. 2017277813, dated Jun. 16, 2020, 3 pages.
Notice of Acceptance received for Australian Patent Application No. 2017330211, dated May 11, 2020, 3 pages.
Notice of Acceptance received for Australian Patent Application No. 2018279037, dated May 13, 2020, 3 pages.
Notice of Allowance received for Japanese Patent Application No. 2019-096219, dated Jun. 26, 2020, 4 pages (1 page of English Translation and 3 pages of Official Copy).
Notice of Allowance received for Japanese Patent Application No. 2019-511611, dated Jul. 20, 2020, 4 pages (1 page of English Translation and 3 pages of Official Copy).
Notice of Allowance received for Korean Patent Application No. 10-2018-7018904, dated Jun. 26, 2020, 4 pages (1 page of English Translation and 3 pages of Official copy).
Notice of Allowance received for U.S. Appl. No. 15/554,204, dated Jul. 13, 2020, 10 pages.
Notice of Allowance received for U.S. Appl. No. 15/798,235, dated Sep. 22, 2020; 8 pages.
Notice of Allowance received for U.S. Appl. No. 16/584,445, dated Apr. 17, 2020, 9 pages.
Notice of Allowance received for U.S. Appl. No. 16/584,445, dated Jul. 23, 2020, 8 pages.
Notice of Allowance received for U.S. Appl. No. 16/584,445, dated Jun. 24, 2020, 5 pages.
Notice of Allowance received for U.S. Appl. No. 16/584,445, dated May 29, 2020, 5 pages.
Notice of Allowance received for U.S. Appl. No. 16/584,445, dated Oct. 21, 2020, 6 pages.
Notice of Allowance received for U.S. Appl. No. 16/585,366, dated Jan. 2, 2020, 6 pages.
Notice of Allowance received for U.S. Appl. No. 16/585,399, dated Jul. 21, 2020, 9 pages.
Notice of Allowance received for U.S. Appl. No. 16/585,714, dated Sep. 25, 2020, 15 pages.
Notice of Allowance received for U.S. Appl. No. 16/585,721, dated Sep. 30, 2020, 15 pages.
Nova Launcher—Lock Screen Edit, Online Available at: https://forums.androidcentral.com/ask-question/835057-nova-launcher-lock-screen-edit.html, Sep. 2017, 2 pages.
Office Action received for Australian Patent Application No. 2018201089, dated Jul. 23, 2020, 4 pages.
Office Action received for Chinese Patent Application No. 201510479088.4, dated Apr. 22, 2020, 7 pages (3 pages of English Translation and 4 pages of Official Copy).
Office Action received for Chinese Patent Application No. 201680013193.1, dated Mar. 25, 2020, 21 pages (8 pages of English Translation and 13 pages of Official Copy).
Office Action received for Chinese Patent Application No. 201680047983.1, dated Jul. 1, 2020, 6 pages (3 pages of English Translation and 3 pages of Official Copy).

(56) References Cited

OTHER PUBLICATIONS

Office Action received for Chinese Patent Application No. 201780002643.1, dated Jun. 17, 2020, 30 pages (10 pages of English Translation and 20 pages of Official Copy).

Office Action received for Chinese Patent Application No. 201910906898.1, dated Sep. 9, 2020, 8 pages (3 pages of English Translation and 5 pages of Official Copy).

Office Action received for Danish Patent Application No. PA201970598, dated Oct. 9, 2020, 4 pages.

Office Action received for European Patent Application No. 20172197.4, dated Aug. 5, 2020, 6 pages.

Office Action received for Japanese Patent Application No. 2020-074878, dated Sep. 7, 2020, 13 pages (7 pages of English Translation and 6 pages of Official Copy).

Office Action received for Korean Patent Application No. 10-2019-7005734, dated Jul. 14, 2020, 8 pages (4 pages of English Translation and 4 pages of Official Copy).

Office Action received for Korean Patent Application No. 10-2019-7029673, dated Sep. 3, 2020, 9 pages (4 pages of English Translation and 5 pages of Official Copy).

Office Action received for Korean Patent Application No. 10-2020-7001340, dated Sep. 24, 2020, 19 pages (8 pages of English Translation and 11 pages of Official Copy).

Phlam Dev, "Clockwork Tomato Presentation", Retrieved from the Internet: URL: https://www.youtube.com/watch?v=21QDx9REn0E, Apr. 29, 2016, 6 pages.

Supplemental Notice of Allowance received for U.S. Appl. No. 16/585,399, dated Aug. 26, 2020, 2 pages.

Wade Cliff, "Get the most out of Nova Launcher: Changing Icon Sizes", Online Available at: https://www.androidguys.com/tips-tools/get-nova-launcher-changing-icon-sizes/, Nov. 16, 2015, 3 pages.

Wade, Cliff, "Get the most out of Nova Launcher: Customizing the Dock (Contest Included)", Online Available at: https://www.androidguys.com/tips-tools/get-nova-launcher-customizing-dockcontest-included/, Dec. 1, 2015, 5 pages.

Extended European Search Report received for European Patent Application No. 20185974.1, dated Oct. 28, 2020, 7 pages.

Notice of Allowance received for Korean Patent Application No. 10-2019-7005734, dated Oct. 21, 2020, 4 pages (1 page of English Translation and 3 pages of Official Copy).

Notice of Allowance received for U.S. Appl. No. 16/585,721, dated Oct. 30, 2020, 9 pages.

Office Action received for Chinese Patent Application No. 201680013193.1, dated Sep. 7, 2020, 6 pages (3 pages of English Translation and 3 pages of Official Copy).

\* cited by examiner

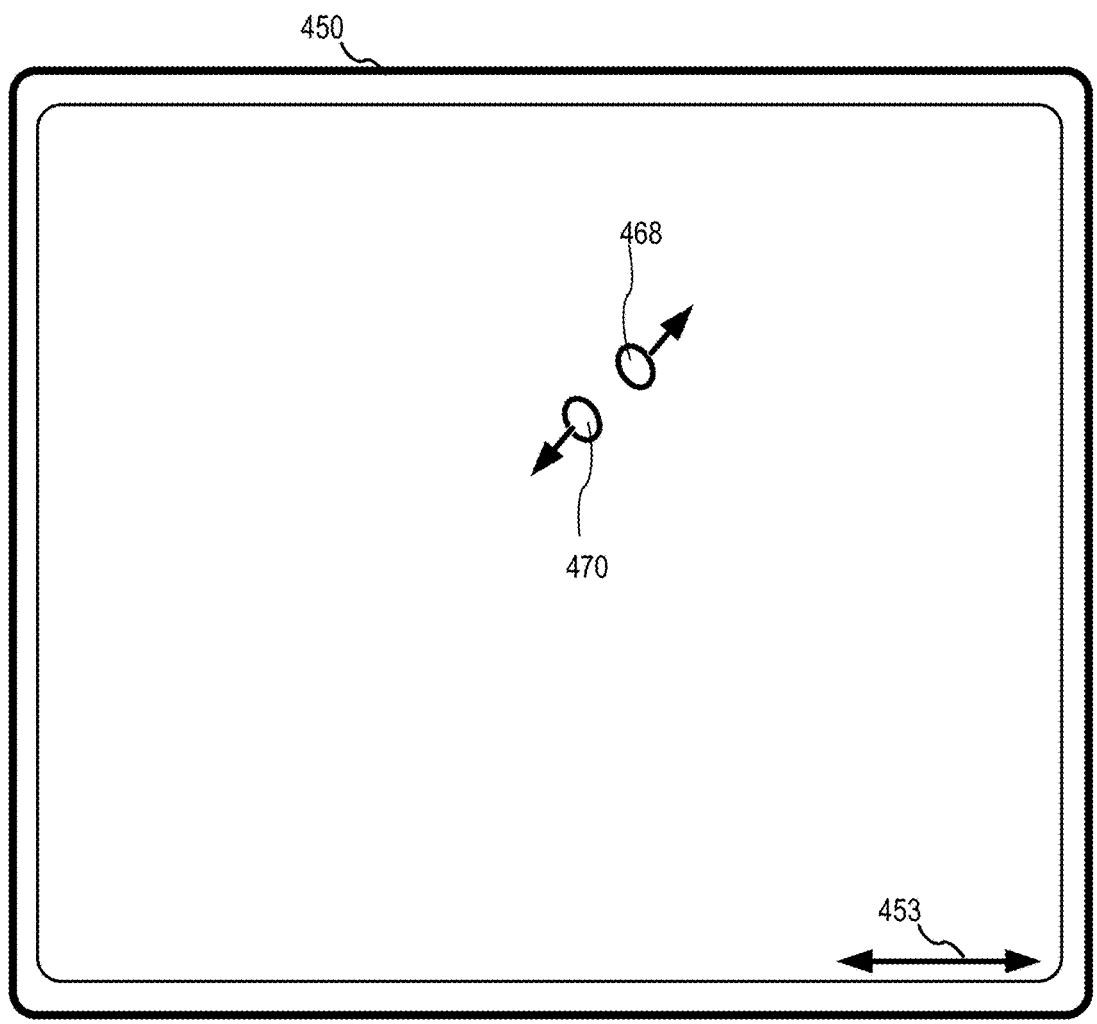
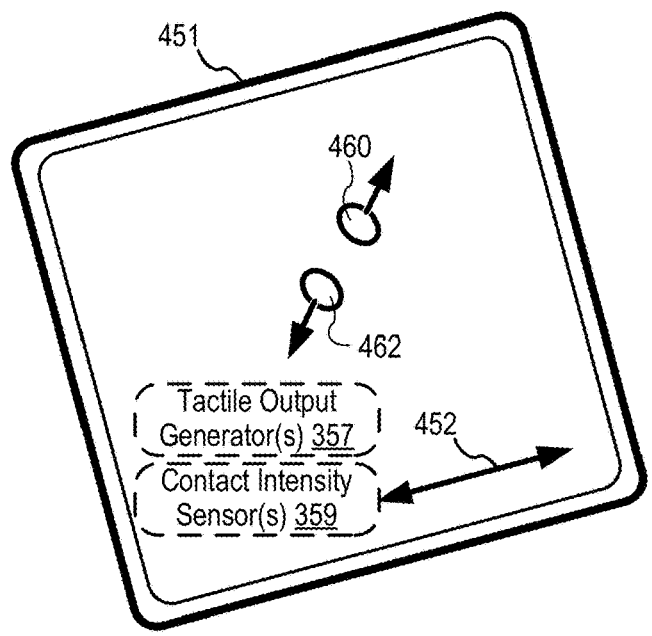
FIG. 4B

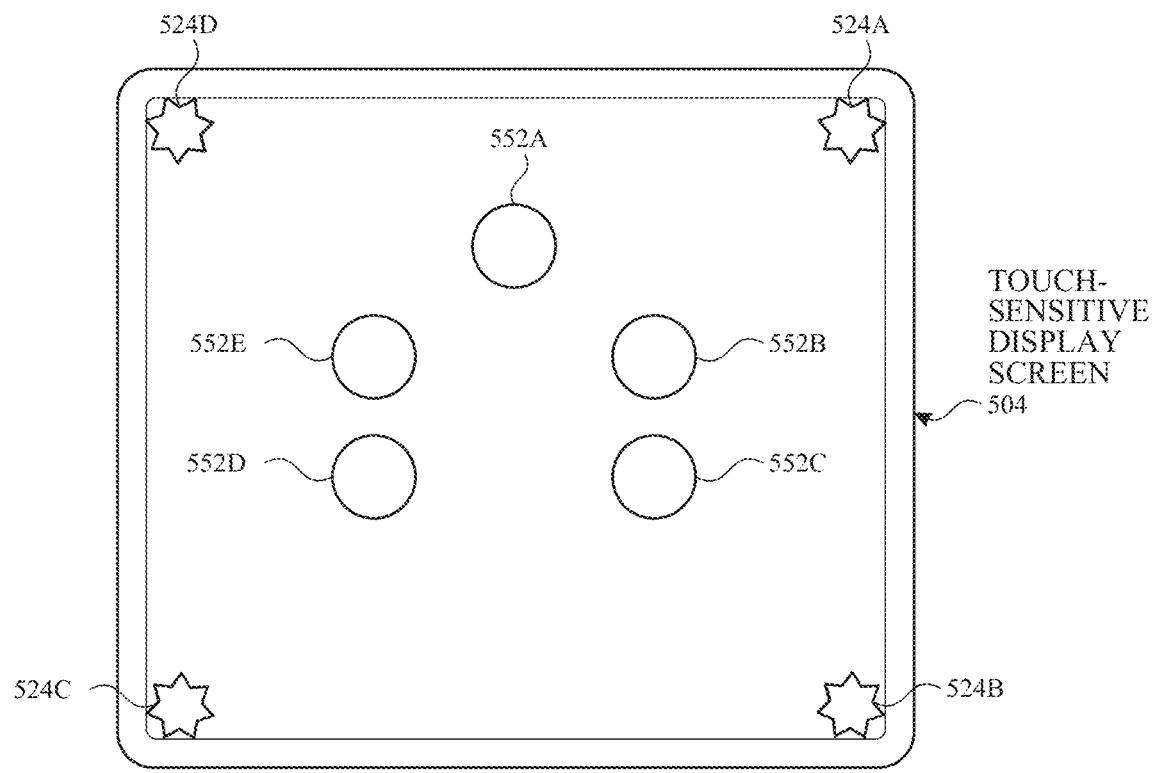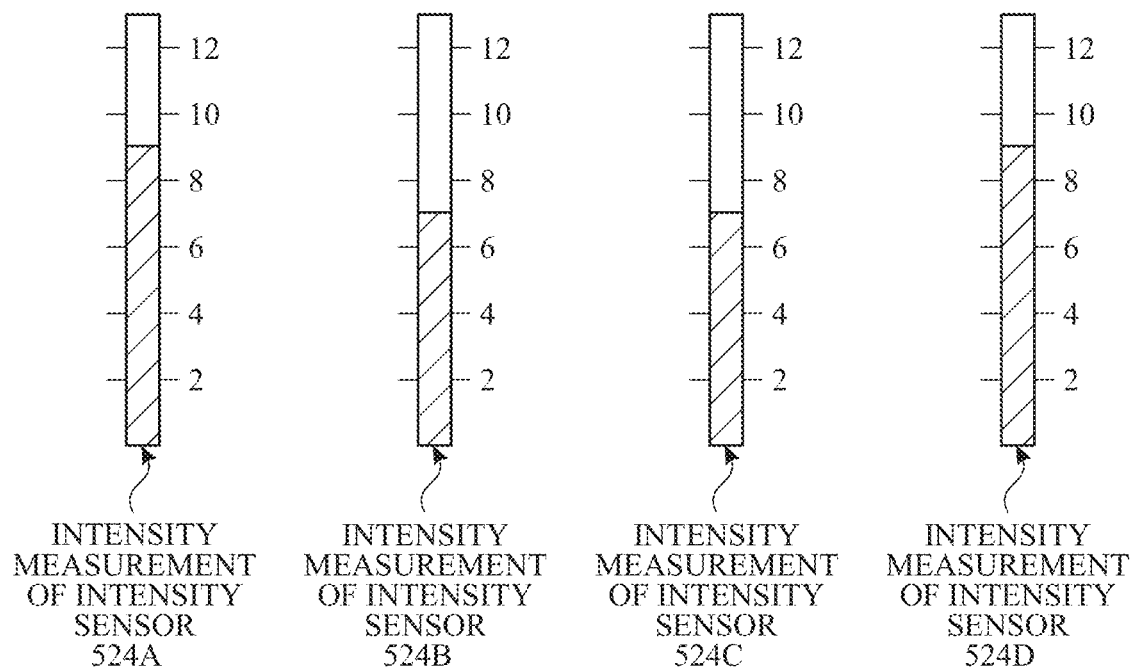
FIG. 5C

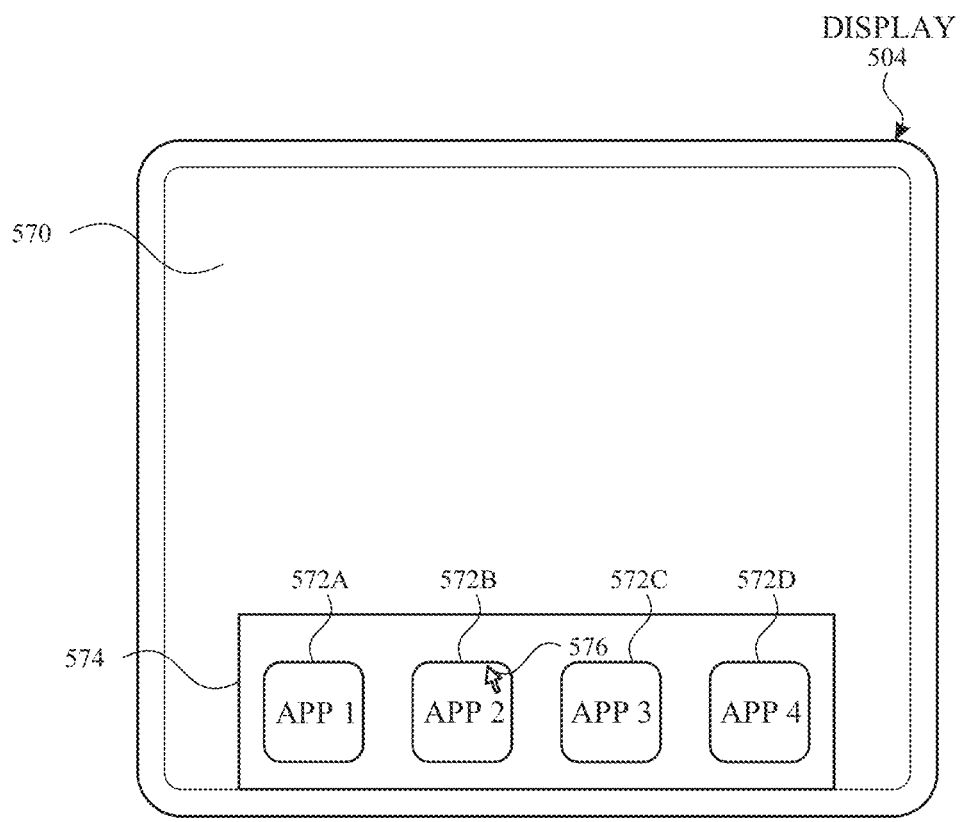
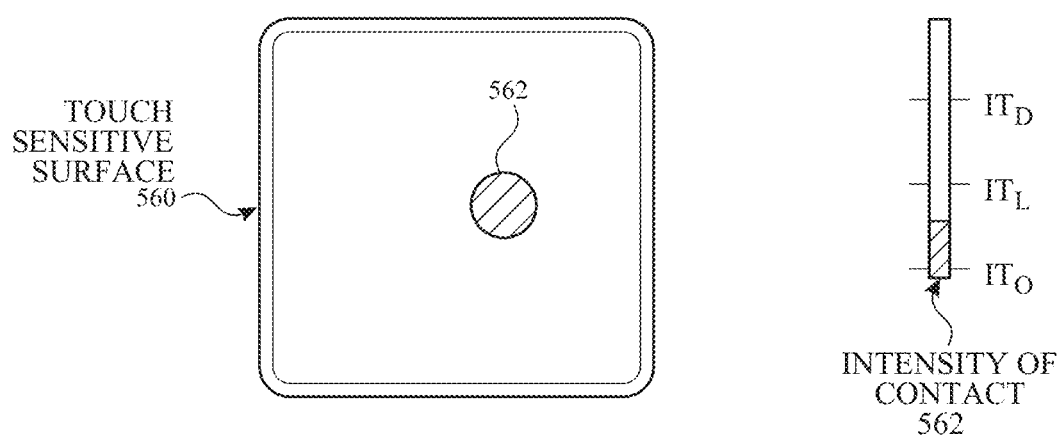
FIG. 5E

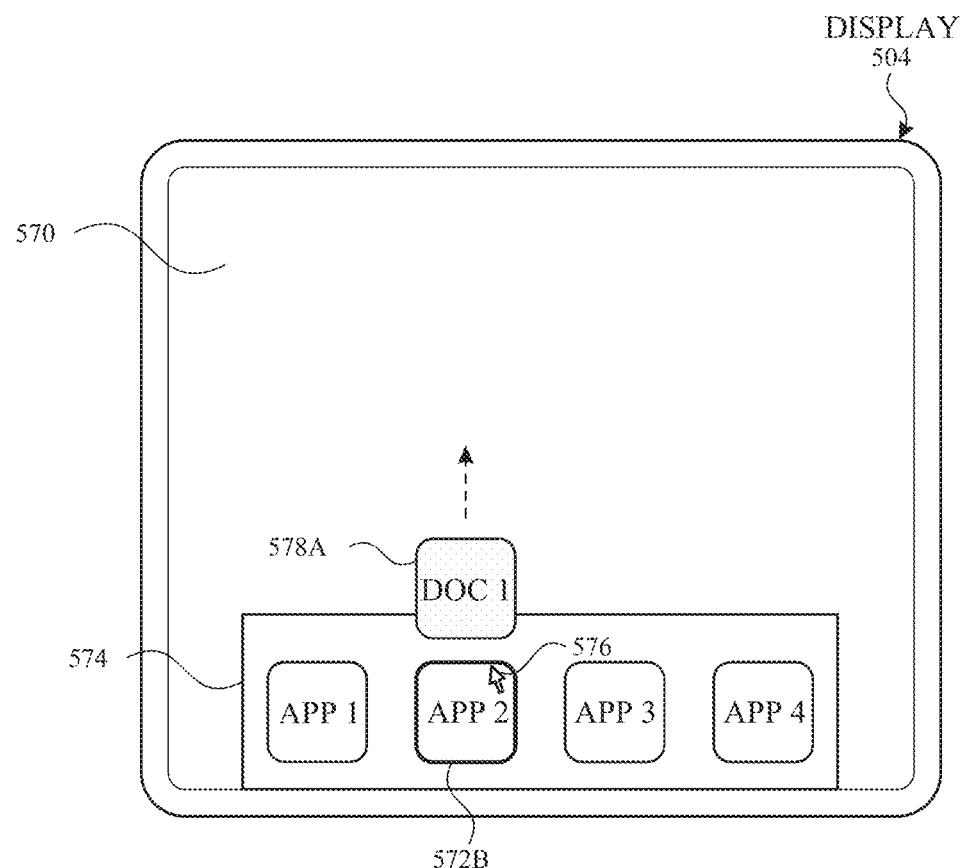
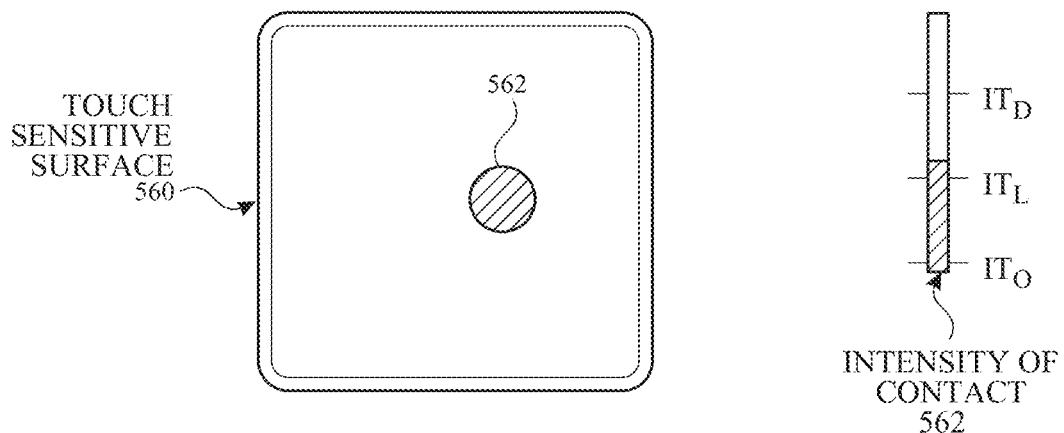
*FIG. 5F*

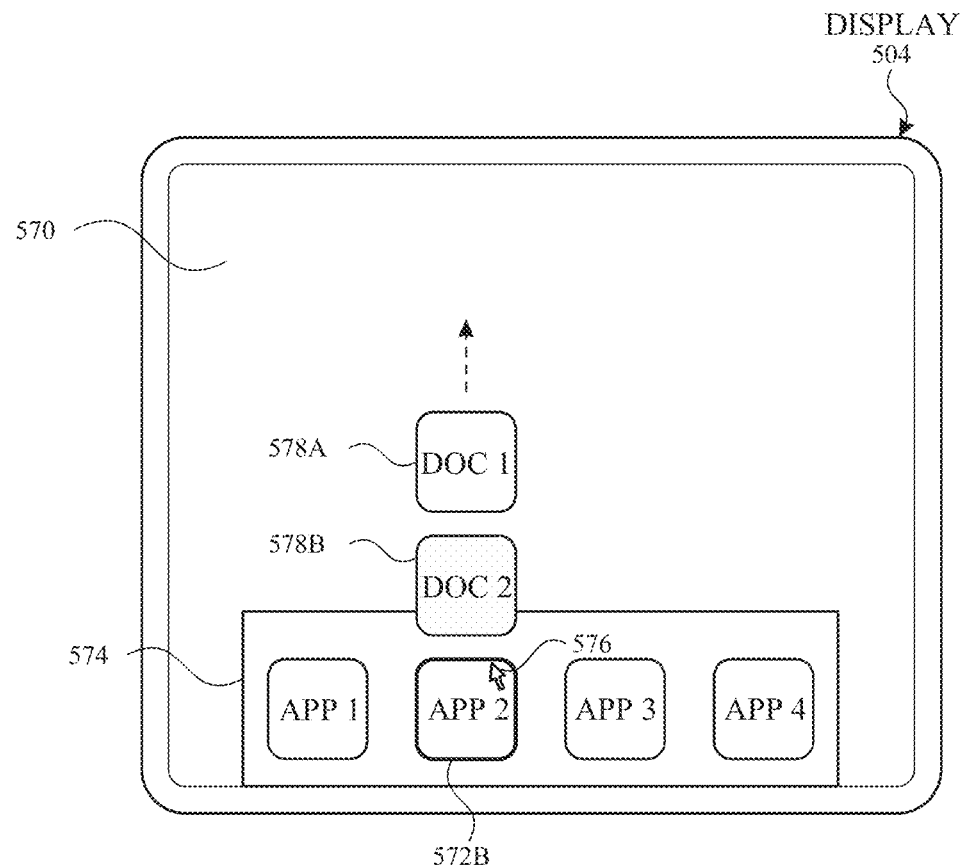
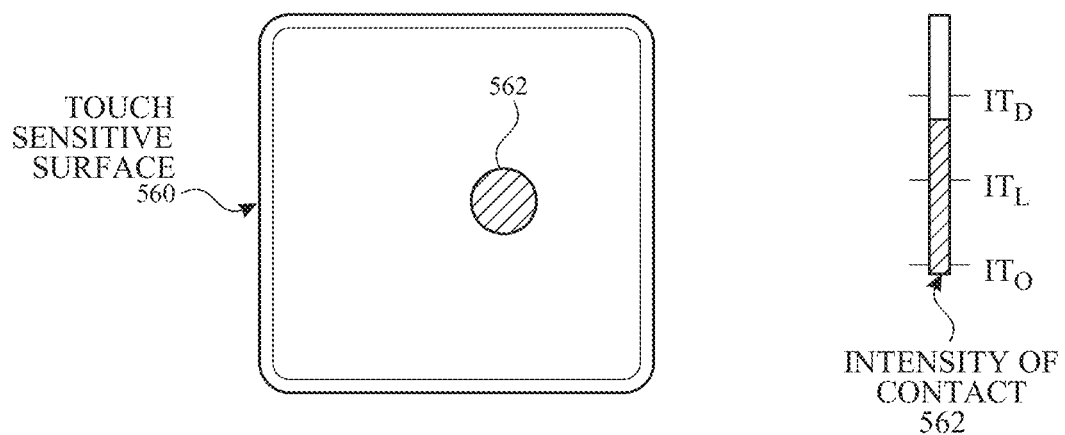
*FIG. 5G*

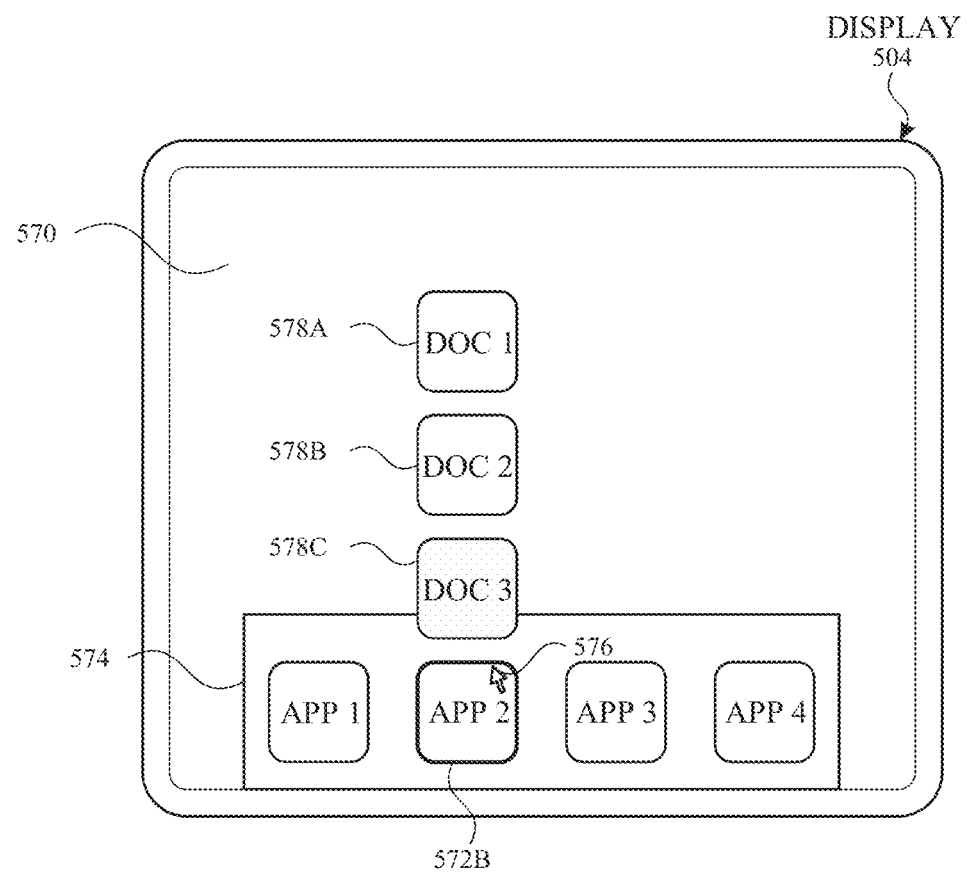
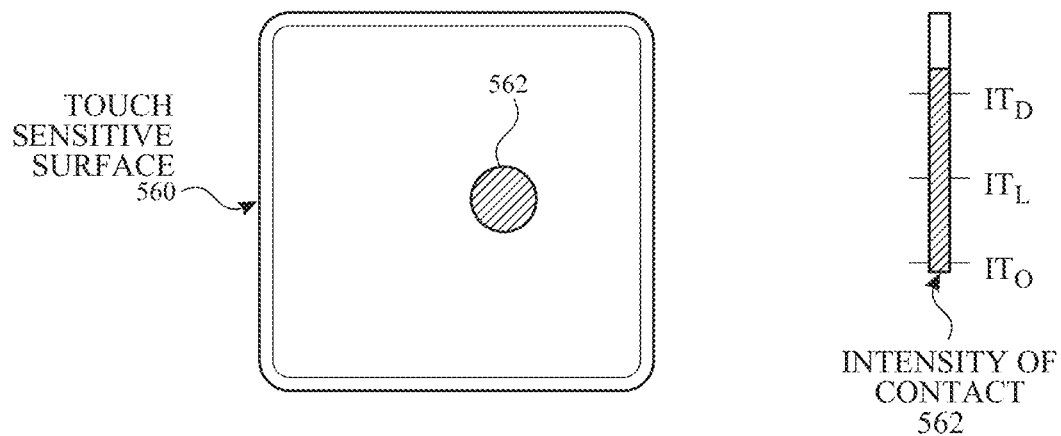
FIG. 5H

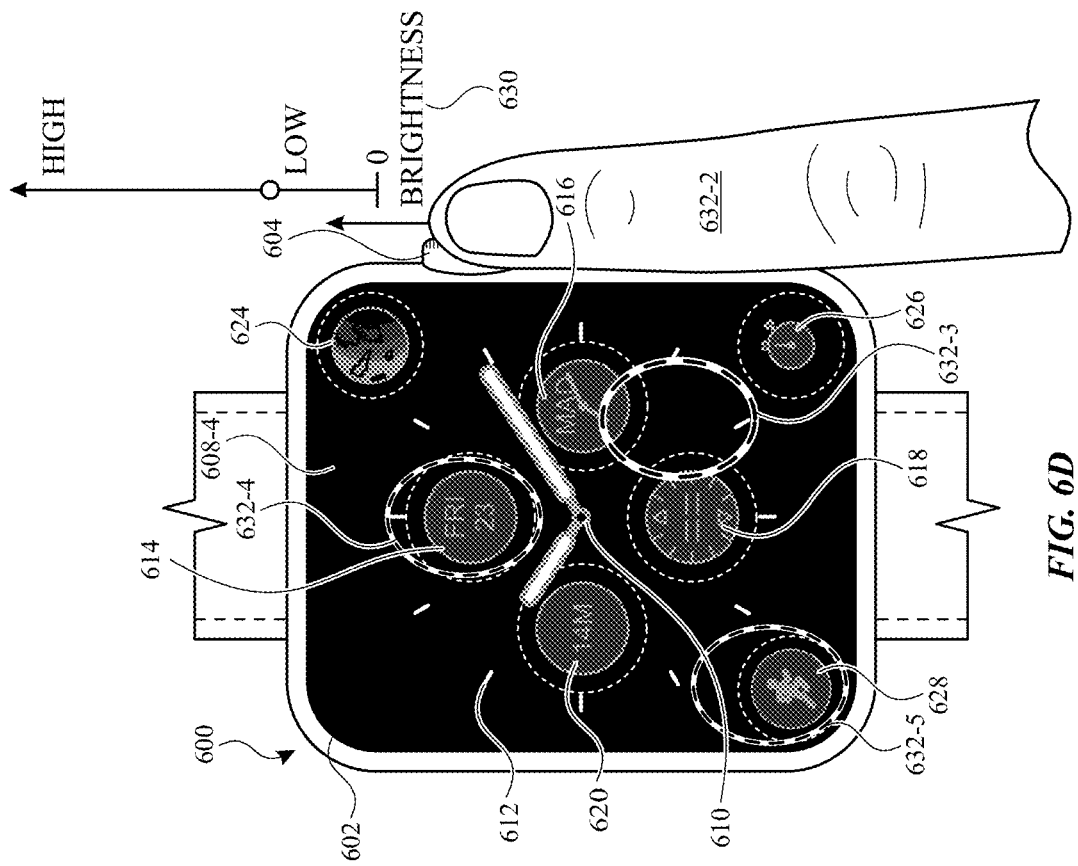
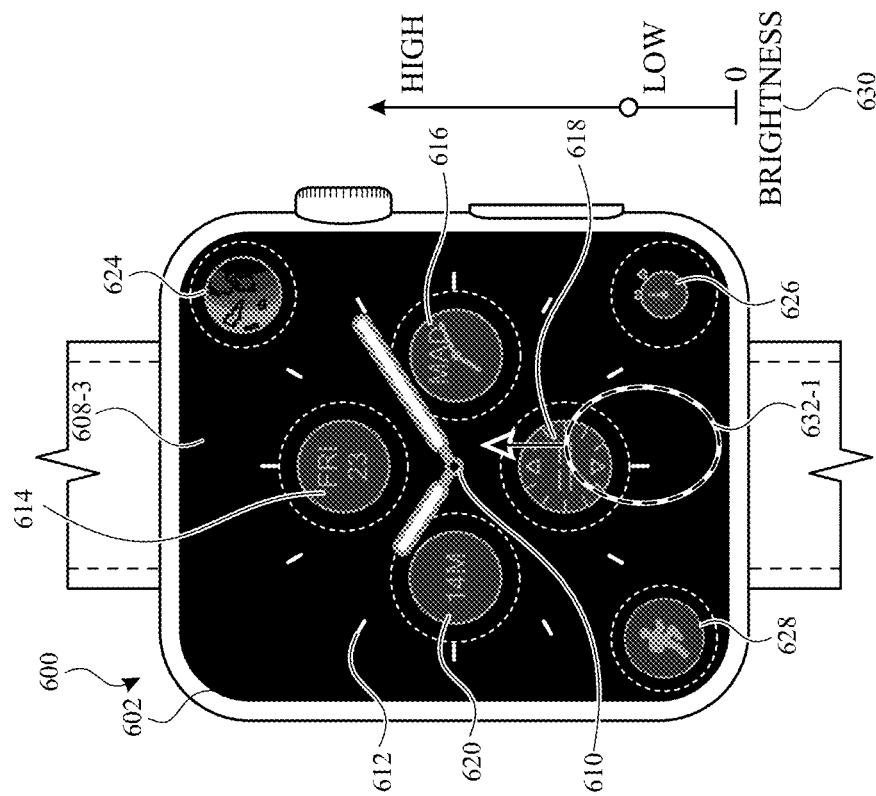
FIG. 6C
FIG. 6D

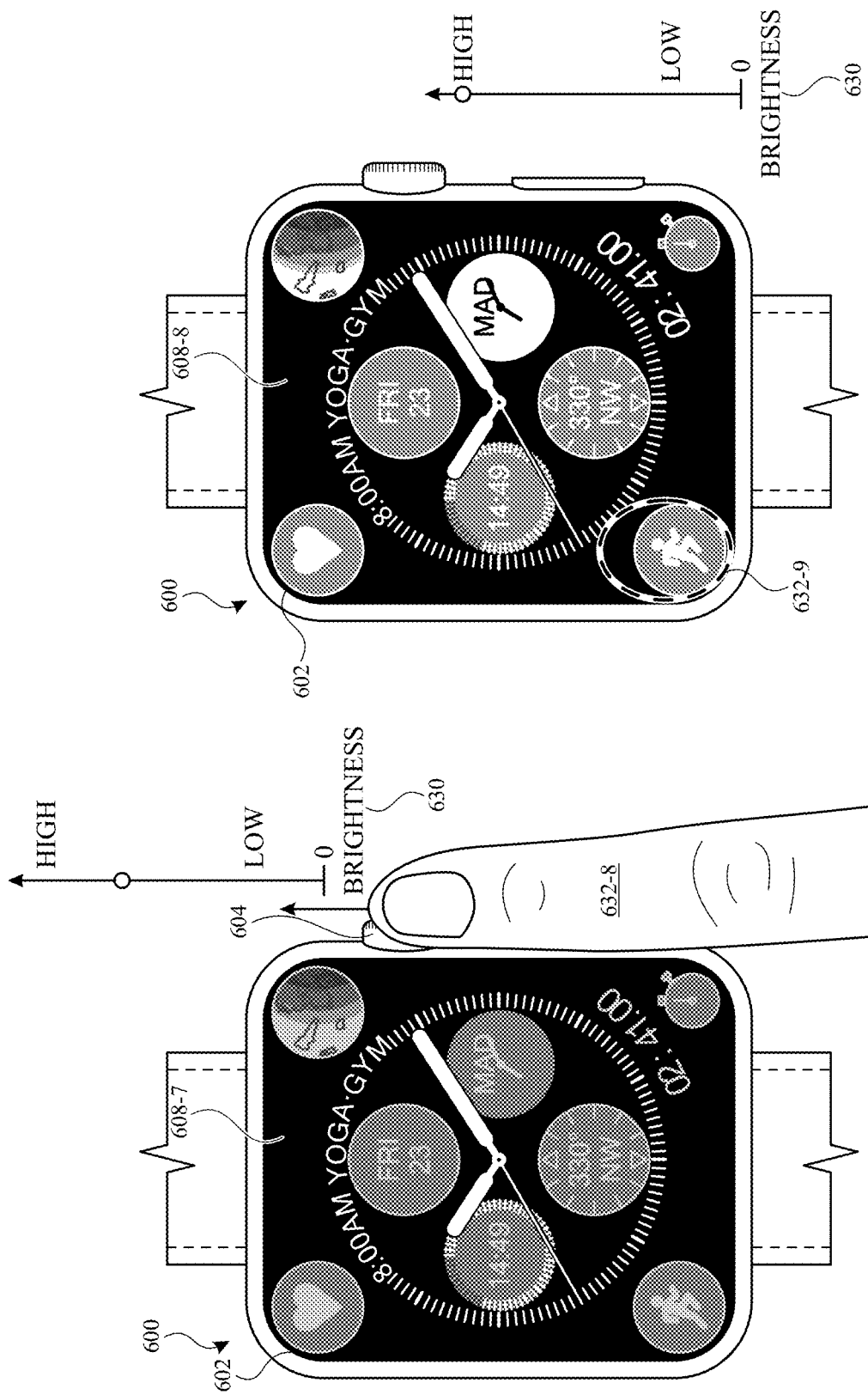

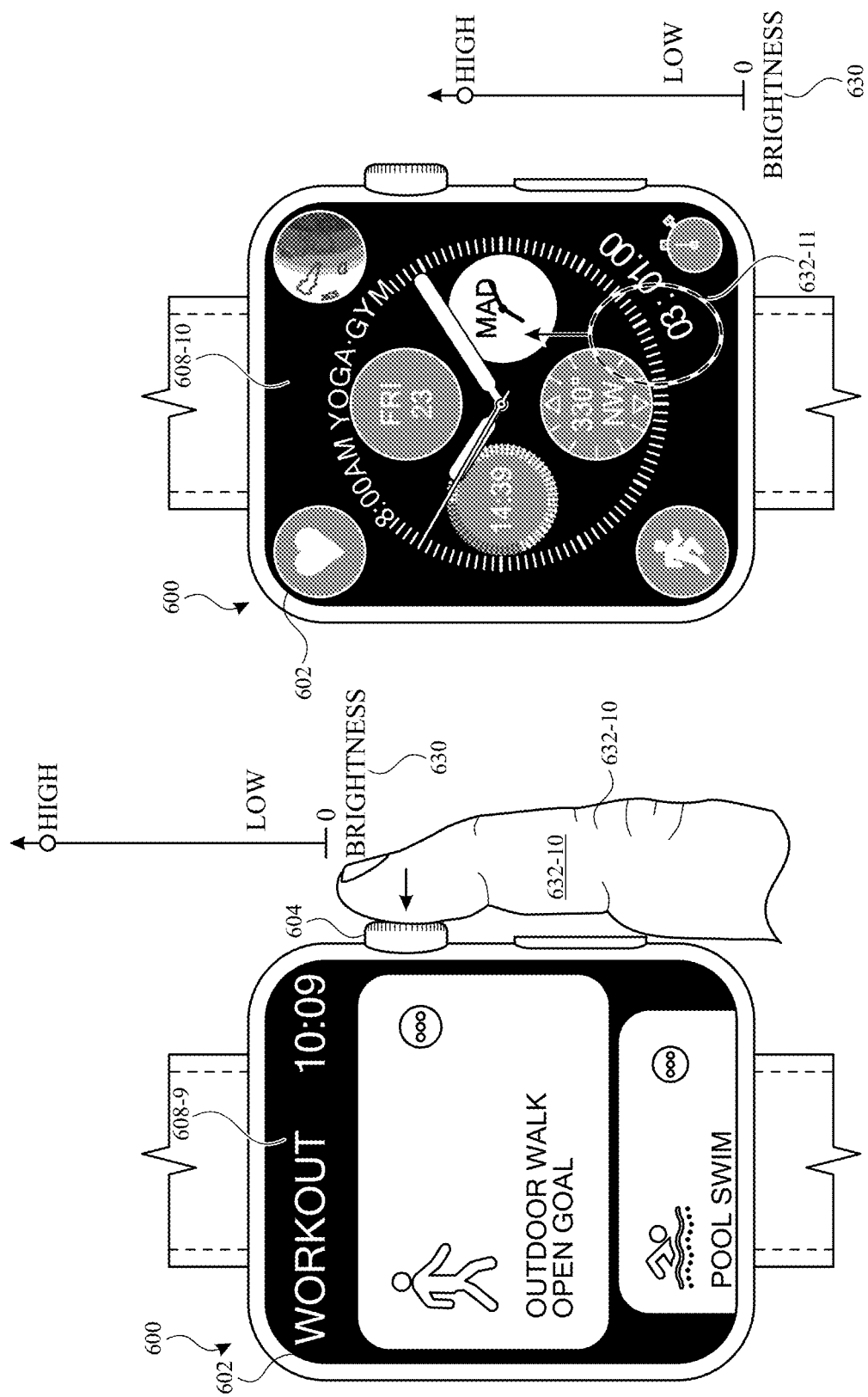

700 ↘

702
While the electronic device is in a first mode, displaying on the display, a first user interface including:

704
A first time indicator, displayed at a first brightness level.

706
A first graphical object, displayed at a second brightness level.

708
Detecting that the electronic device has met criteria for transitioning from the first mode to a second mode.

710
In response to detecting that the electronic device has met the criteria for transitioning from the first mode to the second mode, transitioning the electronic device from the first mode to the second mode.

712
While the electronic device is in the second mode, displaying on the display, a second user interface, including:

714
A second time indicator indicating the current time, wherein the second time indicator is displayed at a third brightness level that is lower than the first brightness level, at which the first time indicator was previously displayed, by a first amount.

716
A second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

902
While the electronic device is in a first mode, displaying on the display, a first user interface including:

904
A first time indicator indicating a current time and is displayed at a first size.

906
A first graphical object and is displayed at a second size.

908
Detecting that the electronic device has met criteria for transitioning from the first mode to a second mode.

910
In response to detecting that the electronic device has met the criteria for transitioning from the first mode to the second mode, transitioning the electronic device from the first mode to the second mode.

912
While the electronic device is in the second mode, displaying on the display, a second user interface including:

914
A second time indicator indicating the current time, wherein the second time indicator is displayed at a third size that is smaller than the first size at which the first time indicator was previously displayed.

916
A second graphical object corresponding to the first graphical object, wherein the second graphical object is displayed at a fourth size that is smaller than the second size at which the first graphical object was previously displayed.

1102
While the electronic device is in a first mode, displaying on the display, a first user interface at a first display brightness level, the first user interface including:

1104
A first time indicator.

1106
A first graphical object.

1108
Receiving data from the one or more sensors.

1110
Detecting (1110) that the electronic device has met criteria for transitioning from the first mode to a second mode.

1112
In response to detecting that the electronic device has met the criteria for transitioning from the first mode to the second mode, transitioning the electronic device from the first mode to the second mode.

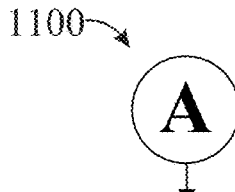

1114
While the electronic device is in the second mode:

1116
In accordance with a determination that the data from the one or more sensors corresponds to a first environmental brightness level, displaying a second user interface at a second display brightness level less than the first display brightness level, the second user interface including:

1118
A second time indicator different from the first time indicator in one or more visual characteristics other than brightness.

1120
a second graphical object that corresponds to the first graphical object.

1122
In accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

*FIG. 11B*

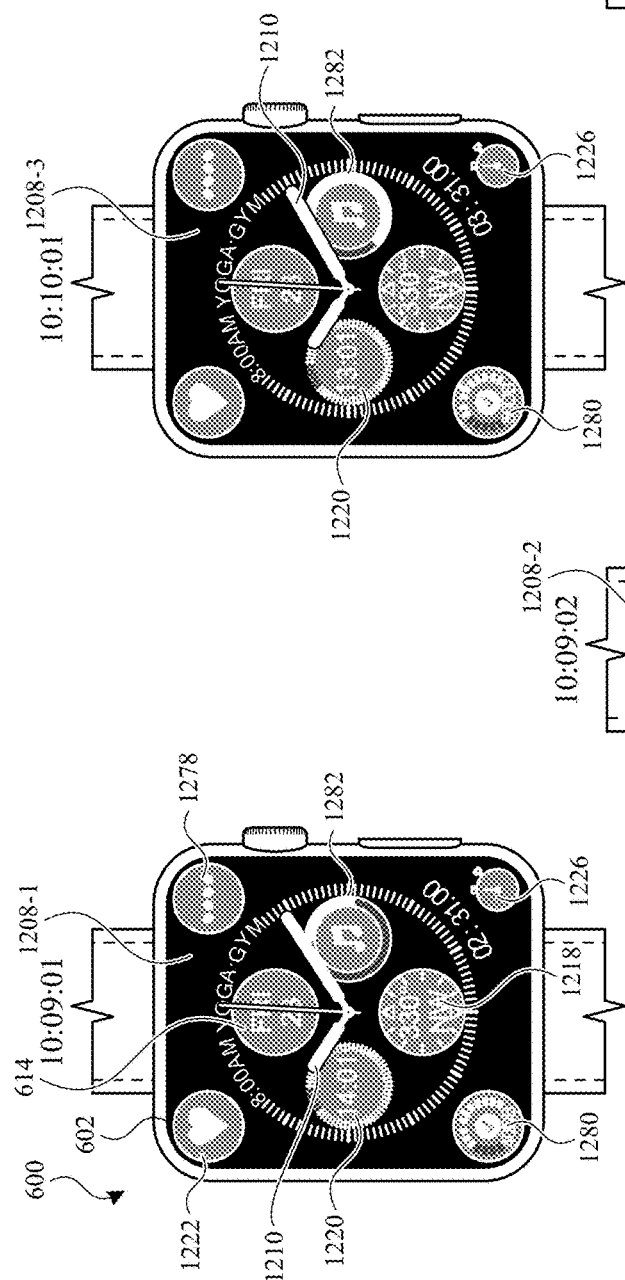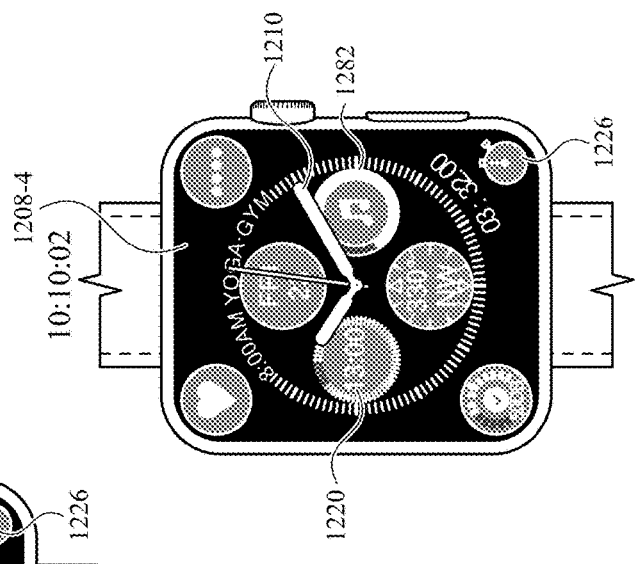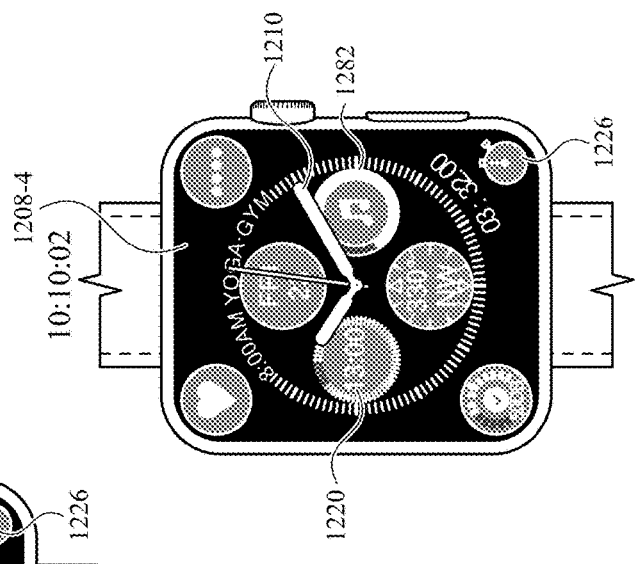
FIG. 12A
FIG. 12B
FIG. 12C
FIG. 12D

1300

1302
Displaying a user interface that includes a plurality of user interface elements including a graphical representation of a first type of information that is associated with a first application.

1304
While the electronic device is in a first mode:

1306
Updating the appearance of the graphical representation of the first type of information over time with a first update interval.

1308
After updating the appearance of the graphical representation of the first type of information over time one or more times at the first update interval, detecting that the electronic device has met criteria for transitioning from the first mode to a second mode.

1310
In response to detecting that the electronic device has met the criteria for transitioning from the first mode to the second mode, transitioning the electronic device from the first mode to the second mode.

1312
While the electronic device is in the second mode, updating the appearance of the graphical representation of the first type of information over time with a second update interval that is different from the first update interval.

1502
While an electronic device is operating in a first mode, displaying, on the display, a first user interface of a first application, the first user interface including a first graphical object corresponding to the first application.

1504
While displaying the first user interface, detecting that the electronic device has met criteria for transitioning from the first mode to a second mode.

1506
In response to detecting that the electronic device has met the criteria for transitioning from the first mode to the second mode:

1508
In accordance with a determination that the first application is an application of a first type, replacing display of the first user interface of the first application with a second user interface of the first application different from the first user interface, the second user interface including a second graphical object corresponding to the first application.

1510
In accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

1702
While the electronic device is operating in a first mode:

1704
Displaying, on the display, a first user interface of a first application with an arrangement of user interface elements determined by the first application.

1706
Displaying, on the display, a second user interface of a second application with an arrangement of user interface elements determined by the second application.

1708
Displaying, on the display, a third user interface of a third application with an arrangement of user interface elements determined by the third application.

1710
While the electronic device is operating in the first mode, detecting that the electronic device has met criteria for transitioning from the first mode to a second mode.

1712
In response to detecting that the electronic device has met the criteria for transitioning from the first mode to the second mode, transitioning from the first mode to the second mode, including:

1714
In accordance with a determination that the first application was displayed on the display when the electronic device detected that the electronic device has met criteria for transitioning from the first mode to a second mode, displaying information from the first application in a predefined template.

1716
In accordance with a determination that the second application was displayed on the display when the electronic device detected that the electronic device has met criteria for transitioning from the first mode to a second mode, displaying information from the second application in the predefined template.

1718
In accordance with a determination that the third application was displayed on the display when the electronic device detected that the electronic device has met criteria for transitioning from the first mode to a second mode, displaying information from the third application in a second predefined template that is different from the predefined template.

1902
While the electronic device is operating in a first mode, displaying, on the display, a first user interface of an application.

1904
Detecting that the electronic device has met criteria for transitioning from the first mode to a second mode.

1906
In response to detecting that the electronic device has met the criteria for transitioning from the first mode to the second mode:

1908
Transitioning from the first mode to the second mode.

1910
Replacing, on the display, the first user interface with a second user interface including an obscured representation of at least a portion of the first user interface of the application.

1912
The obscured representation of at least a portion of the first user interface of the application is a blurred representation of at least the portion of the first user interface.

1914
Displaying a time indicator at a position on the display overlapping at least a portion of the obscured representation of the at least a portion of the first user interface of the application.

*FIG. 19*

TECHNIQUES FOR MANAGING DISPLAY USAGE

CROSS-REFERENCE TO RELATED APPLICATIONS

This application claims priority to of U.S. Provisional Application No. 62/897,959, filed Sep. 9, 2019, entitled "TECHNIQUES FOR MANAGING DISPLAY USAGE," the entire contents of which are hereby incorporated by reference.

FIELD

The present disclosure relates generally to user interfaces, and more specifically to techniques for displaying user interfaces with managed display usage.

BACKGROUND

Electronic devices may include screens for displaying user interfaces. Over time, non-uniform use of screens may lead to discoloration of portions of the screen and decreased quality of displayed images.

BRIEF SUMMARY

Some techniques for displaying user interfaces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces with managed display usage. Such methods and interfaces optionally complement or replace other methods for managing display usage. Such methods improve image quality (e.g., reduce deterioration of image quality) of displayed user interfaces as an electronic device ages and improve the durability of display devices used to display user interfaces. In addition, such methods and interfaces also reduce the cognitive burden on a user and produce a more efficient human-machine interface. For battery-operated computing devices, such methods and interfaces conserve power and increase the time between battery charges. Furthermore, such methods and interfaces also reduce the number of unnecessary, extraneous, or repetitive input required at computing devices, such as smartphones and smartwatches.

In accordance with some embodiments, a method is described. The method comprises: at an electronic device having a display: while the electronic device is in a first mode, displaying on the display, a first user interface including: a first time indicator, displayed at a first brightness level; and a first graphical object, displayed at a second brightness level; detecting that the electronic device has met criteria for transitioning from the first mode to a second mode; and in response to detecting that the electronic device has met the criteria for transitioning from the first mode to the second mode, transitioning the electronic device from the first mode to the second mode; while the electronic device is in the second mode, displaying on the display, a second user interface including: a second time indicator indicating the current time, wherein the second time indicator is displayed at a third brightness level that is lower than the first brightness level, at which the first time indicator was previously displayed, by a first amount; and a second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

In accordance with some embodiments, a non-transitory computer-readable storage medium is described. The non-transitory computer-readable storage medium stores one or more programs configured to be executed by one or more processors of an electronic device with a display, the one or more programs including instructions for: while the electronic device is in a first mode, displaying on the display, a first user interface including: a first time indicator, displayed at a first brightness level; and a first graphical object, displayed at a second brightness level; detecting that the electronic device has met criteria for transitioning from the first mode to a second mode; and in response to detecting that the electronic device has met the criteria for transitioning from the first mode to the second mode, transitioning the electronic device from the first mode to the second mode; while the electronic device is in the second mode, displaying on the display, a second user interface including: a second time indicator indicating the current time, wherein the second time indicator is displayed at a third brightness level that is lower than the first brightness level, at which the first time indicator was previously displayed, by a first amount; and a second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

In accordance with some embodiments, a transitory computer-readable storage medium is described. The transitory computer-readable storage medium stories one or more programs configured to be executed by one or more processors of an electronic device with a display, the one or more programs including instructions for: while the electronic device is in a first mode, displaying on the display, a first user interface including: a first time indicator, displayed at a first brightness level; and a first graphical object, displayed at a second brightness level; detecting that the electronic device has met criteria for transitioning from the first mode to a second mode; and in response to detecting that the electronic device has met the criteria for transitioning from the first mode to the second mode, transitioning the electronic device from the first mode to the second mode; while the electronic device is in the second mode, displaying on the display, a second user interface including: a second time indicator indicating the current time, wherein the second time indicator is displayed at a third brightness level that is lower than the first brightness level, at which the first time indicator was previously displayed, by a first amount; and a second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

In accordance with some embodiments, an electronic device is described. The electronic device comprising a display; one or more processors; and memory storing one or more programs configured to be executed by the one or more processors, the one or more programs including instructions for: while the electronic device is in a first mode, displaying on the display, a first user interface including: a first time indicator, displayed at a first brightness level; and a first graphical object, displayed at a second brightness level; detecting that the electronic device has met criteria for transitioning from the first mode to a second mode; and in response to detecting that the electronic device has met the criteria for transitioning from the first mode to the second mode, transitioning the electronic device from the first mode to the second mode; while the electronic device is in the second mode, displaying on the display, a second user interface including: a second time indicator indicating the current time, wherein the second time indicator is displayed at a third brightness level that is lower than the first brightness level, at which the first time indicator was previously displayed, by a first amount; and a second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

In accordance with some embodiments, an electronic device is described. The electronic device comprising, comprising: a display; means, while the electronic device is in a first mode, for displaying on the display, a first user interface including: a first time indicator, displayed at a first brightness level; and a first graphical object, displayed at a second brightness level; means for detecting that the electronic device has met criteria for transitioning from the first mode to a second mode; and means, responsive to detecting that the electronic device has met the criteria for transitioning from the first mode to the second mode, for transitioning the electronic device from the first mode to the second mode; means, while the electronic device is in the second mode, for displaying on the display, a second user interface including: a second time indicator indicating the current time, wherein the second time indicator is displayed at a third brightness level that is lower than the first brightness level, at which the first time indicator was previously displayed, by a first amount; and a second graphical object corresponding to the first graphical object, wherein the second graphical object is displayed at a fourth brightness level that is lower than the second brightness level, at which the first graphical object was previously displayed, by a second amount that is different from the first amount of difference in brightness between the first brightness level and the second brightness level.

In accordance with some embodiments, a method is described. The method comprises: at an electronic device having a display: while the electronic device is in a first mode, displaying on the display, a first user interface including: a first time indicator indicating a current time and is displayed at a first size; and a first graphical object and is displayed at a second size; and detecting that the electronic device has met criteria for transitioning from the first mode to a second mode; and in response to detecting that the electronic device has met the criteria for transitioning from the first mode to the second mode, transitioning the electronic device from the first mode to the second mode; while the electronic device is in the second mode, displaying on the display, a second user interface including: a second time indicator indicating the current time, wherein the second time indicator is displayed at a third size that is smaller than the first size, at which the first time indicator was previously displayed; and a second graphical object corresponding to the first graphical object, wherein the second graphical object is displayed at a fourth size that is smaller than the second size, at which the first graphical object was previously displayed.

In accordance with some embodiments, a non-transitory computer-readable storage medium is described. The non-transitory computer-readable storage medium stores one or more programs configured to be executed by one or more processors of an electronic device with a display, the one or more programs including instructions for: while the electronic device is in a first mode, displaying on the display, a first user interface including: a first time indicator indicating a current time and is displayed at a first size; and a first graphical object and is displayed at a second size; and detecting that the electronic device has met criteria for transitioning from the first mode to a second mode; and in response to detecting that the electronic device has met the criteria for transitioning from the first mode to the second mode, transitioning the electronic device from the first mode to the second mode, including: while the electronic device is in the second mode, displaying on the display, a second user interface including: a second time indicator indicating the current time, wherein the second time indicator is displayed at a third size that is smaller than the first size, at which the first time indicator was previously displayed; and a second graphical object corresponding to the first graphical object, wherein the second graphical object is displayed at a fourth size that is smaller than the second size, at which the first graphical object was previously displayed.

In accordance with some embodiments, a transitory computer-readable storage medium is described. The transitory computer-readable storage medium stores one or more programs configured to be executed by one or more processors of an electronic device with a display, the one or more programs including instructions for: while the electronic device is in a first mode, displaying on the display, a first user interface including: a first time indicator indicating a current time and is displayed at a first size; and a first graphical object and is displayed at a second size; and detecting that the electronic device has met criteria for transitioning from the first mode to a second mode; and in response to detecting that the electronic device has met the criteria for transitioning from the first mode to the second mode, transitioning the electronic device from the first mode to the second mode, including: while the electronic device is in the second mode, displaying on the display, a second user interface including: a second time indicator indicating the current time, wherein the second time indicator is displayed at a third size that is smaller than the first size, at which the first time indicator was previously displayed; and a second graphical object corresponding to the first graphical object, wherein the second graphical object is displayed at a fourth size that is smaller than the second size, at which the first graphical object was previously displayed.

In accordance with some embodiments, an electronic device is described. The electronic device comprising: a display; one or more processors; and memory storing one or more programs configured to be executed by the one or more processors, the one or more programs including instructions for: while the electronic device is in a first mode, displaying on the display, a first user interface including: a first time indicator indicating a current time and is displayed at a first size; and a first graphical object and is displayed at a second size; and detecting that the electronic device has met criteria for transitioning from the first mode to a second mode; and in response to detecting that the electronic device has met the criteria for transitioning from the first mode to the second mode, transitioning the electronic device from the first mode to the second mode, including: while the electronic device is in the second mode, displaying on the display, a second user interface including: a second time indicator indicating the current time, wherein the second time indicator is displayed at a third size that is smaller than the first size, at which the first time indicator was previously displayed; and a second graphical object corresponding to the first graphical object, wherein the second graphical object is displayed at a fourth size that is smaller than the second size, at which the first graphical object was previously displayed.

In accordance with some embodiments, an electronic device is described. The electronic device comprising: a display; means, while the electronic device is in a first mode, for displaying on the display, a first user interface including: a first time indicator indicating a current time and is displayed at a first size; and a first graphical object and is displayed at a second size; and means for detecting that the electronic device has met criteria for transitioning from the first mode to a second mode; and means, responsive to detecting that the electronic device has met the criteria for transitioning from the first mode to the second mode, for transitioning the electronic device from the first mode to the second mode, including: means, while the electronic device is in the second mode, for displaying on the display, a second user interface including: a second time indicator indicating the current time, wherein the second time indicator is displayed at a third size that is smaller than the first size, at which the first time indicator was previously displayed; and a second graphical object corresponding to the first graphical object, wherein the second graphical object is displayed at a fourth size that is smaller than the second size, at which the first graphical object was previously displayed.

In accordance with some embodiments, a method is described. The method comprises: at an electronic device having a display and one or more sensors: while the electronic device is in a first mode, displaying on the display, a first user interface at a first display brightness level, the first user interface including: a first time indicator; and a first graphical object; receiving data from the one or more sensors; detecting that the electronic device has met criteria for transitioning from the first mode to a second mode; and in response to detecting that the electronic device has met the criteria for transitioning from the first mode to the second mode, transitioning the electronic device from the first mode to the second mode; and while the electronic device is in the second mode: in accordance with a determination that the data from the one or more sensors corresponds to a first environmental brightness level, displaying a second user interface at a second display brightness level less than the first display brightness level, the second user interface including: a second time indicator different from the first time indicator in one or more visual characteristics other than brightness; and a second graphical object that corresponds to the first graphical object; in accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

In accordance with some embodiments, a non-transitory computer-readable storage medium is described. The non-transitory computer-readable storage medium stores one or more programs configured to be executed by one or more processors of an electronic device with a display and one or more sensors, the one or more programs including instructions for: while the electronic device is in a first mode, displaying on the display, a first user interface at a first display brightness level, the first user interface including: a first time indicator; and a first graphical object; receiving data from the one or more sensors; detecting that the electronic device has met criteria for transitioning from the first mode to a second mode; and in response to detecting that the electronic device has met the criteria for transitioning from the first mode to the second mode, transitioning the electronic device from the first mode to the second mode; and while the electronic device is in the second mode: in accordance with a determination that the data from the one or more sensors corresponds to a first environmental brightness level, displaying a second user interface at a second display brightness level less than the first display brightness level, the second user interface including: a second time indicator different from the first time indicator in one or more visual characteristics other than brightness; and a second graphical object that corresponds to the first graphical object; in accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

In accordance with some embodiments, a transitory computer-readable storage medium is described. The transitory computer-readable storage medium stores one or more programs configured to be executed by one or more processors of an electronic device with a display and one or more sensors, the one or more programs including instructions for: while the electronic device is in a first mode, displaying on the display, a first user interface at a first display brightness level, the first user interface including: a first time indicator; and a first graphical object; receiving data from the one or more sensors; detecting that the electronic device has met criteria for transitioning from the first mode to a second mode; and in response to detecting that the electronic device has met the criteria for transitioning from the first mode to the second mode, transitioning the electronic device from the first mode to the second mode; and while the electronic device is in the second mode: in accordance with a determination that the data from the one or more sensors corresponds to a first environmental brightness level, displaying a second user interface at a second display brightness level less than the first display brightness level, the second user interface including: a second time indicator different from the first time indicator in one or more visual characteristics other than brightness; and a second graphical object that corresponds to the first graphical object; in accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

In accordance with some embodiments, an electronic device is described. The electronic device, comprising: a display; one or more sensors; one or more processors; and memory storing one or more programs configured to be executed by the one or more processors, the one or more programs including instructions for: while the electronic device is in a first mode, displaying on the display, a first user interface at a first display brightness level, the first user interface including: a first time indicator; and a first graphical object; receiving data from the one or more sensors; detecting that the electronic device has met criteria for transitioning from the first mode to a second mode; and in response to detecting that the electronic device has met the criteria for transitioning from the first mode to the second mode, transitioning the electronic device from the first mode to the second mode; and while the electronic device is in the second mode: in accordance with a determination that the data from the one or more sensors corresponds to a first environmental brightness level, displaying a second user interface at a second display brightness level less than the first display brightness level, the second user interface including: a second time indicator different from the first time indicator in one or more visual characteristics other than brightness; and a second graphical object that corresponds to the first graphical object; in accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

In accordance with some embodiments, an electronic device is described. The electronic device, comprising: a display; one or more sensors; means, while the electronic device is in a first mode, for displaying on the display, a first user interface at a first display brightness level, the first user interface including: a first time indicator; and a first graphical object; means for receiving data from the one or more sensors; means for detecting that the electronic device has met criteria for transitioning from the first mode to a second mode; and means, responsive to detecting that the electronic device has met the criteria for transitioning from the first mode to the second mode, for transitioning the electronic device from the first mode to the second mode; and means, while the electronic device is in the second mode, for: in accordance with a determination that the data from the one or more sensors corresponds to a first environmental brightness level, displaying a second user interface at a second display brightness level less than the first display brightness level, the second user interface including: a second time indicator different from the first time indicator in one or more visual characteristics other than brightness; and a second graphical object that corresponds to the first graphical object; in accordance with a determination that the data from the one or more sensors corresponds to a second environmental brightness level lower than the first environmental brightness level, displaying a third user interface user interface at a third display brightness level lower than the second display brightness level, the third user interface including different content than the second user interface.

In accordance with some embodiments, a method is described. The method comprises: at an electronic device having a display: displaying a user interface that includes a plurality of user interface elements including a graphical representation of a first type of information that is associated with a first application; while the electronic device is in a first mode: updating the appearance of the graphical representation of the first type of information over time with a first update interval; and after updating the appearance of the graphical representation of the first type of information over time one or more times at the first update interval, detecting that the electronic device has met criteria for transitioning from the first mode to a second mode; in response to detecting that the electronic device has met the criteria for transitioning from the first mode to the second mode, transitioning the electronic device from the first mode to the second mode; and while the electronic device is in the second mode, updating the appearance of the graphical representation of the first type of information over time with a second update interval that is different from the first update interval.

In accordance with some embodiments, a non-transitory computer-readable storage medium is described. The non-transitory computer-readable storage medium stores one or more programs configured to be executed by one or more processors of an electronic device with a display, the one or more programs including instructions for: displaying a user interface that includes a plurality of user interface elements including a graphical representation of a first type of information that is associated with a first application; while the electronic device is in a first mode: updating the appearance of the graphical representation of the first type of information over time with a first update interval; and after updating the appearance of the graphical representation of the first type of information over time one or more times at the first update interval, detecting that the electronic device has met criteria for transitioning from the first mode to a second mode; in response to detecting that the electronic device has met the criteria for transitioning from the first mode to the second mode, transitioning the electronic device from the first mode to the second mode; and while the electronic device is in the second mode, updating the appearance of the graphical representation of the first type of information over time with a second update interval that is different from the first update interval.

In accordance with some embodiments, a transitory computer-readable storage medium is described. The transitory computer-readable storage medium stores one or more programs configured to be executed by one or more processors of an electronic device with a display, the one or more programs including instructions for: displaying a user interface that includes a plurality of user interface elements including a graphical representation of a first type of information that is associated with a first application; while the electronic device is in a first mode: updating the appearance of the graphical representation of the first type of information over time with a first update interval; and after updating the appearance of the graphical representation of the first type of information over time one or more times at the first update interval, detecting that the electronic device has met criteria for transitioning from the first mode to a second mode; in response to detecting that the electronic device has met the criteria for transitioning from the first mode to the second mode, transitioning the electronic device from the first mode to the second mode; and while the electronic device is in the second mode, updating the appearance of the graphical representation of the first type of information over time with a second update interval that is different from the first update interval.

In accordance with some embodiments, an electronic device is described. The electronic device comprising: a display; one or more processors; and memory storing one or more programs configured to be executed by the one or more processors, the one or more programs including instructions for: displaying a user interface that includes a plurality of user interface elements including a graphical representation of a first type of information that is associated with a first application; while the electronic device is in a first mode: updating the appearance of the graphical representation of the first type of information over time with a first update interval; and after updating the appearance of the graphical representation of the first type of information over time one or more times at the first update interval, detecting that the electronic device has met criteria for transitioning from the first mode to a second mode; in response to detecting that the electronic device has met the criteria for transitioning from the first mode to the second mode, transitioning the electronic device from the first mode to the second mode; and while the electronic device is in the second mode, updating the appearance of the graphical representation of the first type of information over time with a second update interval that is different from the first update interval.

In accordance with some embodiments, an electronic device is described. The electronic device comprising: a display; means for displaying a user interface that includes a plurality of user interface elements including a graphical representation of a first type of information that is associated with a first application; means, while the electronic device is in a first mode, for: updating the appearance of the graphical representation of the first type of information over time with a first update interval; and after updating the appearance of the graphical representation of the first type of information over time one or more times at the first update interval, detecting that the electronic device has met criteria for transitioning from the first mode to a second mode; means, responsive to detecting that the electronic device has met the criteria for transitioning from the first mode to the second mode, for transitioning the electronic device from the first mode to the second mode; and means, while the electronic device is in the second mode, for updating the appearance of the graphical representation of the first type of information over time with a second update interval that is different from the first update interval.

In accordance with some embodiments, a method is described. The method comprises: at an electronic device having a display: while the electronic device is operating in a first mode, displaying, on the display, a first user interface of a first application, the first user interface including a first graphical object corresponding to the first application; while displaying the first user interface, detecting that the electronic device has met criteria for transitioning from the first mode to a second mode; and in response to detecting that the electronic device has met the criteria for transitioning from the first mode to the second mode: in accordance with a determination that the first application is an application of a first type, replacing display of the first user interface of the first application with a second user interface of the first application different from the first user interface, the second user interface including a second graphical object corresponding to the first application; in accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

In accordance with some embodiments, a non-transitory computer-readable storage medium is described. The non-transitory computer-readable storage medium stores one or more programs configured to be executed by one or more processors of an electronic device with a display, the one or more programs including instructions for: while the electronic device is operating in a first mode, displaying, on the display, a first user interface of a first application, the first user interface including a first graphical object corresponding to the first application; while displaying the first user interface, detecting that the electronic device has met criteria for transitioning from the first mode to a second mode; and in response to detecting that the electronic device has met the criteria for transitioning from the first mode to the second mode: in accordance with a determination that the first application is an application of a first type, replacing display of the first user interface of the first application with a second user interface of the first application different from the first user interface, the second user interface including a second graphical object corresponding to the first application; in accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

In accordance with some embodiments, a transitory computer-readable storage medium is described. The transitory computer-readable storage medium stores one or more programs configured to be executed by one or more processors of an electronic device with a display, the one or more programs including instructions for: while the electronic device is operating in a first mode, displaying, on the display, a first user interface of a first application, the first user interface including a first graphical object corresponding to the first application; while displaying the first user interface, detecting that the electronic device has met criteria for transitioning from the first mode to a second mode; and in response to detecting that the electronic device has met the criteria for transitioning from the first mode to the second mode: in accordance with a determination that the first application is an application of a first type, replacing display of the first user interface of the first application with a second user interface of the first application different from the first user interface, the second user interface including a second graphical object corresponding to the first application; in accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

In accordance with some embodiments, an electronic device, comprising: a display; one or more processors; and memory storing one or more programs configured to be executed by the one or more processors, the one or more programs including instructions for: while the electronic device is operating in a first mode, displaying, on the display, a first user interface of a first application, the first user interface including a first graphical object corresponding to the first application; while displaying the first user interface, detecting that the electronic device has met criteria for transitioning from the first mode to a second mode; and in response to detecting that the electronic device has met the criteria for transitioning from the first mode to the second mode: in accordance with a determination that the first application is an application of a first type, replacing display of the first user interface of the first application with a second user interface of the first application different from the first user interface, the second user interface including a second graphical object corresponding to the first application; in accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

In accordance with some embodiments, an electronic device, comprising: a display; means, while the electronic device is operating in a first mode, for displaying, on the display, a first user interface of a first application, the first user interface including a first graphical object corresponding to the first application; means, while displaying the first user interface, for detecting that the electronic device has met criteria for transitioning from the first mode to a second mode; and means, responsive to detecting that the electronic device has met the criteria for transitioning from the first mode to the second mode, for: in accordance with a determination that the first application is an application of a first type, replacing display of the first user interface of the first application with a second user interface of the first application different from the first user interface, the second user interface including a second graphical object corresponding to the first application; in accordance with a determination that the first application is an application of a second type, replacing display of the first user interface of the first application with a third user interface different from the first user interface of the first application and the second user interface of the first application, the third user interface that is an operating system user interface including one or more elements that are not part of the first user interface of the first application, including a time indicator.

In accordance with some embodiments, a method is described. The method comprises: at an electronic device having a display: while the electronic device is operating in a first mode: displaying, on the display, a first user interface of a first application with an arrangement of user interface elements determined by the first application; and displaying, on the display, a second user interface of a second application with an arrangement of user interface elements determined by the second application; while the electronic device is operating in the first mode, detecting that the electronic device has met criteria for transitioning from the first mode to a second mode; and in response to detecting that the electronic device has met the criteria for transitioning from the first mode to the second mode, transitioning from the first mode to the second mode, including: in accordance with a determination that the first application was displayed on the display when the electronic device detected that the electronic device has met criteria for transitioning from the first mode to a second mode displaying information from the first application in a predefined template; and in accordance with a determination that the second application was displayed on the display when the electronic device detected that the electronic device has met criteria for transitioning from the first mode to a second mode, displaying information from the second application in the predefined template.

In accordance with some embodiments, a non-transitory computer-readable storage medium is described. The non-transitory computer-readable storage medium stores one or more programs configured to be executed by one or more processors of an electronic device with a display, the one or more programs including instructions for: while the electronic device is operating in a first mode: displaying, on the display, a first user interface of a first application with an arrangement of user interface elements determined by the first application; and displaying, on the display, a second user interface of a second application with an arrangement of user interface elements determined by the second application; while the electronic device is operating in the first mode, detecting that the electronic device has met criteria for transitioning from the first mode to a second mode; and in response to detecting that the electronic device has met the criteria for transitioning from the first mode to the second mode, transitioning from the first mode to the second mode, including: in accordance with a determination that the first application was displayed on the display when the electronic device detected that the electronic device has met criteria for transitioning from the first mode to a second mode displaying information from the first application in a predefined template; and in accordance with a determination that the second application was displayed on the display when the electronic device detected that the electronic device has met criteria for transitioning from the first mode to a second mode, displaying information from the second application in the predefined template.

In accordance with some embodiments, a transitory computer-readable storage medium is described. The transitory computer-readable storage medium stores one or more programs configured to be executed by one or more processors of an electronic device with a display, the one or more programs including instructions for: while the electronic device is operating in a first mode: displaying, on the display, a first user interface of a first application with an arrangement of user interface elements determined by the first application; and displaying, on the display, a second user interface of a second application with an arrangement of user interface elements determined by the second application; while the electronic device is operating in the first mode, detecting that the electronic device has met criteria for transitioning from the first mode to a second mode; and in response to detecting that the electronic device has met the criteria for transitioning from the first mode to the second mode, transitioning from the first mode to the second mode, including: in accordance with a determination that the first application was displayed on the display when the electronic device detected that the electronic device has met criteria for transitioning from the first mode to a second mode displaying information from the first application in a predefined template; and in accordance with a determination that the second application was displayed on the display when the electronic device detected that the electronic device has met criteria for transitioning from the first mode to a second mode, displaying information from the second application in the predefined template.

In accordance with some embodiments, an electronic device is described. The electronic device comprising: a display; one or more processors; and memory storing one or more programs configured to be executed by the one or more processors, the one or more programs including instructions for: while the electronic device is operating in a first mode: displaying, on the display, a first user interface of a first application with an arrangement of user interface elements determined by the first application; and displaying, on the display, a second user interface of a second application with an arrangement of user interface elements determined by the second application; while the electronic device is operating in the first mode, detecting that the electronic device has met criteria for transitioning from the first mode to a second mode; and in response to detecting that the electronic device has met the criteria for transitioning from the first mode to the second mode, transitioning from the first mode to the second mode, including: in accordance with a determination that the first application was displayed on the display when the electronic device detected that the electronic device has met criteria for transitioning from the first mode to a second mode displaying information from the first application in a predefined template; and in accordance with a determination that the second application was displayed on the display when the electronic device detected that the electronic device has met criteria for transitioning from the first mode to a second mode, displaying information from the second application in the predefined template.

In accordance with some embodiments, an electronic device is described. The electronic device comprising: a display; means, while the electronic device is operating in a first mode, for: displaying, on the display, a first user interface of a first application with an arrangement of user interface elements determined by the first application; and displaying, on the display, a second user interface of a second application with an arrangement of user interface elements determined by the second application; means, while the electronic device is operating in the first mode, for detecting that the electronic device has met criteria for transitioning from the first mode to a second mode; and means, responsive to detecting that the electronic device has met the criteria for transitioning from the first mode to the second mode, for transitioning from the first mode to the second mode, including: in accordance with a determination that the first application was displayed on the display when the electronic device detected that the electronic device has met criteria for transitioning from the first mode to a second mode displaying information from the first application in a predefined template; and in accordance with a determination that the second application was displayed on the display when the electronic device detected that the electronic device has met criteria for transitioning from the first mode to a second mode, displaying information from the second application in the predefined template.

In accordance with some embodiments, a method is described. The method comprises: at an electronic device having a display: while the electronic device is operating in a first mode, displaying, on the display, a first user interface of an application; detecting that the electronic device has met criteria for transitioning from the first mode to a second mode; and in response to detecting that the electronic device has met the criteria for transitioning from the first mode to the second mode: transitioning from the first mode to the second mode; replacing, on the display, the first user interface with a second user interface including an obscured representation of at least a portion of the first user interface of the application; and displaying a time indicator at a position on the display overlapping at least a portion of the obscured representation of the at least a portion of the first user interface of the application.

In accordance with some embodiments, a non-transitory computer-readable storage medium is described. The non-transitory computer-readable storage medium stores one or more programs configured to be executed by one or more processors of an electronic device with a display, the one or more programs including instructions for: while the electronic device is operating in a first mode, displaying, on the display, a first user interface of an application; detecting that the electronic device has met criteria for transitioning from the first mode to a second mode; and in response to detecting that the electronic device has met the criteria for transitioning from the first mode to the second mode: transitioning from the first mode to the second mode; replacing, on the display, the first user interface with a second user interface including an obscured representation of at least a portion of the first user interface of the application; and displaying a time indicator at a position on the display overlapping at least a portion of the obscured representation of the at least a portion of the first user interface of the application.

In accordance with some embodiments, a transitory computer-readable storage medium is described. The transitory computer-readable storage medium stores one or more programs configured to be executed by one or more processors of an electronic device with a display, the one or more programs including instructions for: while the electronic device is operating in a first mode, displaying, on the display, a first user interface of an application; detecting that the electronic device has met criteria for transitioning from the first mode to a second mode; and in response to detecting that the electronic device has met the criteria for transitioning from the first mode to the second mode: transitioning from the first mode to the second mode; replacing, on the display, the first user interface with a second user interface including an obscured representation of at least a portion of the first user interface of the application; and displaying a time indicator at a position on the display overlapping at least a portion of the obscured representation of the at least a portion of the first user interface of the application.

In accordance with some embodiments, an electronic device is described. The electronic device comprising a display; one or more processors; and memory storing one or more programs configured to be executed by the one or more processors, the one or more programs including instructions for: while the electronic device is operating in a first mode, displaying, on the display, a first user interface of an application; detecting that the electronic device has met criteria for transitioning from the first mode to a second mode; and in response to detecting that the electronic device has met the criteria for transitioning from the first mode to the second mode: transitioning from the first mode to the second mode; replacing, on the display, the first user interface with a second user interface including an obscured representation of at least a portion of the first user interface of the application; and displaying a time indicator at a position on the display overlapping at least a portion of the obscured representation of the at least a portion of the first user interface of the application.

In accordance with some embodiments, an electronic device is described. The electronic device comprising a display; means, while the electronic device is operating in a first mode, for displaying, on the display, a first user interface of an application; means for detecting that the electronic device has met criteria for transitioning from the first mode to a second mode; and means, responsive to detecting that the electronic device has met the criteria for transitioning from the first mode to the second mode, for: transitioning from the first mode to the second mode; replacing, on the display, the first user interface with a second user interface including an obscured representation of at least a portion of the first user interface of the application; and displaying a time indicator at a position on the display overlapping at least a portion of the obscured representation of the at least a portion of the first user interface of the application.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing display usage, thereby increasing the effectiveness, efficiency, and user satisfaction with such devices. Such methods and interfaces may complement or replace other methods for managing display usage

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 5C-5D illustrate exemplary components of a personal electronic device having a touch-sensitive display and intensity sensors in accordance with some embodiments.

FIGS. 5E-5H illustrate exemplary components and user interfaces of a personal electronic device in accordance with some embodiments.

FIG. 7 illustrates a flow diagram depicting a method for managing display usage in accordance with some embodiments.

FIG. 9 illustrates a flow diagram depicting a method for managing display usage in accordance with some embodiments.

FIGS. 11A-11B illustrate a flow diagram depicting a method for managing display usage in accordance with some embodiments.

FIGS. 12A-12I illustrate exemplary user interfaces with managed display usage in accordance with embodiments.

FIG. 13 illustrates a flow diagram depicting a method for managing display usage in accordance with some embodiments.

FIG. 15 illustrates a flow diagram depicting a method for managing display usage in accordance with some embodiments.

FIGS. 17A-17B illustrate a flow diagram depicting a method for managing display usage in accordance with some embodiments.

FIG. 19 illustrates a flow diagram depicting a method for managing display usage in accordance with some embodiments.

DESCRIPTION OF EMBODIMENTS

Figure 1A:
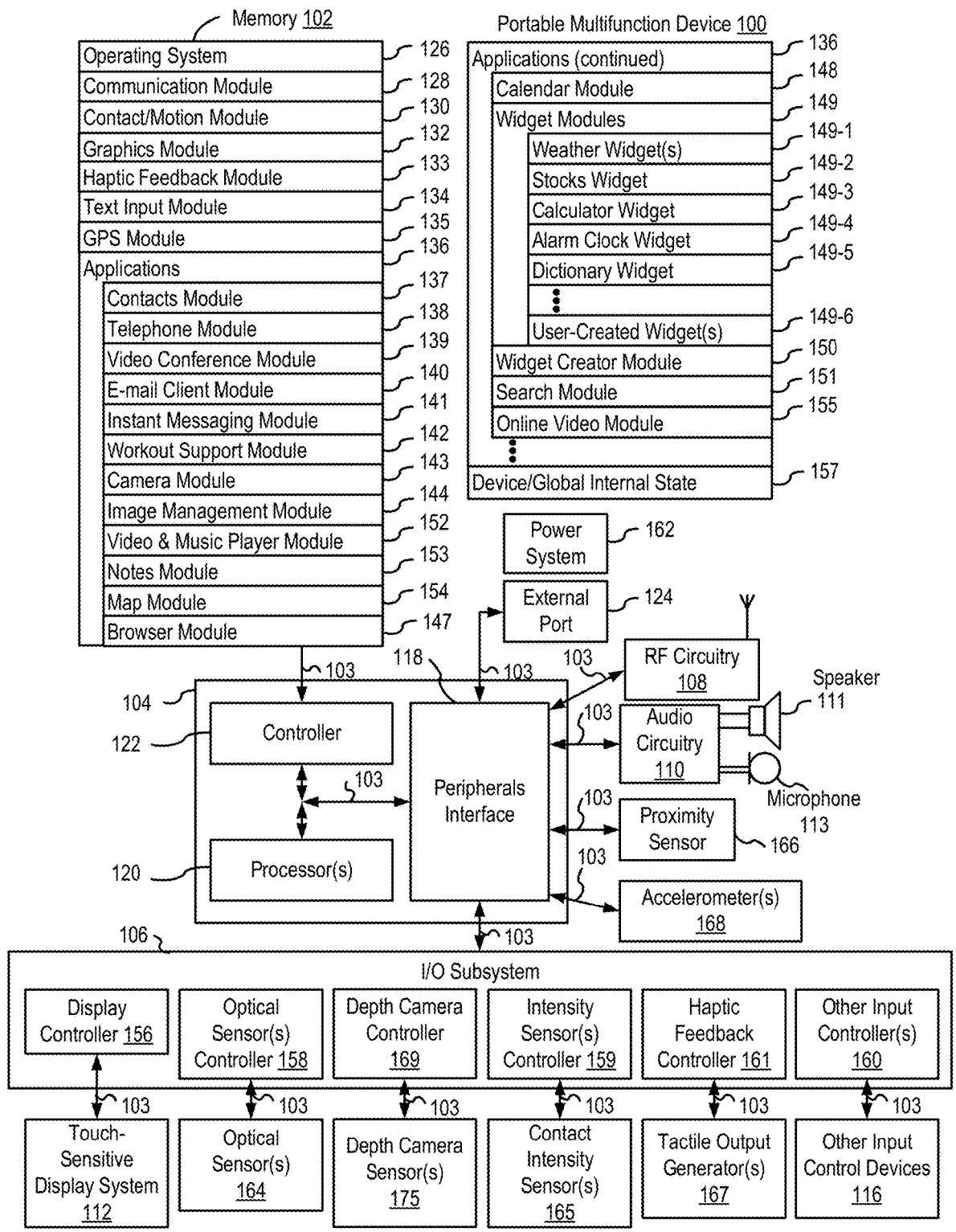
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing display usage. For example, prolonged display of user interfaces that include non-moving graphical object (e.g., static images) overtime causes screen burn-in or image ghosting. This is particularly true for portable multifunction devices with reduced-size displays, since elements of a displayed user interface are often displayed repetitively at fixed positions on a display. Techniques that thoughtfully manage what is include on a user interface, how it is displayed, and when it is displayed minimize screen burn-in and image ghosting. Such techniques can reduce the cognitive burden on a user who accesses user interfaces, thereby enhancing productivity. Further, such techniques can reduce processor and battery power otherwise wasted on redundant user inputs and excessive display brightness, and improve the wear characteristics of display devices used to display user interfaces.

Below, FIGS. 1A-1B, 2, 3, 4A-4B, and 5A-5H provide a description of exemplary devices for performing the techniques for managing display usage. FIGS. 6A-6X illustrate exemplary devices and techniques for managing display usage, in accordance with some embodiments. FIG. 7 is a flow diagram illustrating methods of managing display usage, in accordance with some embodiments. The user interfaces in FIGS. 6A-6X are used to illustrate the processes described below, including the processes in FIG. 7. FIGS. 8A-8M illustrate exemplary devices and techniques for managing display usage, in accordance with some embodiments. FIG. 9 is a flow diagram illustrating methods of managing display usage, in accordance with some embodiments. The user interfaces in FIGS. 8A-8M are used to illustrate the processes described below, including the processes in FIG. 9. FIGS. 10A-10I illustrate exemplary devices and techniques for managing display usage, in accordance with some embodiments. FIGS. 11A-11B are a flow diagram illustrating methods of managing display usage, in accordance with some embodiments. The user interfaces in FIGS. 10A-10I are used to illustrate the processes described below, including the processes in FIGS. 11A-11B. FIGS. 12A-12I illustrate exemplary devices and techniques for managing display usage, in accordance with some embodiments. FIG. 13 is a flow diagram illustrating methods of managing display usage, in accordance with some embodiments. The user interfaces in FIGS. 12A-12I are used to illustrate the processes described below, including the processes in FIG. 13. FIGS. 14A-14E illustrate exemplary devices and techniques for managing display usage, in accordance with some embodiments. FIG. 15 is a flow diagram illustrating methods of managing display usage, in accordance with some embodiments. The user interfaces in FIGS. 14A-14E are used to illustrate the processes described below, including the processes in FIG. 15. FIGS. 16A-16F illustrate exemplary devices and techniques for managing display usage, in accordance with some embodiments. FIGS. 17A-17B are a flow diagram illustrating methods of managing display usage, in accordance with some embodiments. The user interfaces in FIGS. 16A-16F are used to illustrate the processes described below, including the processes in FIGS. 17A-17B. FIGS. 18A-18L illustrate exemplary devices and techniques for managing display usage, in accordance with some embodiments. FIG. 19 is a flow diagram illustrating methods of managing display usage, in accordance with some embodiments. The user interfaces in FIGS. 18A-18L are used to illustrate the processes described below, including the processes in FIG. 19.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
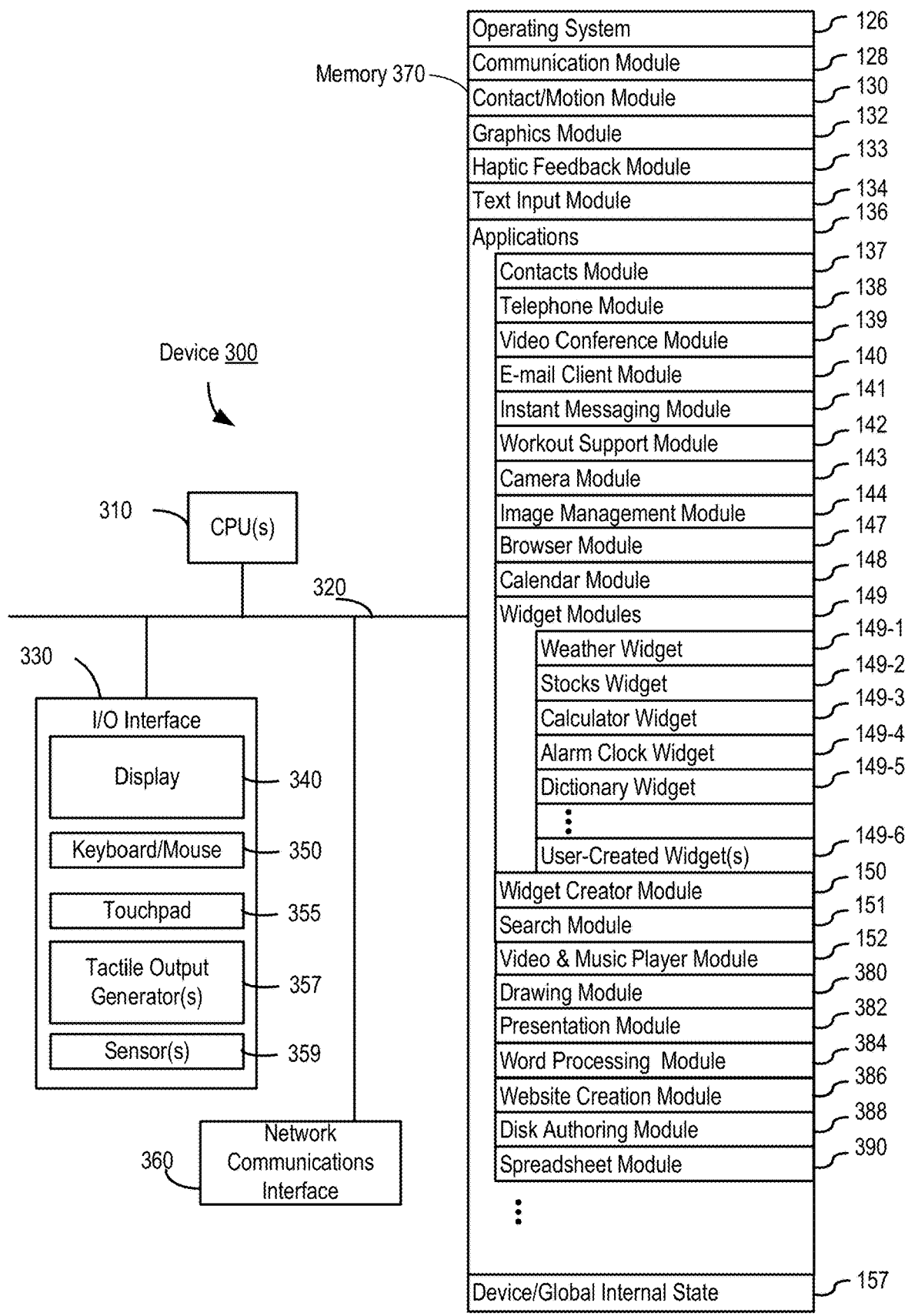
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
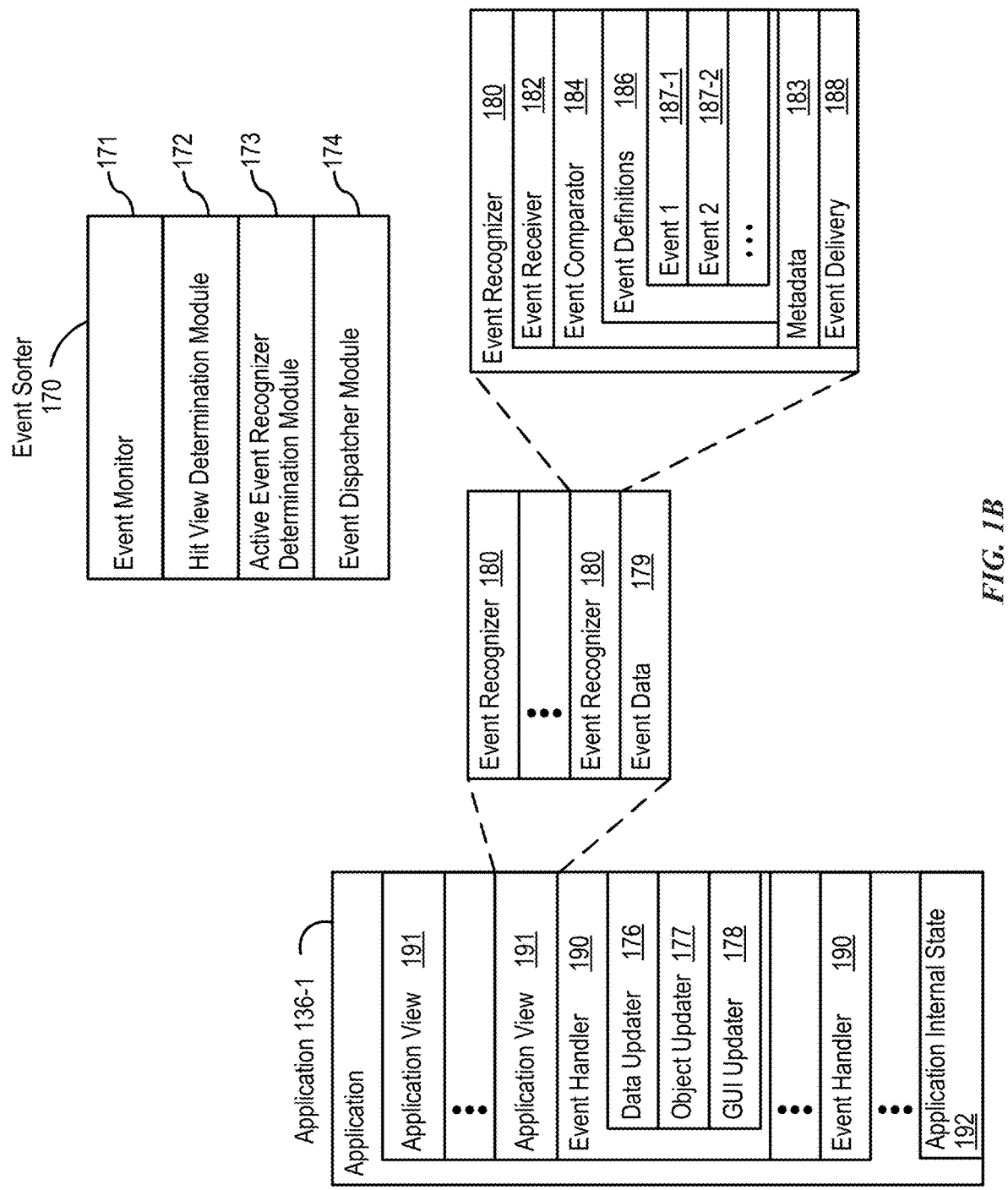
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
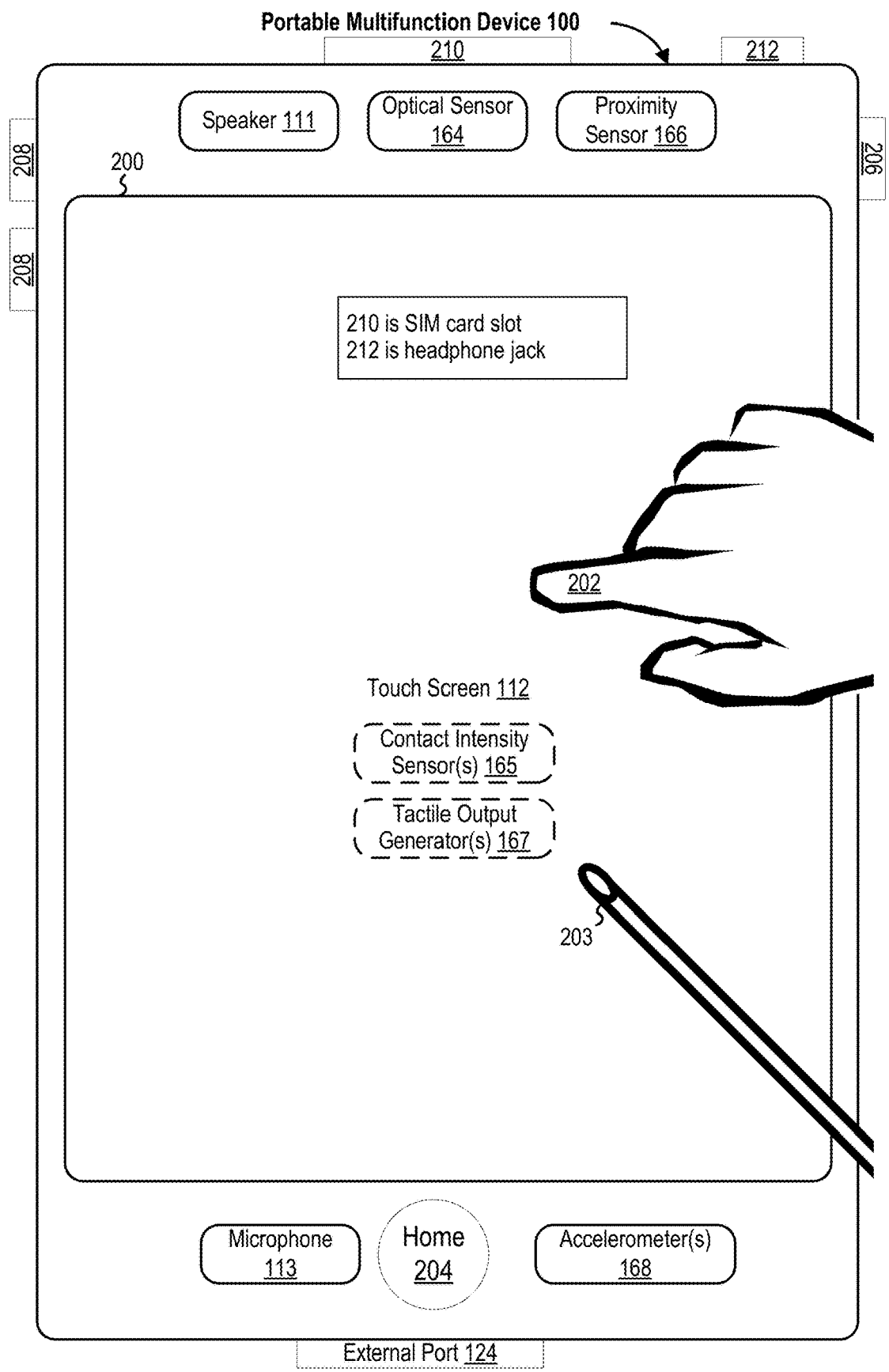
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
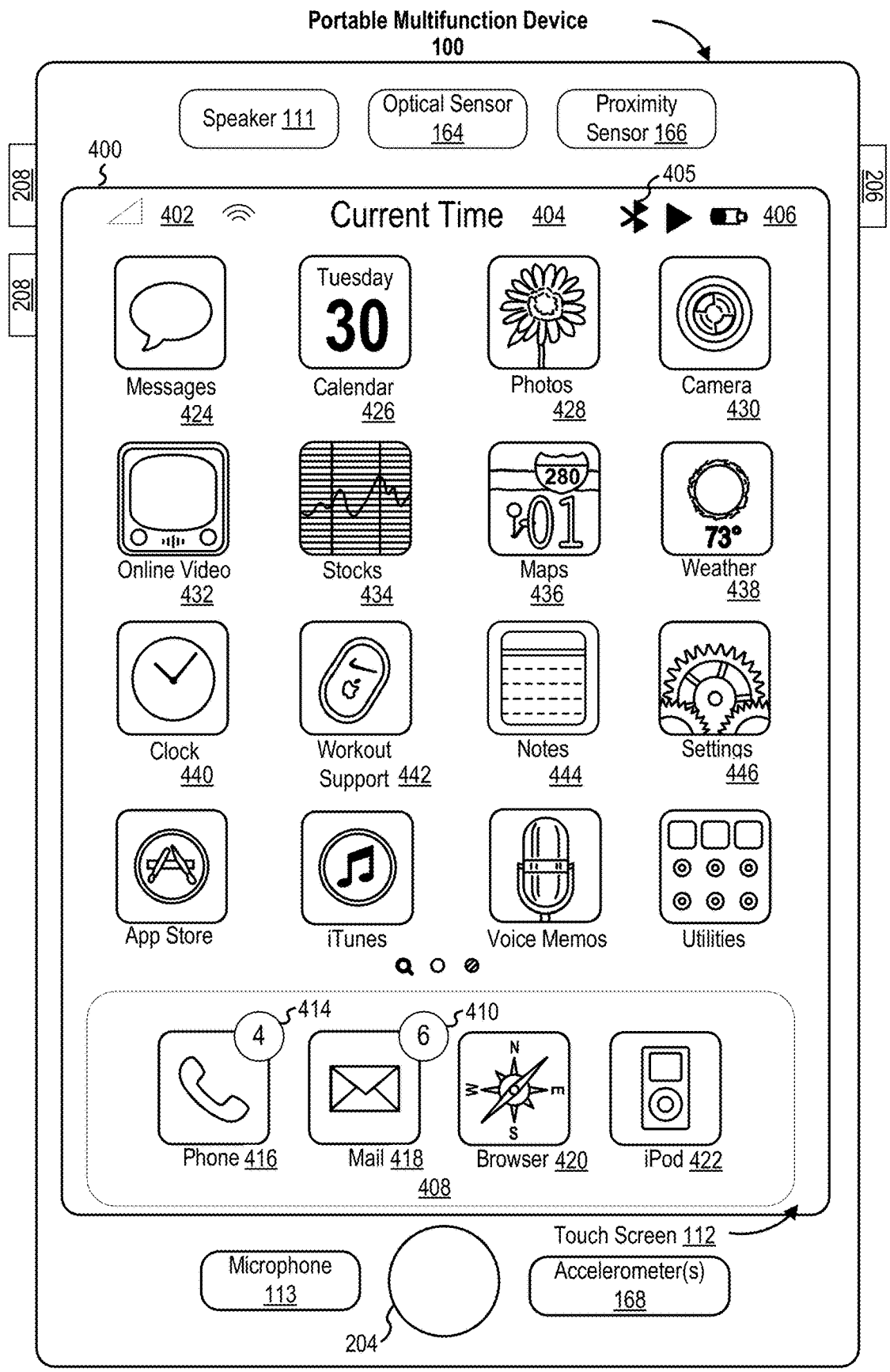
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
   Icon 416 for telephone module 138, labeled "Phone," which optionally includes an indicator 414 of the number of missed calls or voicemail messages;
   Icon 418 for e-mail client module 140, labeled "Mail," which optionally includes an indicator 410 of the number of unread e-mails;
   Icon 420 for browser module 147, labeled "Browser;" and
   Icon 422 for video and music player module 152, also referred to as iPod (trademark of Apple Inc.) module 152, labeled "iPod;" and
Icons for other applications, such as:
   Icon 424 for IM module 141, labeled "Messages;"
   Icon 426 for calendar module 148, labeled "Calendar;"
   Icon 428 for image management module 144, labeled "Photos;"
   Icon 430 for camera module 143, labeled "Camera;"
   Icon 432 for online video module 155, labeled "Online Video;"
   Icon 434 for stocks widget 149-2, labeled "Stocks;"
   Icon 436 for map module 154, labeled "Maps;"
   Icon 438 for weather widget 149-1, labeled "Weather;"
   Icon 440 for alarm clock widget 149-4, labeled "Clock;"
   Icon 442 for workout support module 142, labeled "Workout Support;"
   Icon 444 for notes module 153, labeled "Notes;" and
   Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
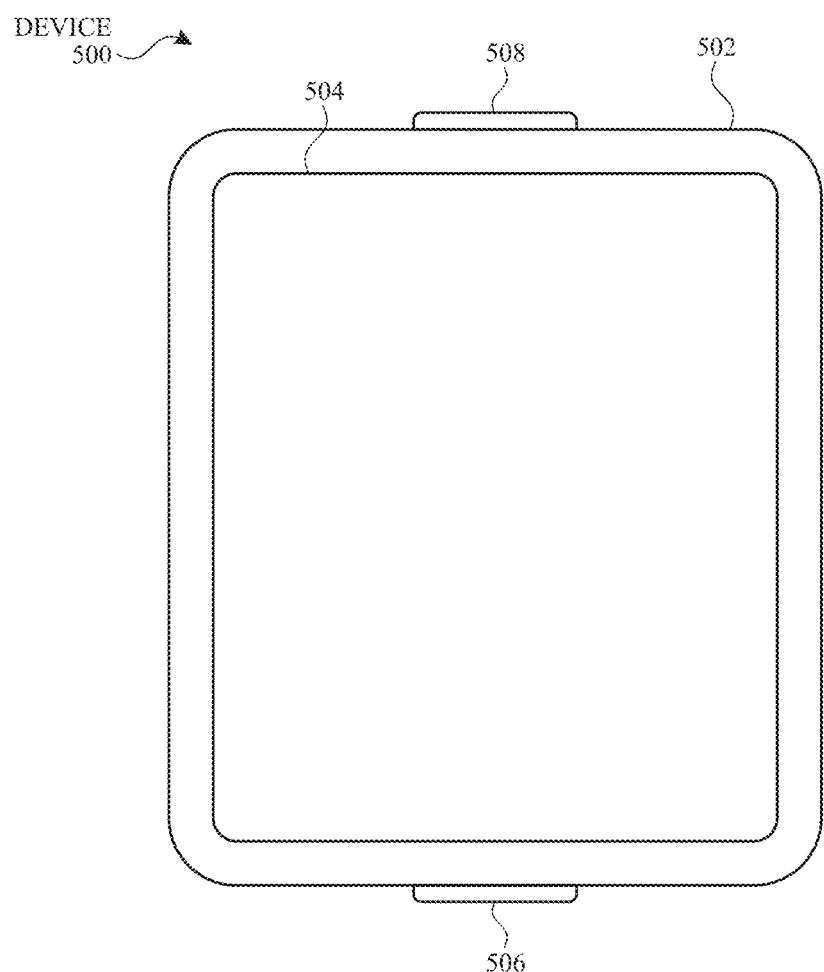
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
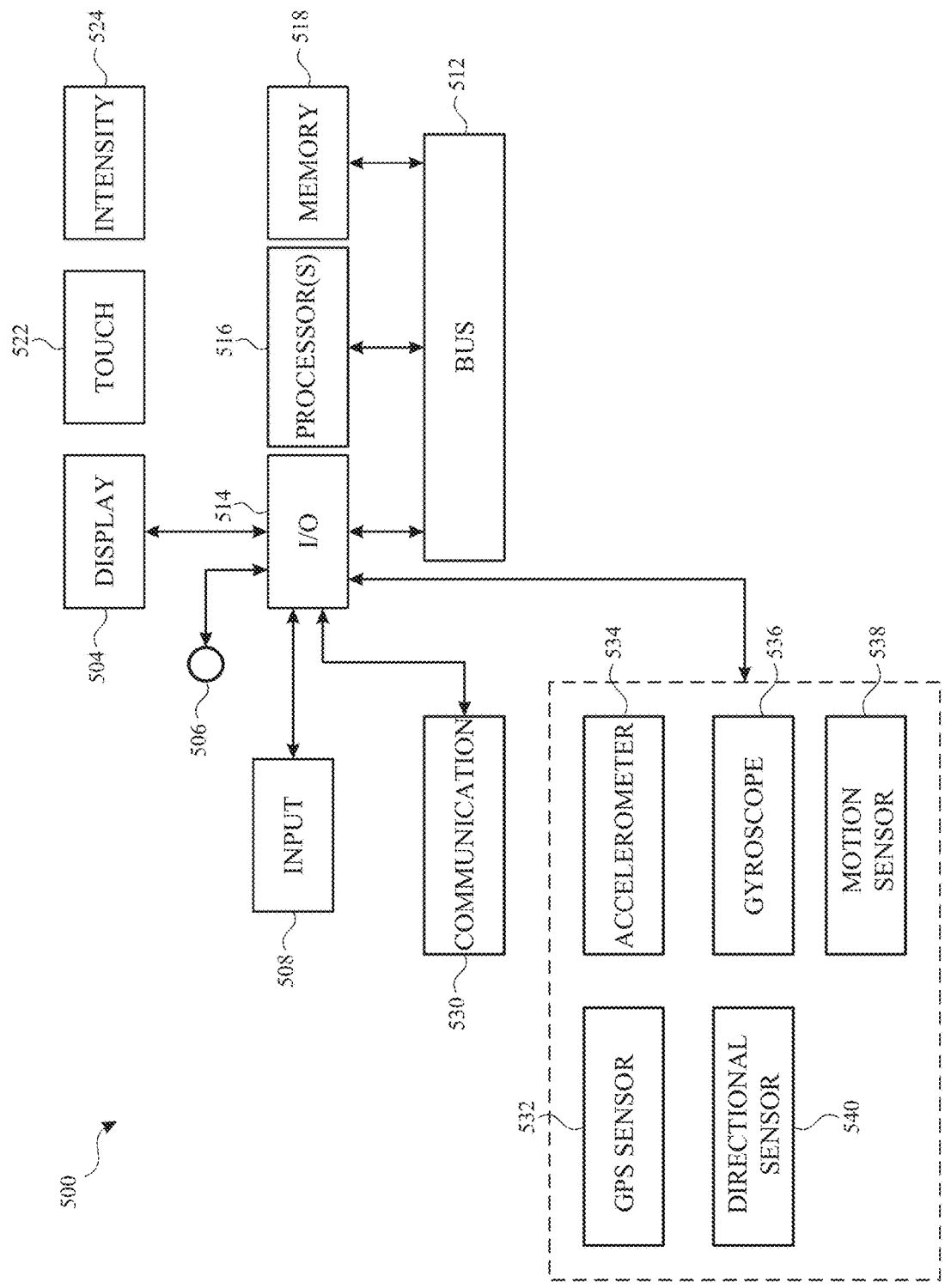
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, 1900 (FIGS. 7, 9, 11A-11B, 13, 15, 17A-17B, and 19). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance. In some examples, an affordance is displayed as a complication associated with a clock face.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5D:
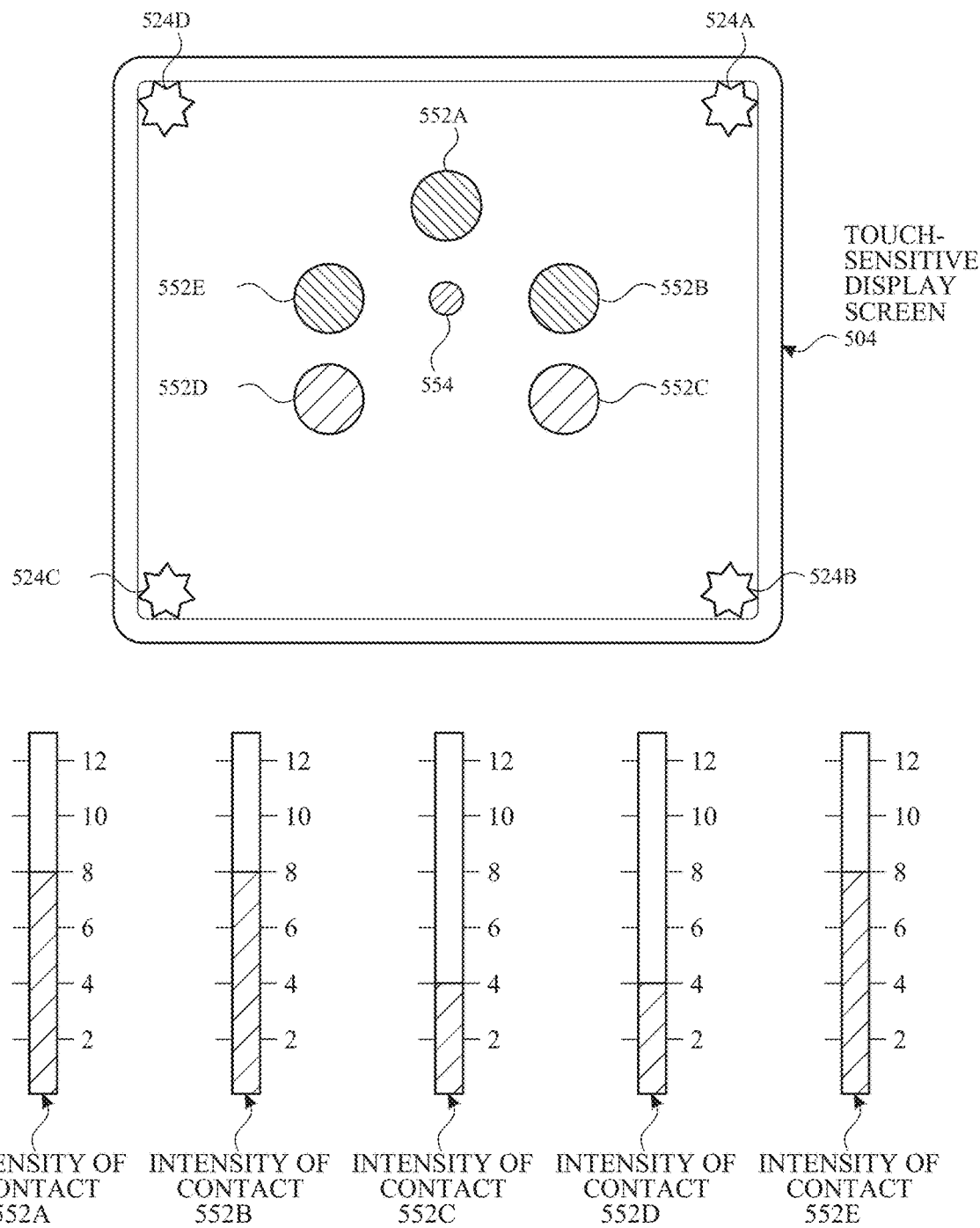

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, device 500, or device 600.

FIGS. 6A-6X illustrate exemplary techniques for displaying user interfaces, in accordance with some embodiments. The user interfaces in these figures are used to illustrate the processes described below, including the processes in FIG. 7. In particular, FIGS. 6A-6X illustrate techniques for managing display usage by altering one or more aspects (e.g., visual characteristics) of a displayed user interface upon determining that the device has met a mode-transition criteria. In some embodiments, the mode-transition criteria are one or more criteria that are indicative of reduced user activity or reduced user interaction with the electronic device (e.g., reduced user activity (physical movement) for a predetermined period of time; a lack of user input for a predetermined period of time; detecting a predefined gesture, such as a cover gesture over the display, corresponding to a request to transition modes). In some embodiments, detecting that the device has met the criteria includes one or more of: receiving data from one or more sensors (e.g., accelerometer, gyroscope, proximity sensor) corresponding to a user gesture (e.g., wrist-down, wrist-up, palm over display), receiving data from one or more sensors indicating user activity below a threshold activity level, and determining a predetermined period of time has elapsed without detecting user input at one or more input devices (e.g., touch-screen, rotatable input mechanism, depressible input mechanism). In some embodiments, a predefined period of time associated with a mode-transition criteria differs depending on how display of the presently displayed user interface was initiated (e.g., a longer predefined period a of time for a tap input and shorter predefined period a of time for a wrist raise).

Upon determining that a mode-transition criteria has been met, the device transitions from a first mode to a second mode (e.g., a low power mode). In some embodiments, while operating in the second mode, device 600 conserves energy by operating one or more processors of the device at a reduced load, such as by waking (e.g., enabling or turning on) one or more processors of the device at increased intervals (e.g., a reduce rate; less often) compared to operation in the first mode. In some embodiments, a processor includes hardware (e.g., a microprocessor or the like). In some embodiments, a processor includes one or more software components (e.g., software modules for performing various functions; a module for displaying information from applications on a display device; a module for processing sensor data received by the device, a module for performing calculations necessary to perform or implement various features of the device, etc.).

Among the visual characteristics described below that may be altered upon transitioning device modes is the overall brightness of a displayed user interface (e.g., average pixel luminance (APL), average lumen output, total lumen output, average illuminance, or total illuminance of the pixels comprising the user interface on the display; brightness expressed in nits, lux, or lumens). To illustrate this, FIGS. 6A-6X (as well as FIGS. 8A-8M, 10A-10I, 14A-14E, 16A-16F, and 18A-18L) include brightness scale 630 indicating a brightness level at which each respective user interface is displayed by device 600 on display 602. For example, as represented by the difference between respective brightness scales (e.g., position of circular indicator relative to the top ("HIGH") and bottom ("LOW") ends of each scale), clock face user interface 608-1 of FIG. 6A is displayed at a higher brightness level (e.g., greater luminance) than clock face user interface 608-2 of FIG. 6B.

Throughout this disclosure, the concept of brightness levels are also discussed with respect to individual graphical elements or groups of graphical elements included in various clock face user interfaces (e.g., affordances, graphical elements included within affordances, complications, clock face elements, backgrounds, indicators, etc.) displayed by device 600 on display 602. Similar to the brightness level of a clock face user interface, the brightness level of a graphical element as displayed within a clock face user interface on display 602 may also by varied (e.g., using the techniques described below). Please note, however, that as depicted throughout the figures described below, brightness scale 630 reflects an overall brightness level of a respective clock face user interface (e.g., the entire clock face user interface being displayed, not the brightness level of individual graphical elements or groups of graphical elements within the respective clock face user interface), unless otherwise noted. Furthermore, brightness scale 630 is not part of any user interface displayed on device 600.

In addition to brightness scale 630, the relative displayed brightness of a clock face user interface and elements constituting the clock face user interfaces described below (e.g., graphical objects displayed in or on the user interface, backgrounds, etc.) are also represented by the depicted shading intensities in each figure (e.g., white or lighter greys indicating more brightly displayed elements; darker greys indicating less brightly displayed elements).

In some embodiments, brightness levels can be adjusted (increased or decreased) using alpha blending. In some embodiments, decreasing a brightness level includes using alpha blending without altering a backlight of the electronic device to create a simulated or real backlight level. For instance, the device can alpha blend image data representing a clock face user interface (or a portion of a clock face user interface such as an affordance or complication) with an increasingly opaque black masking layer to increasingly dim the clock face user interface as displayed on the screen (e.g., so that the user interface fades to black).

In some embodiments, a brightness level of a graphical object in a clock face user interface is changed by altering the shape or composition of the graphical object itself. For example, the brightness of a white clock hand by may decreased by reducing the thickness of the clock hand (e.g., removing white pixels from the element). In some embodiments, a brightness level of a graphical object is altered (e.g., reduced or dimmed) by replacing solid-colored regions of the object with a similarly colored outlines of the solid-colored regions. In some embodiments, a brightness level of a graphical object is reduced or dimmed by altering its colors, for example, by replacing lighter colors (e.g., white, light greys, yellows, etc.) with darker colors (black, dark greys, blues, etc.). Any combination of the brightness altering techniques described above or similar techniques well-known in the art, may be used for adjusting brightness levels of graphical objects and clock face user interfaces in accordance with the embodiments described below.

Turning now to FIG. 6A, device 600 includes display 602, rotatable and depressible input mechanism 604 (e.g., rotatable and depressible in relation to a housing or frame of the device), and button 606. In the embodiments described below, device 600 is a wearable device, such as a smartwatch. In some embodiments, device 600 is a smart phone, a tablet, or other computing system including a display device (e.g., display screen, projection device, and the like). In some embodiments, device 600 includes one or more features of devices 100, 300, or 500.

At FIG. 6A, while operating in a standard display mode, device 600 displays clock face user interface 608-1 (e.g., a higher power consumption user interface) on display 602 at a standard display mode brightness level. In some embodiments, while device 600 continues to operate in the standard display mode, the standard display mode brightness level is reduced in response to detecting reduced ambient light levels at one or more sensor of device 600 (e.g., lower ambient light levels result in lower display brightness levels as described below in more detail with respect to FIGS. 10D-10E).

As illustrated in FIG. 6A, clock face user interface 608-1 includes analog indication of time 610 (e.g., a representation of analog clock hands displaying current hour, minute, and second values relative to time scale 612), and multiple affordances (e.g., clock face complications). In some embodiments, each affordance is associated with an application on device 600 (e.g., the affordance launches an associated application upon selection; the affordance displays information from the associated application).

Date affordance 614 indicates a current date and a description of an upcoming calendar event (e.g., "8:00 AM YOGA GYM"). World clock affordance 616 indicates a geographic location (e.g., "MAD" for Madrid, Spain), a time associated with the geographic location (e.g., an analog clock dial with hour and minute hands), and an indication of day, night, sunset, or sunrise (e.g., indicating that it is day-time in Madrid based on the light-colored shade of the background (e.g., darker shades indicated later in the day)). In some embodiments, world clock affordance 616 includes an offset to a local time. In some embodiments, the position of the location indicator moves to avoid overlapping or interfering with the clock hands as they progress around the world clock dial.

Compass affordance 618 includes graphical (e.g., a compass needle graphic), textual (e.g., "NW"), and numerical ("330" degrees) indicators of a cardinal or intercardinal direction which update as the orientation of device 600 (or the orientation a second device coupled to device 600) changes.

Timer affordance 620 includes a numerical indicator (e.g., "14:59") and radial markings, each indicating a remaining time associated with a timer application. The radial markings are sequentially altered (e.g., visually de-emphasized in size and/or color) such that the ratio of altered to unaltered radial markings is proportional to the time remaining on a decrementing counter associated with the timer application.

Heart rate affordance 622, moon affordance 624, stopwatch affordance 626, and workout affordance 628 are displayed at the corners of clock face user interface 608-1. As depicted in FIG. 6A, stopwatch affordance 626 includes a numeric indicator of an elapsed time (e.g., incrementing seconds, minutes, and milliseconds) associated with a stopwatch application on device 600.

Figure 6B:
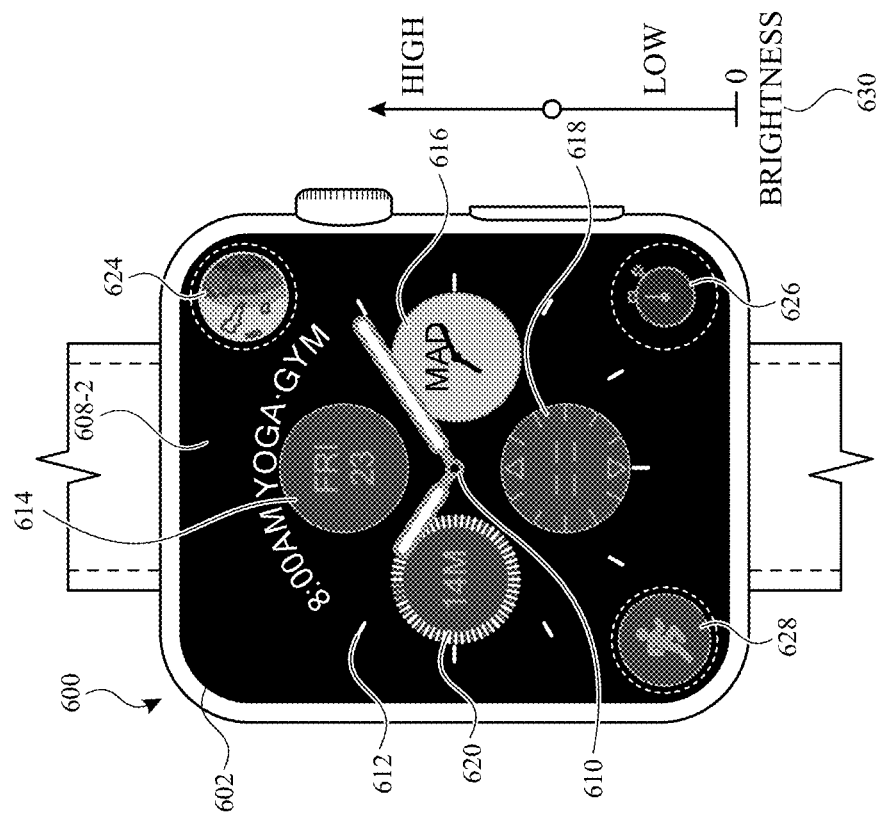
FIGS. 6A-6X illustrate exemplary user interfaces with managed display usage in accordance with embodiments.
Figure 6A:
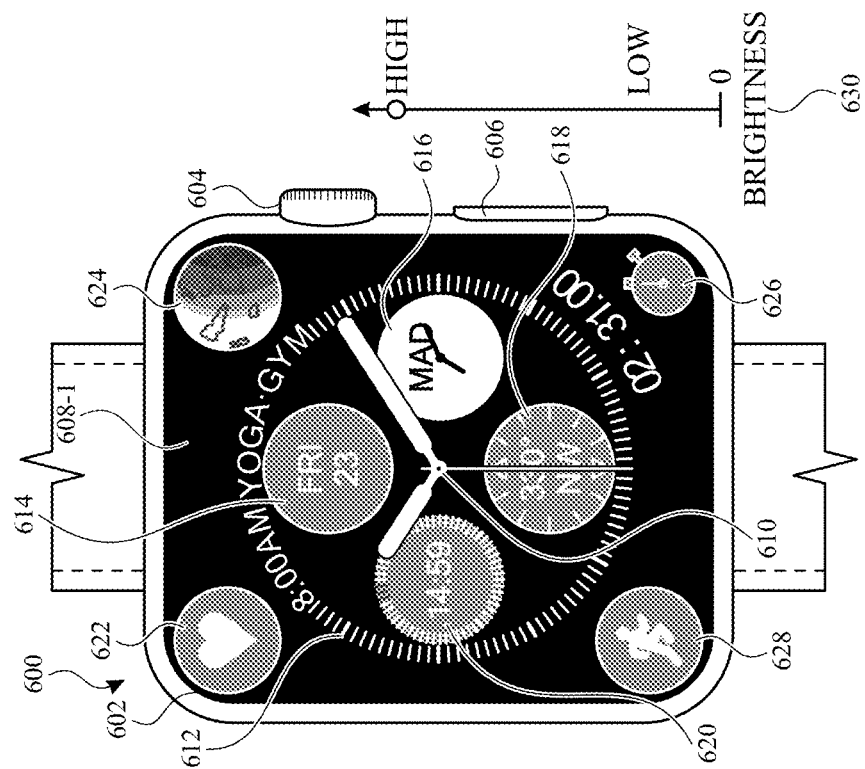
Figure 6F:
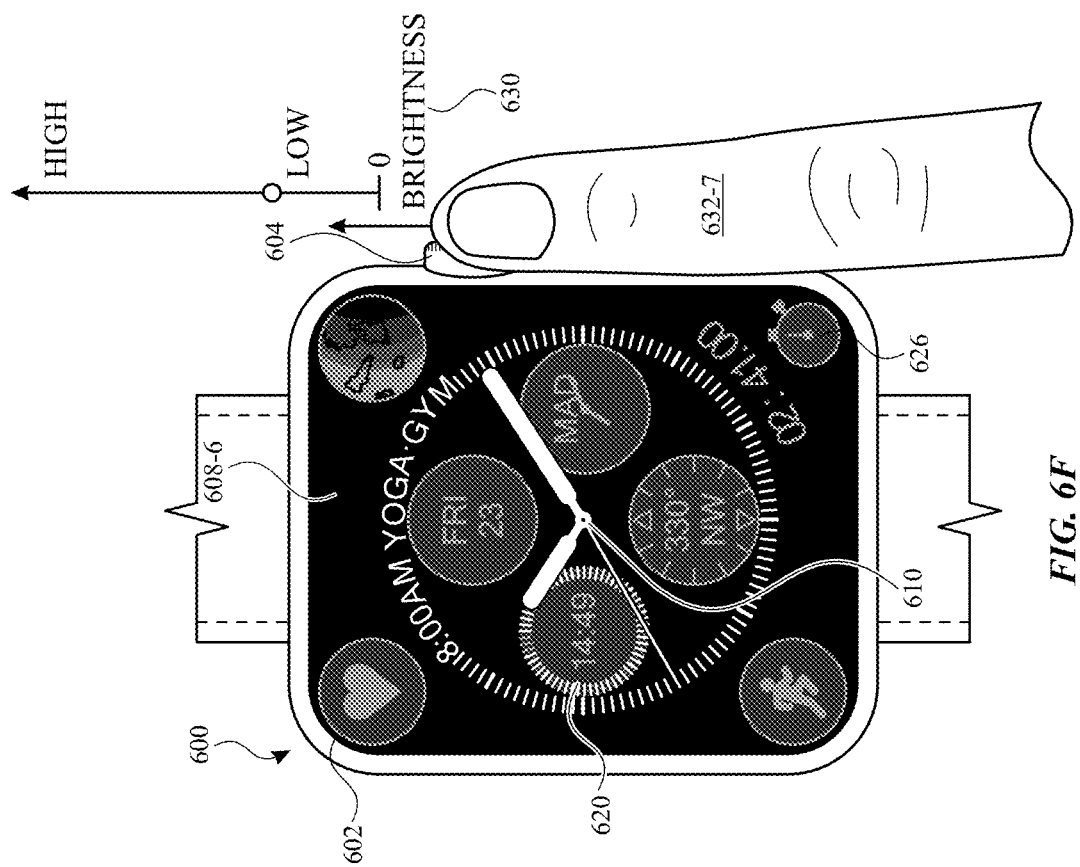

FIG. 6B illustrates device 600 after determining that a mode change criteria has been met and, in response, transitioning out of the standard display mode (e.g., device 600 is in a transitional mode or state). In some embodiments, device 600 determined that the mode change criteria were met after not detecting user inputs for a predetermined time (e.g., 60 seconds).

At FIG. 6B, while in a mode transitional state, device 600 displays clock face user interface 608-2 on display 602 (e.g., device 600 displays a transitional interface). Clock face user interface 608-2 is a frame of an animation (e.g., a sequence of frames or images) illustrating clock face user interface 608-1 (e.g., a higher power consumption user interface) visually morphing into a corresponding lower power consumption user interface (e.g., clock face user interface 608-3 as depicted in FIG. 6C). In some embodiments, device 600 displays a plurality of animation frames (e.g., transitional interfaces) while operating in a transitional state between device modes (e.g., a standard power display mode and a low power display mode).

As depicted in FIG. 6B, and as discussed above, device 600 displays clock face user interface 608-2 on display 602 at a lower brightness level than clock face user interface 608-1 (e.g., the overall brightness level or the average of the brightness values of pixels constituting clock face user interface 608-2 on display 602 is less than the brightness level of clock face user interface 608-1 on display 602 as depicted in FIG. 6A). Clock face user interface 608-2 includes several modifications relative to clock face user interface 608-1 (e.g., changes to brightness and positioning of individual elements (e.g., affordances), removal of content, etc.). However, since clock face user interface 608-2 represents an intermediate visual state, these differences will be discussed in more detail below in reference to FIG. 6C.

FIG. 6C illustrates device 600 in low power display mode (e.g., after the transition from standard display mode to low power display mode has concluded). At FIG. 6C, while operating in low power display mode, device 600 displays clock face user interface 608-3 (e.g., lower power consumption user interface) on display 602. Clock face user interface 608-3 is displayed at a lower brightness level than clock face user interface 608-1 (and clock face user interface 608-2). In some embodiments, clock face user interface 608-3 is displayed at a fixed percentage of the brightness level at which device 600 displays clock face user interface 608-1. In some embodiments, clock face user interface 608-3 is displayed at a brightness level based at least in part on an ambient light level detected by one or more sensor of device 600 (e.g., higher ambient light levels result in higher brightness levels while in low power display mode).

Clock face user interface 608-3 includes less content than clock face user interface 608-1. As depicted in FIG. 6C, analog indication of time 610 does not include a seconds hand, date affordance 614 does not include a description of an upcoming calendar event (e.g., "8:00 AM YOGA GYM"), time scale 612 includes fewer tick marks, compass affordance 618 does not include a textual (e.g., "NW") or a numerical ("330" degrees) indicators of direction, and timer affordance 620 does not includes seconds data. Additionally, clock face user interface 608-3 does not include an affordance corresponding to heart rate affordance 622 (e.g., heart rate affordance 622 was removed in response to device 600 transitioning from standard display mode to low power display mode).

In addition to including less or reduced content, corresponding elements in clock face user interface 608-3 are displayed by device 600 differently than they were previously displayed in clock face user interface 608-1. In FIG. 6C, the hour and minute hands of analog indication of time 610 are displayed in two colors rather than one (e.g., each hand includes an inner lighter colored region outlined by a darker colored region). Additionally, as depicted in FIG. 6C, the point of rotation of analog indication of time 610 (e.g., the stationary element about which the clock hands rotate) is displayed at lower brightness level (e.g., a darker color) relative to the clock hands (e.g., compared to the depiction of the hands and point of rotation of the analog indication of time 610 in clock face user interface 608-1 of FIG. 6A).

Device 600 displays each affordance in clock face user interface 608-3 at reduced brightness levels (e.g., low power display mode brightness levels) compared to their respectively displayed brightness levels in FIG. 6A (e.g., standard display mode brightness levels). As depicted in FIG. 6C, date affordance 614, world clock affordance 616, compass affordance 618, timer affordance 620, moon affordance 624, stopwatch affordance 626, and workout affordance 628 are displayed by device 600 on display 602 at dimmer (lower) brightness levels (e.g., as indicated by darker coloring of each affordance in FIG. 6C compared to FIG. 6A).

As depicted in FIG. 6C, the change in brightness levels between corresponding elements (e.g., affordances) in clock face user interfaces 608-1 and 608-3 is not uniform (e.g., some elements are dimmed more than others). Compared to their respective depictions in clock face user interface 608-1 in FIG. 6A, as depicted in clock face user interface 608-3 in FIG. 6C, world clock affordance 616 has dimmed more than date affordance 614, compass affordance 618, and timer affordance 620. Similarly, analog indication of time 610 has dimmed less than all other affordances depicted in clock face user interface 608-3 (e.g., analog indication time 610 still includes brightly displayed portions whereas the affordances do not). Likewise, the point of rotation of analog indication of time 610 (e.g., the stationary element about which the clock hands rotate) has dimmed more than the clock hands.

As depicted in FIG. 6C, device 600 displays each affordance in clock face user interface 608-3 at a reduced size compared to their respective size in clock face user interface 608-1 (e.g., corresponding outlines represent the size of affordances in clock face user interface 608-1 while device is in standard display mode). As depicted in FIG. 6C (e.g., while the device is in low power display mode), date affordance 614, world clock affordance 616, compass affordance 618, timer affordance 620, moon affordance 624, and stopwatch affordance 626 have shrunk in place relative to their depiction in FIG. 6A (e.g., the center of each affordance remains in the same position relative to the edges of display 602 in both FIG. 6A and FIG. 6C). In some embodiments, one or more affordances may instead shrink towards a common central point (e.g., translate towards the center of display 602 or towards the point of rotation of analog indication of time 610 (e.g., as describe with respect to FIG. 8M below).

At FIG. 6C, while operating in low power display mode, device 600 detects user input 632-1 (e.g., an upward swipe on display 602). Upon detecting user input 632-1, device 600 maintains display of clock face user interface 608-3 (e.g., device 600 does not respond to the swipe input while operating in low power display mode). In some embodiments, rather than ignoring user input 632-1 while operating in the low power display mode, device 600 responds by displaying a watch user interface including a settings menu for changing various device settings (e.g., as described with respect to FIGS. 6J-6K below).

FIGS. 6D-6H illustrate device 600 transitioning from low power display mode back to standard display mode. While the description of FIGS. 6D-6H below discusses device 600 transitioning in response to detecting rotational input, FIG.

6D also illustrates device 600 detecting several other user inputs (e.g., tap gestures 632-3, 632-4, and 632-5), each which can independently cause device 600 to initiate a transition from low power display mode to the standard display mode. In some embodiments, upon detecting a tap gestures 632-3 or 632-5 while in low power display mode, device 600 transitions to standard display mode and launches the corresponding application (e.g., workout and calendar applications, respectively).

Figure 6E:
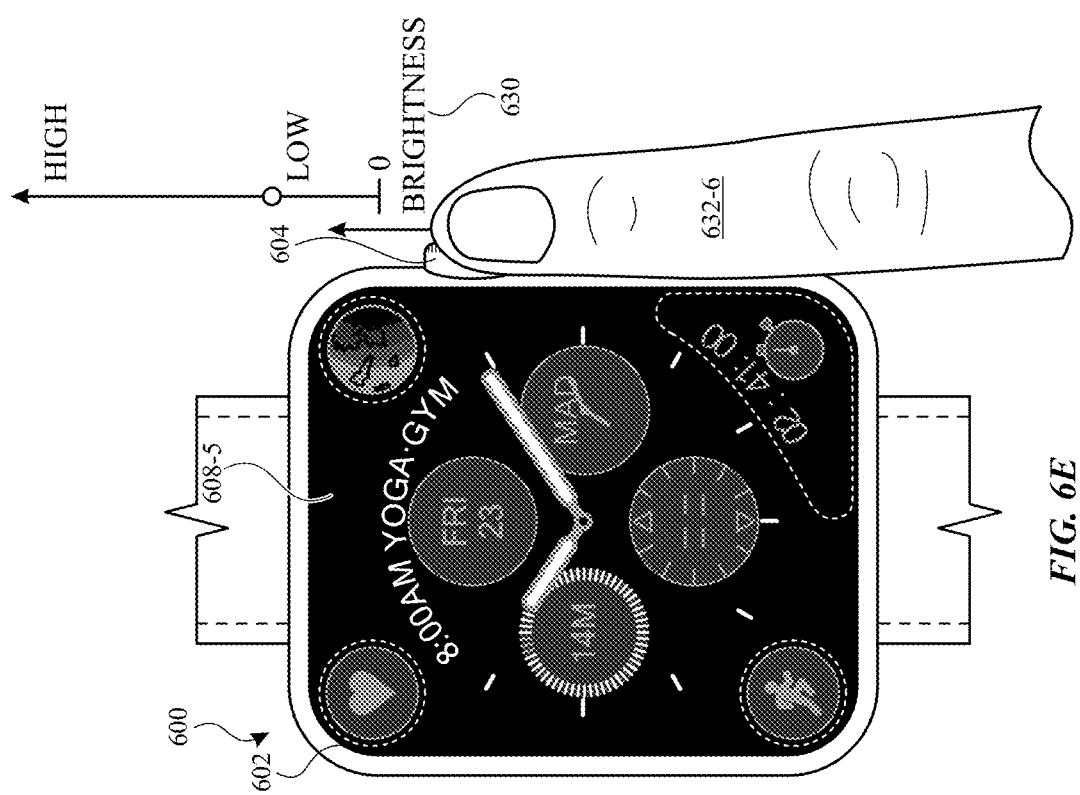

At FIG. 6D, while operating in low power display mode, device 600 detects user input 632-2 (e.g., rotation of rotatable and depressible input mechanism 604). In response to detecting user input 632-2, device 600 initiates a transition back to standard display mode, displaying clock face user interface 608-5 as depicted in FIG. 6E (e.g., device 600 displays a transitional interface similar to clock face user interface 608-2 while in a mode transitional state). Clock face user interface 608-5 is a frame of an animation (e.g., a sequence of frames or images) illustrating clock face user interface 608-4 (e.g., a lower power consumption interface) visually morphing into a corresponding higher power consumption user interface (e.g., clock face user interface 608-8 as depicted in FIG. 6H).

At FIG. 6E, while device 600 displays clock face user interface 608-5 at the same brightness level as clock face user interface 608-4 in FIG. 6D (e.g., device 600 maintains the low power display mode brightness level while in a mode transitional state). As depicted in FIG. 6E, date affordance 614, world clock affordance 616, compass affordance 618, timer affordance 620, moon affordance 624, and stopwatch affordance 626 have enlarged relative to their previously displayed size in clock face user interface 608-4 (e.g., clock face user interface 608-5 includes affordances displayed larger than their respective sizes in clock face user interface 608-4).

At FIG. 6E, device 600 detects user input 632-6 (e.g., device 600 continues to detect rotation of rotatable and depressible input mechanism 604). In response to detecting user input 632-6, device 600 displays clock face user interface 608-6 as depicted in FIG. 6F (e.g., a lower power consumption user interface similar to clock face user interface 608-1). In contrast to clock face user interface 608-1 as depicted in FIG. 6A, device 600 displays user interface 608-6 at the same brightness level as clock face user interface 608-5 in FIG. 6E (e.g., device 600 maintains the low power display mode brightness level while in a mode transitional state).

The sequence of FIGS. 6F, 6G, and 6H illustrate device 600 gradually brightening the displayed clock face user interface in response to device detecting additional rotational inputs at rotatable and depressible input mechanism 604 (e.g., 632-7, 632-8, and 632-9). At FIG. 6H, device 600, while in standard display mode, displays clock face user interface 608-8 (e.g., device 600 has completely transitioned back to operating in the standard display mode). Clock face user interface 608-8 includes substantially the same content as clock face user interfaces 608-1 and 608-7, however, analog indication of time 610, timer affordance 620, and stopwatch affordance 626 have been updated to reflect that time has elapsed since device 600 displayed clock face user interface 608-1.

In some embodiments, the transition from low power display mode to standard display mode described above with respect to FIGS. 6D-6H is initiated in response to receiving user input 632-3, user input 632-4, or user input 632-5 (e.g., taps gestures at various locations on clock face user interface 608-4 as depicted in FIG. 6D). In some embodiments, in response to detecting a tap gesture input (e.g., 632-3, 632-4, 632-5) while operating in low power display mode, device 600 displays an emphasis animation prior to displaying clock face user interface 608-5. In some embodiments, the emphasis animation includes further dimming and shrinking of elements of the clock face user interface prior to increasing their respective size, brightness, and content (e.g., as described below with respect to FIGS. 8D-8F).

At FIG. 6H, device 600 detects user input 632-9 (e.g., a tap input gesture) at a location corresponding to workout affordance 628. In response to detecting user input 632-9, device 600 displays workout application user interface 608-9 as depicted in FIG. 6I (e.g., while in standard display mode, in response to detecting a tap gesture at a location corresponding to an affordance associated with an application, device 600 launches the respective application).

At FIG. 6I, device 600 detects user input 632-10 (e.g., a depression of rotatable and depressible input mechanism 604). In response to detecting user input 632-10, device 600 displays clock face user interface 608-10 as depicted in FIG. 6J. As depicted in FIG. 6J, analog indication of time 610, timer affordance 620, and stopwatch affordance 626 have updated to reflect that additional time has elapsed since device 600 displayed clock face user interface 608-8 as depicted in FIG. 6H.

Figure 6K:
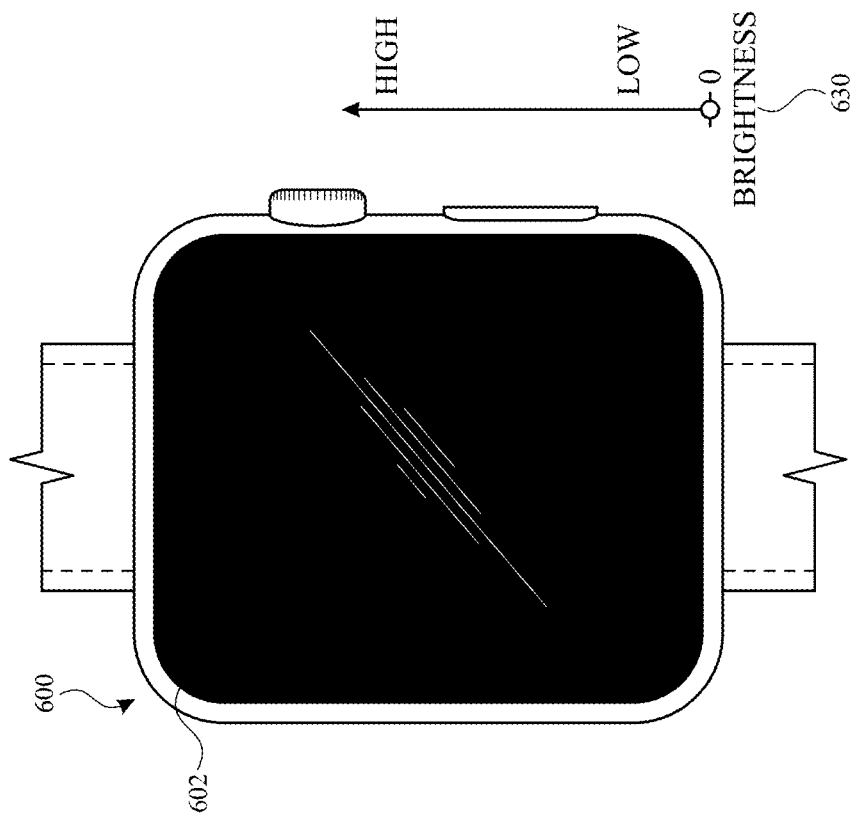
Figure 6L:
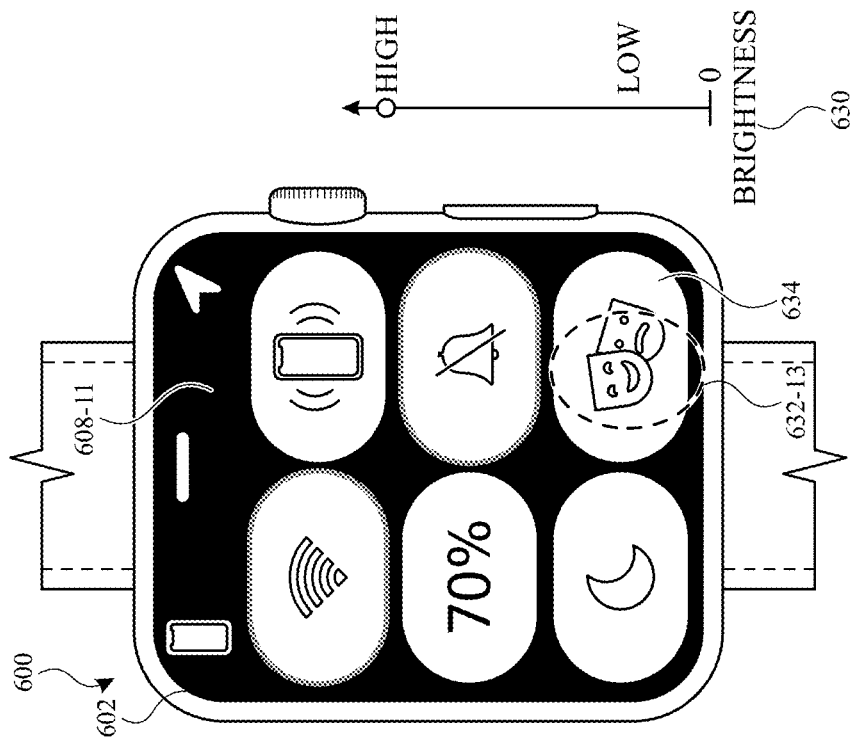
Figure 6N:
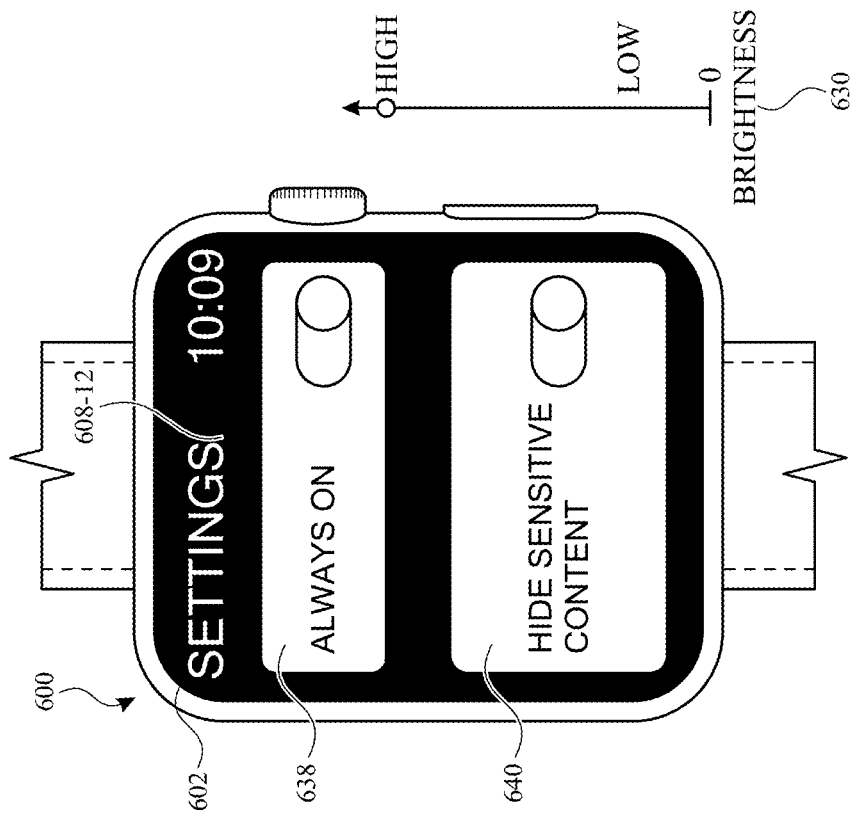

At FIG. 6J, while operating in standard display mode, device 600 detects user input 632-11 (e.g., an upward swipe gesture on display 602). In response to detecting input 632-11, device 600 displays user interface 608-11 as depicted in FIG. 6K. Watch user interface 608-11 includes a menu for altering (e.g., toggling; enabling and disabling) various device settings. User interface 608-11 includes theatre mode affordance 634 for enabling a theater mode setting (e.g., a device setting that prevents display 602 from turning on in response to detected movement, so that display 602 remains off in movie theaters, concerts, public events, or in other scenarios where the user of device 600 desires to avoid incidental activation the display 602).

Figure 8B:
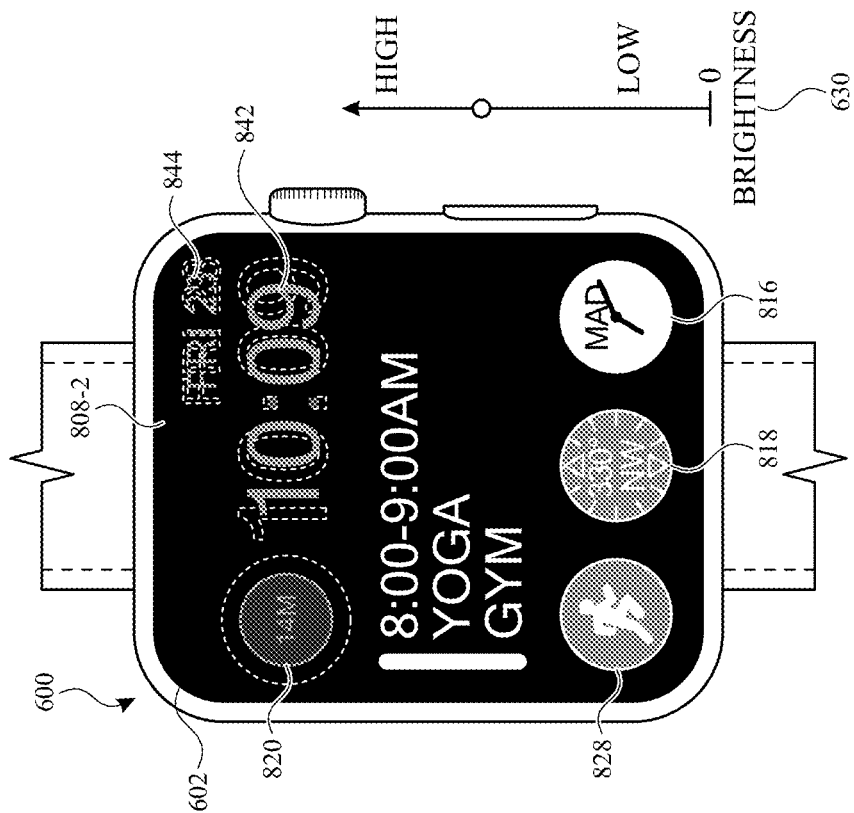
FIGS. 8A-8M illustrate exemplary user interfaces with managed display usage in accordance with embodiments.

At FIG. 6K, device detects user input 632-13 at theater mode affordance 634. In response to detecting user input 632-13, device 600 enables theater mode. As illustrated in FIG. 8L, while in theater mode, device 600 turns display 602 off rather than displaying a corresponding lower power consumption user interface, when for example, device 600 fails to detect user input for a predetermined period of time (e.g., mode-transition criteria as describe above).

Figure 6M:
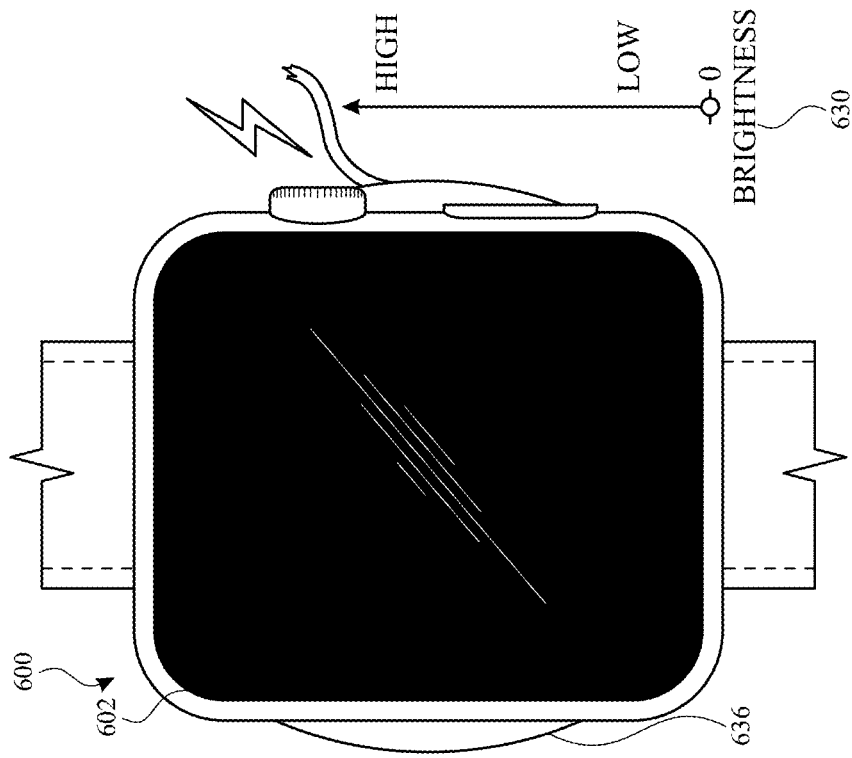
Figure 6P:
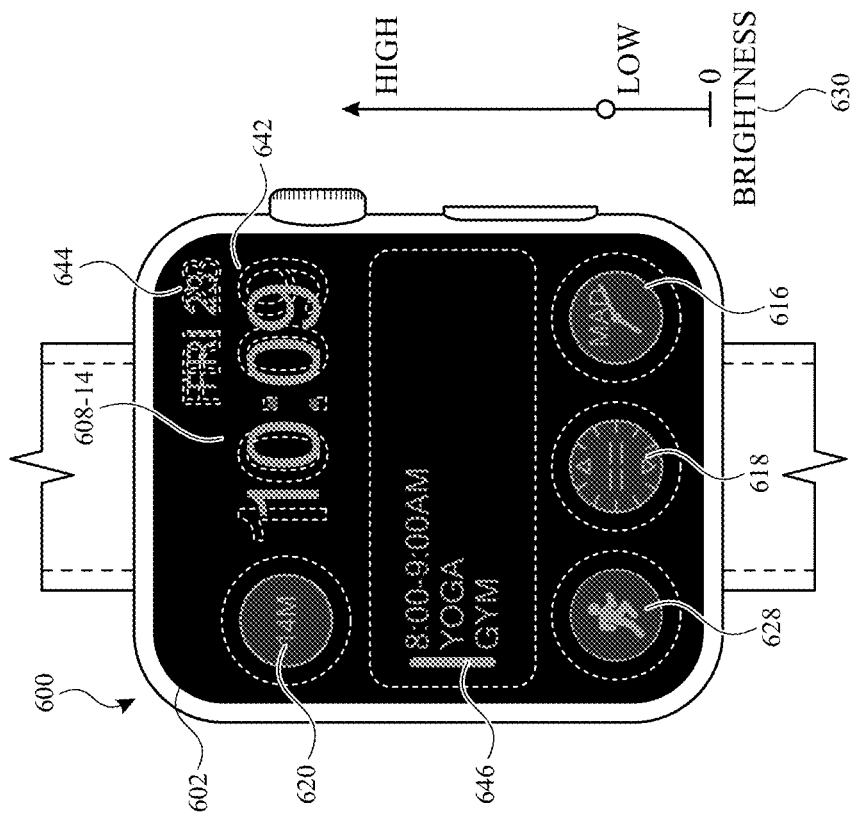

FIG. 6M illustrates device 600 while attached to charger 636. While attached to charger 636 as depicted in FIG. 8M, device 600 turns display 602 off rather than displaying a corresponding lower power consumption user interface, when for example, device 600 fails to detect user input for a predetermined period of time (e.g., mode-transition criteria as described above).

FIG. 6N illustrates device 600 displaying watch user interface 608-12, which is a settings interface. Watch user interface 608-12 includes low power mode affordance 638 for disabling low power mode and privacy affordance 640 for disabling the removal of sensitive content when device 600 operates in low power mode. When low power mode is disabled, rather than transition from a standard display mode to low-power display mode as described with respect to FIGS. 6A-6D, device turns off display 602. When removal of sensitive content is disabled, device 600 refrains from removing content deemed sensitive (e.g., upcoming calendar event (e.g., "8:00 AM YOGA GYM") of date affordance 614 in FIG. 6A is included in FIGS. 6B-6C) upon transitioning from standard display mode to low-power display mode.

FIGS. 6O-6X, depicts device 600 displaying various clock face user interfaces in standard display mode and low power display mode to illustrate the changes that occur when device 600 transitions between modes.

Figure 6O:
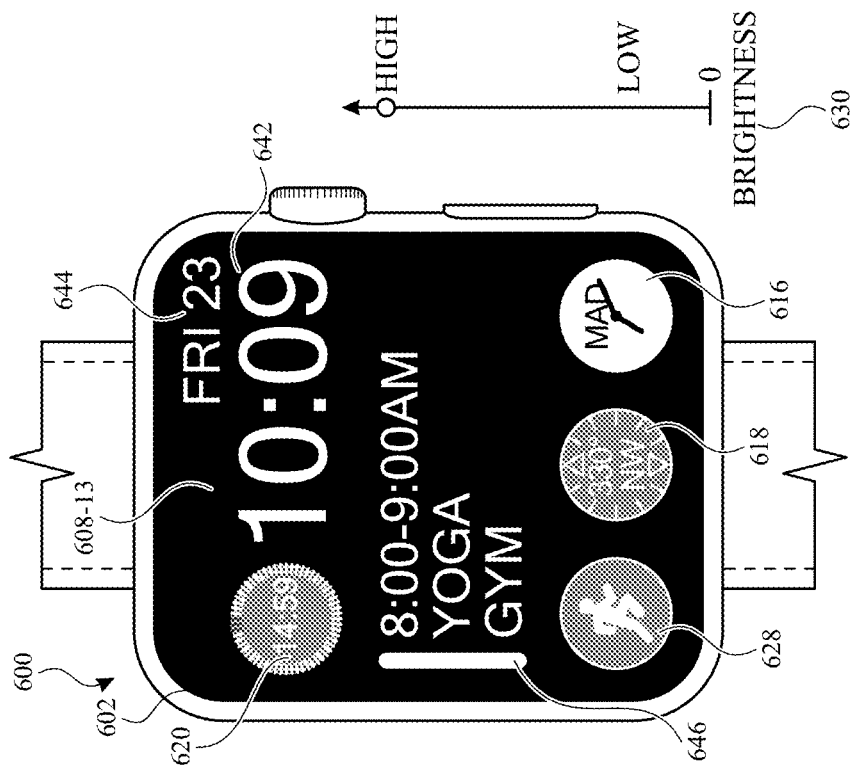
Figure 6R:
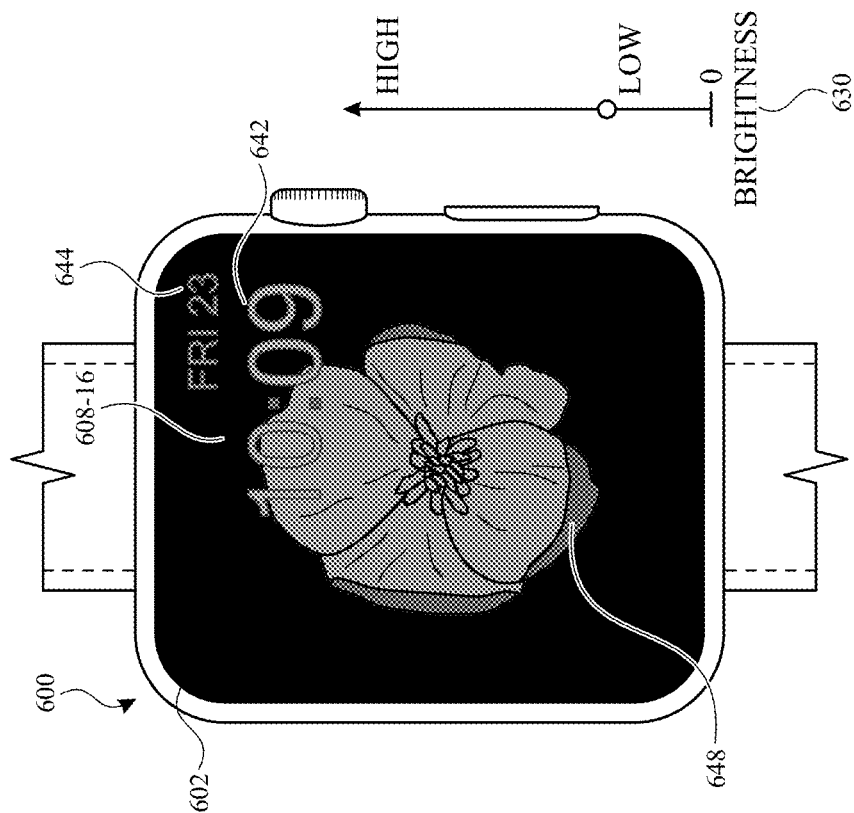

At FIG. 6O, while operating in standard display mode, device 600 displays clock face user interface 608-13 (e.g., a higher power consumption user interface). Clock face user interface 608-13 includes digital indication of time 642 (e.g., a digital clock indicating hour and minute values), date indicator 644, calendar affordance 646, timer affordance 620, workout affordance 628, compass affordance 618, and world clock affordance 616.

At FIG. 6P, while operating in low power display mode (e.g., after device 600 determines that one or more mode-transition criteria has been met), device 600 displays clock face user interface 608-14 (e.g., a low power consumption user interface corresponding to clock face user interface 608-13 as depicted in FIG. 6O). As depicted in FIG. 6P, device 600 displays clock face user interface 608-14 on display 602 at a lower brightness compared to clock face user interface 608-13. Additionally, as depicted in FIG. 6P, digital indication of time 642, date indicator 644, calendar affordance 646, workout affordance 628, compass affordance 618, and world clock affordance 616 have dimmed, shifted, and/or shrunk relative to their depiction in FIG. 6O. Additionally, as depicted in FIG. 6P, the colon (e.g., ":") of digital indication of time 642 is displayed at lower brightness level (e.g., a darker color) relative to hour and minute numerals (e.g., compared to the depiction of the digital indication of time 642 in watch user interface 608-13 of FIG. 6O).

Figure 6Q:
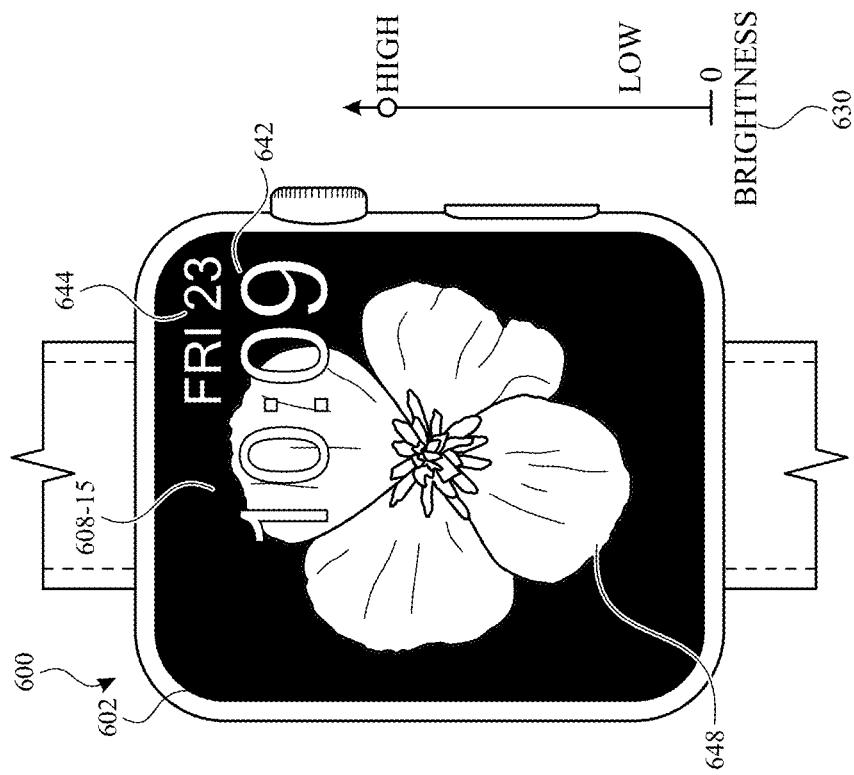
Figure 6T:
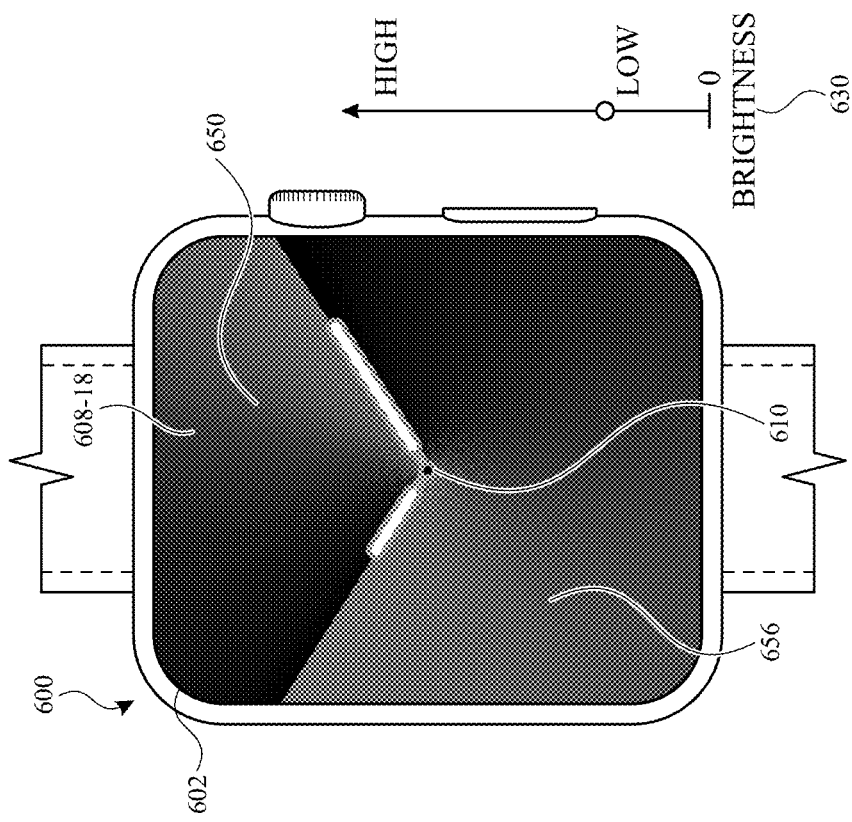

At FIG. 6Q, while operating in a standard display mode, device 600 displays clock face user interface 608-15 on display 602. Clock face user interface 608-15 includes digital indication of time 642 and animated object 648. Animated object 642, as depicted in FIG. 6Q, is a first frame (e.g., image) of animated sequence of frames (e.g., images) displayed by device 600 depicting animated object 648 moving (e.g., blooming; increasing in size).

At FIG. 6R, while operating in low power display mode (e.g., after device 600 determines that one or more mode-transition criteria has been met), device 600 displays clock face user interface 608-16 (e.g., a low power consumption user interface corresponding to clock face user interface 608-15 as depicted in FIG. 6R). As depicted in FIG. 6R, device 600 displays clock face user interface 608-16 on display 602 at a lower brightness compared to clock face user interface 608-15. Additionally, as depicted in FIG. 6R, digital indication of time 642 and date indicator 644 have dimmed, shifted, and shrunk relative to their depiction in clock face user interface 608-15 in FIG. 6Q. In some embodiments, animated object 648 as depicted in user interface 608-15 is a second frame (e.g., different from the first frame) selected from the same animated sequence of images displayed by device 600 while device 600 is in standard display mode.

Figure 6S:
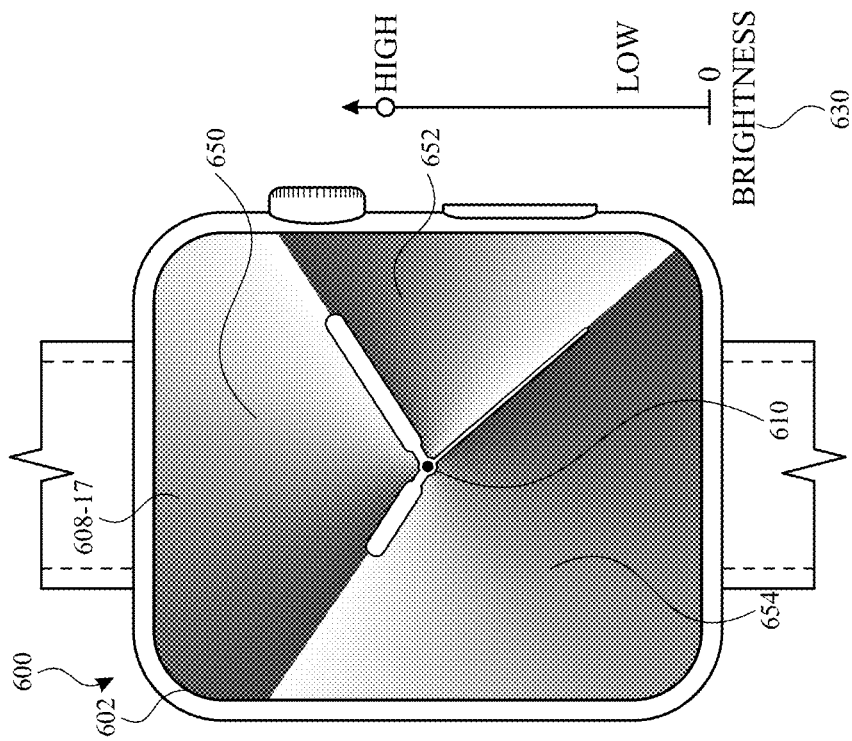
Figure 6V:
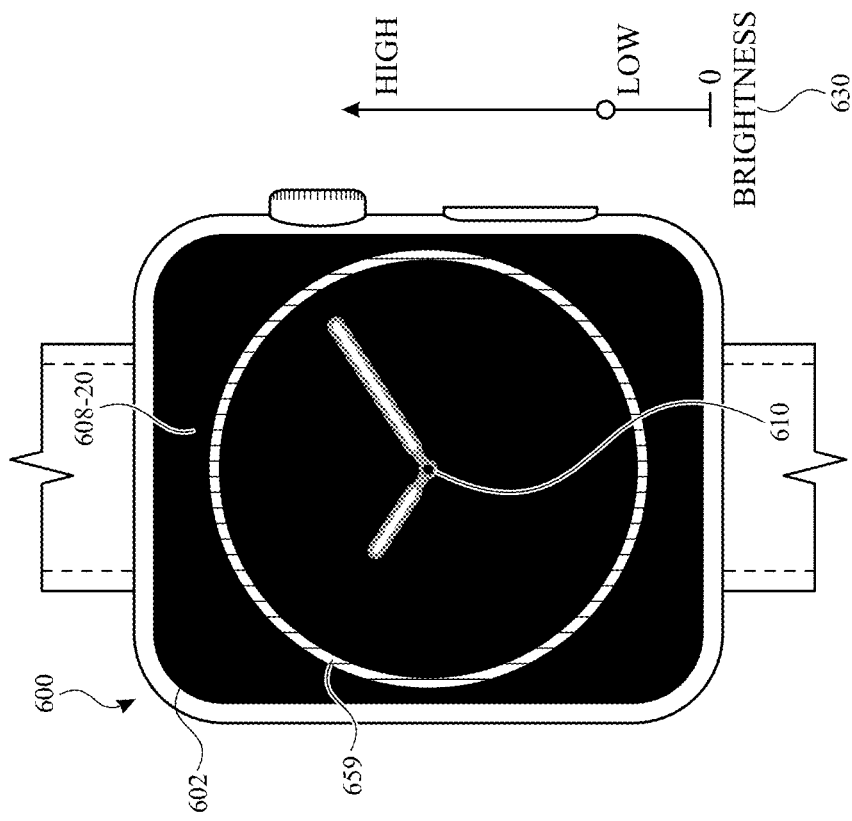

At FIG. 6S, while operating in a standard display mode, device 600 displays clock face user interface 608-17 on display 602. Clock face user interface 608-17 includes analog indication of time 610 displayed over a background including first color gradient 650 extending clockwise from the hour to the minute hand (e.g., transitioning from dark to lighter blues), second color gradient 652 extending clockwise from the minute hand to the second hand (e.g., transitioning from dark to lighter reds), and third color gradient 654 extending clockwise from the second hand to the hour hand (e.g., transitioning from dark to lighter greens). In some embodiments, the colors included within first color gradient portion 650 are based upon a color of a watchband of device 600.

At FIG. 6T, while operating in a low power display mode (e.g., after device 600 determines that one or more mode-transition criteria has been met), device 600 displays clock face user interface 608-18 on display 602. As depicted in FIG. 6T, device 600 displays clock face user interface 608-18 on display 602 at a lower brightness compared to clock face user interface 608-17. In FIG. 6T, relative to clock face user interface 608-17, the second hand of analog indication of time 610 has been removed, second color gradient 652 and third color gradient 654 have been replaced by greyscale gradient 656, extending clockwise from the minute hand to the hour hand, the grey scale gradient starting in black at the minute hand and gradually transiting to lighter shades of grey in the clockwise direction. Additionally, as depicted in FIG. 6T, the point of rotation of analog indication of time 610 (e.g., the stationary element about which the clock hands rotate) is displayed at lower brightness level (e.g., a darker color) relative to the clock hands (e.g., compared to the depiction of the hands and point of rotation of the analog indication of time 610 in clock face user interface 608-17 of FIG. 6S). Further, as depicted in FIG. 6T, analog indication of time 610 is has been modified (e.g., similar to FIG. 6B as described above, the hands consist of two shades rather than one).

Figure 6U:
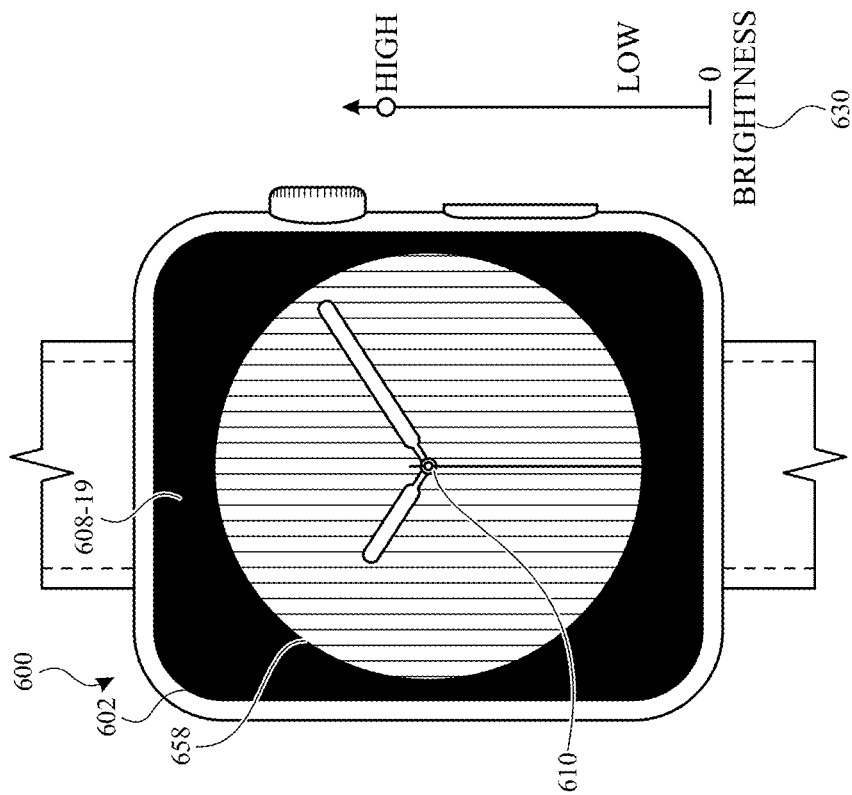
Figure 6X:
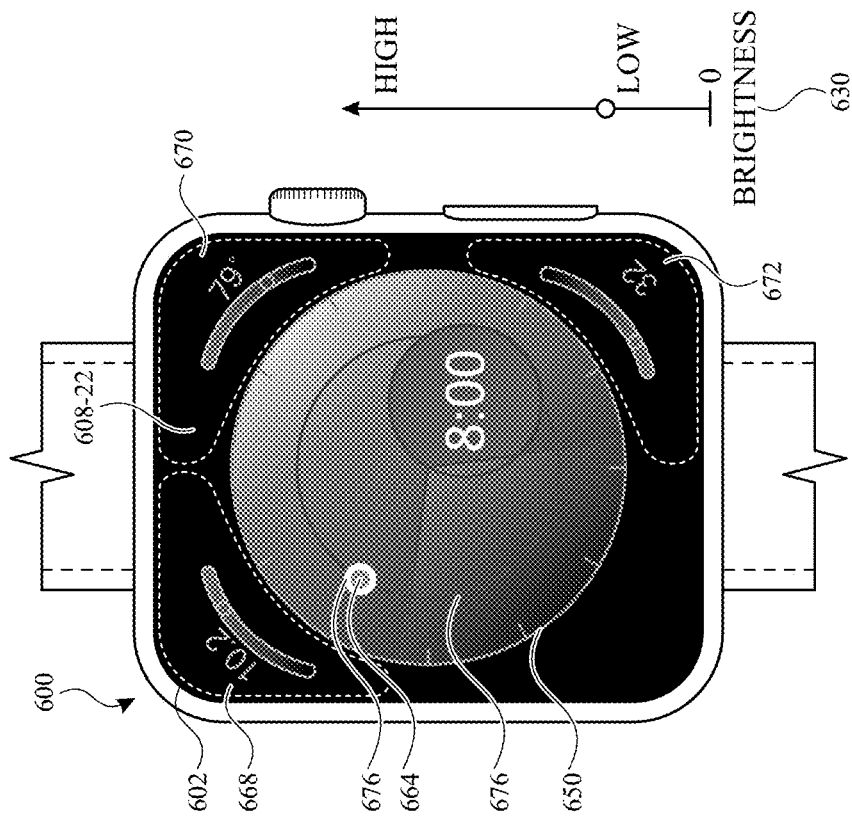

At FIG. 6U, while operating in standard display mode, device 600 displays clock face user interface 608-19 (e.g., a higher power consumption user interface). Clock face user interface 608-19 includes analog indication of time 610 and background object 658 (e.g., a solid or single-colored object, color indicated by hatching).

At FIG. 6V, while operating in low power display mode (e.g., after device 600 determines that one or more mode-transition criteria has been met), device 600 displays clock face user interface 608-20 (e.g., a lower power consumption user interface corresponding to clock face user interface 608-19 as depicted in FIG. 6U). As depicted in FIG. 6V, device 600 displays clock face user interface 608-20 on display 602 at a lower brightness compared to clock face user interface 608-19, background object 658 has been replaced with outline object 659 (e.g., outline of background object 658). Additionally, as depicted in FIG. 6V, the point of rotation of analog indication of time 610 (e.g., the stationary element about which the clock hands rotate) is displayed at lower brightness level (e.g., a darker color) relative to the clock hands (e.g., compared to the depiction of the hands and point of rotation of the analog indication of time 610 in clock face user interface 608-19 of FIG. 6U). Further, as depicted in FIG. 6V, analog indication of time 610 is has been modified (e.g., similar to FIG. 6B as described above, the hands consist of two shades rather than one).

Figure 6W:
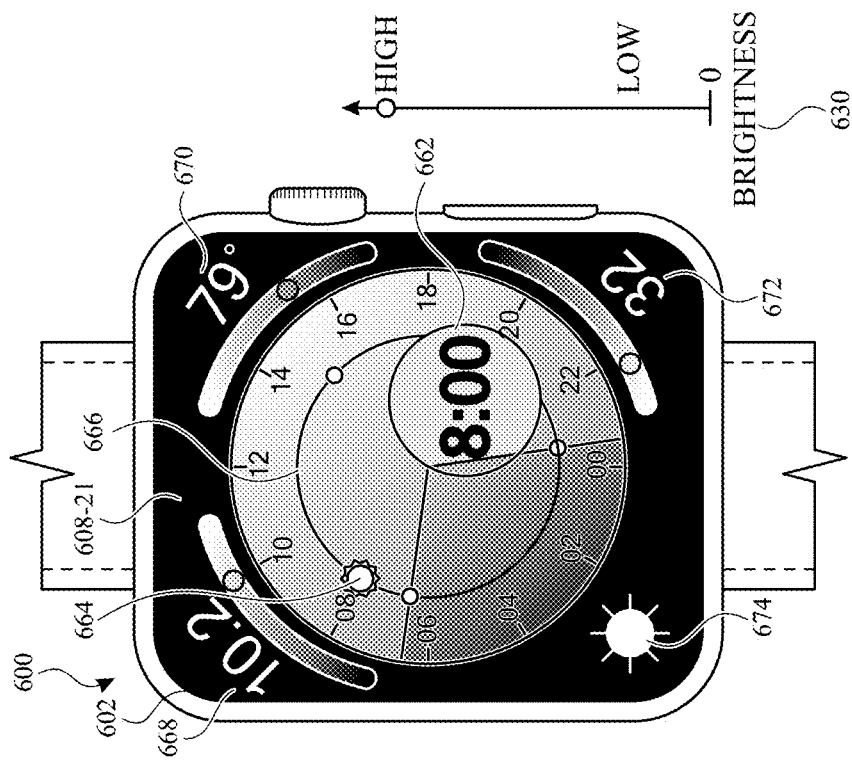

At FIG. 6W, while operating in standard display mode, device 600 displays clock face user interface 608-21 (e.g., a higher power consumption user interface). Clock face user interface 608-21 includes analog dial 660, representing a twenty-four hour time period, and inset time indication 662. In FIG. 6W, analog dial 660 includes a circular dial with hour markers evenly spaced angularly around the perimeter of the circle, representing 24 hours. As depicted in FIG. 6W, the background of analog dial 660 includes an angular gradient that has a gradual transition from a first color to a second color. In FIG. 6W, inset time indication 662 includes a digital clock indicating a current time (8:00 pm). At 8:00 pm, inset time indication 1604 is displayed at a first position on clock face user interface 608-21 inside analog dial 660. As time progresses, inset time indication 1604 moves along a circular path within analog dial 1602.

Clock face user interface 608-21 includes a representation 664 indicating a position of the Sun (e.g., relative to a location on Earth (e.g., corresponding to the current location of device 600)) at the displayed time. The position of representation 664 with respect to analog dial 660 indicates the same time indicated by inset time indication 1604 (e.g., the current time). As time progresses, representation 664 moves around a circular path 666 that has a common origin with the circular path around which inset time indication 662 moves. As illustrated in FIG. 6W, inset time indication 662 and representation 664 are separated by 180 degrees around the common origin of their paths. Additionally, clock face user interface 608-21 also includes ultraviolet index affordance 668, temperature affordance 670, air quality index affordance 672, and weather conditions affordance 674 positioned near the corners of display 602.

At FIG. 6X, while operating in low power display mode (e.g., after device 600 determines that one or more mode-transition criteria has been met), device 600 displays clock face user interface 608-22 (e.g., a lower power consumption user interface corresponding to clock face user interface 608-21 as depicted in FIG. 6W). As depicted in FIG. 6X, device 600 displays clock face user interface 608-22 on display 602 at a lower brightness compared to clock face user interface 608-21. As depicted in FIG. 6X, the angular gradient of the background of analog dial 660 has darkened (e.g., dimmed) more than the hour markers and the affordances positioned at the corners of clock face user interface 608-22 (e.g., relative to their respective appearance FIG. 6W). Additionally, halo object 676 is displayed around representation 664 (e.g., to increase contrast between the representation of the sun and the darkened gradient). In some embodiments, representation 664 is displayed at the same brightness while device is operating in standard display mode and low power display mode.

FIG. 7 is a flow diagram illustrating a method for managing display usage using an electronic device in accordance with some embodiments. Method 700 is performed at a device (e.g., 100, 300, 500, 600) with a display. Some operations in method 700 are, optionally, combined, the orders of some operations are, optionally, changed, and some operations are, optionally, omitted.

As described below, method 700 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

In general, different brightness levels can be achieved using various techniques, which can be employed separately or concurrently. In some embodiments, the brightness level of a graphical element is changed by changing (e.g., brightening, dimming) the brightness of some (or all) pixels of the graphical element. In some embodiments, the brightness level of the graphical element is changed by modifying the graphical element so that fewer (or more) pixels are lit up, such as by thinning (or thickening) lines of the graphical element, and removing (or adding) a background of the graphical element, reducing (or enlarging) a size of the graphical element.

While the electronic device (e.g., 600) is in a first mode (e.g., a higher power consumption mode), the electronic device (e.g., 600) displays (702) on the display, a first user interface (e.g., a clock face of a smart watch; 608-1) including a first time indicator (704) and a first graphical object (706). The first time indicator (704) (e.g., hands of 610 at FIG. 6A) (e.g., an analog clock hand (hour, minute, second hand); a digital clock numeral (hour, minute, second numerals)) is displayed at a first brightness level (e.g., average pixel luminance (APL), average lumen output, total lumen output, average illuminance, or total illuminance of the indicator on the display; brightness expressed in nits, lux, or lumens). The first graphical object (706) (e.g., center of 610 at FIG. 6A; 614, 616, 618, 620 at FIG. 6A) (e.g., an affordance; an affordance representing a first application; an interactive graphical object; an affordance displayed as a complication associated with a clock face; a non-updating graphical element (rotation point of a clock hand; colon separating digital clock numerals)) is displayed at a second brightness level (e.g., a brightness level that is the same as the first brightness level; a brightness level that is different than the first brightness level).

The electronic device, (e.g., 600) detects (708) that the electronic device has met criteria for transitioning from the first mode to a second mode (e.g., one or more criteria that are indicative of reduced user activity or reduced user interaction with the electronic device (e.g., determining reduced user activity (physical movement) for a predetermined period of time, determining a lack of user input for a predetermined period of time, detecting a predefined gesture). In some embodiments, detecting that the electronic device has met the criteria includes one or more of: receiving data from one or more sensors (e.g., accelerometer, gyroscope, proximity sensor) corresponding to a user gesture (e.g., wrist-down, wrist-up, palm over display), receiving data from one or more sensors indicating user activity below a threshold activity level, determining a predetermined period of time has elapse without device receiving user input at one or more input devices (e.g., touch-screen, rotatable input mechanism, depressible input mechanism).

In response to detecting that the electronic device has met the criteria for transitioning from the first mode to the second mode, the electronic device (e.g., 600) transitions (710) the electronic device from the first mode (e.g., a higher power consumption mode) to the second mode (e.g., a lower power consumption mode). The first mode and the second mode are different modes in which the electronic device can operate. In some embodiments, the overall brightness of the display in the first mode is more than the overall brightness of the display in the second mode when displaying a corresponding user interface. In some embodiments, a rate of display refresh is higher in the first mode as compared to the second mode. In some embodiments, one or more processor of the electronic device are awake for a higher percentage of time when the device is in the first mode as compared to when the device is in the second mode. In some embodiments, the one or more processors of the electronic device wake up more frequently over a duration of time when the device is in the first mode as compared to when the device is in the second mode. In some embodiments, more portions of the one or more processors of the electronic device are running when the device is in the first mode as compared to when the device is in the second mode. In some embodiments, the electronic device employs processor power management techniques (e.g., slowing down or turning off a core clock, slowing down or turning off a bus clock, reducing the main CPU voltage (VCC) in the second mode that are not employed in the first mode.

While the electronic device (e.g., 600) is in the second mode, the electronic device (e.g., 600) displays (712) on the display (e.g., 602), a second user interface (e.g., 608-3) including: a second time indicator (714) and a second graphical object (716).

The second time indicator (714) indicates the current time (hands of 610 at FIG. 6C) (e.g., an analog clock hand (hour, minute, second hand); a digital clock numeral (hour, minute, second numerals)). The second time indicator is displayed at a third brightness level that is lower than the first brightness level, at which the first time indicator was previously displayed, by a first amount.

The second graphical object (716) corresponds to the first graphical object (e.g., center of 610 at FIG. 6C; 614, 616, 618, 620 at FIG. 6C) (e.g., a non-interactive version of the first graphical object; a visually distinct graphical object representing to the same application as the first graphical object; a graphical object including a subset of the data included in the first graphical object (only mm remaining rather than mm:ss remaining)). The second graphical object is displayed at a fourth brightness level that is lower than the second brightness level, at which the first graphical object was previously displayed, by a second amount that is different from the first amount of difference in brightness between the first brightness level and the second brightness level.

Displaying the time indicator at a reduced brightness reduces power usage and improves the battery life of the device. Displaying the graphical object at a reduced brightness reduces power usage and improves the battery life of the device. Reducing the brightness of the indicator and the graphical object by different amounts enables the device to conserve more power by significantly reducing the brightness of the less relevant visual element (e.g., the graphical object) while still displaying the other visual element (e.g., the time indicator) at a brightness that leaves the element more perceptible.

In some embodiments, a first display brightness of the display (e.g., 602 at FIG. 6A) while displaying the first user interface (e.g., a clock face of a smart watch; 608-1) while the electronic device is in the first mode (e.g., a higher power consumption mode) is more than a second display brightness of the display (e.g., 602 at FIG. 6C) while displaying the second user interface while the electronic device is in the second mode (e.g., a lower power consumption mode). Thus, the overall brightness of the display is reduced when displaying the second user interface while the electronic device is in the second mode as compared to displaying the first user interface while the electronic device is in the first mode. Reducing the overall brightness of the display reduces power usage and improves the battery life of the device, while still enabling the user to access the device.

In some embodiments, the second display brightness (e.g., 602 at FIG. 6C) is selected based on the first display brightness (e.g., 602 at FIG. 6A). In some embodiments, the electronic device selects the second display brightness by reducing the first display brightness by a predetermined amount or percentage. Selecting the second display brightness based on the first display brightness allows for accommodating user preferences and visual requirements while reducing power usage and improving the battery life of the device.

In some embodiments, the second display brightness (e.g., 602 at FIG. 6C) is selected based on at least an environmental brightness level (e.g., ambient light level). In some embodiments, when the electronic device detects a first level of ambient light (e.g., a high level), the electronic device selects the second display brightness to be brighter than when the electronic device detects a second level of ambient light (e.g., a low level) that is less bright than the first level of ambient light. As a result, the electronic device adapts the second brightness level to the ambient light. In some embodiments, the amount of dimming increases as the environmental brightness increases and the amount of dimming decreases as the environmental brightness decreases (e.g., based on a magnitude of change in the environmental brightness level). In some embodiments, the amount of dimming decreases as the environmental brightness increases and the amount of dimming increases as the environmental brightness decreases (e.g., based on a magnitude of change in the environmental brightness level). In some embodiments, selecting the second display brightness based on the environmental brightness level includes performing one or more of the methods described with respect to method 1100 and FIGS. 11A-11B. Selecting the second display brightness based on an environmental brightness level enables the device to reduce the display brightness while still leaving the contents of the display visible to the user. Reducing the display brightness reduces power usage and improves the battery life of the device.

In some embodiments, the first graphical object is a stationary graphical element (e.g., center of 610 at FIG. 6A; colon separating numerals of 642 at FIG. 6O) and the first time indicator is a moving graphical object (e.g., a non-stationary graphical object; hands of 610 at FIG. 6A; numerals of 642 at FIG. 6O). The first amount of difference in brightness is less than the second amount of difference in brightness. In some embodiments, graphical elements that are stationary on the display over a period of time are dimmed more than graphical elements that are not stationary on the display over the same period of time. In some embodiments, the electronic device dims watch hands that indicate time (and are not stationary) less than icons for activating applications (that are stationary). Dimming stationary graphical elements more than non-stationary graphical elements allows the device to mitigate the negative effects of displaying the same content at the same location on the display, such as display burn-in, while at the same time reducing the display brightness. Reducing the display brightness reduces power usage and improves the battery life of the device.

In some embodiments, the first graphical object is a complication (e.g., 614, 616, 618, and 620 at FIG. 6A) (e.g., a watch face complication; an element of the watch face that is not associated with providing an indication of time) and the first amount of difference in brightness is less than the second amount of difference in brightness (e.g., difference between 610 and 616 in FIGS. 6A and 6C).

A complication refers to any clock face feature other than those used to indicate the hours, minutes, or seconds of a current time associated with the device. In some embodiments, complications provide data obtained from an application. In some embodiments, a complication includes an affordance that when selected launches a corresponding application. In some embodiments, a complication is displayed at a fixed, predefined location on the display while the device is in a particular power consumption mode. In some embodiments, in response to detecting a sequence of one or more inputs, the device may change or edit an aspect of a complication. For example, this could be used to change application data displayed by an application complication.

In some embodiments, the complication may indicate a first set of information obtained by an application (e.g., application data. For example, if the application is a weather application, a set of information could be a forecasted weather condition, a current temperature, etc.), and upon editing, the complication could be updated to indicate a second set of information from the same application (e.g., if the application is a weather application, the display could be edited from showing a current temperature to showing current precipitation). In some embodiments, in response to detecting a sequence of one or more inputs, the device may change or edit a complication to indicate a set of information from a different application (e.g., if the application is a weather application, the display could be edited from showing weather to showing data from a calendar application).

In some embodiments, a first dimming ratio between first brightness level and the third brightness level is different from a second dimming ratio between the second brightness level and the fourth brightness level (e.g., difference between 610 and 616 in FIGS. 6A and 6C). In some embodiments, the first dimming ratio of third brightness level to first brightness level is a first value (e.g., 1:2 (1/2; 50%); 1:3; 1:4) and the second dimming ratio of fourth brightness level to second brightness level to is a second value (e.g., 1:4 (1/4; 25%); 1:5; 1:6)) that is different from the first value.

In some embodiments, the first user interface (e.g., a clock face of a smart watch; 608-1) displayed while the electronic device is in the first mode includes a third graphical object (e.g., 616 at FIG. 6A) displayed at a fifth brightness level that is higher than the first brightness level. The second user interface (e.g., 608-3) displayed while the electronic device is in the second mode includes a fourth graphical object displayed at a sixth brightness level, the fourth graphical object corresponding to the third graphical object (616 at FIG. 6C) (e.g., a non-interactive version of the third graphical object; a visually distinct graphical object representing to the same application as the third graphical object; a graphical object including a subset of the data included in the third graphical object (only mm remaining rather than mm: ss remaining)). In some embodiments, a difference in brightness between the first brightness level (e.g., used to display the first graphical object) and the fourth brightness level (e.g., used to display the second graphical object) is less than a difference in brightness between the fifth brightness level (e.g., used to display the third graphical object) and the sixth brightness level (e.g., used to display the fourth graphical object). In some embodiments, the third graphical object is significantly brighter than the first graphical object and, as a result, the third graphical object is dimmed more than the first graphical object when transitioning to displaying the second user interface in the second mode. Dimming brighter graphical elements more less bright graphical elements allows the device reduce the brightness of elements that more significantly affect battery consumption and to mitigate the negative effects of displaying content at the same location on the display, such as display burn-in, while at the same time reducing the display brightness. Reducing the display brightness reduces power usage and improves the battery life of the device.

In some embodiments, while displaying the first user interface (e.g., 608-1, 1008-4) while the electronic device is in the first mode, the electronic device (e.g., 600) detects (e.g., using one or more light sensors) a change (e.g., reduction) in environmental brightness level (e.g., change in ambient light, without detecting that the electronic device has met criteria for transitioning from the first mode to the second mode). In some embodiments, while displaying the first user interface (e.g., 608-1, 1008-4) while the electronic device is in the first mode, in response to detecting the change (e.g., reduction) in environmental brightness level (e.g., ambient light) (e.g., without detecting that the electronic device has met the criteria for transitioning from the first mode to the second mode), changing (e.g., reducing) the brightness at which the first user interface is displayed on the display without transitioning the electronic device to the second mode (e.g., 1008-4, 1008-5). In some embodiments, the electronic device determines that the amount of ambient light has been reduced and makes a corresponding change in the brightness at which the first user interface is displayed. In some embodiments, changing (e.g., reducing) the brightness at which the first user interface is displayed does not change the displayed content the first user interface other than brightness (e.g., does not change a size of visual elements, does not change the information displayed). In some embodiments, the amount of dimming increases as the environmental brightness increases and the amount of dimming decreases as the environmental brightness decreases (e.g., based on a magnitude of change in the environmental brightness level). In some embodiments, the amount of dimming decreases as the environmental brightness increases and the amount of dimming increases as the environmental brightness decreases (e.g., based on a magnitude of change in the environmental brightness level). Changing the brightness of the display based on environmental brightness allows the contents of the display to be more easily visible in bright ambient light environments, thereby providing the user with improved visual feedback, while reducing battery usage in reduced ambient light environments. Providing improved visual feedback to the user enhances the operability of the device and makes the user-device interface more efficient (e.g., by helping the user to provide proper inputs and reducing user mistakes when operating/interacting with the device). Reducing the display brightness reduces power usage and improves the battery life of the device.

In some embodiments, transitioning the electronic device from the first mode (e.g., a higher power consumption mode) to the second mode (e.g., a lower power consumption mode) includes removing (e.g., ceasing to display) at least some content (e.g., 622) from the display. In some embodiments, one or more visual elements that were displayed in the first mode cease to be displayed as a result of transitioning to the second mode. Removing content from the displays enables the device to conserve battery power by avoiding energizing the pixels that the content previously used (e.g., turning off the pixels). Avoiding energizing pixels of the display reduces the display brightness. Reducing the display brightness reduces power usage and improves the battery life of the device.

In some embodiments, transitioning the electronic device from the first mode (e.g., a higher power consumption mode) to the second mode (e.g., a lower power consumption mode) includes removing (e.g., ceasing to display) one or more complications (e.g., 622) from the display. In some embodiments, one or more complications that were displayed in the first mode cease to be displayed as a result of transitioning to the second mode.

In some embodiments, transitioning the electronic device from the first mode (e.g., a higher power consumption mode) to the second mode (e.g., a lower power consumption mode) includes removing (e.g., ceasing to display) a first set of content of one or more complications from the display (e.g., event description of 614, directional data of 618, and seconds data of 620 at FIG. 6A) (e.g., while maintaining display of a second set of content of the one or more complications). In some embodiments, the first set of content of the one or more complications that were displayed in the first mode cease to be displayed as a result of transitioning to the second mode.

In some embodiments, transitioning the electronic device from the first mode (e.g., a higher power consumption mode) to the second mode (e.g., a lower power consumption mode) includes removing (e.g., ceasing to display) at least a portion of a background (e.g., solid background color, a background image; 658) from the display. In some embodiments, one or more backgrounds that were displayed in the first mode cease to be displayed as a result of transitioning to the second mode.

In some embodiments, the background has a first visual characteristic (e.g., a first color) and wherein transitioning the electronic device from the first mode (e.g., a higher power consumption mode) to the second mode (e.g., a lower power consumption mode) includes displaying, at a location corresponding to the removed portion of background (e.g., 658), a third graphical object (e.g., 659) (e.g., an outline having the same shape as a the background; an unfilled geometric shape) having the first visual characteristic.

In some embodiments, transitioning the electronic device from the first mode (e.g., a higher power consumption mode) to the second mode (e.g., a lower power consumption mode) includes reducing a precision (e.g., a degree of accuracy or exactness of a value (e.g., a time value, a measurement value)) of displayed information (e.g., of the time indicator; 610 at FIGS. 6A and 6C; 620 at FIGS. 6A and 6C). In some embodiments, the first user interface includes display of a first information with first precision and the second user interface includes display of the first information with second precision less than the first precision. Reducing the precision of displayed information enables the device to perform less operations to determine the displayed information and/or allows the display to display less information (e.g., don't display seconds when displaying time), thereby providing the user with valuable feedback while reducing processing usage and/or reducing display brightness (e.g., turning off pixels that would otherwise be used to display the additional precision information). Reducing processing usage and reducing the display brightness reduces power usage and improves the battery life of the device.

In some embodiments, reducing a precision of displayed information includes reducing a precision of a time-based visual element by ceasing to display seconds information (e.g., a seconds counter, a seconds hand; 610 at FIGS. 6A and 6C; 620 at FIGS. 6A and 6C) of the time-based visual element (e.g., while continuing to display minutes and/or hours information of the time-based visual element).

In some embodiments, transitioning the electronic device from the first mode (e.g., a higher power consumption mode) to the second mode (e.g., a lower power consumption mode) includes removing (e.g., ceasing to display) a respective type of information (e.g., potentially sensitive information such as calendar information, physical activity information; information deemed to be personal information (e.g., information that is particular to a user of the electronic device)) from the display while continuing to display information that is not of the respective type of information (e.g., time information, weather information; information is non-personal; information that is the same for different users; event description of 614 at FIGS. 6A and 6C).

In some embodiments, subsequent to (e.g., in response to) detecting that the electronic device has met criteria for transitioning from the first mode to a second mode and in accordance with a determination that an information suppression setting is enabled (e.g., 640), the electronic device (e.g., 600) removes (e.g., ceasing to display) information of a respective type of information (e.g., potentially sensitive information such as calendar information, physical activity information; information deemed to be personal information (e.g., information that is particular to a user of the electronic device)) while continuing to display information that is not of the respective type of information (e.g., time information, weather information; 614 at FIG. 6C). In some embodiments, subsequent to (e.g., in response to) detecting that the electronic device has met criteria for transitioning from the first mode to a second mode and in accordance with a determination that the information suppression setting is not enabled, the electronic device (e.g., 600) continues to display the information of the respective type of information and the information that is not of the respective type of information (e.g., time information, weather information; information is non-personal; information that is the same for different users).

In some embodiments, transitioning the electronic device from the first mode (e.g., a higher power consumption mode) to the second mode (e.g., a lower power consumption mode) includes reducing the display size of one or more visual elements (614, 616, 618, 620, 624, 626, and 628 of FIG. 6C) (e.g., second time indicator is smaller than first time indicator and/or second graphical object is smaller than first graphical object). In some embodiments, the center position of the second time indicator is the same as the center position of the first time indicator. In some embodiments, the center position of the second graphical object is the same as the center of the first graphical object. Reducing the size of visual elements on the display enables the device to conserve battery power by avoiding energizing the pixels that the visual elements previously used (e.g., by turning off the pixels not required to display the smaller version of the visual element). Avoiding energizing pixels of the display reduces the display brightness. Reducing the display brightness reduces power usage and improves the battery life of the device.

In some embodiments, prior to displaying the first user interface (e.g., a clock face of a smart watch), the electronic device (e.g., 600) detects a user input, wherein displaying the first user interface is based on (e.g., is in response to) detecting the user input. In some embodiments, the criteria for transitioning from the first mode to the second mode includes a first criterion, wherein: in accordance with a determination that the user input is of a first type (e.g., tap or other touch gesture on a touch-sensitive surface of the electronic device), the first criterion is met based on a first amount of time having elapsed (e.g., the first amount of time having elapsed after detecting the user input, the first amount of time having elapsed after detecting the last user input while in the first mode); and in accordance with a determination that the user input is of a second type (e.g., wrist raise gesture detected by one or more motion sensors), the first criterion is met based on a second amount of time having elapsed (e.g., the second amount of time having elapsed after detecting the user input, the second amount of time having elapsed after detecting the last user input while in the first mode), the second time being different from the first time. In some embodiments, the electronic device stays in the first mode for different amounts of time (e.g., by transitioning to the second mode after varying amounts of time) based on the time of user input that caused the electronic device to enter the first mode. In some examples, the electronic device stays in the first mode for a longer duration when a touch gesture on the electronic device's touch-sensitive surface causes the electronic device to transition to the first mode because the touch gesture is likely to be intentional input and the electronic device stays in the first mode for a shorter duration when a motion-based gesture (e.g., wrist raise) causes the electronic device to transition to the first mode because the motion-based gesture is less likely to be intentional input.

In some embodiments, the first user interface includes display of an animation that includes a first animation portion and a second animation portion (e.g., 648 at FIG. 6Q) and the second user interface includes display of the first animation portion without displaying the second animation portion (e.g., 648 at FIG. 6R). In some embodiments, the watch face includes an animated aspect that is abbreviated when in the second mode. Selecting a different point for an animation to end enables the display to show different content (different part of the animation) during different playbacks of the animation, thereby avoiding the same content (e.g., the ending frame of the animation) from being displayed on the display for extended periods of time (e.g., after the animation has stopped), thereby reducing the likelihood of the negative effects, such as display burn-in, of displaying the same content at the same location on the display.

In some embodiments, while in the second mode, the electronic device (e.g., 600) detects (e.g., a beginning of) a second user input (e.g., 632-2, 632-6, 632-7, 632-8) (e.g., a touch gesture input on a touch-sensitive surface of the electronic device, a rotation of a rotatable input mechanism of the electronic device). In response to detecting the second user input, the electronic device (e.g., 600) transitions from the second mode to the first mode, including replacing display of the second user interface with display of the first user interface (e.g., FIGS. 6D-6H).

In some embodiments, the electronic device includes a rotatable input mechanism (e.g., 604) (e.g., a physical crown that is rotatable relative to a display and/or housing of the electronic device). The second user input is rotation of the rotatable input mechanism (e.g., 632-2). In some embodiments, replacing display of the second user interface (e.g., 608-3, 608-6) with display of the first user interface (e.g., 608-1, 608-8) occurs in conjunction with detecting rotation (e.g., 632-2, 632-6, 632-7, 632-8) of the rotatable input mechanism (e.g., the transition from the second user interface to the first user interface occurs over time where an incremental rotation of the rotatable input mechanism results in a corresponding incremental transition from the second user interface to the first user interface). In some embodiments, rotating the crown cases the visual elements in the second user interface to transition to the corresponding visual elements of the first user interface (e.g., in size, shape, location, brightness).

In some embodiments, the electronic device includes a rotatable input mechanism (e.g., 606) (e.g., a physical crown that is rotatable relative to a display and/or housing of the electronic device). While in the second mode, the electronic device (e.g., 600) detects (e.g., a beginning of) a third user input (e.g., 632-7 and 632-8) (e.g., rotation of a rotatable input mechanism of the electronic device). In response to detecting the second user input, the electronic device (e.g., 600) transitions from the second mode to the first mode and increasing the brightness of the display (e.g., 602 at FIGS. 6F-6H). In some embodiments, the transition from the second mode to the first mode occurs in response to an initial portion of the input and the first mode is initially displayed in a dimmed state and the dimmed state is gradually brightened as the input continues (e.g., a magnitude of rotation of the rotatable input element determines an amount of change in brightness of the user interface, and a direction of rotation of the rotatable input mechanism determines whether a brightness of the user interface is increased or decreased).

In some embodiments, the first time indicator (e.g., 610 at FIG. 6S) includes a gradient that indicates a measure of time (e.g., 652, 654) (e.g., seconds, minutes, hours) and wherein the second time indicator (e.g., 610 at FIG. 6T) does not include a gradient that indicates the measure of time (or that indicates any measures of time).

In some embodiments, the first time indicator includes a first gradient (e.g., 650 at FIG. 6S) (e.g., a color gradient that varies based on direction from an origin; the color gradient has the first color at a first edge of the gradient, which is located along a first direction from the origin, and the second color at a second edge of the gradient, which is located along a second direction from the origin. The color changes gradually (e.g., smoothly or in increments) with angle from the first color to the second color. The term "color" refers to different hues, tones, shades, tints, including but is not limited to, black, white, and gray.). The first gradient transitions from a first color to a second color and that indicates a measure of time (e.g., seconds, minutes, hours). The second time indicator (e.g., 650 at FIG. 6T) includes a second gradient that transitions from a third color to the second color that indicates the measure of time, wherein the third color is different from the first color. In some embodiments, the first gradient transitions from a first non-black color to a second non-black color and the second gradient transitions from a third non-block color (e.g., same as the first non-black color) to a black color. By replacing the second non-black color with a black color in the second gradient, the second gradient is darker (overall) than the first gradient, thereby conserving power for display of the second gradient as compared to the first gradient.

In some embodiments, the electronic device includes a touch-sensitive surface (e.g., 602). The electronic device (e.g., 600) detects, using the touch-sensitive surface, a tap input (e.g., 632-5, 632-9) at a location corresponding to a displayed complication (e.g., 628) (e.g., that includes weather information, calendar information, or physical activity information) associated with an application (e.g., the complication displays information received from the application). In response to detecting the tap input: in accordance with a determination that the electronic device is in the first mode, the electronic device (e.g., 600) replaces display of the first indication of time with display of the application (e.g., 608-9) (e.g., without changing modes); and in accordance with a determination that the electronic device is in the second mode, the electronic device (e.g., 600) transitions from the second mode to the first mode without replacing display of the second indication of time with display of the application (e.g., FIGS. 6D-6H). In some embodiments, in accordance with a determination that the electronic device is in the second mode, the electronic device replaces display of the second indication of time with display of the first indication of time.

In some embodiments, the electronic device (e.g., 600) detects (e.g., using a touch-sensitive surface) a swipe gesture input (e.g., 632-1, 632-11). In response to detecting the swipe gesture input: in accordance with a determination that the electronic device is in the first mode, the electronic device (e.g., 600) performs an operation (e.g., displaying 608-11) (e.g., that corresponds to the swipe gesture input); and in accordance with a determination that the electronic device is in the second mode, the electronic device (e.g., 600) maintains the electronic device in the second mode without performing the operation (e.g., displaying 608-4). In some embodiments, in accordance with a determination that the electronic device is in the first mode, the technique maintains the electronic device in the first mode. In some embodiments, the operation includes one or more of: displaying one or more received notifications, changing a clock face of the electronic device, displaying one or more affordances for configuring the electronic device. In some embodiments, the electronic device ignores, disregards, and/or does not act upon swipe gesture inputs when the electronic device is in the second mode. Avoiding performing operations reducing the processing that the device is required to do, thereby reducing the power usage of the device and improving the battery life of the device.

In some embodiments, the electronic device (e.g., 600) detects (e.g., using a touch-sensitive surface) a swipe gesture input (e.g., 632-1). In response to detecting the swipe gesture input: in accordance with a determination that the electronic device is in the first mode, the electronic device (e.g., 600) performs an operation while maintaining the electronic device in the first mode (e.g., that corresponds to the swipe gesture input); and in accordance with a determination that the electronic device is in the second mode, the electronic device (e.g., 600) performs the operation (e.g., displaying 608-11) (and, optionally, transitioning the electronic device to the first mode). In some embodiments, in accordance with a determination that the electronic device is in the first mode, the technique maintains the electronic device in the first mode. In some embodiments, the operation includes one or more of: displaying one or more received notifications, changing a clock face of the electronic device, displaying one or more affordances for configuring the electronic device.

In some embodiments, while the electronic device is in the first mode and displaying the first user interface (e.g., 608-1) (e.g., prior to detecting that the electronic device has met criteria for transitioning from the first mode to a second mode; after detecting that the electronic device has met criteria for transitioning from the first mode to a second mode) and while the electronic device is connected (e.g., via a wire; wireless) to an external power source (e.g., a charger; 636), the electronic device (e.g., 600) detects that the electronic device has met criteria for transitioning from the first mode to a third mode (e.g., description of FIGS. 6A-6B). In response to detecting that the electronic device has met the criteria for transitioning from the first mode to the third mode (e.g., criteria for turning off the display), the electronic device (e.g., 600) ceases to display the first time indicator and the first graphical object without displaying the second time indicator and second graphical object (e.g., 602 in FIG. 6L) (e.g., turning off the display, black out the display) (e.g., without entering the second mode).

In some embodiments, while the electronic device (e.g., 600) is in the first mode and displaying the first user interface (e.g., prior to detecting that the electronic device has met criteria for transitioning from the first mode to a second mode; after detecting that the electronic device has met criteria for transitioning from the first mode to a second mode), the electronic device (e.g., 600) detects a request (e.g., a set of one or more user inputs that enables a fourth mode) to transition the electronic device from the first mode to a fourth mode (e.g., a theater mode; a mode in which the display is inactive and only reactivates (e.g., re-enters the first mode) based on selected user input (e.g., does not activate based on certain inputs that would activate the display (e.g., re-enters the first mode) while in the second mode; a mode that also involves suppressing notifications)). In response to detecting the request to transition the electronic device from the first mode to the fourth mode, the electronic device (e.g., 600) ceases to display the first time indicator and the first graphical object without displaying the second time indicator and second graphical object (e.g., 602 in FIG. 6L) (e.g., turning off the display, black out the display) (e.g., without entering the second mode).

Note that details of the processes described above with respect to method 700 (e.g., FIG. 7) are also applicable in an analogous manner to the methods described below. For example, methods 900, 1100, 1300, 1500, 1700, and 1900 optionally include one or more of the characteristics of the various methods described above with reference to method 700. For example, the first mode is the same mode throughout these methods and the second mode is the same mode throughout these methods. For brevity, these details are not repeated below.

FIGS. 8A-8M illustrate exemplary techniques for displaying a user interface, in accordance with some embodiments. The user interfaces in these figures are used to illustrate the processes described below, including the processes in FIG. 9.

FIGS. 8A-8M illustrate exemplary techniques for displaying user interfaces, in accordance with some embodiments. The user interfaces in these figures are used to illustrate the processes described below, including the processes in FIG. 9. In particular, FIGS. 8A-8M illustrate techniques for managing display usage by altering one or more aspects (e.g., visual characteristics) of a displayed user interface upon determining that the device has met a mode-transition criteria (e.g., as described above with respect to FIGS. 6A-6B).

FIGS. 8A-8D illustrate changes made to corresponding elements of a displayed clock face user interface as device 600 transitions from a standard display mode to a low power display mode. In particular, the sequence of displayed clock face user interfaces illustrated in FIGS. 8A-8D are displayed by device 600 at progressively lower brightness values while graphical elements (e.g., affordances, complication, indicators, etc.) resize and dim at different times throughout the mode transition.

Figure 8A:
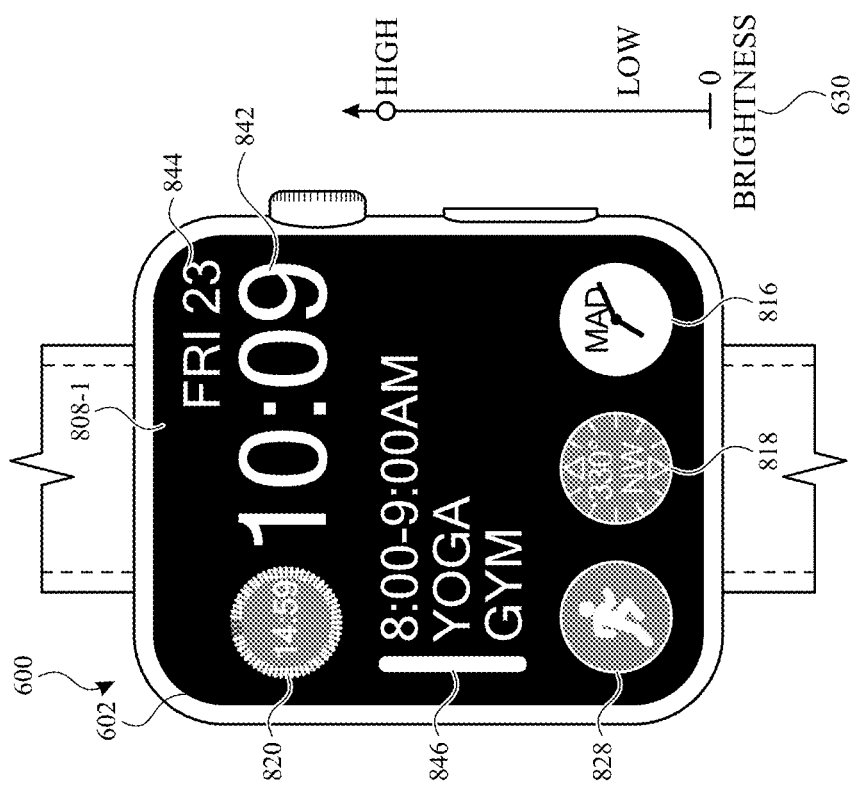
Figure 8D:
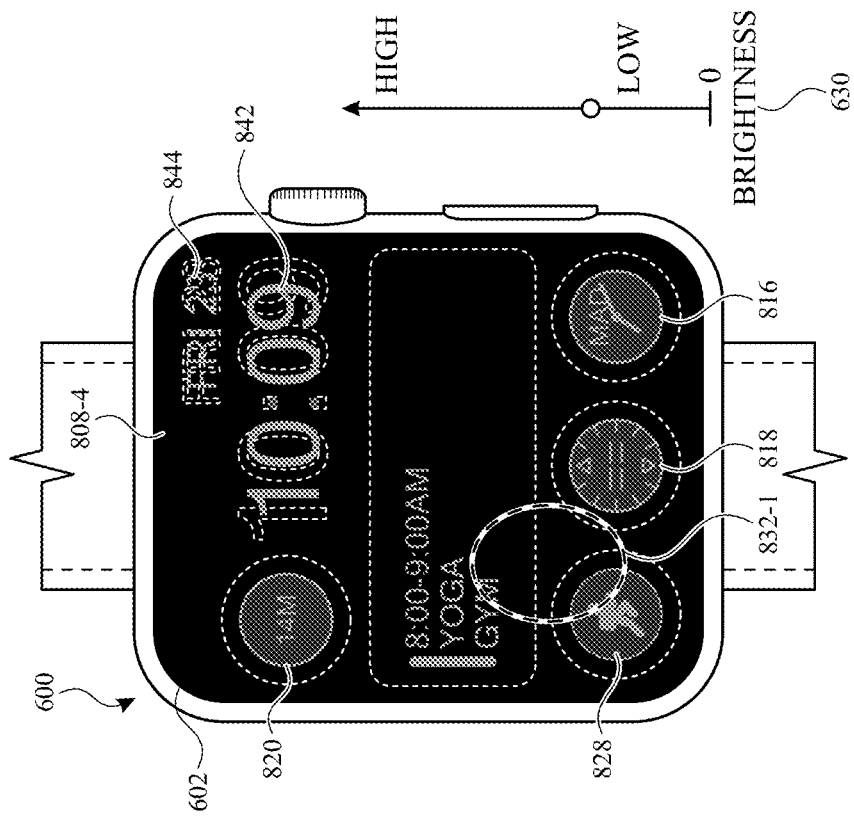

FIG. 8A depicts device 600 displaying clock face user interface 808-1 (e.g., a higher power consumption user interface). In some embodiments, clock face user interface 808-1 corresponds to or is the same as clock face user interface 608-13.

FIG. 8B illustrates device 600 after failing to detect user input for a predetermined period of time (e.g., a mode-transition criteria has been met and in response, device 600 has initiated a transition from standard display mode to low power display mode). At FIG. 8B, while in a mode transitional state, device 600 displays clock face user interface 808-2 on display 602 (e.g., device 600 displays a transitional interface). Clock face user interface 808-2 is a frame of an animation (e.g., a sequence of frames or images) illustrating clock face user interface 808-1 (e.g., a higher power consumption user interface) visually morphing into a corresponding low power consumption user interface (e.g., clock face user interface 808-4 as depicted in FIG. 8D).

As depicted in FIG. 8B, device 600 displays digital indication of time 842, date indicator 844, and timer affordance 820 in clock face user interface 808-2 at reduced sizes and brightness levels compared to their respective appearance in clock face user interface 808-1 (e.g., corresponding outlines representing the size of elements in clock face user interface 808-1 while device is in standard display mode). As depicted in FIG. 8B, digital indication of time 842, date indicator 844, and timer affordance 820 have shrunk inward about their respective center points (e.g., the center of each of these elements remains in the same position relative to the edges of display 602 in both FIG. 8A and FIG. 8B), thereby increasing the distance between elements in clock face user interface 808-8. Additionally, timer affordance 620 is displayed by device 600 without seconds data.

Figure 8C:
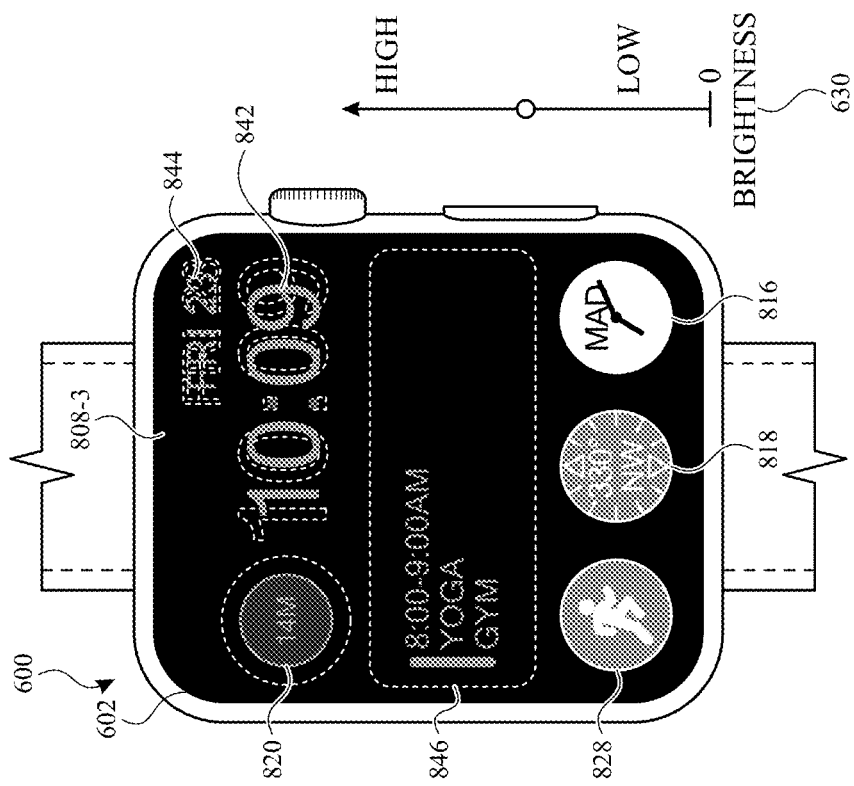

FIG. 8C depicts device 600 at a time after clock face user interface 808-2 has been displayed. At FIG. 8C, while in a mode transitional state, device 600 displays clock face user interface 808-3 on display 602 (e.g., device 600 displays an additional transitional interface). As depicted in FIG. 8C, device 600 displays calendar affordance 846 at a reduced size and brightness level compared its respective appearance in clock face user interface 808-2. As depicted in FIG. 8C, calendar affordance 846 has shrunk inward (e.g., about its own center).

FIG. 8D illustrates device 600 at a time after clock face user interface 808-3 has been displayed (e.g., after device 600 has completely transitioned to low power display mode). At FIG. 8D, while operating in low power display mode, device 600 displays clock face user interface 808-4 (e.g., a lower power consumption user interface) on display 602. In some embodiments, clock face user interface 808-4 corresponds to or is the same as clock face user interface 608-14. Clock face user interface 808-4 (e.g., a lower power consumption user interface) is displayed at a lower brightness level than clock face user interface 808-1 (e.g., a higher power consumption user interface). As depicted in FIG. 8D, workout affordance 828, compass affordance 818, and world clock affordance 816 have shrunk inward (e.g., about their own centers) and dimmed relative to their appearance in clock face user interface 808-3. Additionally, compass affordance 620 is displayed by device 600 without seconds data.

At FIG. 8D, while operating in low power display mode, device 600 detects user input 832-1 (e.g., a tap gesture on display 602). In response to detecting user input 832-1, device 600 initiates a transition back to the standard display mode, by first displaying an emphasis animation visually indicating to the user that a mode transition has been initiated (e.g., clock face user interface 808-5 as depicted in FIG. 8E illustrates a frame of an exemplary emphasis animation). As depicted in FIG. 8E, digital indication of time 842, as well as each displayed affordance, is displayed in a further dimmed and shrunken state prior to device 600 transitioning back to low power display mode.

Figure 8F:
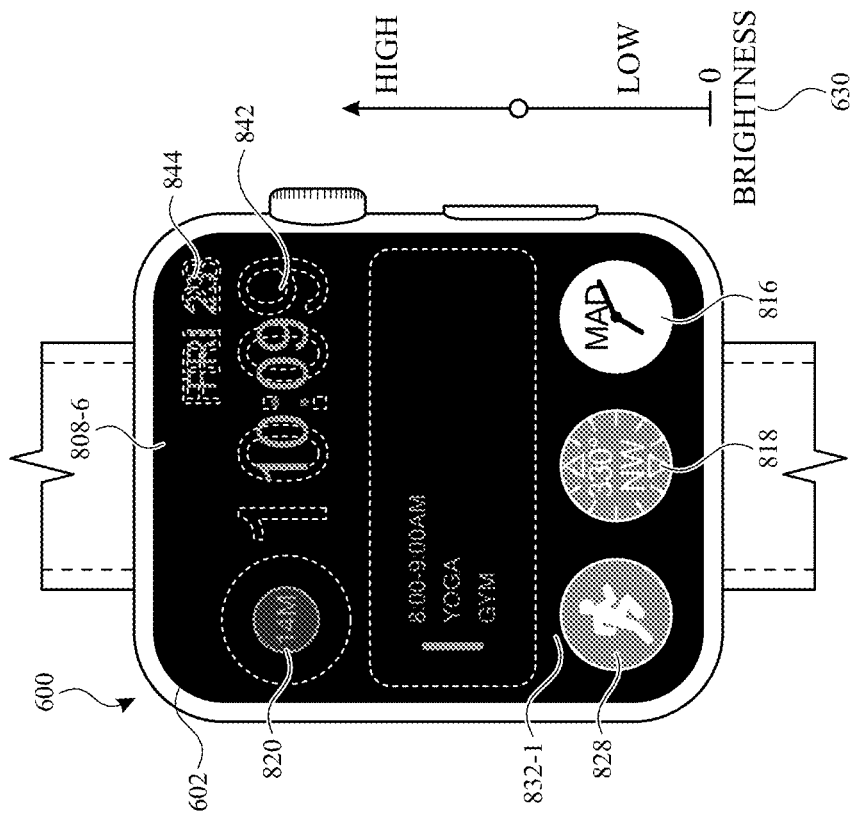
Figure 8E:
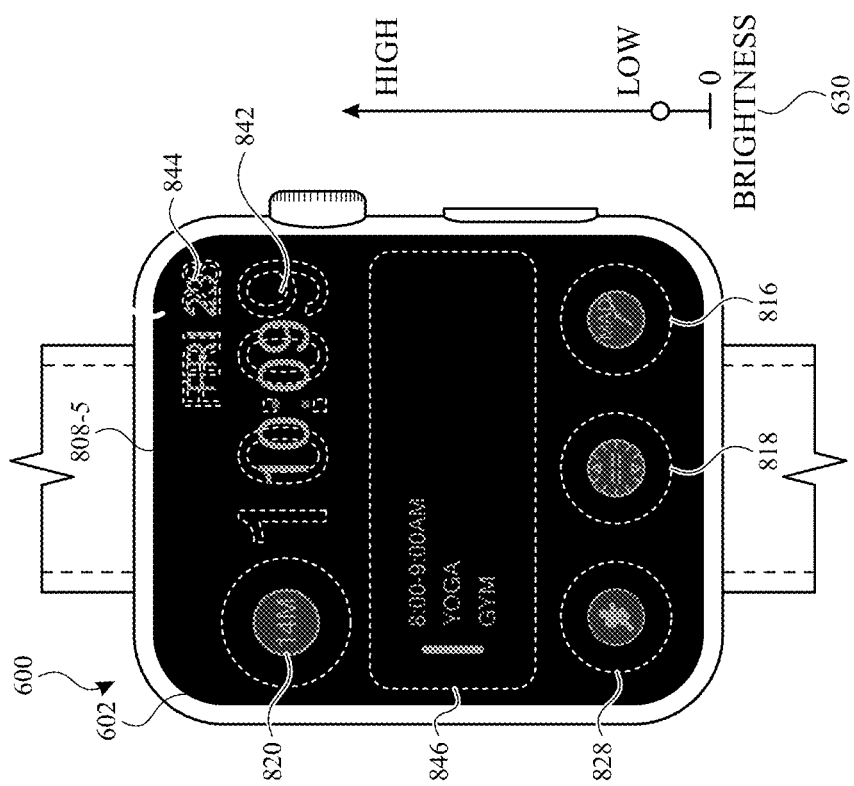
Figure 8H:
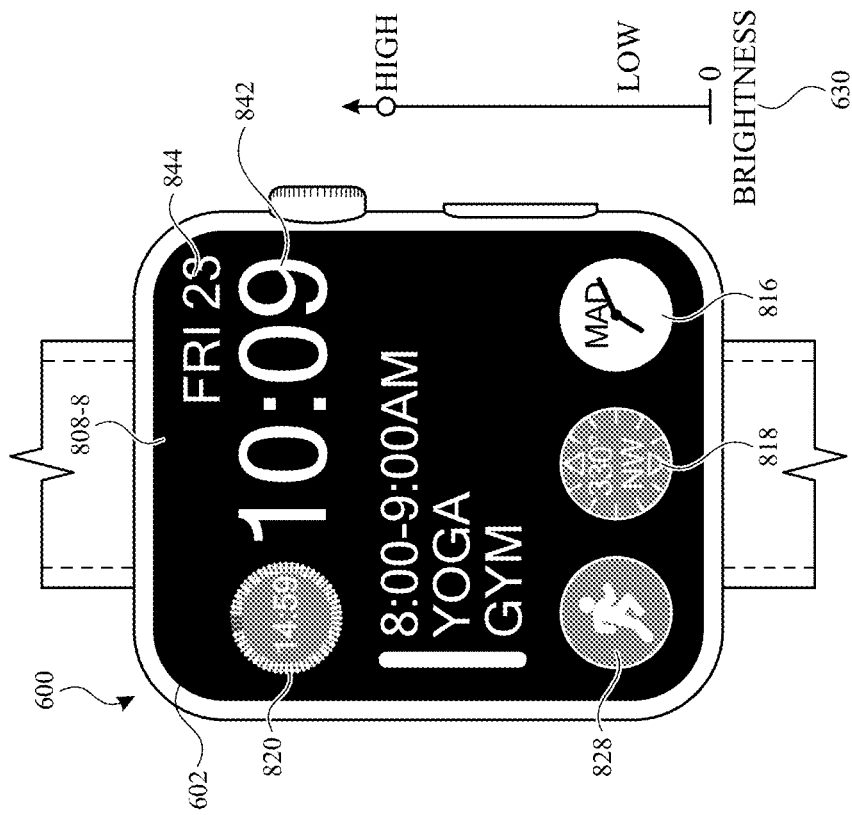
Figure 8G:
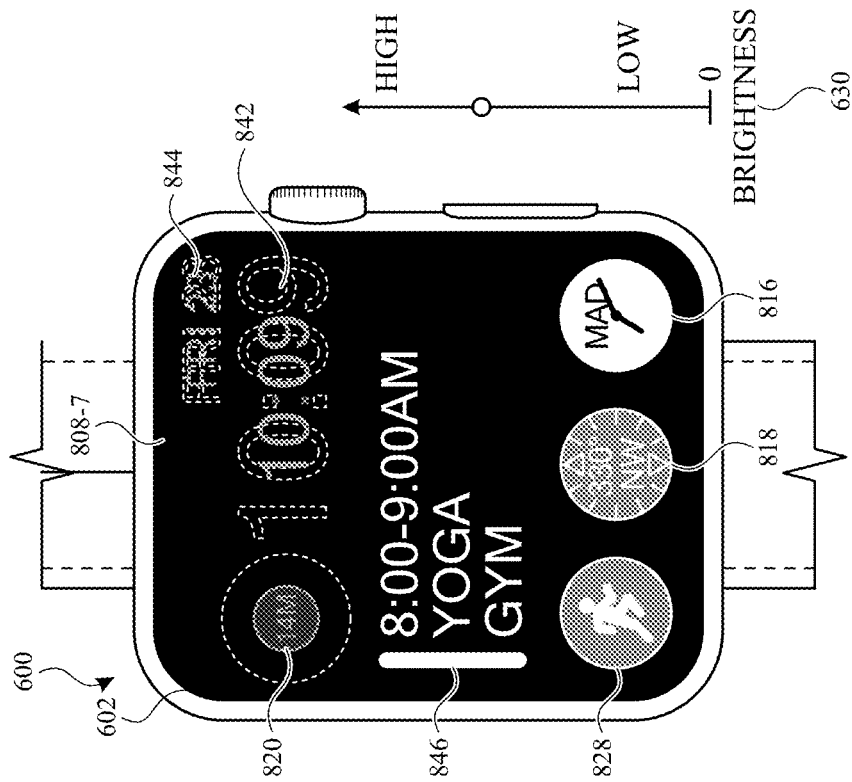
Figure 8J:
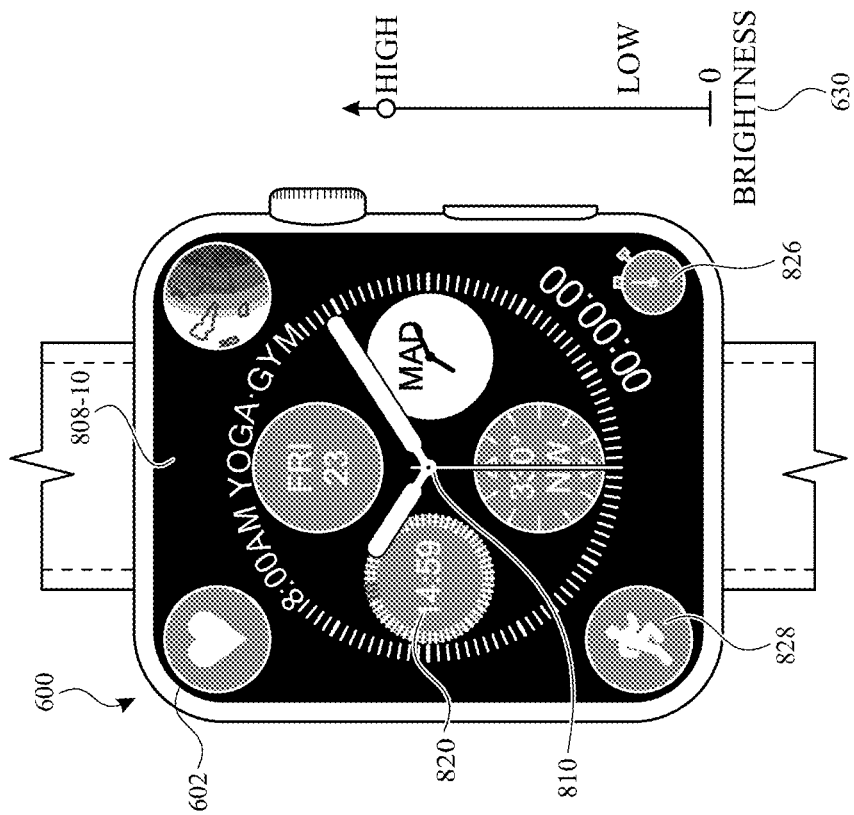

FIGS. 8F-8H depict device 600 as it transitions from low power display mode to standard display mode (e.g., device 600 performs a reversal of the transition sequence described above with respect to FIGS. 8A-8D). In some embodiments, the transition back to standard display mode occurs at different rates depending on the mode-transition criteria that initiated the reversal (e.g., faster if device 600 detected a wrist raise gesture and slower if device detected a tap gesture).

Figure 8I:
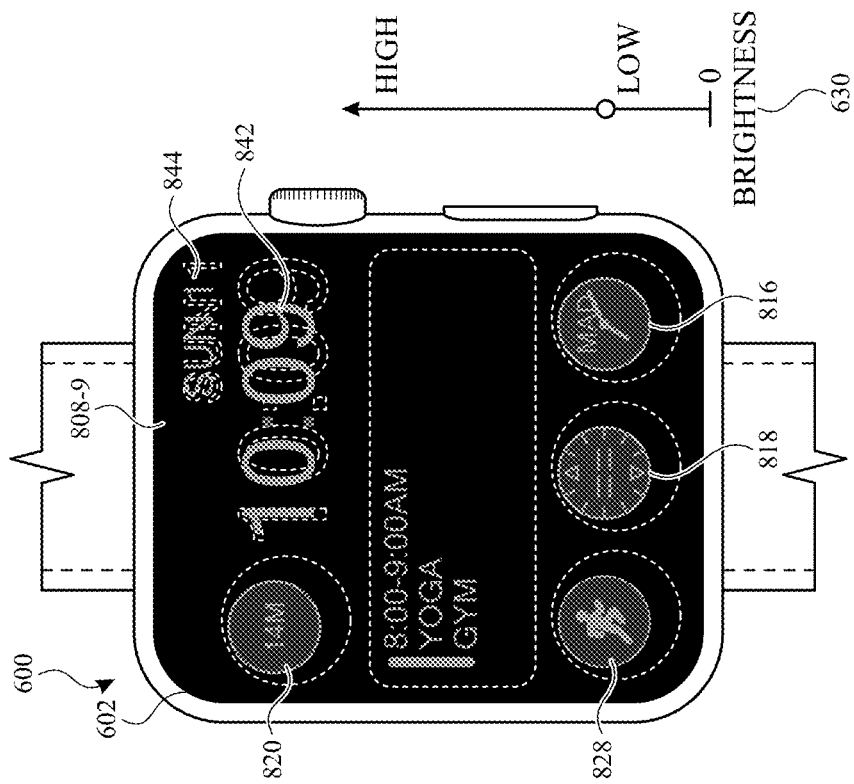

In some embodiments, as depicted in FIG. 8I, rather than shrinking in place (e.g., inward), one or more elements displayed in clock face user interface 808-1 may instead shrink in a directional manner. For example, as depicted in FIG. 8I, upon transitioning to low power display mode, digital indication of time 842, date indicator 844, timer affordance 820, workout affordance 828, compass affordance 818, and world clock affordance 816 have shrunk toward the center of display 602 thereby translating their respective center points away from the edges of display 602. In some embodiments, elements in clock face user interface 808-9 scale within the area they occupied while in standard display mode (e.g., as indicated by respective outlines). Additionally, as depicted in FIG. 8I, the shrinking of a clock face user interface element upon transition to low power display mode can vary (e.g., in direction or magnitude) based a time associated with the mode-transition (e.g., based in part on date, day, month, week, etc.).

Figure 8K:
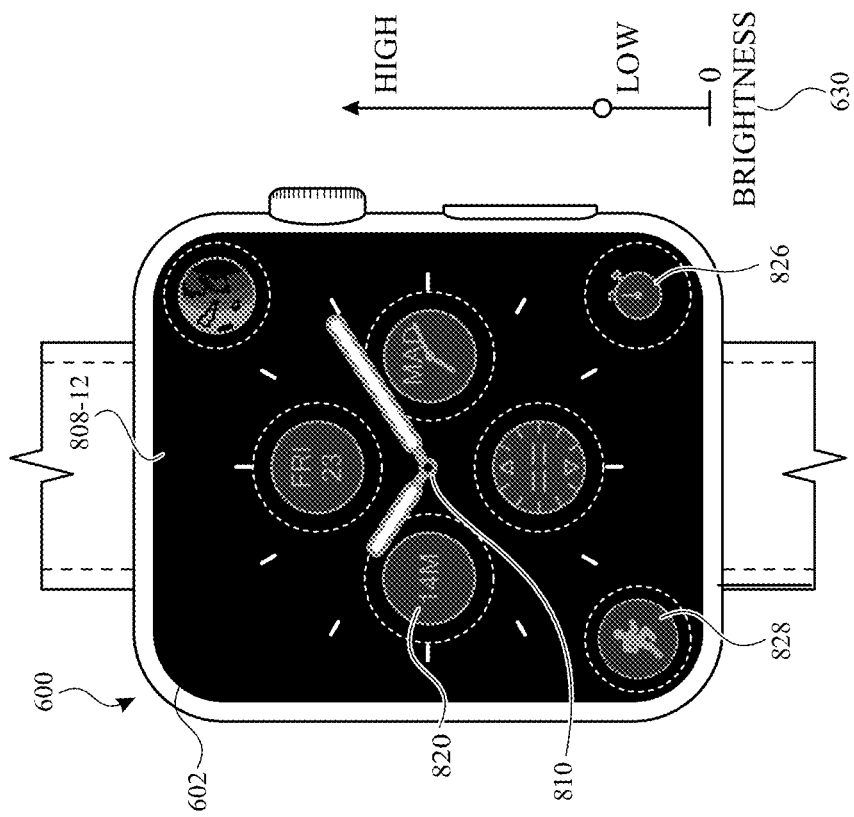
Figure 8L:
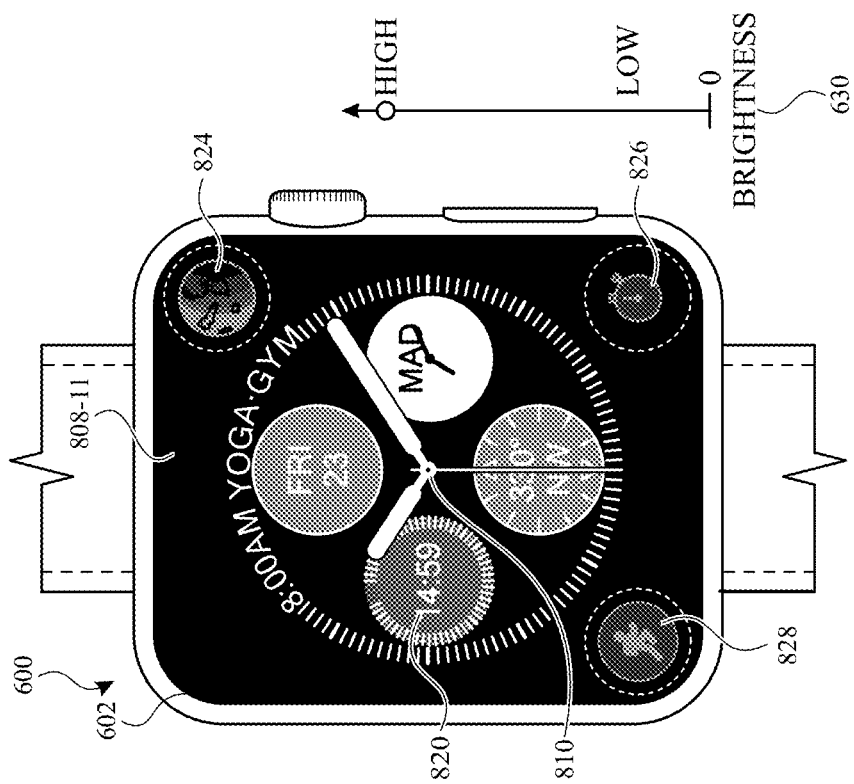
Figure 8M:
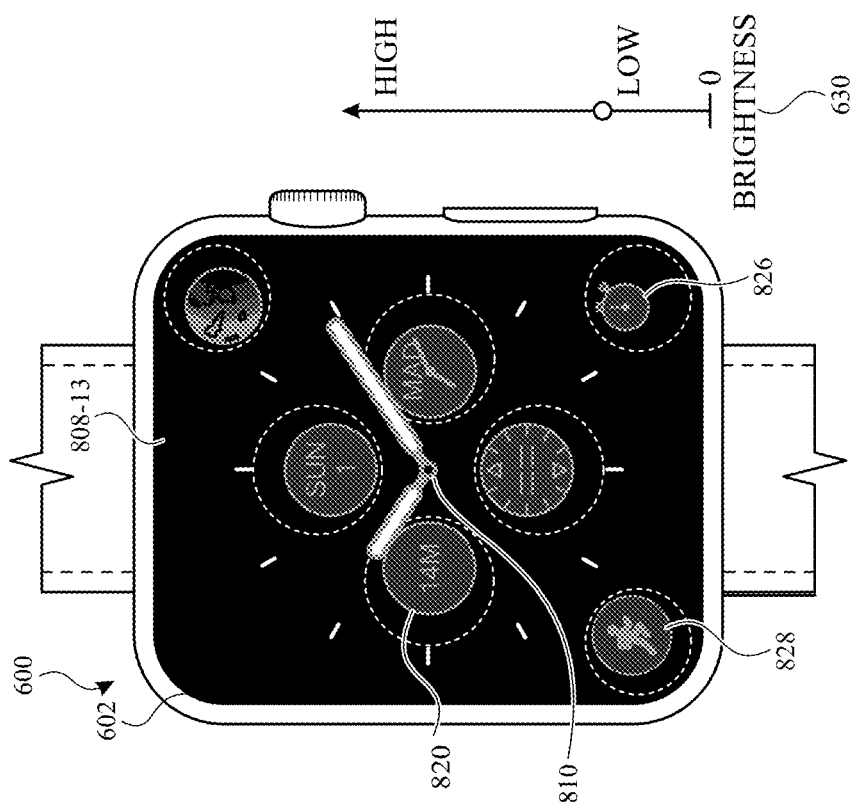

FIGS. 8J-8L depict another example of device 600 transitioning from standard display mode to low power display mode and the corresponding changes to the clock face user interface displayed by device 600. At FIG. 8J, while in a standard display mode, device 600 displays clock face user interface 808-10 (e.g., a higher power consumption user interface). In some embodiments, clock face user interface 808-10 corresponds to or is the same as clock face user interface 608-1. As illustrated by FIGS. 8K and 8L, device 600 first shrinks outer affordances (e.g., closer to the edge of display 602) and subsequently shrinks the interior affordances (e.g., affordances closer to the center to display 602) as device 600 transitions to low power display mode. FIG. 8M depicts device 600, while operating in low power display mode at a later time (e.g., date, day, month, week, etc.). As depicted in FIG. 8M, the shrinking of a clock face user interface element upon transition to low power mode can vary. For example, the shrinking can be directional (e.g., as described above with respect to FIG. 8I), applied in a non-uniform manner (e.g., outer affordances shrink more than interior affordances), or of different magnitudes.

FIG. 9 is a flow diagram illustrating a method for managing display usage using an electronic device in accordance with some embodiments. Method 900 is performed at a device (e.g., 100, 300, 500, 600, a smart watch, a smart phone, a tablet computer) with a display. Some operations in method 900 are, optionally, combined, the orders of some operations are, optionally, changed, and some operations are, optionally, omitted.

As described below, method 900 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

While the electronic (e.g., 600) device is in a first mode (e.g., a higher power consumption mode), the electronic device (e.g., 600) displays (902) on the display (e.g., 602), a first user interface (e.g., a clock face of a smart watch) including a first time indicator (904) and a first graphical object (906).

The first time indicator (904) indicates a current time (e.g., 842 at FIG. 8A) (e.g., a clock hand (hour, minute, second hand); a digital time numeral (hour, minute, second numerals) and is displayed at a first size. The first graphical object (906) (e.g., 816, 818, 820, 828, 846, and 844 at FIG. 8A) (e.g., an affordance; a complication) is displayed at a second size.

The electronic device (e.g., 600) detects (908) that the electronic device has met criteria for transitioning from the first mode to a second mode. In response to detecting that the electronic device has met the criteria for transitioning from the first mode to the second mode, electronic device (e.g., 600) transitions (910) the electronic device from the first mode (e.g., a higher power consumption mode) to the second mode (e.g., a lower power consumption mode).

While the electronic device is in the second mode, electronic device (e.g., 600) displays (912) on the display, a second user interface (e.g., 808-10) including: a second time indicator (914) and a second graphical object (916).

The second time indicator (914) (e.g., 842 at FIG. 8D) indicates the current time (e.g., an analog clock hand (hour, minute, second hand); a digital clock numeral (hour, minute, second numerals)). The second time indicator is displayed at a third size that is smaller than the first size, at which the first time indicator was previously displayed.

The second graphical object (916) (e.g., 816, 818, 820, 828, 846, and 844 at FIG. 8D) corresponds to the first graphical object (e.g., a non-interactive version of the first graphical object; a visually distinct graphical object representing to the same application as the first graphical object; a graphical object including a subset of the data included in the first graphical object (only mm remaining rather than mm: ss remaining)). The second graphical object is displayed at a fourth size that is smaller than the second size, at which the first graphical object was previously displayed. As discussed above in greater detail, the first mode and the second mode are different modes in which the electronic device can operate. Reducing the size of visual elements on the display enables the device to conserve battery power by avoiding energizing the pixels that the visual elements previously used (e.g., by turning off the pixels not required to display the smaller version of the visual element). Avoiding energizing pixels of the display reduces the display brightness, which reduces power usage and improves the battery life of the device.

In some embodiments, the first time indicator (e.g., 842 at FIG. 8A) and the first graphical object (e.g., 820 at FIG. 8A) are spaced apart by a first distance in the first user interface (e.g., 808-1). In some embodiments, the second time indicator (e.g., 842 at FIG. 8D) and the second graphical object (e.g., 820 at FIG. 8A) are spaced apart by a second distance in the second user interface (e.g., 808-10). In some embodiments, the second distance is greater than the first distance. In some embodiments, the distance between the time indicator and the graphical object increases as a result of transitioning the electronic device from the first mode (e.g., a higher power consumption mode) to the second mode (e.g., a lower power consumption mode).

In some embodiments, while the electronic device is in the first mode (e.g., a higher power consumption mode), the electronic device (e.g., 600) displays on the display in the first user interface (e.g., a clock face of a smart watch), a third graphical object (e.g., an affordance; a complication; 828 at FIG. 8A) that is displayed at a fifth size. While the electronic device is in the second mode, the electronic device (e.g., 600) displays on the display in the second user interface, a fourth graphical object (e.g., 828 at FIG. 8D) corresponding to the third graphical object (e.g., a non-interactive version of the third graphical object; a visually distinct graphical object representing to the same application as the third graphical object; a graphical object including a subset of the data included in the third graphical object (only mm remaining rather than mm:ss remaining)). The fourth graphical object is displayed at a sixth size that is smaller than the fifth size, at which the third graphical object was previously displayed. Reducing the size of visual elements on the display enables the device to conserve battery power by avoiding energizing the pixels that the visual elements previously used (e.g., by turning off the pixels not required to display the smaller version of the visual element). Avoiding energizing pixels of the display reduces the display brightness, which reduces power usage and improves the battery life of the device.

In some embodiments, the first graphical object (e.g., 820 at FIG. 8A) and the third graphical object (e.g., 828 at FIG. 8A) are spaced apart (e.g., based on the closet points of each object to the other object or based on the centers of the objects or some other measurement) by a third distance in the first user interface (e.g., 808-1). In some embodiments, the second graphical object (e.g., 820 at FIG. 8D) and the fourth graphical object (e.g., 828 at FIG. 8D) are spaced apart by a fourth distance in the second user interface. In some embodiments, the fourth distance is greater than the third distance. In some embodiments, the distance between the complications increases as a result of transitioning the electronic device from the first mode (e.g., a higher power consumption mode) to the second mode (e.g., a lower power consumption mode).

In some embodiments, the first time indicator (e.g., 842 at FIG. 8A) and the second time indicator (e.g., 842 at FIG. 8I) are digital time indicators and wherein a center of the second time indicator is closer to the center of the display as compared to a center of the first time indicator. In some embodiments, a combination of the first time indicator (e.g., 842 at FIG. 8A) and the second graphical object (e.g., 844 at FIG. 8A) have a combined center. In some embodiments, a combination of the second time indicator (e.g., 842 at FIG. 8D) and the second graphical object (e.g., 844 at FIG. 8D) have the same combined center. In some embodiments, the time indicator and the graphical object are grouped together such that they scale in size together and maintain a center with respect to the group when scaled. Maintaining a combined center of graphical elements enables the device to display the graphical elements at the same location, thereby providing the user with improved visual feedback such that the user can easily identify that the same content is being displayed in a different form factor. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, a combination (e.g., a group) of the first graphical object (e.g., 816, 818, 828 at FIG. 8A) and the second graphical object (e.g., 816, 818, 828 at FIG. 8A) have a combined center. In some embodiments, a combination of the third graphical object (e.g., 816, 818, 828 at FIG. 8D) and the fourth graphical object (e.g., 816, 818, 828 at FIG. 8D) have the same combined center. In some embodiments, the graphical objects are grouped together such that they scale in size together and maintain a center with respect to the group when scaled.

In some embodiments, the first time indicator is displayed at a first location on the display as part of the first user interface while in the first mode. In some embodiments, the first graphical object (e.g., 816, 818, 820, 828, 846, and 844 at FIG. 8A) (e.g., an affordance; a complication) is displayed at a second location on the display as part of the first user interface while in the first mode. In some embodiments, the second time indicator is displayed at a third location on the display as part of the second user interface while in the second mode, the third location being different from the first location. In some embodiments, the second graphical object (e.g., 816, 818, 820, 828, 846, and 844 at FIG. 8D) (e.g., an affordance; a complication) is displayed at a fourth location on the display as part of the second user interface while in the second mode, the fourth location being different from the second location.

In some embodiments, transitioning the electronic device from the first mode (e.g., a higher power consumption mode) to the second mode includes: a first animation (e.g., 808-1 and 808-2) transitioning the first time indicator (e.g., 842 at FIG. 8A) to the second time indicator (e.g., 842 at FIG. 8B), and a second animation (e.g., 808-2 and 808-3) transitioning the first graphical object (e.g., 846 at FIG. 8B) to the second graphical object (e.g., 846 at FIG. 8C). The first animation begins before the second animation begins. In some embodiments, the first animation ends before the second animation begins. In some embodiments, a third animation transitions the third graphical object to the fourth graphical object. In some embodiments, the second animation begins before the third animation. In some embodiments, the second animation ends before the third animation begins. Displaying animations at different starting times for different graphical elements provides the user with improved visual feedback by enabling the user to individually appreciate how each graphical element is changing, thereby better understanding which element in the second mode corresponds to which element from the first mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first graphical object (e.g., 846 at FIG. 8A) is displayed closer to the center of the display in the first user interface than the third graphical object (e.g., 816, 818, and 828 at FIG. 8A) in the first user interface. In some embodiments, transitioning the electronic device from the first mode (e.g., a higher power consumption mode) to the second mode includes: a second animation (e.g., transition from 808-2 to 808-3) transitioning the first graphical object to the second graphical object, and a third animation (e.g., transition from 808-3 to 808-4) transitioning the third graphical object to the fourth graphical object. In some embodiments, the second animation begins before the third animation begins. In some embodiments, the second animation ends before the third animation begins. In some embodiments, graphical objects (such as complications) are resized and/or moved on the display using animations when the electronic device transitions from the first mode to the second mode. In some embodiments, graphical objects further from the center of the display are animated to resize and/or move before objects closer to the center of the display. Displaying animations at different starting times for different graphical elements provides the user with improved visual feedback by enabling the user to individually appreciate how each graphical element is changing, thereby better understanding which element in the second mode corresponds to which element from the first mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first graphical object (e.g., 820 at FIG. 8A) is displayed is closer to a first edge (e.g., the bottom edge) of the display in the first user interface than the third graphical object (e.g., 816 at FIG. 8A) in the first user interface. In some embodiments, transitioning the electronic device from the first mode (e.g., a higher power consumption mode) to the second mode includes: a second animation (e.g., transition from 808-1 to 808-2) transitioning the first graphical object to the second graphical object, and a third animation (e.g., transition from 808-2 to 808-3) transitioning the third graphical object to the fourth graphical object. In some embodiments, the second animation begins before the third animation begins. In some embodiments, the second animation ends before the third animation begins. In some embodiments, graphical objects (such as complications) are resized and/or moved on the display using animations when the electronic device transitions from the first mode to the second mode. In some embodiments, graphical objects displayed closer to the bottom of the display are animated to resize and/or move before objects displayed further from the bottom edge of the display. Displaying animations at different starting times for different graphical elements provides the user with improved visual feedback by enabling the user to individually appreciate how each graphical element is changing, thereby better understanding which element in the second mode corresponds to which element from the first mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first time indicator (e.g., 810 at FIG. 8K) and the first graphical object (e.g., 820, 822, 828 at FIG. 8K) are spaced apart by a first distance in the first user interface (e.g., 810) (e.g., based on the closet points of each object to the other object or based on the centers of the objects or some other measurement). In some embodiments, the second time indicator (e.g., 810 at FIG. 8M) and the second graphical object (e.g., 820, 822, 828 at FIG. 8M) are spaced apart by a second distance in the second user interface (e.g., 810) (e.g., based on the closet points of each object to the other object or based on the centers of the objects or some other measurement). In some embodiments, the first distance is greater than the second distance. In some embodiments, the distance between the time indicator and the graphical object decreases as a result of transitioning the electronic device from the first mode (e.g., a higher power consumption mode) to the second mode (e.g., a lower power consumption mode).

In some embodiments, the fourth size is smaller than the second size by a first percentage (e.g., relative size of 846 in FIGS. 8A and 8D) and the sixth size is smaller than the fifth size by a second percentage (e.g., relative size of 828 in FIGS. 8A and 8D) different from the first percentage. In some embodiments, the amount of scaling is different for different elements. For example, the first graphical object may reduce in size by 10% when transitioning to the second graphical object while the third graphical object may reduce in size by 50% (or 5%) when transitioning to the fourth graphical object. Using different amounts of scaling for different visual elements enables the device to conserve more power by reducing the size of less relevant visual elements (e.g., less used, less important elements) by a larger degree then the size of more relevant visual elements (e.g., more frequently used, more important elements). As a result, the device continues to provide the user with feedback while reducing the size of visual elements, which reduces display brightness and reduces power usage.

In some embodiments, the first graphical object (e.g., 820 at FIG. 8A) is displayed closer to the center of the display in the first user interface (e.g., 808-1) than the third graphical object (e.g., 828 at FIG. 8A) in the first user interface. In some embodiments, transitioning the electronic device from the first mode (e.g., a higher power consumption mode) to the second mode includes: a second animation transitioning the first graphical object to the second graphical object, and a third animation transitioning the third graphical object to the fourth graphical object. The first percentage is less than the second percentage. In some embodiments, graphical elements (e.g., complications) displayed further from the center of the display reduce in size (e.g., as a percentage) more than graphical elements displayed closer to the center of the display.

In some embodiments, the fourth size is smaller than the second size by a first percentage and the third size is smaller than the first size by a third percentage that is less than the first percentage (e.g., relative size of 810 and 828 at FIGS. 8J and 8L). In some embodiments, the amount of scaling is different for different elements. For example, the first time indication may reduce in size by 20% when transitioning to the second time indication while the first graphical object may reduce in size by more (e.g., 50%) when transitioning to the second graphical object. Using different amounts of scaling for different visual elements enables the device to conserve more power by reducing the size of less relevant visual elements (e.g., watch complications) by a larger degree then the size of more relevant visual elements (e.g., time indicator). As a result, the device continues to provide the user with feedback (e.g., of the time and of the complications) while reducing the size of visual elements, which reduces display brightness and reduces power usage.

In some embodiments, while the electronic device is in the second mode and displaying, on the display, the second user interface including the second time indicator at the third size and the second graphical object at the fourth size, the electronic device (e.g., 600) detects that the electronic device has met criteria for transitioning from the second mode to the first mode (e.g., detecting a user input on the display, detecting motion (e.g., motion indicative of a wrist-raise)). In response to detecting that the electronic device has met the criteria for transitioning from the second mode to the first mode, the electronic device (e.g., 600) transitions from the second mode to the first mode, including: animating, over a first amount of time, a transition of the second time indicator (e.g., 842 in FIGS. 8G and 8H) at the third size to the first time indicator at the first size, and animating, over a second amount of time, a transition of the second graphical object (e.g., 846 in FIGS. 8F-G) at the fourth size to the first graphical object at the second size. In some embodiments, transitioning from the second mode to the first mode includes animating the transition from the second time indicator to the first time indicator and animating the transition from the second graphical object to the first graphical object. In some embodiments, the first time and the second time are the same amounts of time (e.g., they animate over the same amount of time). In some embodiments, the first time and the second time are different amounts of time.

In some embodiments, transitioning from the first mode (e.g., a higher power consumption mode) to the second mode (e.g., a lower power consumption mode) includes: animating, over a third amount of time, a transition of the first time indicator (e.g., 842 at FIG. 8D) at the first size to the second time indicator at the third size, and animating, over a fourth amount of time, a transition of the first graphical object (e.g., 846 at FIG. 8D) at the second size to the second graphical object at the fourth size. In some embodiments, transitioning from the first mode to the second mode includes animating the transition from the first time indicator to the second time indicator and animating the transition from the first graphical object to the second graphical object. In some embodiments, the third time and the fourth time are the same amounts of time (e.g., they animate over the same amount of time). In some embodiments, the third time and the fourth time are different amounts of time. In some embodiments, the third amount of time (e.g., animation when transitioning from first mode to second mode) is different from the first amount of time (e.g., animation when transitioning from second mode to first mode). In some embodiments, the third amount of time is the same as the fourth amount of time. In some embodiments, the third amount of time is different from the fourth amount of time. In some embodiments, the first amount of time (e.g., transitioning from second mode to first mode) is less than the third amount of time (transitioning from first mode to second mode). In some embodiments, the second amount of time is less than the fourth amount of time.

In some embodiments, transitioning from the second mode (e.g., a lower power consumption mode) to the first mode (e.g., a higher power consumption mode) includes: in accordance with a determination that the user input (e.g., 832-1) is of a first type (e.g., tap or other touch gesture on a touch-sensitive surface of the electronic device), the first amount of time is a first predetermined period of time; and in accordance with a determination that the user input is of a second type (e.g., wrist raise gesture detected by one or more motion sensors) different from the first type, the first amount of time is a second predetermined period of time that is different from the first predetermined period of time. In some embodiments, in accordance with a determination that the user input is of the first type (e.g., tap or other touch gesture on a touch-sensitive surface of the electronic device), the second amount of time is the first predetermined period of time, and in accordance with a determination that the user input is of a second type (e.g., wrist raise gesture detected by one or more motion sensors), the second amount of time is the second predetermined period of time. In some embodiments, the transition from the second mode to the first mode happens at different rates based on the type of input that causes the transition.

In some embodiments, transitioning from the second mode to the first mode includes displaying an animation (e.g., 808-5) that visually accentuates one or more visual differences between the second user interface displayed in the second mode and the first user interface displayed in the first mode.

In some embodiments, visually accentuating one or more visual differences between the second mode and the first mode includes: reducing the display size of the second time indicator (e.g., 842 at FIGS. 8D-8F) to a size that is smaller than the third size before displaying the first time indicator at the first size; and reducing the display size of the second graphical (e.g., 820 at FIGS. 8D-8F) object to a size that is smaller than the fourth size before displaying the first graphical object at the second size. In some embodiments, the technique shrinks the graphical elements before enlarging them to accentuate the visual difference (e.g., size) between the elements in the two states.

In some embodiments, while the electronic device is in the first mode (e.g., a higher power consumption mode) and displaying the first user interface (e.g., a clock face of a smart watch), the first time indicator (e.g., an analog clock hand (hour, minute, second hand); a digital clock numeral (hour, minute, second numerals)) is displayed at a first brightness level (e.g., average pixel luminance (APL), average lumen output, total lumen output, average illuminance, or total illuminance of the indicator on the display; brightness expressed in nits, lux, or lumens) and the first graphical object (e.g., an affordance; an affordance representing a first application; an interactive graphical object; an affordance displayed as a complication associated with a clock face; a non-updating graphical element (rotation point of a clock hand; colon separating digital clock numerals)) is displayed at a second brightness level (e.g., a brightness level that is the same as the first brightness level; a brightness level that is different than the first brightness level). Thus, the first time indicator is displayed at a first brightness level and the first graphical object is displayed at a second brightness level. In some embodiments, while the electronic device is in the second mode and displaying the second user interface, the second time indicator is displayed at a third brightness level that is lower than the first brightness level, at which the first time indicator was previously displayed and the second graphical object corresponding to the first graphical object (e.g., a non-interactive version of the first graphical object; a visually distinct graphical object representing to the same application as the first graphical object; a graphical object including a subset of the data included in the first graphical object (only mm remaining rather than mm:ss remaining)) is displayed at a fourth brightness level that is lower than the second brightness level, at which the first graphical object was previously displayed.

In some embodiments, visually accentuating one or more visual differences between the second mode and the first mode includes: reducing the brightness level of the second time indicator (e.g., 842 at FIG. 8E) to a brightness level that is less than the third brightness level before displaying the first time indicator at the first brightness level; and reducing the brightness level of the second graphical object (e.g., 820 at FIG. 8E) to a brightness level that is less than the fourth brightness level before displaying the first graphical object at the second brightness level. In some embodiments, the technique reduces the brightness of the graphical elements before brightening them to accentuate the visual difference (e.g., brightness) between the elements in the two states.

In some embodiments, the third size and fourth size are selected based on one or more resizing criteria (e.g., 844 at FIG. 8I) that cause the sizes (and, optionally positions) of elements of the user interface to vary when the device enters the second mode on different occasions (e.g., 808-9 at FIG. 8I) (e.g., even though the sizes and/or positions of corresponding elements of the user interface do not vary when the device enters the first mode on different occasions). In some embodiments, the graphical elements are reduced in size to various sizes such that the reduced sizes are not the same each time the second user interface is displayed in the second mode. In some embodiments, the resizing criteria are based on day of the week, hours of the time, month of the year, and/or year. Selecting a different sizes for content to be displayed enables the display to show the content and avoid having the content be displayed on the display for extended periods of time (e.g., after the animation has stopped) at the same size, thereby reducing the likelihood of the negative effects, such as display burn-in, of displaying the same content at the same location/size on the display.

In some embodiments, the resizing criteria (e.g., 844 at FIG. 8I) is based on one or more of a current hour of the day, a current day of the week, a current date of the month, a current month of year, and a current year (e.g., 808-9 at FIG. 8I). In some embodiments, the one or more resizing criteria cause the sizes (and, optionally positions) of elements of the user interface to vary between various states (e.g., resize by 90% during a first hour, 91% during a second hour, 92% during a third hour, 93% during a fourth hour; resize by 90% during a first day of week, 91% during a second day of week, 92% during a third day of week, 93% during a fourth day of week). Selecting a different sizes for content to be displayed based on hour, day, date, month, and/or year enables the display to show the content and avoid having the content be displayed on the display for extended periods of time (e.g., after the animation has stopped) at the same size, thereby reducing the likelihood of the negative effects, such as display burn-in, of displaying the same content at the same location/size on the display.

In some embodiments, the electronic device (e.g., 600) selects the third size for the second time indicator (e.g., 842 at FIG. 8I) that is different from a size at which the second time indicator was last displayed as part of the second user interface while the electronic device was in the second mode. In some embodiments, the electronic device (e.g., 600) selects the fourth size for the second graphical object (e.g., 820 at FIG. 8I) that is different from a size at which the second graphical object was last displayed as part of the second user interface while the electronic device was in the second mode. In some embodiments, each time that the electronic device transitions from the first mode to the second mode the electronic device display the graphical elements at a size that is different from the last time the graphical element was displayed in the second mode. Selecting a different sizes for content to be displayed enables the display to show the content and avoid having the content be displayed on the display for extended periods of time (e.g., after the animation has stopped) at the same size, thereby reducing the likelihood of the negative effects, such as display burn-in, of displaying the same content at the same location/size on the display.

In some embodiments, a first display brightness (e.g., Average Pixel Luminance (APL)) of the display (e.g., 602 displaying 808-1) while displaying the second user interface while the electronic device is in the second mode (e.g., a lower power consumption mode) is less than a second display brightness (e.g., APL) of the display (e.g., 602 displaying 808-4) while displaying the first user interface (e.g., a clock face of a smart watch) while the electronic device is in the first mode (e.g., a higher power consumption mode). Thus, the overall brightness of the display is reduced when displaying the second user interface while the electronic device is in the second mode as compared to displaying the first user interface while the electronic device is in the first mode. Reducing the overall brightness of the display reduces power usage and improves the battery life of the device, while still enabling the user to access the device.

Note that details of the processes described above with respect to method 900 (e.g., FIG. 9) are also applicable in an analogous manner to the methods described above/below. For example, methods 700, 1100, 1300, 1500, 1700, and 1900 optionally include one or more of the characteristics of the various methods described above with reference to method 900. For example, the first mode is the same mode throughout these methods and the second mode is the same mode throughout these methods. For brevity, these details are not repeated below.

FIGS. 10A-10I illustrate exemplary techniques for displaying user interfaces, in accordance with some embodiments. The user interfaces in these figures are used to illustrate the processes described below, including the processes in FIGS. 11A-11B. In particular, FIGS. 10A-10F illustrate techniques for managing display usage by displaying distinct user interfaces upon determining that the device has met a mode-transition criteria (e.g., as described above with respect to FIGS. 6A-6C) based in part on the level of ambient light detected in the environment surrounding the device.

Figure 10A:
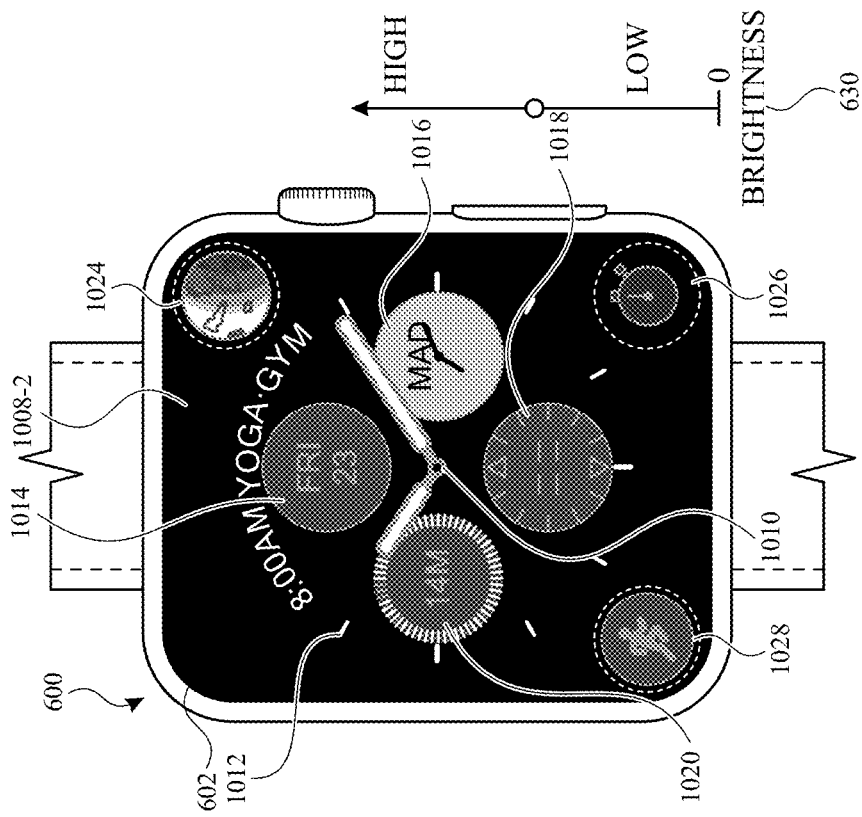
FIGS. 10A-10I illustrate exemplary user interfaces with managed display usage in accordance with embodiments.
Figure 10B:
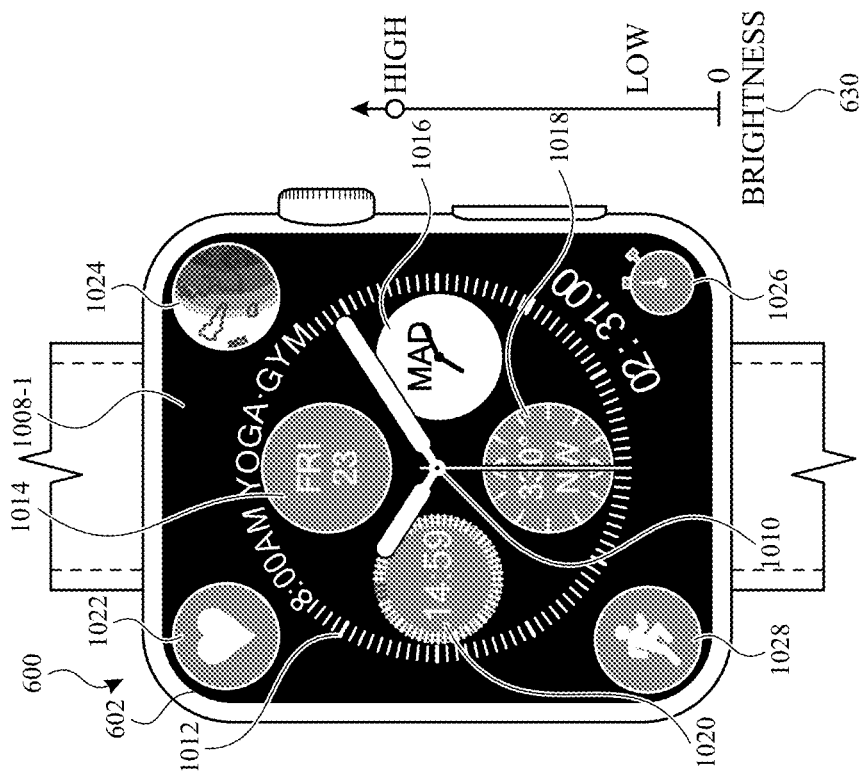
Figure 10D:
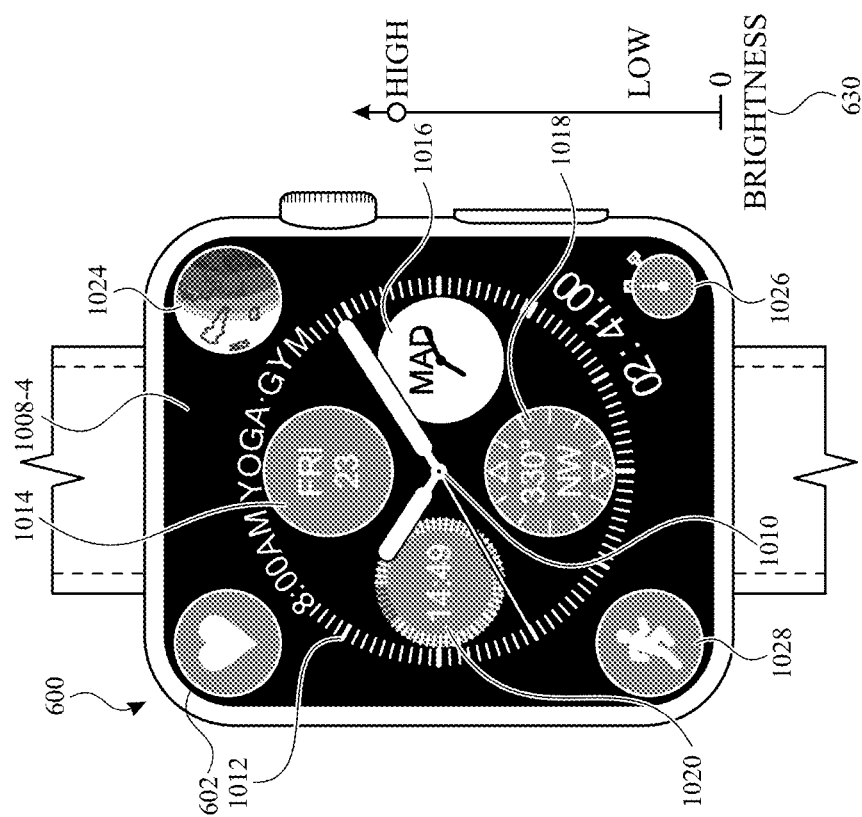
Figure 10C:
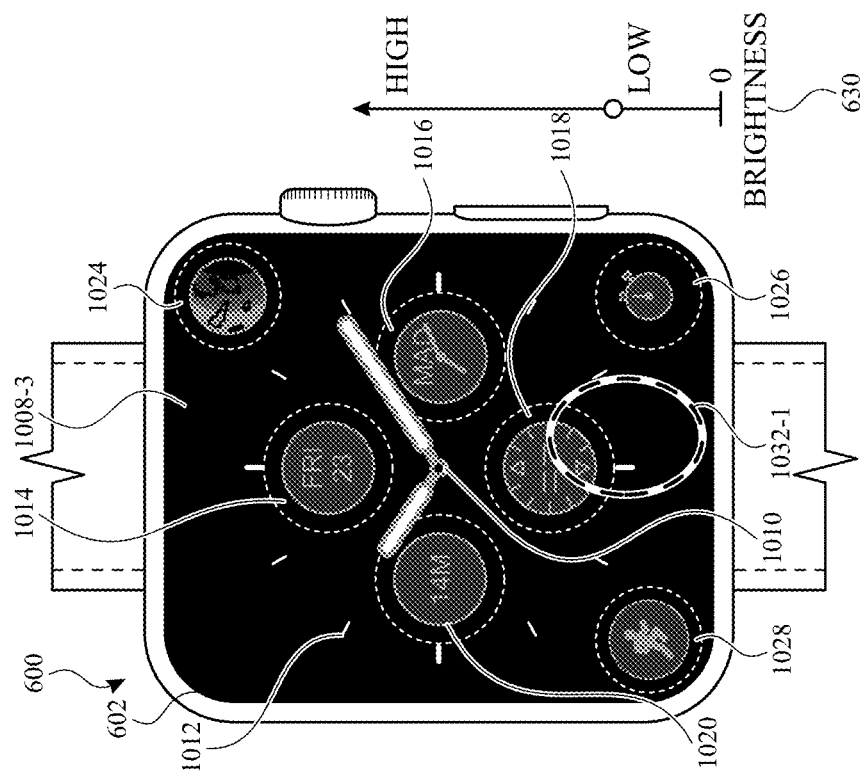

FIGS. 10A-10D depict device 600 operating in a bright environment (e.g., device 600 is in direct sunlight). FIGS. 10A-10C illustrate device 600 transitioning from standard display mode to low power display mode, as described above with respect to FIGS. 6A-6C. At FIG. 10A, device 600 displays clock face user interface 1008-1 while in standard display mode. In some embodiments, clock face user interface 1008-1 corresponds to or is the same as clock face user interface 608-1. At FIG. 10B, device 600 displays clock face user interface 1008-2, which represents a frame of an animation depicting clock face user interface 1008-1 (e.g., a higher power consumption user interface for higher ambient light conditions) visually morphing into clock face user interface 1008-3 (e.g., a lower power consumption interface for higher ambient light conditions).

As depicted in FIG. 10C, at the conclusion of the mode transition, device 600 displays clock face user interface 1008-3 (e.g., a lower power consumption user interface for higher ambient light conditions) on display 602 at a lower brightness compared to the corresponding clock face user interface in standard display mode (e.g., user interface 1008-1 as depicted in FIG. 10A). In some embodiments, clock face user interface 1008-3 corresponds to or is the same as clock face user interface 608-3. In some embodiments, displaying clock face user interface 1008-3 on display 602 at a lower brightness level includes applying a mask (e.g., alpha blending as described above in reference to FIGS. 6A-6X).

As depicted in FIG. 10C, clock face user interface 1008-3 includes date affordance 1014, world clock affordance 1016, compass affordance 1018, timer affordance 1020, moon affordance 1024, stopwatch affordance 1026, and workout affordance 1028, each displayed at a reduced brightness and size relative to their appearance in standard power mode as depicted in FIG. 10A. Additionally, various elements in clock face user interface 1008-3 have been removed or altered relative to their appearance in standard power mode as depicted in FIG. 10A (e.g., as described in reference to FIG. 6C above). For example, heart complication 1022 has been removed, white portions of analog indication of time 1010 and world clock 1016 have been replaced with darker colors (e.g., greys), directional information has been removed compass affordance 1018, portions of stopwatch affordance 1026 (e.g., interior fill) and time scale 1012 (e.g., tick marks) have been removed. In some embodiments, time scale 1012 tick marks are reduced in thickness.

Additionally, analog indication of time 1010 is displayed in a lower brightness relative to its appearance in standard power mode (e.g., as depicted in FIG. 10A) but hasn't dimmed as much as other affordances included in clock face user interface 1008-3. In some embodiments, analog indication time 1010 is further modified to be displayed in a different color (e.g., a color included in the background of clock face user interface 1008-1). In some embodiments, the clock hands of analog indication time 1010 are further modified to be displayed in a different size (e.g., thinner).

At FIG. 10C, device 600 detects user input 1032-1 (e.g., a tap gesture on display 602). In response to user input 1032-1, device 600 displays user interface 1008-4 as depicted in FIG. 10D (e.g., device 600 transitions back to standard display mode as described with respect to FIGS. 6D-6H above). In some embodiments, the transition back to low power mode occurs as described above with respect to FIGS. 6D-6F and FIGS. 8D-8H (e.g., transition includes displaying a transitional animation or in some cases, an emphasis animation prior to displaying a transitional animation). FIG. 10D, depicts device 600, once again operating in a bright environment while in standard display mode (e.g., displaying a higher power consumption interface for higher ambient light conditions). At FIG. 10D, device 600 displays clock face user interface 1008-4. In some embodiments, clock face user interface 1008-4 corresponds to or is the same as clock face user interface 608-1.

Figure 10F:
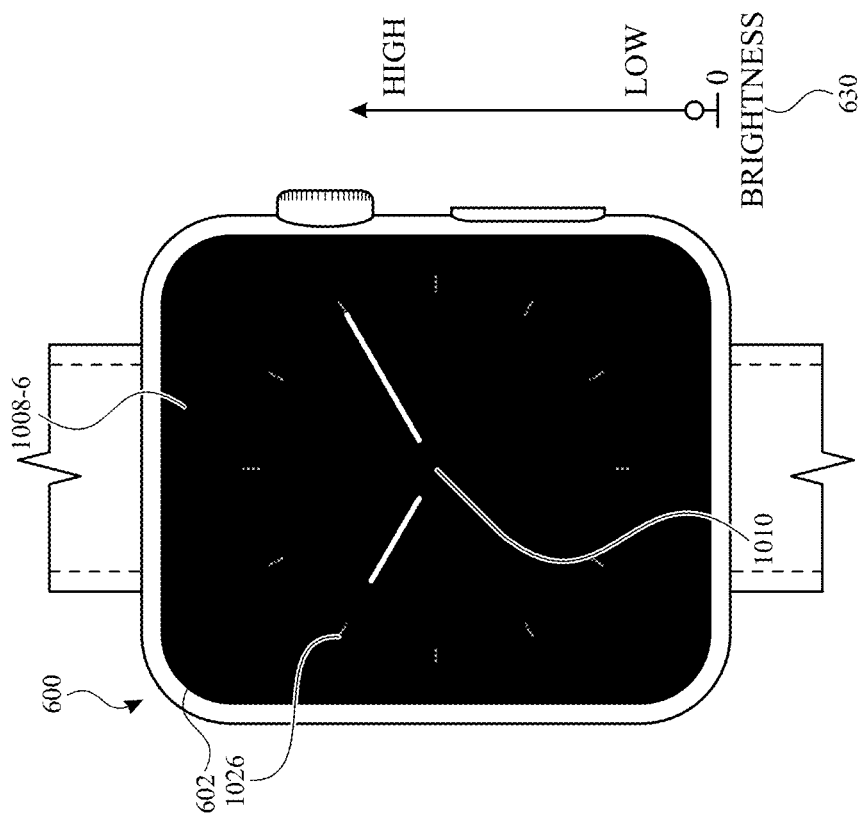
Figure 10E:
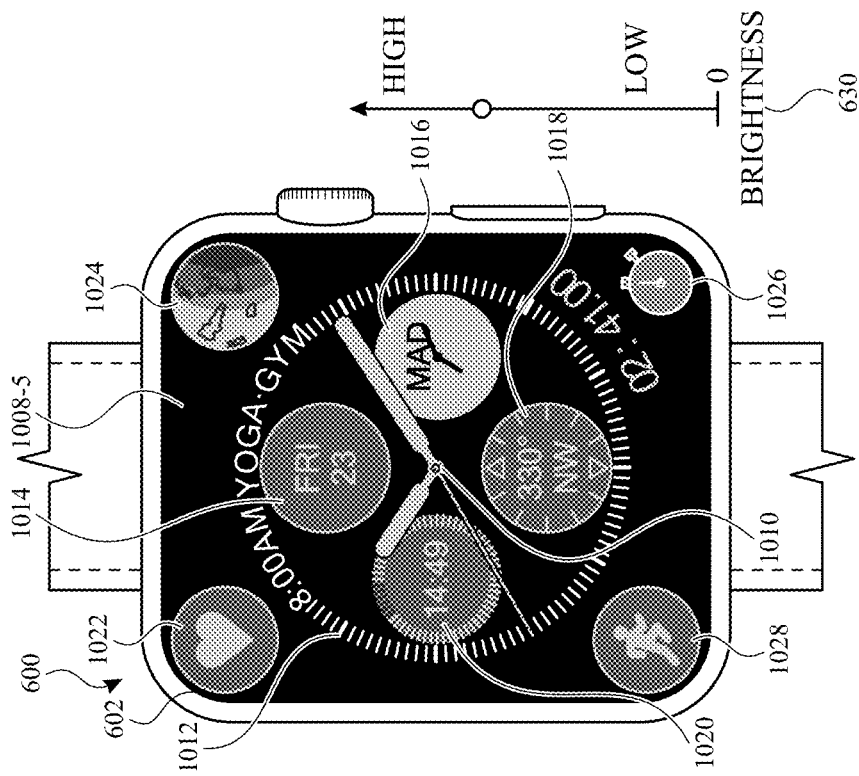

FIG. 10E depicts device 600 after detecting a reduction in environmental brightness while in standard display mode (e.g., a user wearing device 600 walks into a dark movie theater, device 600 determines that a detected environmental brightness value is below a threshold value). In some embodiments, device 600 determines an environmental brightness level based on data detected at one or more sensors of device 600 (e.g., a phototransistor, photodiode, or other light-sensing device).

In response to detecting the drop in environmental brightness, device 600 displays clock face user interface 1008-5 as depicted in FIG. 10E (e.g., device 600 displays a higher power consumption interface for lower ambient light conditions). In FIG. 10E, device 600 display clock face user interface 1008-5 with a reduced brightness relative to the displayed brightness of clock face user interface 1008-4 in FIG. 10E. In some embodiments, displaying clock face user interface 1008-5 on display 602 at lower brightness level includes applying a mask (e.g., alpha blending as described above in reference to FIGS. 6A-6X). As depicted in FIG. 10E, device 600 continues displaying elements corresponding to those displayed in clock face user interface 1008-4, but at reduced brightness levels (e.g., elements on the user interface have not shifted or transformed, and contain the same content relative to the corresponding elements depicted in the higher power consumption interface for higher ambient light condition of FIG. 10D).

FIG. 10F illustrates device 600 after determining that a mode change criteria has been met while device 600 continues to occupy a low light environment (e.g., a mode-transition criteria has been met and in response, device 600 has initiated a transition from standard display mode to low power display mode). In some embodiments, device 600 displays an animation depicting clock face user interface 1008-5 (e.g., higher power consumption user interface for lower ambient light conditions) visually morphing into clock face user interface 1008-6 (e.g., lower power consumption user interface for lower ambient light conditions).

As depicted in FIG. 10F, device 600 displays clock face user interface 1008-6 on display 602 at a lower brightness level than both clock face user interface 1008-5 as depicted FIG. 10E (e.g., the higher power consumption user interface for low ambient light conditions displayed in standard display mode) and clock face user interface 1008-3 as depicted in FIG. 10C (e.g., the lower power consumption user interface for higher ambient light conditions displayed in low power display mode). In some embodiments, displaying clock face user interface 1008-6 on display 602 at the lower brightness level includes applying a mask (e.g., alpha blending as described above in reference to FIGS. 6A-6X).

As depicted in FIG. 10F, clock face user interface 1008-6 only includes analog indication of time 1010 and time scale 1020, however, each is displayed thinner in appearance relative to corresponding elements in FIGS. 10A-10E.

In some embodiments, device 600 first transitions from displaying clock face user interface 1008-1 (e.g., a higher power consumption user interface for high ambient light conditions) to displaying clock face user interface 1008-3 (e.g. a lower power consumption user interface for high ambient light conditions), as described above with respects 10A-10C, then subsequently transitions to displaying clock face user interface 1008-6 (e.g., a lower power consumption user interface for lower ambient light conditions). In some embodiments, portions of analog indication of time 1010 remain brightly displayed (e.g., dimming of hands is foregone, and hands white), when device 600 transitions directly from displaying clock face user interface 1010-3 (e.g. a lower power consumption user interface for high ambient light conditions) to displaying clock face user interface 1008-6 (a lower power consumption user interface for lower ambient light conditions).

In some embodiments, clock face user interface 1008-6 (e.g., lower power consumption user interface for lower ambient light conditions) includes workout affordance 1028 displayed at the brightness level depicted in FIG. 10E (e.g., in clock face user interface 1008-6, the relative difference in brightness between workout affordance 1028 and analog indication of time 1010 is greater than the relative difference in brightness between workout affordance 1028 and analog indication of time 1010, as depicted in clock face user interface 1008-1 of FIG. 10A). In some embodiments, displaying clock face user interface 1008-3 involves other content modifications relative to clock face user interface 1008-3 or clock face user interface 1008-1 (e.g., removing content (e.g., complications, affordances, or portions thereof), altering the composition or size of elements (e.g., color, saturation, size, etc.), and dimming elements at various levels, as describe in reference to FIG. 10C).

Figure 10H:
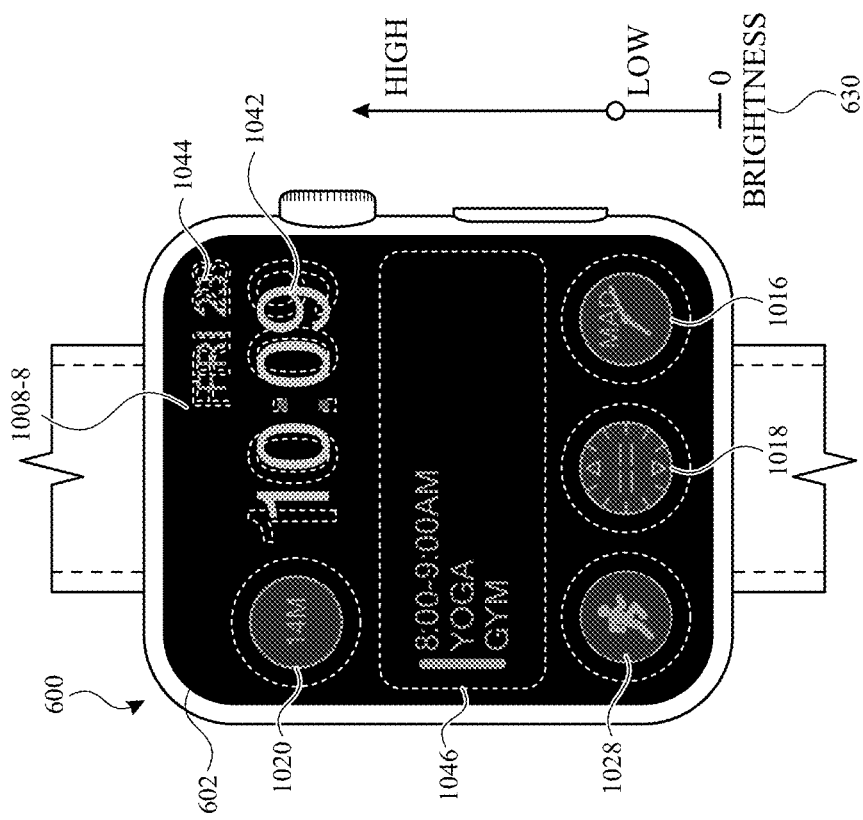
Figure 10G:
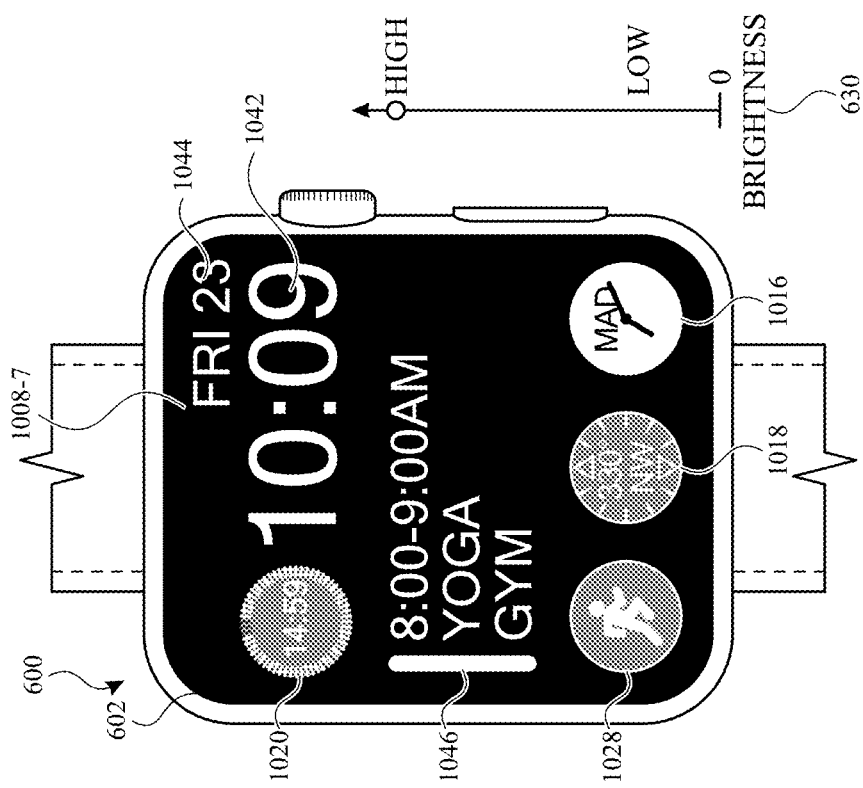
Figure 10I:
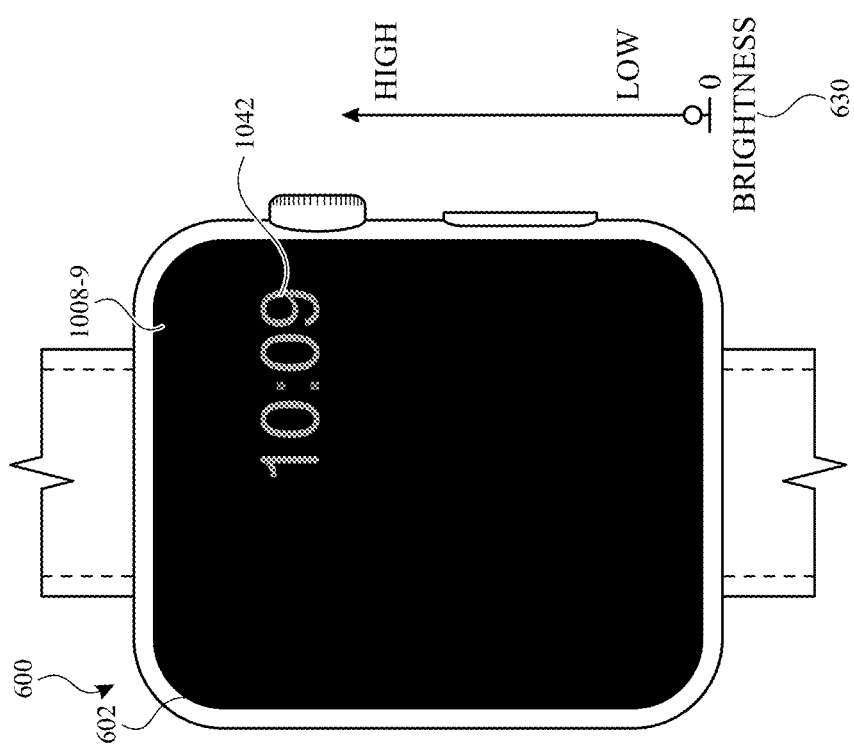

FIGS. 10G-10I illustrate additional clock face user interfaces, in accordance with some embodiments.

FIG. 10G depicts device 600 displaying clock face user interface 1008-7 in standard display mode while in a high ambient light environment (e.g., device 600 displays a higher power consumption user interface for higher ambient light conditions). In some embodiments, clock face user interface 1008-7 corresponds to or is the same as clock face user interface 608-13. In some embodiments, device 600 displays a dimmed version of clock face user interface 1008-7, upon detecting lower ambient light conditions (e.g., as described above in reference to FIG. 10E).

FIG. 10H depicts device 600 displaying clock face user interface 1008-8 in low power display mode while in a bright environment (e.g., device 600 displays a lower power consumption interface for higher ambient light conditions). In some embodiments, clock face user interface 1008-8 corresponds to or is the same as clock face user interface 608-14. As depicted in FIG. 10H, while operating in low power display mode, device 600 displays digital indication of time 1042 in a dimmed state, but at a higher brightness level relative to other displayed complications (e.g., workout affordance 1042, compass affordance 1018, world clock affordance 1016, and timer affordance 1012).

FIG. 10I depicts device 600 displaying clock face user interface 1008-9 in low power display mode while in a low ambient light environment (e.g., device 600 displays a lower power consumption user interface for lower ambient light conditions). In some embodiments, device 600 transitions between these clock face user interfaces (e.g., 1008-6, 1008-7, 1008-9) as described above in reference to FIGS. 10A-10F.

FIGS. 11A-11B are a flow diagram illustrating a method for managing display usage using an electronic device in accordance with some embodiments. Method 1100 is performed at a device (e.g., 100, 300, 500, 600, a smart watch, a smart phone, a tablet computer) with a display and one or more sensors (e.g., ambient light sensor). Some operations in method 1100 are, optionally, combined, the orders of some operations are, optionally, changed, and some operations are, optionally, omitted.

As described below, method 1100 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

While the electronic device (e.g., 600) is in a first mode (e.g., a higher power consumption mode), the electronic device (e.g., 600) displays (1102) on the display (e.g., 602), a first user interface (e.g., 1008-1, 1008-7) (e.g., a clock face of a smart watch; a higher power user interface) at a first display brightness level (e.g., average pixel luminance (APL), average lumen output, total lumen output, average illuminance, or total illuminance of the display; brightness expressed in nits, lux, or lumens). The first user interface includes: a first time indicator (1104) (e.g., 1010 at FIG. 10A) (e.g., an analog clock hand (hour, minute, second hand); a digital clock numeral (hour, minute, second numerals)); and a first graphical object (1106) (e.g., 1020 at FIG. 10A) (e.g., affordances; interactive graphical objects; complications representing applications; non-updating graphical elements (rotation point of a clock hand, colon separating digital clock numerals, clock dial background, etc.)).

The electronic device (e.g., 600) receives (1108) data from the one or more sensors (e.g., a value (digital, analog voltage) representing ambient light measured at a sensor of the electronic device).

The electronic device (e.g., 600) detects (1110) that the electronic device has met criteria for transitioning from the first mode to a second mode (e.g., one or more criteria that are indicative of reduced user activity or reduced user interaction with the electronic device (e.g., determining reduced user activity (physical movement) for a predetermined period of time, determining a lack of user input for a predetermined period of time, detecting a predefined gesture). In some embodiments, detecting that the electronic device has met the criteria includes one or more of: receiving data from one or more sensors (e.g., accelerometer, gyroscope, proximity sensor) corresponding to a user gesture (e.g., wrist-down, wrist-up, palm over display), receiving data from one or more sensors indicating user activity below a threshold activity level, determining a predetermined period of time has elapse without device receiving user input at one or more input devices (e.g., touch-screen, rotatable input mechanism, depressible input mechanism).

In response to detecting that the electronic device has met the criteria for transitioning from the first mode to the second mode, the electronic device (e.g., 600) transitions (1112) the electronic device from the first mode (e.g., a higher power consumption mode) to the second mode (e.g., a lower power consumption mode). As discussed above in greater detail, the first mode and the second mode are different modes in which the electronic device can operate.

While (1114) the electronic device is in the second mode: in accordance with a determination that the data from the one or more sensors corresponds to a first environmental brightness level, the electronic device (e.g., 600) displays (1116) a second user interface (e.g., 1008-3; 1008-8) (e.g., lower power consumption interface for high ambient light conditions) at a second display brightness level less than the first display brightness level (e.g., average pixel luminance (APL) of inactive interface is lower than APL of the active interface). The second user interface includes: a second time indicator (1118) (e.g., 1010 at FIG. 10C) different from the first time indicator in one or more visual characteristics other than brightness (e.g., position, size, color, hue, saturation, opacity, shape); and a second graphical object (1120) (e.g., 1020 at FIG. 10C) that corresponds to the first graphical object (e.g., differs from the first graphical object in one or more visual characteristics that is other than brightness (position, size, color, hue, saturation, opacity, shape)).

While (1114) the electronic device is in the second mode: in accordance with a determination that the data from the one or more sensors corresponds to a second environmental brightness level lower than the first environmental brightness level, the electronic device (e.g., 600) displays (1122) a third user interface user interface (e.g., 1008-6) (e.g., a lower power consumption interface for low ambient light conditions) at a third display brightness level lower than the second display brightness level (e.g., average pixel luminance (APL) of the lower power consumption interface for low ambient light conditions is less than the APL of the lower power consumption interface for high ambient light conditions). The third user interface includes different content (e.g., 1008-6) than the second user interface (e.g., the third user interface includes a third time indicator different from the second time indicator (e.g., the third time indicator differs from the second time indicator in one or more visual characteristics (size, color, hue, saturation, opacity, shape)); the second user interface includes one or more graphical objects not included in the third user interface (e.g., the second includes a seconds indicator (analog or digital) and third user interface does not include a seconds indicator); the third user interface includes a subset of the graphical objects included in the second interface (e.g., second user interface includes hour ticks and a seconds scale, and third user interface includes hour ticks but does not include a seconds scale); the second user interface includes a greater quantity of graphical objects than the third user interface (e.g., second user interface includes twelve hour markers (e.g., 1-12) and the third user interface includes four hour markers (e.g., 12, 3, 6, 9)); the second user interface includes one or more affordances (complications) and the third user interface does not include at least one of the one or more affordances).

In some embodiments, the electronic device (e.g., 600) detects that the electronic device has not met criteria for transitioning from the first mode to the second mode (e.g., prior to detecting that the electronic device has met criteria for transitioning from the first mode to a second mode). In response to detecting that the electronic device has not met the criteria for transitioning from the first mode to the second mode: in accordance with a determination that second data from the one or more sensors corresponds to a third environmental brightness level, the electronic device (e.g., 600) displays the first user interface (e.g., 1008-5) at a fourth display brightness level different from (e.g., less than) the first display brightness level without transitioning the electronic device from the first mode (e.g., a higher power consumption mode) to the second mode (e.g., a lower power consumption mode) (e.g., maintain the electronic device in the first mode and continue to display the same user interface but at a different brightness level). In some embodiments, in accordance with a determination that the data from the one or more sensors corresponds to an environmental brightness level different from the third brightness level, the electronic device continues to display the first user interface at the first display brightness level and does not transition the electronic device from the first mode (e.g., a higher power consumption mode) to the second mode (e.g., a lower power consumption mode) (e.g., maintain the electronic device in the first mode and continue to display the same user interface at the same brightness level). Changing the brightness of the display based on environmental brightness allows the contents of the display to be more easily visible in bright ambient light, thereby providing the user with improved visual feedback, while reducing battery usage in reduced ambient light environments. Providing improved visual feedback to the user enhances the operability of the device and makes the user-device interface more efficient (e.g., by helping the user to provide proper inputs and reducing user mistakes when operating/interacting with the device). Reducing the display brightness reduces power usage and improves the battery life of the device.

In some embodiments, transitioning the electronic device from the first mode (e.g., a higher power consumption mode) to the second mode (e.g., a lower power consumption mode) includes changing the color of one or more user interface elements (e.g., 1010, 1014, 1016, 1018, 1020, 1024, 1026, 1028) having a first color (e.g., white) to be a color other than the first color (e.g., a darker color). In some embodiments, the electronic device changes the color of one or more white user interface elements of the first user interface to a first color when displaying the second user interface and to a second color (different from the first color) when displaying the third user interface. Changing certain colored elements (e.g., white-colored, lighter colored) to a different color allows the device reduce the brightness of elements that more significantly affect battery consumption and to mitigate the negative effects of displaying bright content at the same location on the display, such as display burn-in, while at the same time reducing the display brightness, which reduces power usage and improves the battery life of the device.

In some embodiments, the first graphical object (e.g., 1014, 1018, 1020, and 1026 at FIG. 10A) is a complication (e.g., a calendar complication; a complication that displays data received from an application, such as a calendar application) corresponding to a respective application and that includes display of data received from the respective application. In some embodiments, the second graphical object (e.g., 1014, 1018, 1020, and 1026 at FIG. 10C) corresponds to the respective application and does not include display of data from the respective application. In some embodiments, the complication displays data received from the respective application while in the first mode, but does not receive and/or display the data from the respective application while in the second mode, thereby reducing the electronic device's power consumption. In some embodiments, the electronic device displays (while in the second mode) a tick or dash mark instead of the data to indicate that the data is not being displayed. Reducing the information displayed enables the device to conserve battery power by avoiding energizing the pixels that the content previously used (e.g., turning off the pixels) and by reducing the requirement for the device to process data to determine the information for display.

Reducing processing needs reduces power and improves battery life. Avoiding energizing pixels of the display reduces the display brightness, thereby reducing power usage and improving the battery life of the device.

In some embodiments, displaying the second user interface (e.g., 1008-3, 1008-8) (e.g., lower power consumption interface for high ambient light conditions) at the second display brightness level includes applying a mask (e.g., a black mask, a gray mask; an overlay) to a display area. In some embodiments, the electronic device applies a mask the display to reduce the brightness level of the display. In some embodiments, displaying the third user interface (e.g., lower power consumption interface for low ambient light conditions) at the third display brightness level includes applying a black (or gray, or other color) mask to a display area. Applying a mask, such as a black or gray mask, to a display area reduces the display brightness with which that area is displayed. Reducing the display brightness reduces power usage and improves the battery life of the device.

In some embodiments, displaying the second user interface (e.g., 1008-3, 1008-8) (e.g., lower power consumption interface for high ambient light conditions) at the second display brightness level includes turning off one or more pixels (e.g., 1014, 1018, 1020, and 1026 at FIG. 10A) (e.g., that were on in the first mode when displaying the first user interface). In some embodiments, displaying the third user interface (e.g., lower power consumption interface for low ambient light conditions) at the third display brightness level includes turning off one or more pixels (e.g., that were on in the first mode when displaying the first user interface). Turning off one or more pixels enables the device to conserve battery power by avoiding energizing the pixels that the content previously used. Avoiding energizing pixels of the display reduces the display brightness, which reduces power usage and improves the battery life of the device.

In some embodiments, the first graphical object (e.g., 1014, 1016, 1018, 1020, 1024, 1026, and 1028 at FIG. 10A) corresponds to a respective application. In some embodiments, the second graphical object (e.g., 1014, 1016, 1018, 1020, 1024, 1026, and 1028 at FIG. 10C) corresponds to the respective application. In some embodiments, the third user interface (e.g., 1008-6, 1008-9) does not include a graphical object corresponding to the respective application. In some embodiments, the first and second graphical objects are complications and the third user interface does not include a complication corresponding to the respective application. Thus, in some embodiments, when the electronic device transitions from the first mode to the second mode and updates the displayed user interface, the electronic device ceases to display a complication in the second mode that was previously displayed in the first mode when displaying the third user interface. Removing content from the displays enables the device to conserve battery power by avoiding energizing the pixels (e.g., turning off the pixels) that the content would otherwise use. Avoiding energizing pixels of the display reduces the display brightness, which reduces power usage and improves the battery life of the device.

In some embodiments, the first time indicator (e.g., 1010 at FIG. 10A) includes one or more clock hands indicating time that are displayed at a first brightness level. In some embodiments, the second time indicator (e.g., 1010 at FIG. 10C) includes one or more clock hands indicating time that are displayed at a second brightness level that is less than the first brightness level. In some embodiments, the third time indicator includes one or more clock hands indicating time that are displayed at a third brightness level that is less than the second brightness level. Reducing the brightness of displayed clock hands on the display reduces the display brightness, which reduces power usage and improves the battery life of the device.

In some embodiments, the first time indicator (e.g., 1010 at FIG. 10A) includes one or more clock hands indicating time that are displayed at a first thickness level. In some embodiments, the second time indicator (e.g., inner portions of hands of 1010 at FIG. 10C are thinner) includes one or more clock hands indicating time that are displayed at a second thickness level that is less than the first thickness level. In some embodiments, the third time indicator includes one or more hands indicating time that are displayed at a third thickness level that is less than the second thickness level. Reducing the thickness of visual elements on the display enables the device to conserve battery power by avoiding energizing the pixels that the visual elements previously used (e.g., by turning off the pixels not required to display the less-thick version of the visual element). Avoiding energizing pixels of the display reduces the display brightness, which reduces power usage and improves the battery life of the device.

In some embodiments, the first user interface includes a first set of tick marks (e.g., indicating locations corresponding to respective times) displayed with a fourth thickness. In some embodiments, the second user interface (e.g., 1008-3) includes a second set of tick marks (e.g., 1012 at FIG. 10C) (e.g., indicating locations corresponding to respective times) displayed with a fifth thickness that is less than the fourth thickness (e.g., without displaying the first set of tick marks). In some embodiments, the third user interface includes a third set of tick marks with a sixth thickness that is less than the fifth thickness (e.g., without displaying the first or second tick marks). Reducing the thickness of visual elements on the display enables the device to conserve battery power by avoiding energizing the pixels that the visual elements previously used (e.g., by turning off the pixels not required to display the less-thick version of the visual element). Avoiding energizing pixels of the display reduces the display brightness, which reduces power usage and improves the battery life of the device.

In some embodiments, a rate of change (e.g., illustrated by change in shading between 1008-1 and 1008-3 of elements 1010 and 1016) in brightness for transitioning from display of the first time indicator to display of the second time indicator is faster than the rate of change in brightness for transitioning from display of the first graphical object to the second graphical object.

In some embodiments, the second user interface (e.g., 1008-3, 1008-7) includes a first complication corresponding to a first application and the third user interface (e.g., 1008-6, 1008-9) includes a second complication corresponding to the first application and a third time indicator. In some embodiments, a difference in brightness between the second time indicator and the first complication is less than a different in brightness between the third time indicator and the second complication.

In some embodiments, the first user interface (e.g., 1008-1) includes a first graphical element (e.g., 1028 of FIG. 10A) of a second color. In some embodiments, the second user (e.g., 1008-3) interface includes a second graphical element (e.g., 1028 of FIG. 10C) corresponding to the first graphical element, wherein the second graphical element is of a third color (e.g., black, gray) different from the second color. Changing certain colored elements (e.g., white-colored, lighter colored) to a different color allows the device reduce the brightness of elements that more significantly affect battery consumption and to mitigate the negative effects of displaying bright content at the same location on the display, such as display burn-in, while at the same time reducing the display brightness, which reduces power usage and improves the battery life of the device.

In some embodiments, a background of the first user interface (e.g., 1008-1) has a third color that is different from a color of the first time indicator. In some embodiments, the second time indicator is displayed in the third color in the second user interface (e.g., 1008-3).

In some embodiments, the first user interface (e.g., 1008-1) includes a first level of color saturation. In some embodiments, the second user interface (e.g., 1008-3) includes a second level of color saturation that is different from (e.g., less than or greater than) the first level of color saturation. In some embodiments, the technique reduces the color saturation of graphical elements when transitioning from the first mode to the second mode. In some embodiments, the technique reduces the color saturation to zero, thereby displaying the user interfaces in monochrome. In some embodiments, the technique reduces the color saturation to zero for certain colors while not reducing the color saturation to zero (but optionally still reducing) for other colors. Reducing the saturation of colors (or of certain colors or elements) mitigates the negative effects of displaying content at the same location on the display, such as display burn-in, while at the same time reducing the display brightness, which reduces power usage and improves the battery life of the device.

Note that details of the processes described above with respect to method 1100 (e.g., FIGS. 11A-11B) are also applicable in an analogous manner to the methods described above/below. For example, methods 700, 900, 1300, 1500, 1700, and 1900 optionally include one or more of the characteristics of the various methods described above with reference to method 1100. For example, the first mode is the same mode throughout these methods and the second mode is the same mode throughout these methods. For brevity, these details are not repeated below.

FIGS. 12A-12I illustrate exemplary techniques for displaying user interfaces, in accordance with some embodiments. The user interfaces in these figures are used to illustrate the processes described below, including the processes in FIG. 13. In particular, FIGS. 12A-12I illustrate techniques for managing display usage by updating displayed content on a user interface at different time intervals (e.g., at different rates) based in part on a current device mode (e.g., standard display mode and low power display mode as described above with respect to FIG. 6A-6C).

FIGS. 12A-12D depict device 600 in standard display mode at four different times (e.g., at 10:09:01, 10:09:02, 10:10:01, and 10:10:02 as labeled). FIGS. 12A-12D illustrate how various elements of a displayed clock face user interface update over time while device 600 operates in standard display mode (e.g., as described above).

In FIG. 12A, at a time of 10:09:01, device 600 displays clock face user interface 1208-1. In some embodiments, clock face user interface 1208-1 corresponds to or is the same as clock face user interface 608-1. As depicted in FIG. 12A, clock face user interface 1208-1 includes analog indication of time 1210, time scale 1212, date affordance 1214, compass affordance 1218, timer affordance 1220, heart rate affordance 1222, and stopwatch affordance 1226 (e.g., as described above with respect to similar elements illustrated in FIG. 6A). Additionally, clock face user interface 1208-1 includes cellular affordance 1278, noise affordance 1280, and music affordance 1282.

Cellular affordance 1278 includes four circular indicators (e.g., dots) which change appearance in response to changes to a cellular signal strength detected by device 600 (e.g., circular indicators appearing as either solidly-colored or as outlines, a greater number of solidly-colored circular indicators representing a stronger detected signal strength). As depicted in FIG. 12A, cellular affordance 1278 includes four solidly-colored circular dots indicating a strong cellular signal strength. In some embodiments, the circular indicators are removed to indicate a signal strength that has fallen below a threshold strength (e.g., to indicate no cellular signal or no cellular connectivity).

Noise affordance 1280 includes graphical (e.g., meter graphic), numerical (e.g., "40 dB"), and symbolic (e.g., check mark) indicators which update in response to changes to one or more environmental noise levels detected by device 600. The graphical indicator includes radially-oriented segments which are sequentially emphasized (e.g., transitioned from a first visual appearance to a second visual appearance) in a clockwise direction as a detected noise level increases, and vice versa. In some embodiments, the radially-oriented segments are emphasized with a color based in part on a threshold noise level (e.g., emphasized segments are green when a detected noise level is below a threshold noise level and yellow when a detected noise level is not below the threshold noise level). In some embodiments, the status indicator is updated based in part on a threshold noise level (e.g., including an "OK" or a first graphical element (e.g., a checkmark) when the noise level is below a threshold and "LOUD" or a second graphical element (e.g., an exclamation point) when the noise level is at or above the threshold). In some embodiments, the graphical, numerical, and symbolic indicators are based on different sampling windows of the same noise data and as a result, update at different rates (e.g., graphical and numerical indicators based on an averaged detected noise level over a 1-second window; symbolic indicator based on an averaged detected noise level over a 1-second window). As depicted in FIG. 12A, at 10:09:01, noise affordance 1280 indicates detected noise level of 40-decibels (e.g., "40 dB") which is below a threshold value (e.g., as indicated by the check mark).

Music affordance 1282 includes a graphical icon (e.g., musical note) surrounded by a circular progress indicator depicting a playback position associated with a music application on device 600 (e.g., a playback position of a media file currently being played or accessed by the music application). As a playback position advances, a portion of the circular progress indicator is progressively emphasized (e.g., transitioned from a first visual appearance to a second visual appearance) in a clockwise direction, beginning at the top of the affordance (e.g., beginning at the twelve o'clock position). As depicted in FIG. 12A, music affordance 1282 indicates a first playback position (e.g., the emphasized portion of the circular progress indicator begins at the twelve o'clock position and ends at the three o'clock position, occupying 25% of the ring). At FIG. 12B, at a time of 10:09:02, device 600 displays clock face user interface 1208-2. In FIG. 12B, device 600 displays updated depictions of analog indication of time 1210, music affordance 1282, timer affordance 1220, and stopwatch affordance 1226 indicating that 1-second has elapsed since device 600 displayed clock face user interface 1208-1. For example, the seconds hand of analog indication of time 1210 had progressed, the playback position indicated by music affordance 1282 has increased (e.g., the emphasized portion of the circular progress indicator of music affordance 1282 has grown slightly beyond the 3-o'clock position depicted in FIG. 12A), timer affordance 1220 has decremented, and stopwatch affordance has incremented, each by an amount corresponding to 1-second. In some embodiments, updating displayed content as discussed above, includes waking a processor of device 600 or performing processing tasks associated with displaying content.

At FIG. 12C, at a time of 10:10:01, device 600 displays clock face user interface 1208-3. In FIG. 12D, device 600 displays updated depictions of analog indication of time 1210, music affordance 1282, timer affordance 1220, and stopwatch affordance 1226 indicating that 59-seconds have elapsed since device 600 displayed clock face user interface 1208-2. For example, as depicted in FIG. 12C, the emphasized portion of the circular progress indicator of music affordance 1282 has grown well beyond the position depicted in FIG. 12B).

At FIG. 12D, at a time of 10:10:02, device 600 displays clock face user interface 1208-4. In FIG. 12D, device 600 displays updated depictions of analog indication of time 1210, music affordance 1282, timer affordance 1220, and stopwatch affordance 1226, indicating that 1-second has elapsed since device 600 displayed clock face user interface 1208-3. For example, as depicted in FIG. 12C, the emphasized portion of the circular progress indicator of music affordance 1282 has grown slightly beyond the position depicted in FIG. 12C).

FIGS. 12E-12H depict device 600 after transitioning to low power display mode (e.g., as describe above with respect to FIG. 6A-6C) at the same points in time described above with respect to FIGS. 12A-12D (e.g., at 10:09:01, 10:09:02, 10:10:01, and 10:10:02). In some embodiments, prior to transitioning from standard display mode to low power display mode, device 600 pre-computes content for display in low power display mode (e.g., device 600 determines what content will need to be displayed in low power display mode, prepares representations (e.g., images) of the content, and store the prepared representations for periodic retrieval and display while in low-power display). FIGS. 12E-12H illustrate how corresponding elements of a displayed clock face user interface update differently in low power display mode than in standard display mode. As depicted in FIGS. 12E-12H, device 600 displays each respective clock face user interface at a lower brightness level than the corresponding clock face user interfaces displayed in FIGS. 12A-12D.

Figure 12E:
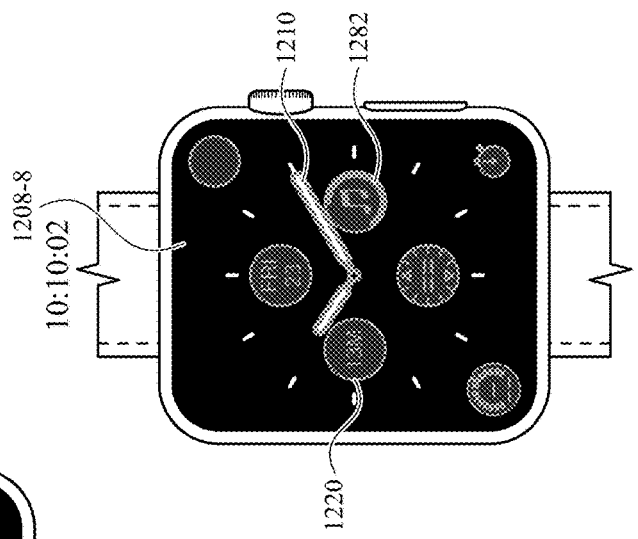

At FIG. 12E, at a time of 10:09:01, device 600 displays clock face user interface 1208-5. In some embodiments, clock face user interface 1208-5 corresponds to or is the same as clock face user interface 608-3. As depicted in FIG. 12E, clock face user interface 1208-5 includes analog indication of time 1210 indicating a current time of 10:09 relative to time scale 1212, date affordance 1214 indicating a current date (e.g., "FRI 23"), timer affordance 1220 indicating 14 minutes remaining on an associated timer, and music affordance 1282 indicating a first playback position (e.g., as described in FIG. 12A). Additionally, clock face user interface 1208-5 includes stopwatch affordance 1226 and cellular affordance 1278, which do not indicate data while device 600 operates in low power mode. In some embodiments, stopwatch affordance 1226 displays minutes data (e.g., does not display second-level data) while in low power mode similar to timer affordance 1220.

As depicted in FIG. 12E, while in low power display mode, device 600 displays analog indication of time 1210, cellular affordance 1278, noise affordance 1280, and music affordance 1282 differently relative to their respective appearances in clock face user interface 1208-1 (e.g., each affordance is displayed at a lower brightness, and in some cases, includes less content in low power display mode than in standard display mode). As depicted in FIG. 12E, elements associated with data that updates at least every second (e.g., data that updates each second or more often than each second) have been removed (e.g., compared to clock face user interface 1208-1). For example, as depicted in FIG. 12E, analog indication of time 1210 no longer includes a seconds hands, compass affordance 1218 no longer includes directional indicators, timer affordance 1220 no longer includes an indication of seconds, cellular affordance 1278 no longer includes circular indicators to indicate a signal strength, and noise affordance 1280 no longer includes indications of one or more noise levels. In some embodiments, while device 600 operates in low power display mode, music affordance 1282 does not include an indication of a playback position.

In some embodiments, music affordance 1282 includes a track description (e.g., a song title) in place of or in addition to the circular progress indicator. While operating in standard display and low power display modes, device 600 updates the track description (e.g., to indicate a media file currently being played or accessed) in a manner corresponding to the updates to performed to the progress indicator as described herein. For example, while in standard display mode, device 600 updates the track description every second (e.g., at 10:09:02, 10:10:01, and 10:10:02 as depicted in FIGS. 12A-12D). In contrast, while in low power display mode, device 600 updates the track description every minute (e.g., at 10:10:01 as depicted in FIGS. 12E-12H).

Figure 12F:
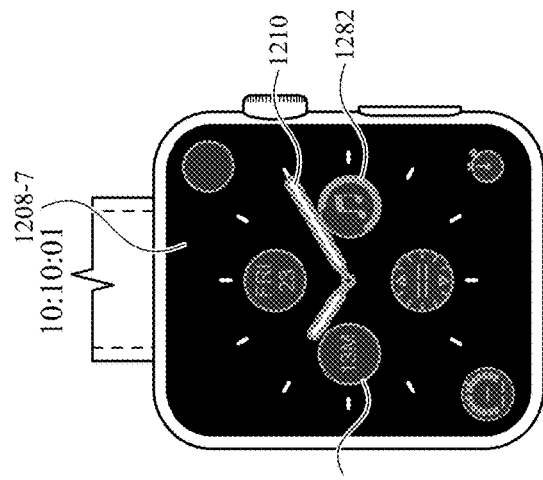

At FIG. 12F, at a time of 10:09:02, device 600 displays clock face user interface 1208-6. As depicted in FIG. 12F, clock face user interface 1208-6 is identical to clock face user interface 1208-5 despite the passage of time from 10:09:01 to 10:09:02. That is, compared to device 600 updating each second while in standard display as depicted in FIGS. 12A-12B, while operating in low power display mode, device 600 updates displayed content every minute (e.g., device 600 updates displayed data less frequently (e.g., at a decreased rate; at increased time intervals)).

Figure 12G:
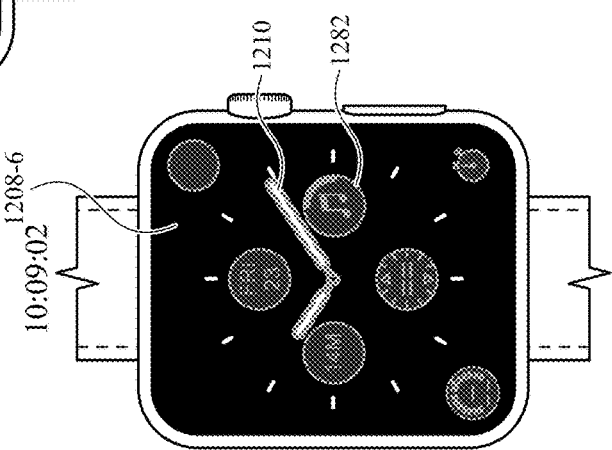

At FIG. 12G, at a time of 10:10:01, device 600 displays clock face user interface 1208-7. In FIG. 12G, device 600 displays updated depictions of analog indication of time 1210, timer affordance 1220, and music affordance 1282 indicating that 1-minute has elapsed since device 600 displayed clock face user interface 1208-5. For example, as depicted in FIG. 12G, the emphasized portion of the circular progress indicator of music affordance 1282 has grown beyond the position depicted in FIGS. 12E and 12F.

Figure 12H:
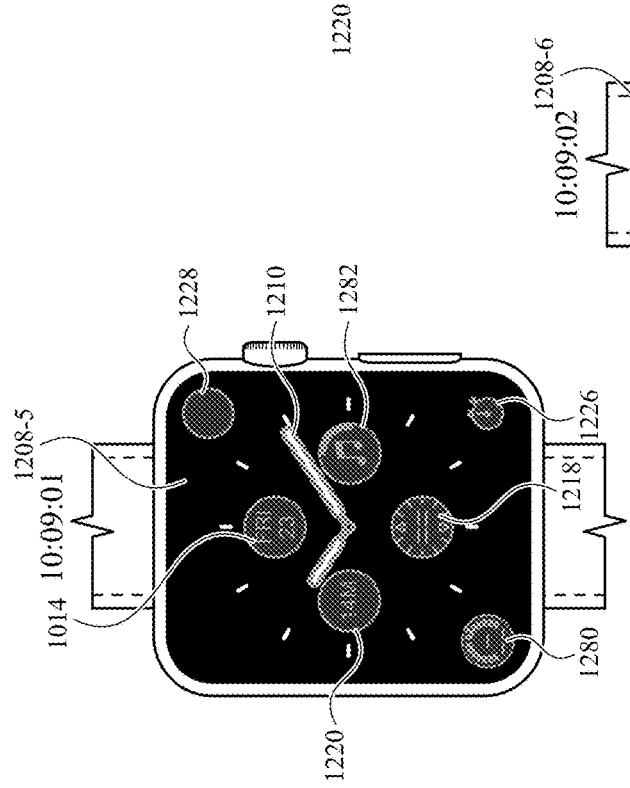

At FIG. 12H, at a time of 10:10:02, device 600 displays clock face user interface 1208-8. As depicted in FIG. 12H, clock face user interface 1208-8 is identical to clock face user interface 1208-7 despite the passage of time from 10:10:01 to 10:10:02. In some embodiments, device 600 continues updating every minute while in low power display mode. In some embodiments, rather than update every minute while in low power display mode, device 600 updates displayed content at a different interval of time (e.g., at 30-second intervals, at 5-minute intervals, etc.).

Figure 12I:
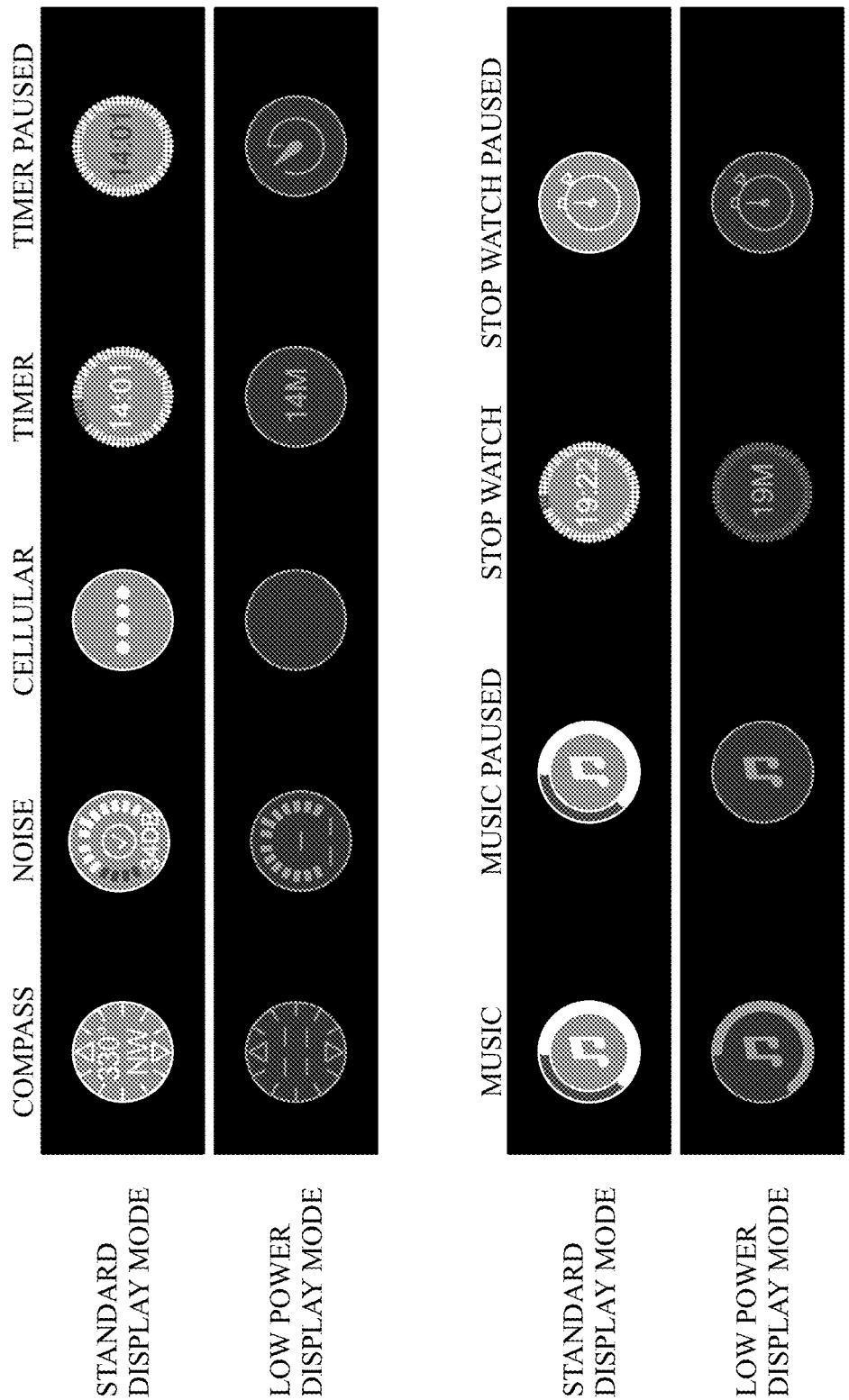

FIG. 12I is a chart depicting various affordances that can be included on a clock face user interface, in accordance with some embodiments. As depicted in FIG. 12I, the appearance of a respective affordance can differ based on a device mode (e.g., standard display mode or low power display mode) and application state (e.g., pause or not paused). For example, elements of an affordance corresponding to data that updates frequently (e.g., every second) while device 600 operates in standard display mode, are not included in the corresponding low power mode representations of the same affordance.

FIG. 13 is a flow diagram illustrating a method for managing display usage using an electronic device in accordance with some embodiments. Method 1300 is performed at a device (e.g., 100, 300, 500, 600, a smart watch, a smart phone, a tablet computer) with a display. Some operations in method 1300 are, optionally, combined, the orders of some operations are, optionally, changed, and some operations are, optionally, omitted.

As described below, method 1300 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

The electronic device (e.g., device 600) displays (1302) a user interface (e.g., 1208-1) that includes a plurality of user interface elements including a graphical representation (e.g., 1220 at FIG. 12A) of a first type of information that is associated with a first application.

While (1304) the electronic device is in a first mode (e.g., a higher power consumption mode), the electronic device (e.g., device 600) updates (1306) the appearance of the graphical representation of the first type of information over time with a first update interval (e.g., transition from 1208-1 to 1208-2).

While (1304) the electronic device is in the first mode (e.g., a higher power consumption mode) and after updating the appearance of the graphical representation of the first type of information over time one or more times at the first update interval, the electronic device (e.g., device 600) detects (1308) that the electronic device has met criteria for transitioning from the first mode to a second mode.

In response to detecting that the electronic device has met the criteria for transitioning from the first mode to the second mode, the electronic device (e.g., device 600) transitions (1310) the electronic device from the first mode (e.g., a higher power consumption mode) to the second mode (e.g., a lower power consumption mode). As discussed above in greater detail, the first mode and the second mode are different modes in which the electronic device can operate.

While the electronic device is in the second mode, the electronic device (e.g., device 600) updates (1312) the appearance of the graphical representation of the first type of information (e.g., 1220 at FIG. 12E) over time with a second update interval (e.g., transition from 1208-5 to 1208-7) that is different from the first update interval. Changing the interval at which the appearance of graphical elements are displayed enables the device to reduce processing time (e.g., calculations) for graphics processor(s) and general purpose processor(s), because fewer user interfaces need to be generated. The reduction in processing time, enables processors to operate in a very low power state for longer periods of time (e.g., when user interfaces are not changing), and thus activity at the device does not need to be monitored, which reduces power usage and improves the battery life of the device.

In some embodiments, the plurality of user interface elements includes a graphical representation (e.g., 1282 at FIG. 12A) of a second type of information that is associated with a second application (e.g., data received from the application is optionally displayed as part of the graphical representation). While the electronic device is in the first mode (e.g., a higher power consumption mode), the electronic device (e.g., device 600) updates the appearance of the graphical representation (e.g., transition from 1208-1 to 1208-2) of the second type of information over time with a third update interval (e.g., same as or different from the first update interval). In some embodiments, detecting that the electronic device has met criteria for transitioning from the first mode to the second mode occurs after updating the appearance of the graphical representation of the second type of information over time one or more times at the third update interval. While the electronic device is in the second mode, the electronic device (e.g., 600) updates the appearance of the graphical representation (e.g., 1282 at FIG. 12E) of the second type of information over time with a fourth update interval (e.g., transition from 1208-5 to 1208-7) (e.g., the same as or different from the second update interval) that is different from the third update interval. Changing the interval at which the appearance of graphical elements are displayed enables the device to reduce processing time (e.g., calculations) for graphics processor(s) and general purpose processor(s), because fewer user interfaces need to be generated and displayed. The reduction in processing time enables processors to operate in a very low power state for longer periods of time (e.g., when user interfaces are not changing), and thus activity at the device does not need to be monitored, which reduces power usage and improves the battery life of the device.

In some embodiments, displaying the user interface that includes the plurality of user interface elements includes displaying, as part of the user interface and concurrently with the graphical representation of the first type of information, a time indicator (e.g., 1210) (e.g., watch hands that indicate the current time, digital readout that indicates the current time, an analog clock hand (hour, minute, second hand); a digital clock numeral (hour, minute, second numerals).

In some embodiments, while the electronic device is operating in the first mode, the electronic device (e.g., 600) updates the time indicator (e.g., 1210 at FIGS. 12A-12B) over time with a fifth update interval. While the electronic device is operating in the second mode, the electronic device (e.g., 600) updates updating the time indicator (e.g., 1210 at FIGS. 12E-12G) over time with a sixth update interval that is different from the fifth update interval (e.g., slower than the third update interval). In some embodiments, the time indicator is updated every second while in the first mode and updated every minute while in the second mode. Changing the interval at which the appearance of graphical elements are displayed enables the device to reduce processing time (e.g., calculations) for graphics processor(s) and general purpose processor(s), because fewer user interfaces need to be generated and displayed. The reduction in processing time, enables processors to operate in a very low power state for longer periods of time (e.g., when user interfaces are not changing), and thus activity at the device does not need to be monitored, which reduces power usage and improves the battery life of the device.

In some embodiments, the graphical representation (e.g., 1220 and 1282 at FIGS. 12A-12D) of the first type of information displayed in the first mode has one or more visual characteristics that are different from the graphical representation (e.g., 1220 and 1282 at FIGS. 12E-12H) of the first type of information displayed in the second mode. In some embodiments, the graphical representation is displayed at a higher brightness level in the first mode than in the second mode. In some embodiments, the graphical representation is displayed at a larger size in the first mode than in the second mode. In some embodiments, the graphical representation is displayed in color in the first mode and in monochrome in the second mode or, more generally, has a different level of color saturation.

In some embodiments, the first mode (e.g., operation of device 600 in FIGS. 12A-12D) is a higher power consumption mode (e.g., higher power consumption via the display of the electronic device and/or one or more processors). In some embodiments, the second mode (e.g., operation of device 600 in FIGS. 12E-12H) is a lower power consumption mode. In some embodiments, the electronic device (e.g., 600) consumes more power in the higher power consumption mode than in the lower power consumption mode.

In some embodiments, the first update interval is based on an activity level of the first application. In some embodiments, the second update interval is not based on the activity level of the first application. In some embodiments, both the first update interval and the second update interval are based on the activity level of the first application. Changing the interval at which the appearance of graphical elements are displayed based on the activity level of the corresponding applications enables the device to conserve battery power by, for example, avoiding unnecessarily checking for information from the application that is not available or updating the display when new information would not be available, which reduces power usage and improves the battery life of the device. As a result, more active applications cause the corresponding graphical elements to be updated more frequently while less active applications cause the corresponding graphical element to be updated less frequently.

In some embodiments, updating the appearance of the graphical representation of the first type of information includes displaying an animation (e.g., display 1208-1 to 1208-4). In some embodiments, updating the appearance of the first type of information in the first mode includes displaying the animation and updating the appearance of the first type of information in the second mode does not include displaying the animation.

In some embodiments, a first display brightness (e.g., Average Pixel Luminance (APL)) of the display (e.g., display 602 at FIGS. 12A-12D) while the electronic device is in the first mode (e.g., a higher power consumption mode) is higher than a second display brightness (e.g., APL) of the display (e.g., display 602 at FIGS. 12E-12H) while the electronic device is in the second mode (e.g., a lower power consumption mode). Thus, the overall brightness of the display is reduced when the electronic device transitions from the first mode to the second mode. Reducing the brightness of the display reduces power usage and improves the battery life of the device.

In some embodiments, while the electronic device is in the second mode, the electronic device (e.g., 600) displays an indication (e.g., removal of 1210 in FIGS. 12E-12H) (e.g., concurrently with the graphical representation of the first type of information) that the update interval of the graphical representation of the first type of information has changed. In some embodiments, the second update interval is longer than the first update interval and the electronic device displays an indication that the rate of updates of the first type of information has reduced. Displaying an indication that the update interval has changed provides the user with feedback about the status of the device and the update frequency of the first type of information. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, in response to detecting that the electronic device has met the criteria for transitioning from the first mode to the second mode, the electronic device (e.g., 600) computes (e.g., prior to transitioning to the second mode) animation frames for the graphical representation of the first type of information to be displayed while the electronic device is in the second mode (e.g., to use to update the appearance of the graphical representation of the first type of information over time with the second update interval). In some embodiments, frames for graphical representations that can be accurately predicted (e.g., upcoming calendar event, song progress) for display in the second mode are computed in the first mode. Computing animation frames for display in the second mode (e.g., before entering the second mode) enables the device to avoid computing the animation frames while in the second mode, thereby allowing those processing components to be put to sleep, which reduces power usage and improves the battery life of the device. Computing animation frames for display in the second mode (e.g., before entering the second mode) enables the device to display the animation frames while in the low power consumption mode, thereby providing the user with visual feedback. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the plurality of user interface elements includes a graphical representation of a third type of information that is associated with a third application (e.g., data received from the application is optionally displayed as part of the graphical representation). In some embodiments, while the electronic device is operating in the first mode, the electronic device (e.g., 600) updates the appearance of the graphical representation of the third type of information over time with a seventh update interval. While the electronic device is operating in the second mode, the electronic device (e.g., 600) forgoes updating (e.g., maintaining) the appearance of the graphical representation of the third type of information over.

Note that details of the processes described above with respect to method 1300 (e.g., FIG. 13) are also applicable in an analogous manner to the methods described above/below. For example, methods 700, 900, 1100, 1500, 1700, and 1900 optionally include one or more of the characteristics of the various methods described above with reference to method 1300. For example, the first mode is the same mode throughout these methods and the second mode is the same mode throughout these methods. For brevity, these details are not repeated below.

FIGS. 14A-14E illustrate exemplary devices and user interfaces for managing display usage, in accordance with some embodiments. The user interfaces in these figures are used to illustrate the processes described below, including the processes in FIG. 15.

In particular, FIGS. 14A-14E illustrate techniques for managing display usage by altering one or more aspects (e.g., visual characteristics) of a displayed user interface upon determining that the device has met a mode-transition criteria, such as the mode-transition criteria described in greater detail above.

Figure 14A:
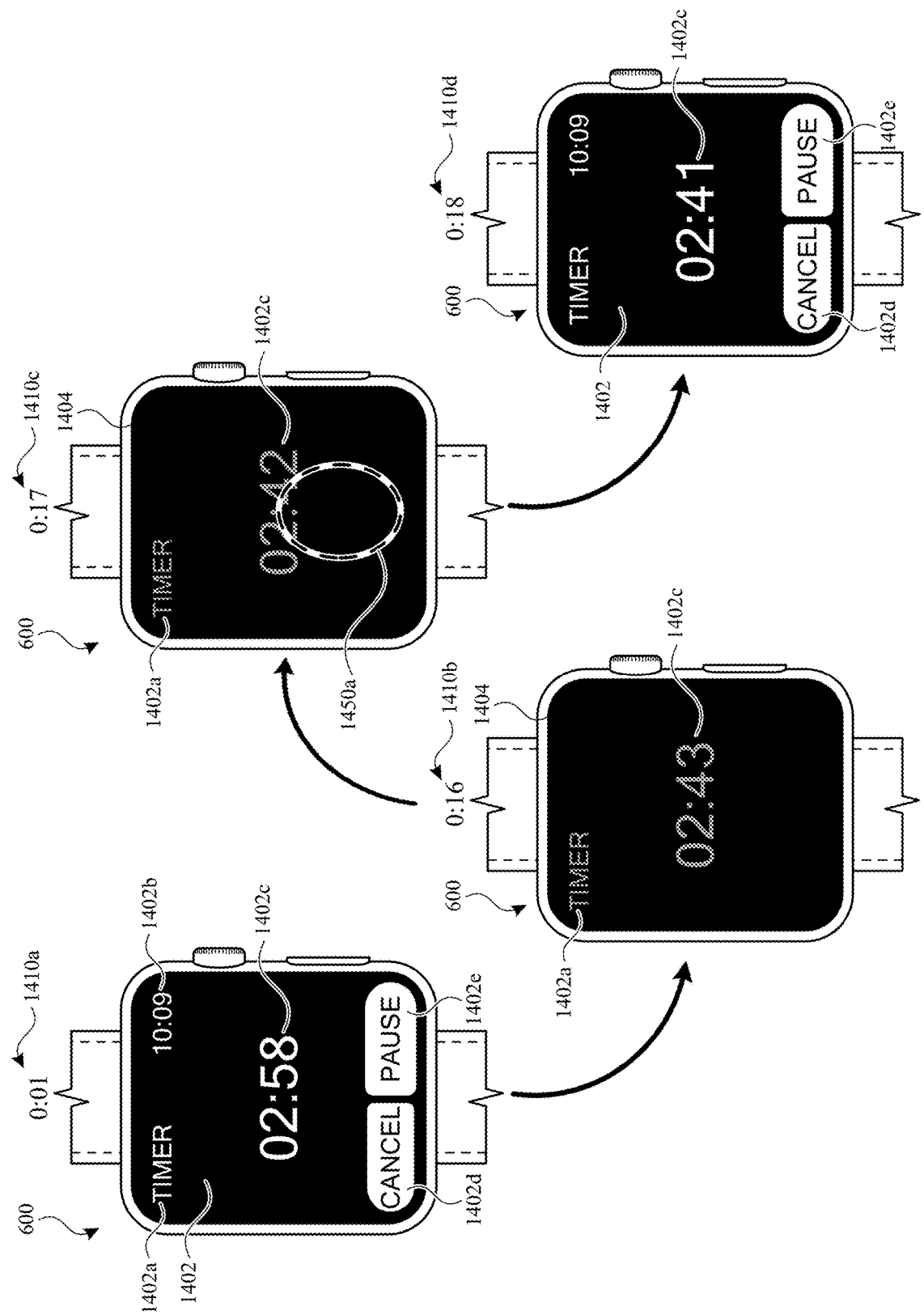
FIGS. 14A-14E illustrate exemplary user interfaces with managed display usage in accordance with embodiments.

FIG. 14A illustrates the same electronic device 600 at four different times, as indicated by time 1410. Time 1410 is not part of the user interface of device 600. Time 1410 is provided for the better understanding of the concepts described.

At FIG. 14A at time 1410a, device 600 displays a user interface 1402 of a timer application while device 600 is in a standard display mode. User interface 1402 includes title 1402a ("Timer") of the timer application, current time 1402b, a countdown timer 1402c, cancel affordance 1402d, and pause affordance 1402e. Countdown timer 1402c indicates that there are 2 minutes and 58 seconds left on the timer, at which point device 600 will provide an alert (visual, audio, and/or tactile) that the timer has expired. Title 1402a is displayed in a color (e.g., orange) different from the color (e.g., white) of current time 1402b and color (e.g., white) of countdown timer 1402c. Cancel affordance 1402d, when activated (e.g., via a tap input on cancel affordance 1402d), causes the countdown of countdown timer 1402c to be canceled. Pause affordance 1402e, when activated (e.g., via a tap input on pause affordance 1402e), causes the countdown of countdown timer 1402c to be paused. The background of user interface 1402 is black.

At FIG. 14A at time 1410b, 15 seconds have elapsed since time 1410a. Countdown timer 1402c reflects this elapsed time, now indicating that 2 minutes and 43 seconds are left on the timer. Device 600 has determined that the device has met the mode-transition criteria (e.g., detecting a wrist-down gesture using, for example, motion sensors; no input of certain types for 15 seconds). In response to the determination that device 600 has met the mode-transition criteria, device 600 has transitioned to a low power display mode and replaced user interface 1402 with user interface 1404. User interface 1404 is a lower power consumption interface of the timer application and is displayed, at least in part, because the timer application has a lower power consumption interface. User interface 1404 does not include the current time (e.g., 1402b) and does not include affordances (e.g., 1402d, 1402e) for canceling or pausing the countdown of countdown timer 1402c. Title 1402a has changed in color (e.g., from orange) to gray, thereby reducing the amount of power consumed by the display (e.g., takes less power to display gray pixels than it does to display orange pixels). Countdown timer 1402c has also changed in color, from white to gray, thereby also reducing the amount of power consumed by the display. In this example, the size and location of countdown timer 1402c has not changed between user interface 1402 and user interface 1404. The background of user interface 1404 is black. In the examples of FIG. 14A, user interface 1404 is a monochrome user interface. The monochrome user interface varies in color from black to gray (and not white). User interface 1404 has a lower brightness level than user interface 1402. In some examples, user interface 1404 does include a time indicator, such as described below with respect to FIGS. 18G-18H. In some examples, user interface 1404 (which is specific to the timer application or which can accommodate the information the timer application displays) is displayed, rather than a clock face user interface (such as 1406, which is not specific to the timer application and which does not accommodate display of the information the timer application displays) because the timer application has a specific user interface for low power operation (e.g., a lower power consumption interface), which device 600 uses for display while in the low power display mode.

At FIG. 14A at time 1410c, 1 second has elapsed since time 1410b. Countdown timer 1402c reflects this elapsed time, now indicating that 2 minutes and 42 seconds are left on the timer. While in the low power display mode and while displaying user interface 1404, device 600 detects tap user input 1450a on a touch-sensitive display of device 600. In response to detecting tap user input 1450a (and regardless of the location of the detected tap user input 1450a on the touch-sensitive display), device 600 transitions back to the standard display mode. In response to detecting tap user input 1450a (and regardless of the location of the detected tap user input 1450a on the touch-sensitive display) and because device 600 detected tap user input 1450a within a predetermined period of time (e.g., within 2 seconds) of transitioning to displaying user interface 1404, device 600 replaces user interface 1404 with user interface 1402, as shown in FIG. 14A at time 1410d.

At FIG. 14A at time 1410d, 1 second has elapsed since time 1410c. Countdown timer 1402c reflects this elapsed time, now indicating that 2 minutes and 41 seconds are left on the timer. Device 600 is in the standard display mode. Title 1402a is displayed again, as well as affordances 1402d and 1402e. Cancel affordance 1402d, when activated (e.g., via a tap input on cancel affordance 1402d), causes the countdown of countdown timer 1402c to be canceled. Pause affordance 1402e, when activated (e.g., via a tap input on pause affordance 1402e), causes the countdown of countdown timer 1402c to be paused. Countdown timer 1402c returns to being displayed in white (rather than gray). The background of user interface 1402 is black.

The timer application continues to execute throughout the times in FIG. 14A, as reflected in the countdown timer 1402c that continues to be updated. In addition, device 600 will provide an alert once countdown timer 1402c expires, regardless of whether the device is in the standard display mode or the low power display mode.

Figure 14B:
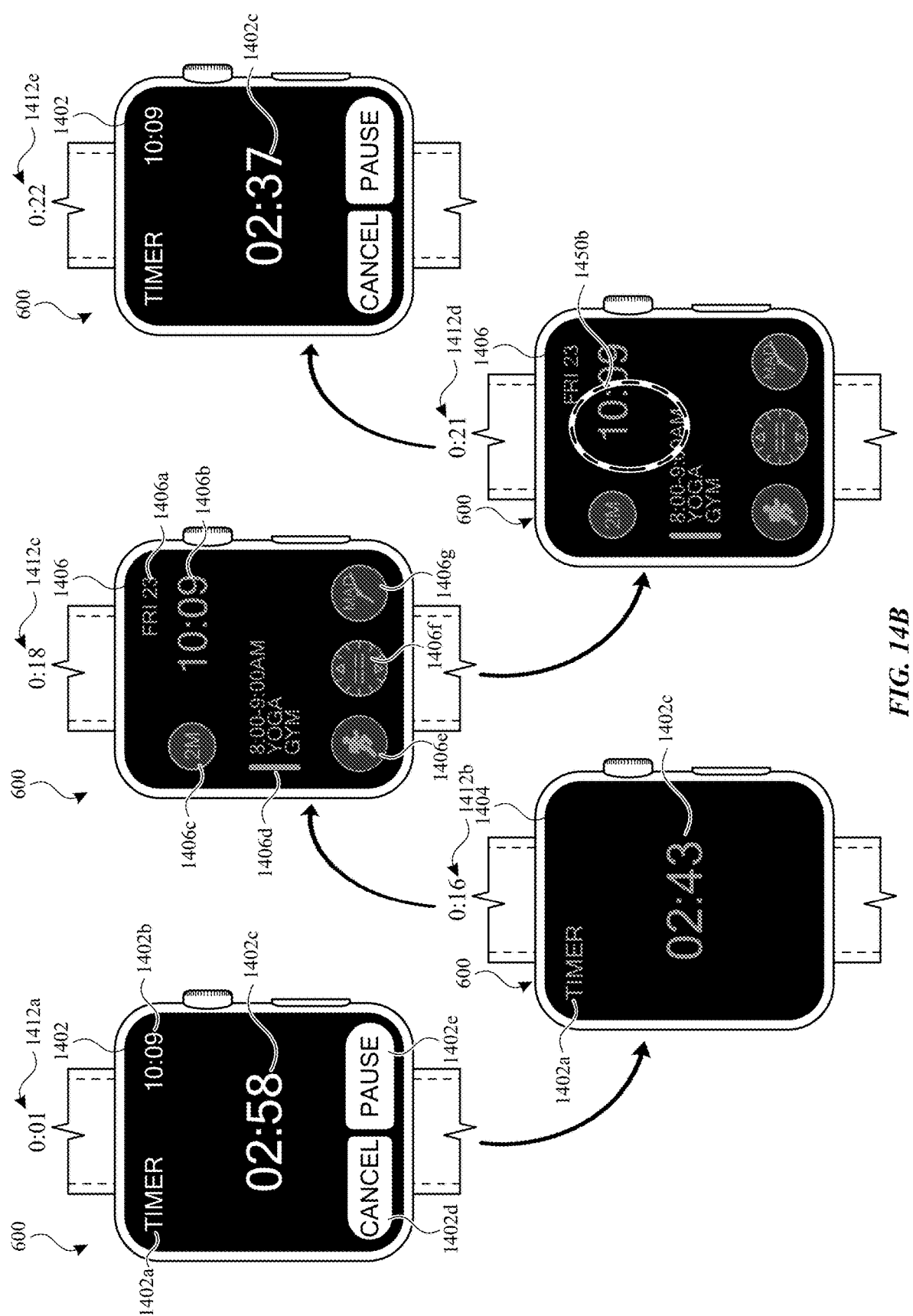

FIG. 14B illustrates the same electronic device 600 at five different times, as indicated by time 1412. Time 1412 is not part of the user interface of device 600. Time 1412 is provided for the better understanding of the concepts described.

At FIG. 14B at time 1412a, device 600 displays a user interface 1402 of a timer application while device 600 is in a standard display mode. User interface 1402 is the same user interface as displayed in FIG. 14A at time 1410a.

At FIG. 14B at time 1412b, 15 seconds have elapsed since time 1410a. Countdown timer 1402c reflects this elapsed time, now indicating that 2 minutes and 43 seconds are left on the timer. Device 600 has determined that the device has met the mode-transition criteria (e.g., detecting a wrist-down gesture using, for example, motion sensors; no input of certain types for 15 seconds). In response to the determination that device 600 has met the mode-transition criteria, device 600 has transitioned to the low power display mode and replaced user interface 1402 with user interface 1404. User interface 1404 is the same user interface as displayed in FIG. 14A at time 1410b. User interface 1404 is a lower power consumption interface of the timer application and is displayed when the device transitions to the low power display mode because the timer application has a lower power consumption interface.

At FIG. 14B at time 1412c, 2 seconds have elapsed since time 1412b. In response to determining that the predetermined period of time (e.g., 2 seconds) has elapsed since transitioning to displaying user interface 1404 without detecting a tap user input (and because the timer application is determined to not be a particular application type (e.g., is not identified as being an application benefiting from continuous display of the application's lower power consumption user interface)), device 600 transitions to display of clock face user interface 1406. Clock face user interface 1406 is distinct from the user interfaces 1402-1404 of the timer application. Clock face user interface 1406 has a lower brightness level than user interface 1402. Clock face user interface 1406 includes date 1406*a*, current time 1406*b*, and various watch complications. The watch complications include timer complication 1406*c*, which displays the minutes portion of countdown timer 1402*c* in a gray color (without displaying the seconds portion). The watch complications also include a calendar complication 1406*d*, exercise complication 1406*e*, compass complication 1406*f*, and a time zone complication 1406*g*. In some embodiments, one or more (or all) of complications 1406*d*-1406*g* do not display data from their corresponding application while the device is in the low power display mode and displaying clock face user interface 1406. For example, in FIG. 14B at time 1412*c*, compass complication 1406*f* does not display a cardinal direction. The background of user interface 1406 is black. In the examples of FIG. 14B, user interface 1406 is a monochrome user interface. Clock face user interface 1406 is a low power consumption clock face.

At FIG. 14B at time 1412*d*, 3 seconds have elapsed since time 1412*c*. The timer application is continuing to be processed by the one or more processors of device 600. While in the low power display mode and while displaying clock face user interface 1406, device 600 detects tap user input 1450*b* on the touch-sensitive display of device 600. In response to detecting tap user input 1450*b* (and regardless of the location of the detected tap user input 1450*b* on the touch-sensitive display), device 600 transitions back to the standard display mode. In response to detecting tap user input 1450*b* (and regardless of the location of the detected tap user input 1450*b* on the touch-sensitive display) and because device 600 detected tap user input 1450*b* within a second predetermined period of time (e.g., within 5 seconds) of transitioning to displaying clock face user interface 1406, device 600 replaces user interface 1406 with user interface 1402, as shown in FIG. 14B at time 1412*e*. The timer application continues to execute throughout the times in FIG. 14B, as reflected in the countdown timer 1402*c* that is displayed in FIG. 14B at time 1412*e*.

At FIG. 14B, while in the low power display mode and while displaying clock face user interface 1406, had device 600 detected a tap user input on the touch-sensitive display of device 600 after the second predetermined period of time (e.g., after 5 seconds) of transitioning to displaying clock face user interface 1406, device 600 would transition back to the standard display mode and would replace user interface 1406 with a standard clock face user interface (e.g., 1426).

Figure 14C:
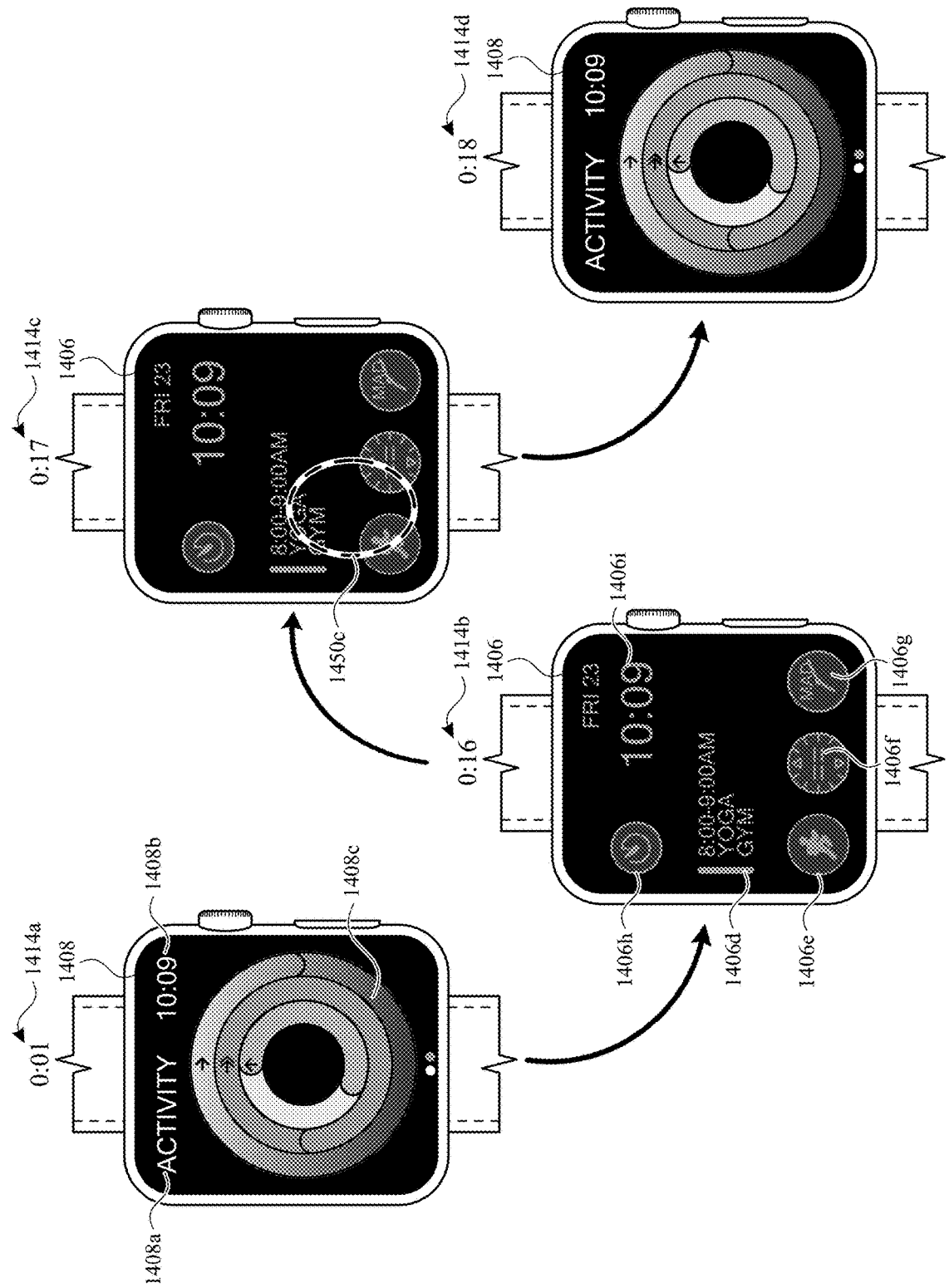

FIG. 14C illustrates the same electronic device 600 at four different times, as indicated by time 1414. Time 1414 is not part of the user interface of device 600. Time 1414 is provided for the better understanding of the concepts described.

At FIG. 14C at time 1414*a*, device 600 displays user interface 1408 of an activity (e.g., workout) tracking application while device 600 is in a standard display mode. User interface 1408 includes title 1408*a* ("Activity") of the activity tracking application, current time 1408*b*, and three activity rings 1408*c* that indicate progress towards goals of three different types of activities. Title 1408*a* is displayed in a color (e.g., white) that is the same as the color (e.g., white) of current time 1408*b* and different from the colors (e.g., red, green, blue) of activity rings 1408*c*. The background of user interface 1408 is black.

At FIG. 14C at time 1414*b*, 15 seconds have elapsed since time 1414*a*. Device 600 has determined that the device has met the mode-transition criteria (e.g., detecting a wrist-down gesture using, for example, motion sensors; no input of certain types for 15 seconds). In response to the determination that device 600 has met the mode-transition criteria, device 600 has transitioned to the low power display mode and replaced user interface 1408 with clock face user interface 1406. As compared to clock face user interface 1406 in FIG. 14B, clock face user interface 1406 in FIG. 14C includes timer complication 1406*h*. Clock face user interface 1406 is displayed because the activity tracking application does not have a lower power consumption interface, so the device instead displays clock face user interface 1406. Clock face user interface 1406 has a lower brightness level than user interface 1408.

At FIG. 14C at time 1414*c*, 1 second has elapsed since time 1414*b*. While in the low power display mode and while displaying clock face user interface 1406, device 600 detects tap user input 1450*c* on a touch-sensitive display of device 600. In response to detecting tap user input 1450*c* (and regardless of the location of the detected tap user input 1450*c* on the touch-sensitive display), device 600 transitions back to the standard display mode. In response to detecting tap user input 1450*c* (and regardless of the location of the detected tap user input 1450*c* on the touch-sensitive display) and because device 600 detected tap user input 1450*c* within the predetermined period of time (e.g., within 2 seconds) of transitioning to displaying clock face user interface 1406, device 600 replaces clock face user interface 1406 with user interface 1408, as shown in FIG. 14C at time 1414*d*.

At FIG. 14C at time 1414*d*, 1 second has elapsed since time 1414*c*. Device 600 is in the standard display mode and is displaying user interface 1408 of the activity tracking application as updated to reflect any additional activity tracked during the time the device was in the low power display mode. The activity tracking application continues to execute throughout the times in FIG. 14C.

Figure 14D:
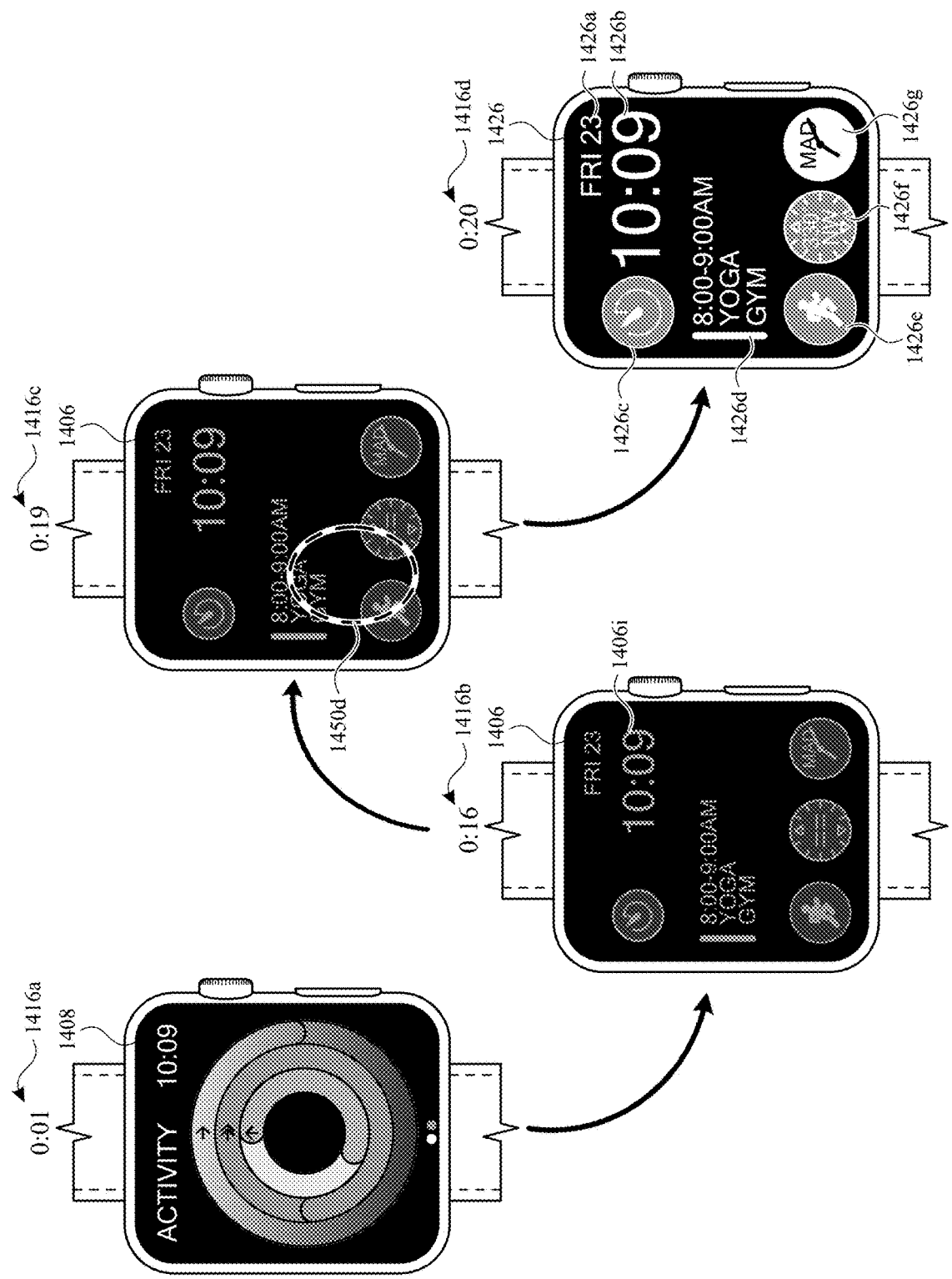

FIG. 14D illustrates the same electronic device 600 at four different times, as indicated by time 1416. Time 1416 is not part of the user interface of device 600. Time 1416 is provided for the better understanding of the concepts described.

At FIG. 14D at time 1416*a*, device 600 displays user interface 1408 of the activity (e.g., workout) tracking application while device 600 is in the standard display mode. User interface 1408 is the same user interface as displayed in FIG. 14C at time 1414*a*.

At FIG. 14D at time 1416*b*, 15 seconds have elapsed since time 1416*a*. Device 600 has determined that the device has met the mode-transition criteria (e.g., detecting a wrist-down gesture using, for example, motion sensors; no input of certain types for 15 seconds). In response to the determination that device 600 has met the mode-transition criteria, device 600 has transitioned to the low power display mode and replaced user interface 1408 with clock face user interface 1406. Clock face user interface 1406 is the same user interface as displayed in FIG. 14C at time 1414*b*. Clock face user interface 1406 displayed because the activity tracking application does not have a lower power consumption interface, so device 600 instead displays clock face user interface 1406. Clock face user interface 1406 is a lower power consumption user interface and has a lower brightness level than user interface 1408.

At FIG. 14D at time 1416c, 3 seconds have elapsed since time 1416b. While in the low power display mode and while displaying clock face user interface 1406, device 600 detects tap user input 1450d on the touch-sensitive display of device 600. In response to detecting tap user input 1450d (and regardless of the location of the detected tap user input 1450d on the touch-sensitive display), device 600 transitions back to the standard display mode. In response to detecting tap user input 1450d (and regardless of the location of the detected tap user input 1450d on the touch-sensitive display) and because device 600 detected tap user input 1450d after the predetermined period of time (e.g., outside of 2 seconds) of transitioning to displaying clock face user interface 1406, device 600 replaces clock face user interface 1406 with standard clock face user interface 1426, as shown in FIG. 14D at time 1416d.

At FIG. 14D at time 1416d, 1 second has elapsed since time 1416c. Device 600 is in the standard display mode and is displaying standard clock face user interface 1426. The standard clock face user interface 1426 has a higher brightness level than clock face user interface 1406. Date 1426a is larger than and brighter than date 1406a. Current time 1426b is larger than and brighter than current time 1406b. Similarly, complications 1426c-1426g are larger than and brighter than the corresponding complications 1406c-1406g of clock face user interface 1406. Complications 1406c-1406g of standard clock face user interface 1426 update more frequently than the corresponding complications of clock face user interface 1406, as described in greater detail with respect to method 1300, FIG. 13, and the corresponding description. Compass complication 1426f displays a cardinal direction based on the detected orientation of electronic device 600 (as compared to compass complication 1416f, which does not display the cardinal direction).

Figure 14E:
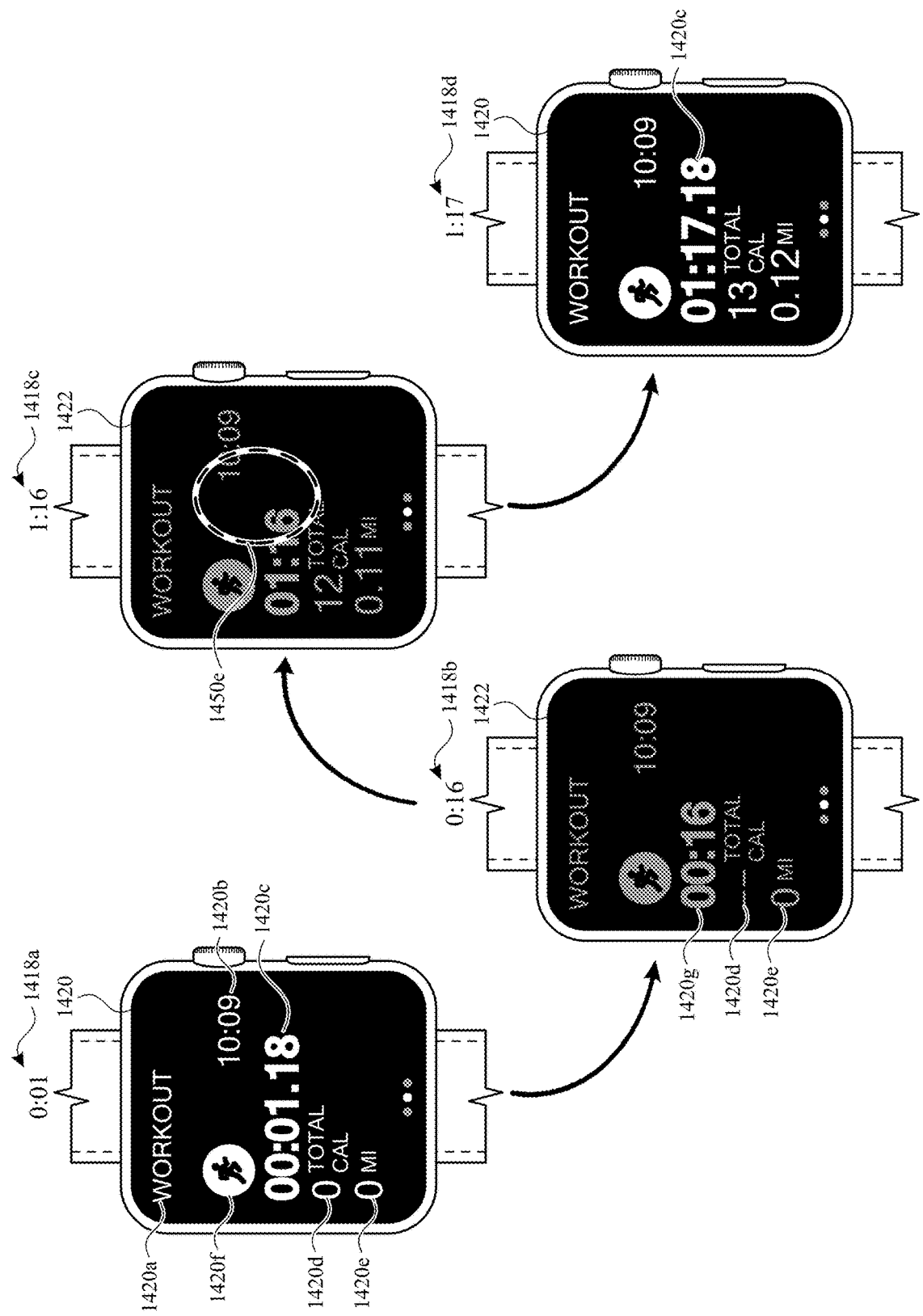

FIG. 14E illustrates the same electronic device 600 at four different times, as indicated by time 1418. Time 1418 is not part of the user interface of device 600. Time 1418 is provided for the better understanding of the concepts described.

At FIG. 14E at time 1418a, device 600 displays user interface 1420 of a workout application while device 600 is in a standard display mode. User interface 1420 includes title 1420a ("Workout") of the workout application, current time 1420b, elapsed workout time indicator 1420c, calories indicator 1420d, distance indicator 1420e, and application icon 1420f, all of which are displayed using a white color. Device 600 is displaying an indication (e.g., in response to receiving user input to select elapsed workout time indicator 1420c) that elapsed workout time indicator 1420c is selected by displaying elapsed workout time indicator in bold (e.g., as compared to 1420d-1420e, which are not in bold). The background of user interface 1420 is black.

At FIG. 14E at time 1418b, 15 seconds have elapsed since time 1418a. Device 600 has determined that the device has met the mode-transition criteria (e.g., detecting a wrist-down gesture using, for example, motion sensors; no input of certain types for 5, 10 or 15 seconds). In response to the determination that device 600 has met the mode-transition criteria, device 600 has transitioned to a low power display mode and replaced user interface 1420 with user interface 1422. User interface 1422 is a lower power consumption interface of the workout application and is displayed because the workout application has a lower power consumption interface. User interface 1422 includes title 1420a ("Workout") of the workout application, current time 1420b, abbreviated elapsed workout time indicator 1420g, calories indicator 1420d, distance indicator 1420e, and application icon 1420f, all of which are displayed using a gray color (which consumes less energy to display than a white color). Abbreviated elapsed workout time indicator 1420g displays hours and seconds of elapsed time without displaying hundredths of seconds of elapsed time. In contrast, elapsed workout time indicator 1420c displays a higher precision value of elapsed time by displaying hours, seconds, and hundredths of seconds of elapsed time. Reducing the precision of the displayed elapsed time while displaying user interface 1422 enables the device to reduce the quantity of pixels used to display the time, thereby reducing power consumption of the display of the time, and to reduce the processing power required to calculate and/or display the higher precision time, thereby further reducing power consumption of the display of the time. Device 600 updates calories indicator 1420d and distance indicator 1420e less frequently (at longer intervals) than at which abbreviated elapsed workout time indicator 1420g is displayed because abbreviated elapsed workout time indicator 1420g is selected (as was indicated by the bolding of 1420c). Device 600 displays calories indicator 1420d and distance indicator 1420e at a lower brightness level than at which abbreviated elapsed workout time indicator 1420g is displayed because abbreviated elapsed workout time indicator 1420g is selected (as was indicated by the bolding of 1420c). Device 600 also updates calories indicator 1420d and distance indicator 1420e less frequently (at longer intervals) than were previously updated while the device was in the standard display mode and was displaying user interface 1420. In the examples of FIG. 14A, user interface 1422 is a monochrome user interface. The monochrome user interface varies in color from black to gray (and not white). User interface 1422 has a lower brightness level than user interface 1420.

At FIG. 14E at time 1418c, 1 minute has elapsed since time 1418b. Abbreviated elapsed workout time indicator 1420g reflects this elapsed time, now indicating that 1 minute and 16 seconds have elapsed. In contrast to the technique in FIG. 14B, device 600 has not transitioned device 600 to display clock face user interface 1406 despite the predetermined period of time (e.g., 2 seconds) having elapsed since transitioning to displaying user interface 1422 without detecting a tap user input. Device 600 has not transitioned device 600 to display clock face user interface 1406 and has instead maintained display of user interface 1422 because the workout application is determined to be a particular application type (e.g., identified as benefiting from continuous display of the application's lower power consumption user interface). Because device 600 has determined the workout application to be of the particular application type, device 600 forgoes replacing user interface 1422 with display clock face user interface 1406.

At FIG. 14E at time 1418c, while in the low power display mode and while displaying user interface 1422, device 600 detects tap user input 1450e on a touch-sensitive display of device 600. In response to detecting tap user input 1450e (and regardless of the location of the detected tap user input 1450e on the touch-sensitive display), device 600 transitions back to the standard display mode. In response to detecting tap user input 1450e (and regardless of the location of the detected tap user input 1450c on the touch-sensitive display) and because device 600 detected tap user input 1450e (regardless of whether tap user input 1450e is detected before or after the predetermined period of time (e.g., within 2 seconds) of transitioning to displaying user interface 1422), device 600 replaces user interface 1422 with user interface 1420, as shown in FIG. 14E at time 1418*d*.

At FIG. 14E at time 1418*d*, 1 second has elapsed since time 1418*c*. Elapsed workout time indicator 1420*c* reflects this elapsed time, now indicating that 1 minute, 17 seconds, and 18 hundredths of seconds have elapsed. Device 600 is in the standard display mode. While in the standard display mode and displaying user interface 1420, device 600 updates the display updates calories indicator 1420*d* and distance indicator 1420*e* with the same frequency with which elapsed workout time indicator 1420*c* is displayed. Device 600 updates calories indicator 1420*d* and distance indicator 1420*e* more frequently (at shorter intervals) than were previously updated while in the low power display mode and displaying user interface 1422. The workout application continues to execute throughout the times in FIG. 14E, as reflected in the elapsed workout time indicator 1420*c* that continues to be updated.

FIG. 15 is a flow diagram illustrating a method for managing display usage using an electronic device in accordance with some embodiments. Method 1500 is performed at a device (e.g., 100, 300, 500, 600) with a display. Some operations in method 1500 are, optionally, combined, the orders of some operations are, optionally, changed, and some operations are, optionally, omitted.

As described below, method 1500 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

While the electronic device (e.g., 600) is operating in a first mode (e.g., a higher power consumption mode), the electronic device (e.g., 600) displays (1502), on the display, a first user interface (e.g., a higher power consumption interface; 1402 of FIG. 14A at 1410*a*, 1402 at FIG. 14B at 1412*a*, 1408 at FIG. 14C at 1414*a*, 1408 at FIG. 14D at 1416*a*, 1420 at FIG. 14E at 1418*a*) of a first application (e.g., an installed application distinct from the operating system; an interface corresponding to an application operating in the foreground). The first user interface includes a first graphical object (e.g., 1402*c*, 1420*c*) corresponding to (e.g., generated by) the first application (e.g., a graphical object that includes information provided by the first application).

While displaying the first user interface, the electronic device (e.g., 600) detects (1504) that the electronic device (e.g., 600) has met criteria for transitioning from the first mode to a second mode (e.g., a lower power consumption mode).

In some embodiments, in response (1506) to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)), the electronic device (e.g., 600) transitions the electronic device from the first mode to the second mode in response to detecting that the electronic device has met the criteria for transitioning from the first mode to the second mode. As discussed above in greater detail, the first mode and the second mode are different modes in which the electronic device can operate.

In response (1506) to detecting that the electronic device has met the criteria for transitioning from the first mode to the second mode and in accordance with a determination that the first application is an application of a first type (e.g., an application that includes a lower power consumption interface), the electronic device (e.g., 600) replaces (1508) display of the first user interface (e.g., 1402, 1420) of the first application with a second user interface (e.g., a lower power consumption interface, 1404 of FIG. 14A at 1410*b*, 1404 of FIG. 14B at 1412*b*, 1422 of FIG. 14E at 1418*b*) of the first application different from the first user interface (e.g., lower power interface differs from the higher power interface in one or more visual characteristics (size of elements, color, hue, saturation, opacity, shape)), the second user interface including a second graphical object (e.g., 1402*c*, 1420*g*) corresponding to the first application (e.g., a graphical object that includes information provided by the first application). In some embodiments, the second graphical object is the first graphical object. In some embodiments, the second graphical object corresponds to the first graphical object (e.g., the second graphical object includes the same information as the first graphical object).

In response (1506) to detecting that the electronic device has met the criteria for transitioning from the first mode to the second mode and in accordance with a determination that the first application is an application of a second type (e.g., an application that does not include a lower power consumption interface), the electronic device (e.g., 600) replaces (1510) display of the first user interface (e.g., 1408 of FIG. 14C at 1414*a*, 1408 at FIG. 14D at 1416*a*,) of the first application with a third user interface (e.g., a clock face of a smart watch, 1406 of FIG. 14C at 1414*b*, 1406 at FIG. 14D at 1416*b*) different from the first user interface of the first application and the second user interface of the first application. The third user interface that is an operating system user interface including one or more elements (e.g., 1406*d*, 1406*e*, 1406*f*) that are not part of the first user interface of the first application (In some embodiments, and not part of the second user interface of the first application), including a time indicator (e.g., an analog clock hand (hour, minute, second hand); a digital clock numeral (hour, minute, second numerals; 1406*i*). In some embodiments, the third user interface is not generated by the first application. In some embodiments, the third user interface does not include graphical objects (e.g., any graphical objects) generated by the first application (e.g., does not include graphical objects that include information provided by the first application).

Displaying a lower power consumption interface of an application when available enables the device to continue to show information specific to that application while in the lower power consumption mode, yet still allows the device to achieve the lower power consumption mode when the lower power consumption interface is not available for the application by displaying a lower power consumption watch face. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, while the electronic device (e.g., 600) is in the second mode and is displaying the third user interface (e.g., 1406 of FIG. 14C at 1414*b*), the electronic device (e.g., 600) detects that the electronic device has met a first set of criteria for transitioning from the second mode to the first mode. In some embodiments, the first set of criteria for transitioning from the second mode to the first mode are met with the electronic device detects a user input (e.g., detecting a wrist raise gesture, detecting a touch gesture, such as a tap, on a touch-sensitive surface of the electronic device). In response to detecting that the electronic device has met the first set of criteria for transitioning from the second mode to the first mode, the electronic device (e.g., 600) replaces display of the third user interface (e.g., 1406 of FIG. 14C at 1414*b*-1414*c*) with display of the first user interface (e.g., 1408 of FIG. 14C at 1414*d*) including the first graphical object generated (e.g., 1408*c*) by the first application.

In some embodiments, while the electronic device (e.g., 600) is in the second mode and is displaying the third user interface (e.g., 1406 of FIG. 14C at 1414*b*, 1406 at FIG. 14D at 1416*b*), the electronic device (e.g., 600) detects that the electronic device has met a second set of criteria for transitioning from the second mode to the first mode. In some embodiments, the second set of criteria for transitioning from the second mode to the first mode are met with the electronic device detects a user input (e.g., detecting a wrist raise gesture, detecting a touch gesture, such as a tap, on a touch-sensitive surface of the electronic device). In response to detecting that the electronic device has met the second set of criteria for transitioning from the second mode to the first mode, the electronic device (e.g., 600) replaces (e.g., in accordance with a determination that the first user interface was not a system user interface, in accordance with a determination that the user input was not received within a threshold period of time, such as 2 seconds) display of the third user interface (e.g., a first clock face of a smart watch; 1406 of FIG. 14C at 1414*d*) with display of a fourth user interface (e.g., 1426 of FIG. 14D at 1416*d*) different from the first user interface of the first application, the second user interface of the first application, and the third user interface, wherein the fourth user interface is an operating system user interface including one or more elements (e.g., 1426*d*-1426*g*) that are not part of the user interface of the first application, including a second time indicator (e.g., 1426*b*) that is different in one or more characteristics (e.g., bigger, brighter, different color) from the time indicator of the third user interface. In some embodiments, the second time indicator is displayed at a brightness level that is higher than a brightness level of the time indicator of the third user interface. In some embodiments, the second time indicator is smaller in size than the time indicator of the third user interface. In some embodiments, the second time indicator is a different color than the time indicator of the third user interface.

Displaying a brighter user interface when the device detects that the user is attempting to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the second set of criteria for transitioning from the second mode to the first mode includes a criterion that is met when the electronic device (e.g., 600) detects a wrist raise gesture (e.g., detected using one or more motion sensors of the electronic device to detect the device changing in orientation to an orientation that is facing upward at an angle). Displaying a brighter user interface when the device detects that the user is performing a wrist raise gesture to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the second set of criteria for transitioning from the second mode to the first mode includes a criterion that is met when the electronic device detects a tap gesture (e.g., 1450*d*, detected using a touch-sensitive surface of the electronic device).

Displaying a brighter user interface when the device detects that the user is performing a tap gesture to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, while the electronic device is in the second mode and is displaying the second user interface, the electronic device (e.g., 600) detects that the electronic device has met a third set of criteria for transitioning from the second mode to the first mode. In some embodiments, the third set of criteria for transitioning from the second mode to the first mode are met with the electronic device detects a user input (e.g., detecting a wrist raise gesture, detecting a touch gesture, such as a tap, on a touch-sensitive surface of the electronic device) (within the threshold period of time). In response to detecting that the electronic device has met the third set of criteria for transitioning from the second mode to the first mode, the electronic device (e.g., 600) replaces (e.g., in accordance with a determination that the first user interface was not a system user interface, in accordance with a determination that the user input was received within the threshold period of time, such as 2 seconds) display of the second user interface with display of the first user interface (e.g., 1402 of FIG. 14A at 1410*d*, an updated version of the first user interface (e.g., based on updated information from the first application) including the first graphical object (e.g., 1402*c*) corresponding to (e.g., generated by) the first application.

Displaying a brighter user interface when the device detects that the user is attempting to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, while the electronic device is in the second mode and is displaying the third user interface (e.g., 1406 of FIG. 14C at 1414*b*, 1406 at FIG. 14D at 1416*b*), the electronic device (e.g., 600) detects that the electronic device has met a fourth set of criteria for transitioning from the second mode to the first mode that includes a criterion that is met when the electronic device detects a user input (e.g., detecting a wrist raise gesture, detecting a touch gesture, such as a tap, on a touch-sensitive surface of the electronic device).

In some embodiments, in response to detecting that the electronic device has met the fourth set of criteria for transitioning from the second mode to the first mode: in accordance with a determination that a set of criteria is met (e.g., the set of criteria including one or more of: a time-from-input criterion that is met when the user input is detected within a threshold period of time (e.g., 2 seconds, 5 seconds) of the electronic device transitioning to the second mode, a touch-gesture criterion that is met when the user input is a touch gesture detected on a touch-sensitive surface of the electronic device, a tap-gesture criterion that is met when the user input is a tap gesture detected on the touch-sensitive surface of the electronic device, and a wrist-raise-gesture that is met when the user input is a wrist-raise gesture detected using one or more sensors (e.g., motion sensors) of the electronic device), the electronic device (e.g., 600) replaces display of the third user interface with display of the first user interface (e.g., 1402 at FIG. 14B at 1412e) including the first graphical object (e.g., 1402c) corresponding to (e.g., generated by) the first application, wherein the set of criteria includes a criterion that is met when the user input is detected within a threshold period of time of the electronic device transitioning to the second mode.

In some embodiments, in response to detecting that the electronic device has met the fourth set of criteria for transitioning from the second mode to the first mode: in accordance with a determination that the set of criteria is not met (e.g., input is detected after the threshold period of time, after 5 seconds), replacing display of the third user interface (e.g., 1406 at FIG. 14D at 1416c, a first clock face of a smart watch) with display of a fifth user interface (e.g., 1426 at FIG. 14D at 1416d, a brighter clock face of a smart watch) different from the first user interface of the first application, the second user interface of the first application, and the third user interface, wherein the fifth user interface is an operating system user interface including one or more elements (e.g., 1426d-1426g) that are not part of the user interface of the first application, including a third time indicator (e.g., 1426b) that is different in one or more characteristics from the time indicator (e.g., 1406i) of the third user interface. In some embodiments, the third time indicator is displayed at a brightness level that is higher than a brightness level of the time indicator of the third user interface. In some embodiments, the second time indicator is smaller in size than the time indicator of the third user interface. In some embodiments, the second time indicator is a different color than the time indicator of the third user interface.

In some embodiments, the user input is a wrist raise gesture (e.g., detected using one or more motion sensors of the electronic device). In some embodiments, the input type criterion is satisfied if the user input is a wrist raise gesture. Displaying a brighter user interface when the device detects that the user is performing a wrist raise gesture to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the user input is a tap gesture (e.g., 1450c, 1450d, detected using a touch-sensitive surface of the electronic device). In some embodiments, the input type criterion is satisfied if the user input is a tap gesture. In some embodiments, the input type criterion is satisfied if the user input is either a tap gesture or a wrist raise gesture. In some embodiments, the threshold period of time varies based on the type of input received. In some examples, the threshold period of time is shorter when the user input is a tap input and longer when the user input is a wrist raise gesture. Displaying a brighter user interface when the device detects that the user is performing a tap gesture to interact with the device provides the user with feedback that the device has left the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first graphical object (e.g., 1402c, 1420c) (or a another graphical object, such as 1402d, 1402e) is displayed with a first visual characteristic (e.g., in a first color) in the first user interface and the first graphical object (or the another graphical object 1402d, 1402e), when selected in the first user interface, activates a first function (e.g., device detecting tap gesture on the first graphical object causes a corresponding function (e.g., a function related to the first application) to be performed). For example, cancel when affordance 1402d is pressed, pause when affordance 1402e is pressed.

In some embodiments, the first graphical object (or the another graphical object 1402d, 1402e) is displayed with a second visual characteristic (e.g., in a second color, such as in a darker color affordance in 1404 of FIG. 14A) in the second user interface different from the first visual characteristic and the first graphical object, when selected in the second user interface, does not cause activation of the first function (e.g., does not cause activation of any function; causes activation of a function other than the first function (e.g., causes a transition from the second mode to the first mode)). In some embodiments, the appearance of the first graphical object changes to indicate whether the graphical object is activatable. Displaying an indication that certain graphical objects cannot be activated in certain modes provides the user with feedback about what inputs will and will not perform functions and reduces unnecessary user inputs. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first graphical object (e.g., 1420c) (e.g., a first metric provided by a workout application) is a selected graphical object (e.g., is visually distinguished (e.g., by highlighting, by bolding, by being different in size) from other graphical objects of the first user interface (e.g., indicating that it is selected and/or highlighted for further action)). In some embodiments, only one graphical object can be selected at a time and selection of another graphical object deselects the first graphical object. In some embodiments, the first application is a workout application (e.g., a physical activity tracking application. In some embodiments, the first user interface of the first application includes a third graphical object (e.g., 1420d-1420e in FIG. 14E at 1418a, a second metric provided by a workout application) corresponding to the first application that is not a selected graphical object.

In some embodiments, replacing display of the first user interface of the first application with a second user interface (e.g., a lower power consumption interface) of the first application different from the first user interface includes: in accordance with a determination that the second graphical object (e.g., 1420g) corresponds to the selected first graphical object (e.g., the second graphical object includes at least a portion of the same information as the first graphical object), the electronic device (e.g., 600) displays the second graphical object (e.g., 1420g) at a first brightness level (e.g., average pixel luminance (APL), average lumen output, total lumen output, average illuminance, or total illuminance of the indicator on the display; brightness expressed in nits, lux, or lumens); and in accordance with a determination that the second graphical object (e.g., 1420d-1420e in FIG. 14E at 1418b) corresponds to the third graphical object that is not a selected object (e.g., does not correspond to the selected first graphical object), the electronic device (e.g., 600) displays the second graphical object at a second brightness level that is less than the first brightness level. In some embodiments, the first application is a workout application that tracks workout information/metric (e.g., steps, distance, heartrate) of a user and the first graphical object and the second graphical object display the same workout metric. In some embodiments, while in the second mode, the second user interface for the first application displays a selected graphical object at a brightness level that is brighter than the brightness level of graphical objects that are not selected. Differentiating between selected and unselected graphical elements for brightness control enables the device to show selected elements (e.g., that is particularly relevant to the user) at an appropriate brightness level so that the user can more readily access the selected information, yet reduce the overall display brightness, which reduces power usage and improves the battery life of the device.

In some embodiments, after displaying the second graphical object (e.g., 1420g at 1418b) at the first brightness level, the electronic device (e.g., 600) displays, on the display, a second instance of the first user interface with the first graphical object as a selected object. the electronic device (e.g., 600) detects a set of one or more inputs corresponding to a request to select the third graphical object. In response to detecting the set of one or more inputs corresponding to a request to select the third graphical object: the electronic device (e.g., 600) selects the third graphical object and de-selecting the first graphical object. In some embodiments, displaying the third graphical object with one or more visual characteristics that indicate that it is selected (e.g., by highlighting, by bolding, by being different in size) from other graphical objects of the first user interface (e.g., indicating that it is selected and/or highlighted for further action)). While the third graphical object is selected, the electronic device (e.g., 600) detects that the electronic device has met criteria for transitioning from the first mode to a second mode. In response to detecting that the electronic device has met criteria for transitioning from the first mode to a second mode while the third graphical object is detected, the electronic device (e.g., 600) replaces display of the second instance of the first user interface with a second instance of the second user interface that includes a fourth graphical object that: in accordance with a determination that the fourth graphical object corresponds to the first graphical object that is not selected, is displayed at a third brightness level; and in accordance with a determination that the fourth graphical object corresponds to the third graphical object that is selected, is displayed at a fourth brightness level that is greater than the third brightness level. In some embodiments, selecting a different graphical object (e.g., while in the first user interface) causes a graphical object of the second user interface that corresponds to the newly selected graphical object to be displayed with a brightness level that is greater than the brightness of a graphical object of the second user interface that corresponds to the previously selected (but no longer selected) graphical object of the first user interface. Differentiating between selected and unselected graphical elements for brightness control enables the device to show selected elements (e.g., that is particularly relevant to the user) at an appropriate brightness level so that the user can more readily access the selected information, yet reduce the overall display brightness, which reduces power usage and improves the battery life of the device.

In some embodiments, the fourth graphical object updates with a shorter update interval than the second graphical object based on the third graphical object having been selected. In some embodiments, graphical objects in the second user interface that correspond to selected graphical object in the first user interface update with shorter update intervals than graphical objects in the second user interface that do not correspond to selected graphical objects in the first user interface. Differentiating between selected and unselected graphical elements for frequency of updates enables the device to update selected elements (e.g., that is particularly relevant to the user) at appropriate intervals so that the user can more readily access the selected information, yet reduce the overall processing required for the user interface, which reduces power usage and improves the battery life of the device.

In some embodiments, the electronic device (e.g., 600) displays, on the display, a fourth user interface (e.g., a higher power consumption interface) of (e.g., generated by) a second application (e.g., an installed application distinct from the operating system; an interface corresponding to an application operating in the foreground) that is different from the first application, the fourth user interface including a fifth graphical object corresponding to (e.g., generated by) the second application (e.g., a graphical object that includes information provided by the second application). While displaying the fourth user interface, the electronic device (e.g., 600) detects that the electronic device has met the criteria for transitioning from the first mode to the second mode. In response to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)): in accordance with a determination that the second application is an application of the first type (e.g., an application that includes a lower power consumption interface), the electronic device (e.g., 600) replaces display of the fourth user interface of the second application with a fifth user interface (e.g., a lower power consumption interface) of the second application different from the fourth user interface (e.g., lower power interface differs from the higher power interface in one or more visual characteristics (size of elements, color, hue, saturation, opacity, shape)), the fifth user interface including a sixth graphical object corresponding to the second application (e.g., a graphical object that includes information provided by the second application). In some embodiments, the sixth graphical object is the fifth graphical object. In some embodiments, the sixth graphical object corresponds to the fifth graphical object (e.g., the sixth graphical object includes the same information as the fifth graphical object). In some embodiments, in accordance with a determination that the second application is an application of the second type (e.g., an application that does not include a lower power consumption interface), the electronic device (e.g., 600) replaces display of the fourth user interface of the second application with the third user interface (e.g., a clock face of a smart watch). In some embodiments, the third user interface is not generated by the second application. In some embodiments, the third user interface is different from the fifth user interface of the second application and the sixth user interface of the second application. In some embodiments, the third user interface does not include graphical objects (e.g., any graphical objects) generated by the second application (e.g., does not include graphical objects that include information provided by the second application).

In some embodiments, display of the first user interface (e.g., 1402 of FIG. 14A at 1410*a*, 1402 at FIG. 14B at 1412*a*, 1408 at FIG. 14C at 1414*a*, 1408 at FIG. 14D at 1416*a*, 1420 at FIG. 14E at 1418*a*) is at a brightness level above a threshold brightness level, display of the second user interface (e.g., 1404 of FIG. 14A at 1410*b*, 1404 of FIG. 14B at 1412*b*, 1422 of FIG. 14E at 1418*b*) is at a brightness level below the threshold brightness level, and display of the third user interface (e.g., 1406 of FIG. 14C at 1414*b*, 1406 at FIG. 14D at 1416*b*) is at a brightness level (e.g., same as or different from the brightness level of the second user interface) below the threshold brightness level. Reducing the brightness of the display below the threshold brightness level when in the lower power consumption mode reduces power usage and improves the battery life of the device.

In some embodiments, in response to detecting that the electronic device (e.g., 600) has met criteria for transitioning from the first mode to the second mode, prior to replacing display of the first user interface (e.g., 1408 at FIG. 14D at 1416*a*) of the first application with the third user interface (e.g., 1406 at FIG. 14D at 1416*b*), the electronic device (e.g., 600) reduces a brightness of the first user interface. In some embodiments, the electronic device slightly dims the first user interface before replacing the first user interface with the third user interface.

In some embodiments, the third user interface includes a graphical object (e.g., 1406*f* associated with a compass application) associated with a third application (e.g., the graphical object is a complication that displays information received from the third application) and a graphical object associated (e.g., 1406*g* associated with a world time application) with a fourth application (e.g., the graphical object is a complication that displays information received from the fourth application).

In some embodiments, while the electronic device is operating in the first mode, the electronic device (e.g., 600) displays, on the display, a system user interface (e.g., 1818 of FIG. 181) generated by the operating system (e.g., a plurality of icons that when activated cause display of a corresponding application user interface, a plurality of icons that when activated toggle a system setting (such as wifi on/off, bluetooth on/off)). While displaying the system user interface (e.g., 1818 of FIG. 181) generated by the operating system, the electronic device (e.g., 600) detects that the electronic device has met a sixth set of criteria for transitioning from the first mode to the second mode. In some embodiments, the sixth set of criteria for transitioning from the first mode to the second mode are met when the electronic device detects that the user has moved their wrist that is wearing the electronic device from a raised position to a non-raised position, such as detecting a wrist down gesture. In some embodiments, the sixth set of criteria for transitioning from the first mode to the second mode are met when the electronic device detects a tap input on the touch-screen display of the device. In response to detecting that the electronic device has met the fifth set of criteria for transitioning from the first mode to the second mode: the electronic device (e.g., 600) transitions from the first mode to the second mode.

In some embodiments, in response to detecting that the electronic device has met the fifth set of criteria for transitioning from the first mode to the second mode: in accordance with the electronic device displaying the system user interface when the sixth set of criteria for transitioning from the first mode to the second mode are met, replacing display of the system user interface (e.g., 1818 of FIG. 181) generated by the operating system with a clock face user interface (e.g., 1822 of FIG. 18K, 1824 of FIG. 18L; a clock face of a smart watch) different from the system user interface, the clock face user interface being an operating system user interface including one or more elements that are not part of the system user interface, including a time indicator (e.g., an analog clock hand (hour, minute, second hand); a digital clock numeral (hour, minute, second numerals). In some embodiments, the clock face user interface does not include graphical objects (e.g., any graphical objects) from the system user interface.

Note that details of the processes described above with respect to method 1500 (e.g., FIG. 15) are also applicable in an analogous manner to the methods described above/below. For example, methods 700, 900, 1100, 1300, 1700, and 1900 optionally include one or more of the characteristics of the various methods described above with reference to method 1500. For example, the first mode is the same mode throughout these methods and the second mode is the same mode throughout these methods. For brevity, these details are not repeated below.

FIGS. 16A-16F illustrate exemplary devices and user interfaces for managing display usage, in accordance with some embodiments. The user interfaces in these figures are used to illustrate the processes described below, including the processes in FIGS. 17A-17B.

In particular, FIGS. 16A-16F illustrate techniques for managing display usage by altering one or more aspects (e.g., visual characteristics) of a displayed user interface upon determining that the device has met a mode-transition criteria, such as the mode-transition criteria described in greater detail above.

Figure 16B:
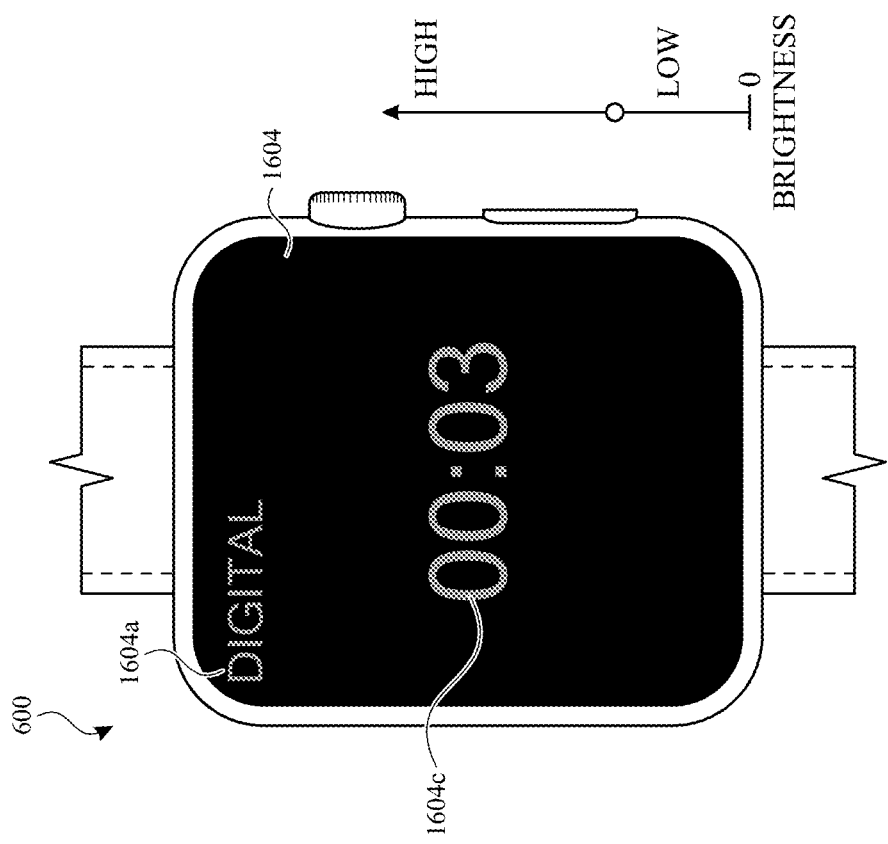
FIGS. 16A-16F illustrate exemplary user interfaces with managed display usage in accordance with embodiments.
Figure 16A:
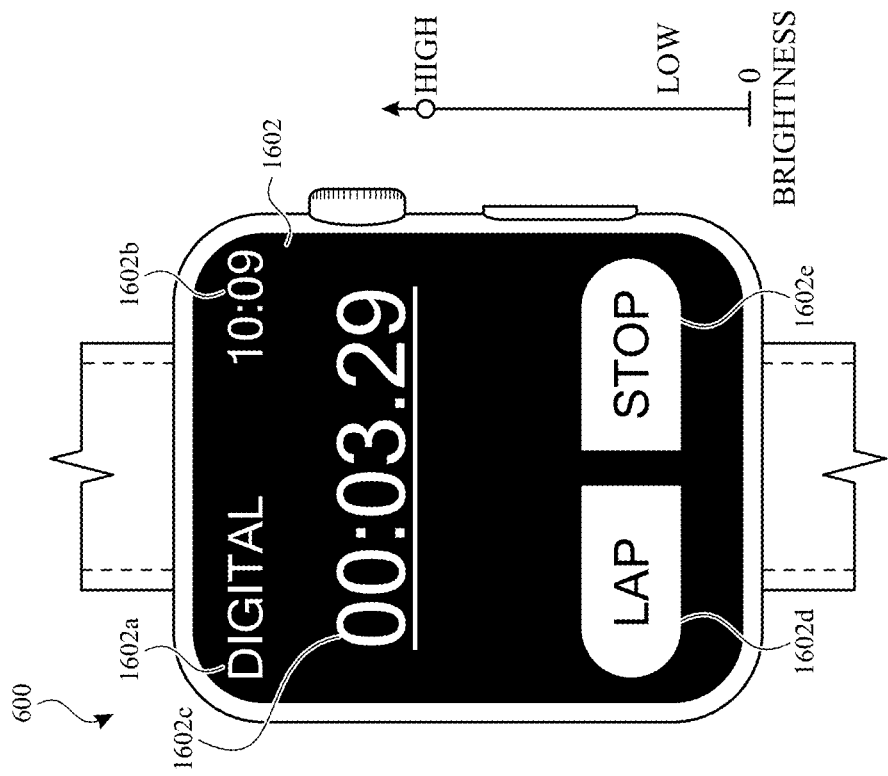

FIGS. 16A-16B illustrate a transition from a higher power consumption user interface to a lower power consumption user interface (using a first template) while displaying a stopwatch application.

FIG. 16A illustrates electronic device 600 displaying user interface 1602 of a stopwatch application while device 600 is in the standard display mode. User interface 1602 is a higher power consumption user interface. User interface 1602 includes title 1602*a* ("Digital") of the stopwatch application (indicating it is displaying a digital stopwatch), current time 1602*b*, a stopwatch timer 1602*c*, lap affordance 1602*d*, and stop affordance 1602*e*. Stopwatch timer 1602*c* indicates that 3 seconds and 29 hundredths of seconds have elapsed since the stopwatch timer was started. Title 1602*a* is displayed in a color (e.g., white) that is the same as the color (e.g., white) of current time 1602*b* and color (e.g., white) of stopwatch timer 1602c. Lap affordance 1602d, when activated (e.g., via a tap input on lap affordance 1602d), causes the stopwatch application to display a lap time. Stop affordance 1602e, when activated (e.g., via a tap input on pause affordance 1602e), causes stopwatch timer 1602c to stop running. The background of user interface 1602 is black. The stopwatch application determines the arrangement of the graphical elements of user interface 1602. The stopwatch application also determines the sizing, color, and content of the graphical elements of user interface 1602.

While displaying user interface 1602 of the stopwatch application, device 600 determines that the device has met the mode-transition criteria (e.g., detecting a wrist-down gesture using, for example, motion sensors; no input of certain types for 15 seconds). In response to the determination that device 600 has met the mode-transition criteria, device 600 transitions to a low power display mode and replaces user interface 1602 with user interface 1604. User interface 1604 is a lower power consumption interface (as compared to 1602) and is displayed using the first template (e.g., based on device 600 having determined that the timer application corresponds to the first template).

FIG. 16B illustrates electronic device 600 displaying user interface 1604 while device 600 is in the low power display mode. User interface 1604 relies on the first template to include title 1604a ("Digital") of the stopwatch application (indicating digital stopwatch) and stopwatch timer 1604c. The first template optionally specifies one or more of: the quantity of graphical elements, the color of graphical elements (e.g., gray), the size of graphical elements (larger size for the timer, smaller size for the title), the location of graphical elements (e.g., centered on display for the timer), the brightness level of graphical elements, the background color (e.g., black), the font of text, and the precision with which data is displayed. User interface 1604 does not include current time (e.g., 1602b), a lap affordance (e.g., 1602d), or a stop affordance (e.g., 1602e) because, for example, the first template only accommodates a single type of information (e.g., a time) to be displayed in addition to the title. In the examples of FIGS. 6A-6B, stopwatch timer 1604c is displayed at a larger size than stopwatch timer 1602c. Title 1604a and stopwatch timer 1604c are displayed in a gray color. The background of user interface 1604 is black. User interface 1604 has a lower brightness level than user interface 1602.

In some embodiments, the stopwatch application provides the time for stopwatch timer 1604c, but the stopwatch application is not able to specify (e.g., because the operating system of device 600 specifies) the color, size, location, font, and/or precision with which to display the timer, for device 600 to display user interface 1604 in the low power display mode.

Figure 16C:
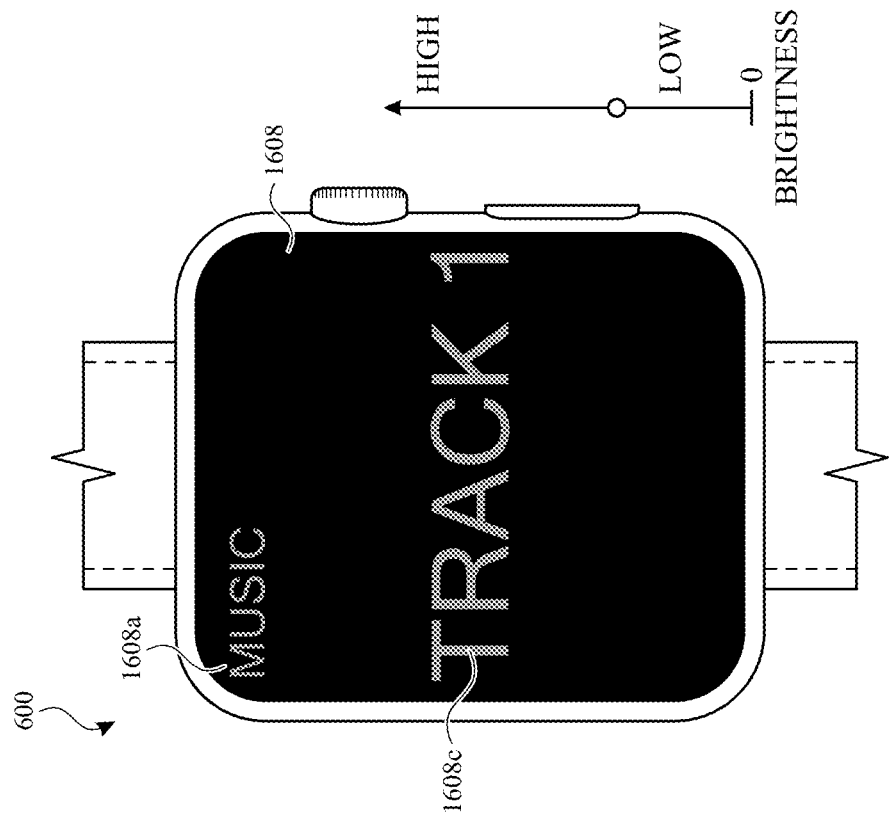
Figure 16D:
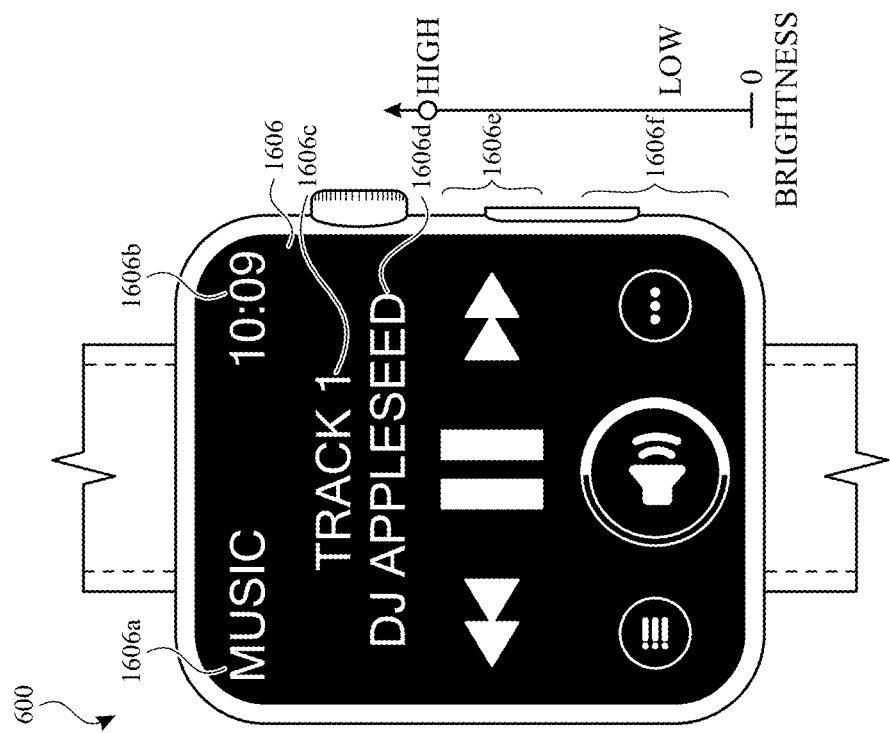

FIGS. 16C-16D illustrate a transition from a higher power consumption user interface to a lower power consumption user interface (using the first template) while displaying a music application.

FIG. 16C illustrates electronic device 600 displaying user interface 1606 of a music application while device 600 is in the standard display mode. User interface 1606 is a higher power consumption user interface. User interface 1606 includes title 1606a ("Music") of the music application, current time 1606b, song name 1606c ("Track 1"), artist name 1606d ("DJ Appleseed"), playback controls 1606e (which, when activated, skip to the beginning of the current song, pause the current song, and skip to a next song), and controls 1606f (which, when activated, enable changing settings of the music application). Title 1606a, time 1606b, song name 1606c, artist name 1606d, playback controls 1606e, and controls 1606f are optionally displayed in the same color (e.g., white) in user interface 1606. The background of user interface 1606 is black. The music application determines the arrangement of the graphical elements (e.g., 1606c, 1606d, 1606e) of user interface 1606. The music application also determines the sizing, color, and content of the graphical elements of user interface 1606.

While displaying user interface 1606 of the music application, device 600 determines that device 600 has met the mode-transition criteria (e.g., detecting a wrist-down gesture using, for example, motion sensors; no input of certain types for 15 seconds). In response to the determination that device 600 has met the mode-transition criteria, device 600 transitions to a low power display mode and replaces user interface 1606 with user interface 1608. User interface 1608 is a lower power consumption interface (as compared to 1606) and is displayed using the first template (e.g., based on device 600 having determined that the music application corresponds to the first template).

FIG. 16D illustrates electronic device 600 displaying user interface 1608 while device 600 is in the low power display mode. User interface 1608 relies on the first template to include title 1608a ("Music") of the music application and song name 1608c. The first template optionally specifies one or more of: the quantity of graphical elements, the color of graphical elements (e.g., gray), the size of graphical elements (larger size for the song name, smaller size for the title), the location of graphical elements (e.g., song name centered on display), the brightness level of graphical elements, the background color (e.g., black), the font of text, and the precision with which data is displayed. User interface 1608 does not include current time (e.g., 1606b), artist name (e.g., 1606d), playback controls (e.g., 1606e), or controls (e.g., 1606f) because, for example, the first template only accommodates a single type of information (e.g., a song name) to be displayed in addition to the title. In the examples of FIGS. 6C-6D, song name 1608c is displayed at a larger size than song name 1606c. Title 1608a and song name 1608c are displayed in a gray color. The background of user interface 1608 is black. User interface 1608 has a lower brightness level than user interface 1606.

In some embodiments, the music application provides the name for song name 1608c, but the music application is not able to specify the color, size, location, font, and/or precision with which to display the name, for device 600 to display user interface 1608 in the low power display mode.

Because user interface 1604 and 1608 both use the same first template, they have various visual characteristics in common. In some embodiments, the location, size, color, and font of title 1604a is the same as those of 1608a. In some embodiments, the location, size, color, and font of stopwatch timer 1604c is the same as those of song name 1608c. In some embodiments, the background color of user interface 1604 and 1608 is the same color. In some embodiments, user interface 1604 and 1608 each include only two fields (e.g., for title and for stopwatch timer/song name).

Figure 16F:
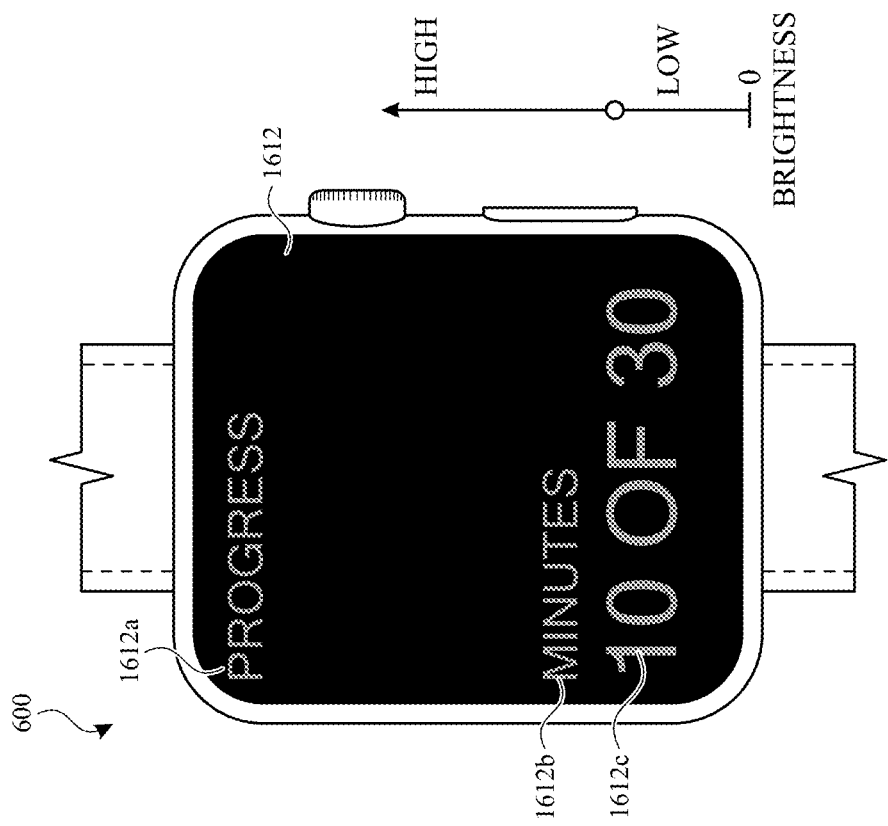
Figure 16E:
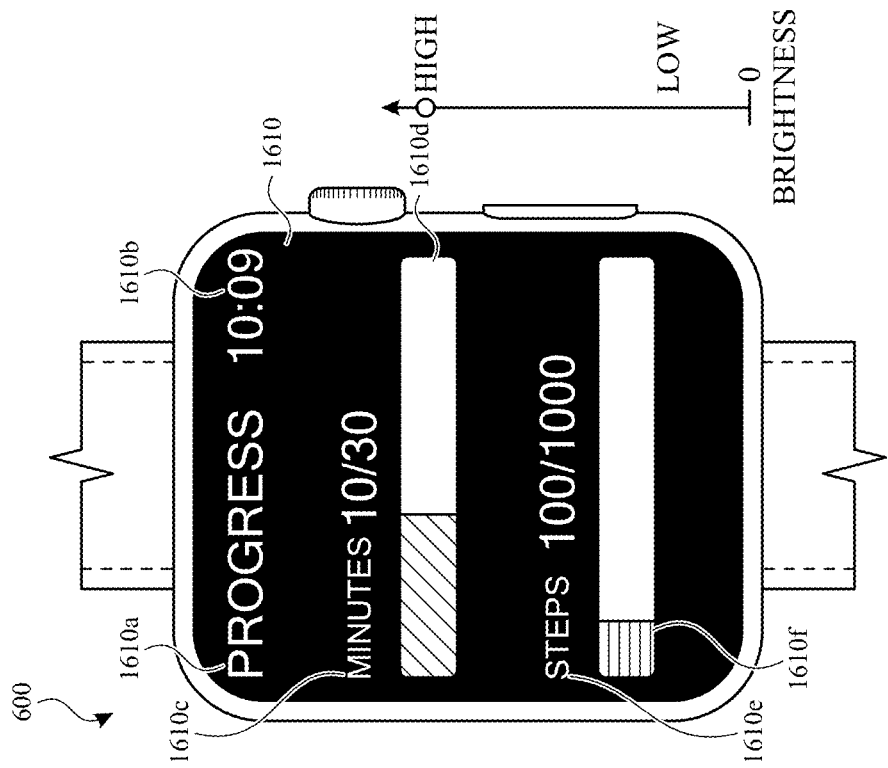

FIGS. 16E-16F illustrate a transition from a higher power consumption user interface to a lower power consumption user interface (using a second template) while displaying a progress tracking application.

FIG. 16E illustrates electronic device 600 displaying user interface 1610 of a progress tracking application while device 600 is in the standard display mode. User interface 1610 is a higher power consumption user interface. User interface 1610 includes title 1610a ("Progress") of the progress tracking application, current time 1610b, time progress text 1610c, time progress bar 1610d, step progress text 1610e, and step progress bar 1610f. Title 1610a, time 1610b, time progress text 1610c, and step progress text 1610e are optionally displayed in the same color (e.g., white) in user interface 1610. The background of user interface 1610 is black. The progress tracking application determines the arrangement of the graphical elements (e.g., 1610c, 1610d, 1610e, 1610f) of user interface 1610. The progress tracking application also determines the sizing, color, and content of the graphical elements of user interface 1610.

While displaying user interface 1610 of the progress tracking application, device 600 determines that device 600 has met the mode-transition criteria (e.g., detecting a wrist-down gesture using, for example, motion sensors; no input of certain types for 15 seconds). In response to the determination that device 600 has met the mode-transition criteria, device 600 transitions to a low power display mode and replaces user interface 1610 with user interface 1612. User interface 1612 is a lower power consumption interface (as compared to 1610) and is displayed using the second template (e.g., based on device 600 having determined that the progress tracking application corresponds to the second template) that is different from the first template.

FIG. 16F illustrates electronic device 600 displaying user interface 1612 while device 600 is in the low power display mode. User interface 1612 relies on the second template to include title 1612a of the progress tracking application, measurement units 1612b, and time progress information 1612c. The second template optionally specifies one or more of: the quantity of graphical elements, the color of graphical elements (e.g., gray), the size of graphical elements (larger size for the timer, smaller size for the title), the location of graphical elements (e.g., centered on display for the timer), the brightness level of graphical elements, the background color (e.g., black), the font of text, and the precision with which data is displayed. User interface 1608 does not include current time (e.g., 1610b), time progress bar (e.g., 1610d), step progress text (e.g., 1610e), and step progress bar (e.g., 1610f) because, for example, the second template only accommodates a measurement unit and a set of progress information to be displayed in addition to the title. In the examples of FIGS. 6E-6F, the progress of minutes is displayed in a different format, as illustrated by time progress information 1612c. Measurement units 1612b is displayed at a smaller font as compared to time progress information 1612c. Title 1612a, measurement units 1612b, and time progress information 1612c are displayed in a gray color. The background of user interface 1612 is black. User interface 1612 has a lower brightness level than user interface 1610.

In some embodiments, the progress tracking application provides the units for measurement units 1612b and provides the progress and goal for time progress information 1612c, but the progress tracking application is not able to specify the color, size, location, font, and/or precision with which to display the information, for device 600 to display user interface 1612 in the low power display mode.

Because user interface 1612 uses a second template that is different from the first template used for user interface 1604 and 1608, use interface 1612 has various visual characteristics that differ from those of user interfaces 1604 and 1608. In some embodiments, the location, size, color, and font of measurement units 1612b and time progress information 1612c are different from graphical elements of user interfaces 1604 and 1608. In some embodiments, the background color of user interface 1604, 1608, and 1612 is the same color. In some embodiments, user interface 1604 and 1608 each include only two fields (e.g., for title and for stopwatch timer/song name), while user interface 1612 includes more than two fields.

FIGS. 17A-17B are a flow diagram illustrating a method for managing display usage using an electronic device in accordance with some embodiments. Method 1700 is performed at a device (e.g., 100, 300, 500, device 600, a smart watch, a smart phone, a tablet computer) with a display. Some operations in method 1700 are, optionally, combined, the orders of some operations are, optionally, changed, and some operations are, optionally, omitted.

As described below, method 1700 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

While (1702) the electronic device (e.g., 600) is operating in a first mode (e.g., a higher power consumption mode), the electronic device (e.g., 600) displays (1704), on the display, a first user interface (e.g., 1602; a higher power consumption interface) of a first application with an arrangement of user interface elements (e.g., 1602c-1602e) determined by the first application, and displays (1706), on the display, a second user interface (e.g., 1606; a higher power consumption interface) of a second application with an arrangement of user interface elements (e.g., 1606c-1606f) determined by the second application.

While the electronic device (e.g., 600) is operating in the first mode, the electronic device (e.g., 600) detects (1710) that the electronic device has met criteria for transitioning from the first mode to a second mode (e.g., a lower power consumption mode).

In response to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)), the electronic device (e.g., 600) transitions (1712) from the first mode to the second mode.

Transitioning (1712) from the first mode to the second mode includes: in accordance with a determination that the first application (e.g., 1602) was displayed on the display when the electronic device detected that the electronic device has met criteria for transitioning from the first mode to a second mode, displaying (1714) information (e.g., 1604c) from the first application in a predefined template (e.g., template shown used in 1604 and 1608; a preset format (e.g., comprising preset elements (e.g., graphical elements, watch complications, text elements, and/or time indicator elements), preset sizes for elements, preset color schemes for elements, preset brightness level schemes for elements, and/or present positions for elements); a preset arrangement; a preset layout).

Transitioning (1712) from the first mode to the second mode includes: in accordance with a determination that the second application (e.g., 1606) was displayed on the display when the electronic device detected that the electronic device has met criteria for transitioning from the first mode to a second mode, displaying (1716) information (e.g., 1608c) from the second application in the predefined template (e.g., template shown used in 1604 and 1608). As discussed above in greater detail, the first mode and the second mode are different modes in which the electronic device can operate.

Displaying information from various applications using the same template enables the device to display information from those various applications using a lower power consumption interface, which reduces power usage and improves the battery life of the device. Displaying information in the same template also provides the user with feedback about the state of the device (e.g., that it is in the second mode). Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, while (1702) the electronic device is operating in the first mode (e.g., a higher power consumption mode), the electronic device (e.g., 600) displays (1708) a third user interface (e.g., 1610; a higher power consumption interface) of a third application with an arrangement of user interface elements (e.g., 1610*c*-1610*f*) determined by the third application. In some embodiments, transitioning (1712) from the first mode to the second mode includes: in accordance with a determination that the third application (e.g., 1610) was displayed on the display when the electronic device detected that the electronic device has met criteria for transitioning from the first mode to a second mode, displaying (1718) information (e.g., 1612*b*-1612*c*) from the third application in a second predefined template (e.g., template as shown in 1612) that is different (e.g., having a different predefined set or arrangement of elements; having the same elements but arranged in a different predefined spatial pattern) from the predefined template (e.g., template as shown in 1604 and 1608). In some embodiments, different applications use different predefined temples for displaying information while the electronic device is in the second mode. In some embodiments, the first application and the second application are a first type of application and accordingly use the predefined template and the third application is a second type of application (different from the first type) and thus the second predefined template is used. In some embodiments, the predefined template and the second predefined template include placement of user interface elements at different positions.

Displaying information from particular types of applications using templates that correspond to the application enables the device to display information from those different types of applications in formats appropriate for the applications in lower power consumption interface formats, which reduces power usage and improves the battery life of the device.

In some embodiments, the predefined template (e.g., template as shown in 1604 and 1608) is a user interface template configured for use in a low power consumption mode. In some embodiments, the power required to display the first user interface is higher than that required to display information (e.g., of the first and/or the second applications) in the predefined template. In some embodiments, displaying information of the first application in the predefined template requires approximately the same amount of power as displaying the information of the second application in the predefined template.

In some embodiments, the predefined template includes an icon template field for display of an application icon corresponding to the application that was displayed on the display when the electronic device detected that the electronic device has met criteria for transitioning from the first mode to a second mode.

In some embodiments, the predefined template includes an information template field (e.g., template field for displaying 1604*c*, 1608*c*) for display of the information from the application that was displayed on the display when the electronic device detected that the electronic device has met criteria for transitioning from the first mode to a second mode.

In some embodiments, the predefined template also includes a title template field for display of the name of the application or a title provided by the application. In some embodiments, the icon template field is positioned at the top of the user interface, the title template field is positioned below the icon template field, and the information template field is displayed below the title template field. Displaying an application icon and information from an application provides the user with feedback about which application is providing the information. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, the first application is of a first category of applications (e.g., applications that require more frequent display updates in the second mode) and the second application is of a second category of applications (e.g., applications that require less frequent updates in the second mode) different from the first category of information. While the electronic device is operating in the second mode, the electronic device (e.g., 600) updates the information (e.g., 1604*c*, 1608*c*) from the application that was displayed on the display when the electronic device detected that the electronic device has met criteria for transitioning from the first mode to a second mode, over time with an update interval that is determined based on the category of the application. In some embodiments, when information from the first application is being displayed, the information is updated with a first update interval (e.g., updated every second) and when information from the second application is being displayed, the information is updated with a second update interval (e.g., updated every two seconds) that is different from the first update interval. For example, information from an application that is categorized as a workout (e.g., user exercise tracking) application is updated more frequently than information from an application that is not categorized as a workout application.

Changing the interval at which displayed information from applications are updated based on the category of the application enables the device to conserve battery power by reducing the frequency with which the information to be displayed is calculated and the frequency with which the display should be refreshed when, for example, the application is a lower priority application and/or the application does not provide frequent/constant updated information, which reduces power usage and improves the battery life of the device.

In some embodiments, the information from the first application is of a first category of information (e.g., timer information 1604*c*, information that requires more frequent display updates in the second mode) and the information from the second application is of a second category of information (e.g., track name information 1608c, information that require less frequent updates in the second mode) different from the first category of information. While the electronic device is operating in the second mode, the electronic device (e.g., 600) updates display of information (e.g., 1604c, 1608c) from the application that was displayed on the display over time with an update interval that is determined based on the category of the information. In some embodiments, displayed information from the first category of information is updated with a first information update interval (e.g., updated every second) and displayed information from the second category of information is updated with a second information update interval (e.g., updated every two seconds, ten seconds, or minute) that is different from the first information update interval. For example, information that is categorized as workout (e.g., user exercise tracking) information is updated more frequently than information that is not categorized as workout information. Changing the interval at which displayed information from applications are updated based on the category of the information enables the device to conserve battery power by reducing the frequency with which the information to be displayed is calculated and the frequency with which the display should be refreshed when, for example, the type of information is lower priority information and/or the type of information is not time-sensitive, which reduces power usage and improves the battery life of the device.

In some embodiments, displaying the first user interface (e.g., a higher power consumption interface) of the first application with an arrangement of user interface elements determined by the first application includes displaying information of a first category of information (e.g., timer information; workout information, steps taken, heart rate). In some embodiments, displaying information from the first application in the predefined template includes displaying information of the first category of information. In some embodiments, the displayed information from the first application in the predefined template being visually different (e.g., not having a hundredths of seconds field as shown in 1604c) from the displayed information in the first user interface by one or more visual characteristics other than color. In some embodiments, the information displayed in the first user interface is a first size and the same category of information displayed using the predefined template is in a second size different from the first size (e.g., smaller than the first size). In some embodiments, the information displayed in the first user interface is displayed at a first brightness level and the same category of information displayed using the predefined template is in at a second brightness level different from the first brightness level (e.g., less bright than the first brightness level).

Displaying the information from the application in visually distinct ways provides the user with feedback about the state of the device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves the battery life of the device by enabling the user to use the device more quickly and efficiently.

In some embodiments, displaying the first user interface (e.g., 1602; a higher power consumption interface) of the first application with an arrangement of user interface elements determined by the first application includes displaying a first set of information (e.g., minutes and seconds of 1602c) and a second set of information (e.g., hundredths of seconds of 1602c). In some embodiments, displaying information from the first application in the predefined template includes displaying the first set of information (e.g., minutes and seconds of 1602c) without displaying the second set of information (e.g., hundredths of seconds of 1602c). In some embodiments, the amount of information displayed while in the second mode is less than the amount of information displayed while in the first mode.

In some embodiments, a first display brightness level (e.g., average pixel luminance (APL), average lumen output, total lumen output, average illuminance, or total illuminance of the indicator on the display; brightness expressed in nits, lux, or lumens) of the display while displaying the first user interface (e.g., 1602) while the electronic device is in the first mode (e.g., a higher power consumption mode) is higher than a second display brightness level of the display while displaying information from the first application in the predefined template (e.g., 1604) while the electronic device is in the second mode (e.g., a lower power consumption mode). In some embodiments, a third display brightness level (e.g., Average Pixel Luminance (APL)) of the display while displaying the second user interface while the electronic device is in the first mode (e.g., a higher power consumption mode) is higher than a fourth display brightness level (e.g., APL, same as second display brightness) of the display while displaying information from the second application in the predefined template while the electronic device is in the second mode (e.g., a lower power consumption mode). Thus, the overall brightness of the display is reduced when displaying information while the electronic device is in the second mode as compared to displaying information while the electronic device is in the first mode. Reducing the overall brightness of the display reduces power usage and improves the battery life of the device, while still enabling the user to access the device.

Note that details of the processes described above with respect to method 1700 (e.g., FIGS. 17A-17B) are also applicable in an analogous manner to the methods described above/below. For example, methods 700, 900, 1100, 1300, 1500, and 1900 optionally include one or more of the characteristics of the various methods described above with reference to method 1700. For example, the first mode is the same mode throughout these methods and the second mode is the same mode throughout these methods. For brevity, these details are not repeated below.

FIGS. 18A-18L illustrate exemplary devices and user interfaces for managing display usage, in accordance with some embodiments. The user interfaces in these figures are used to illustrate the processes described below, including the processes in FIG. 19.

In particular, FIGS. 18A-18F illustrate techniques for managing display usage by altering one or more aspects (e.g., visual characteristics) of a displayed user interface upon determining that the device has met a mode-transition criteria, such as the mode-transition criteria described in greater detail above.

FIGS. 18A-18F illustrate a transition from a higher power consumption user interface (e.g., FIG. 18A) to a lower power consumption user interface (e.g., FIG. 18D) and back to the higher power consumption user interface (e.g., 18F) for a user interface of a music application.

Figure 18B:
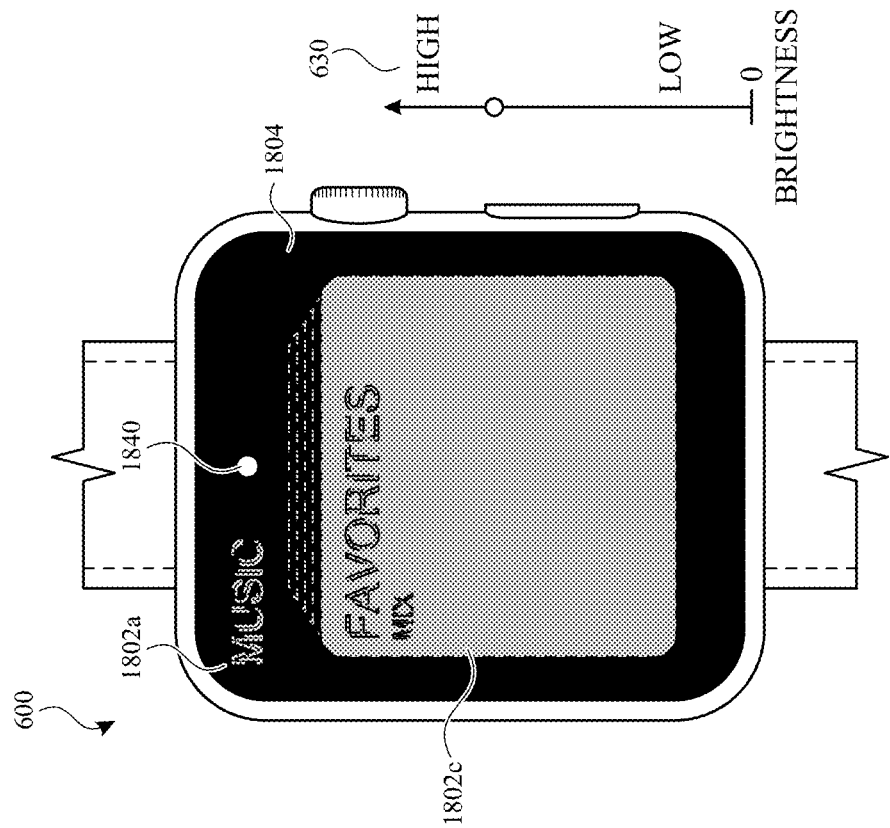
FIGS. 18A-18L illustrate exemplary user interfaces with managed display usage in accordance with embodiments.
Figure 18A:
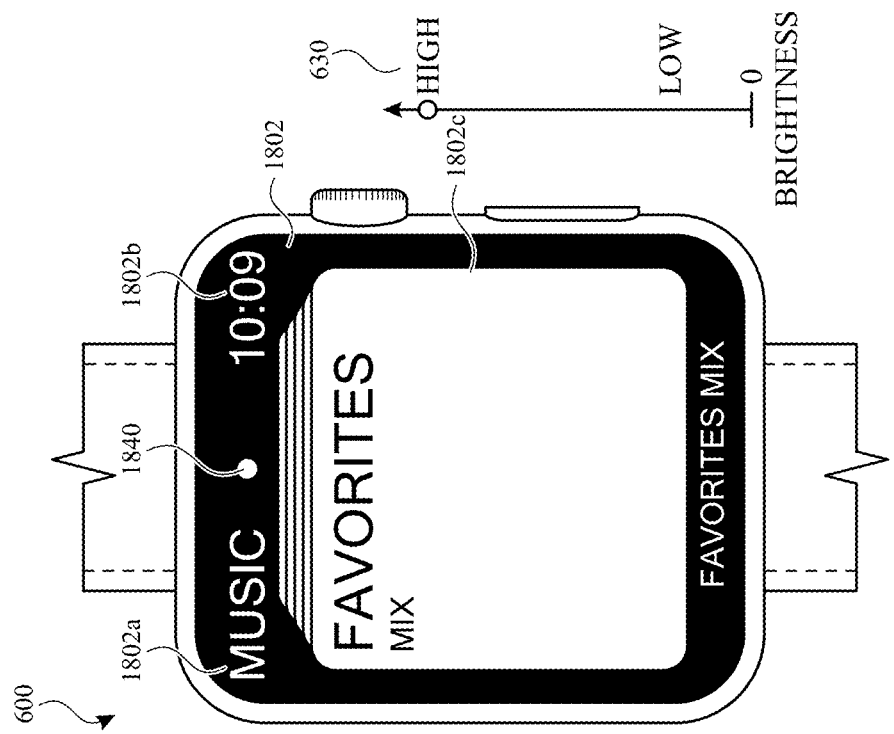

FIG. 18A illustrates electronic device 600 in the standard display mode and displaying user interface 1802 for a music application at a standard display mode brightness level. User interface 1802 includes title 1802a (e.g., "Music") and graphical elements 1802 (e.g., a stack of albums). User interface 1802 is a higher power consumption user interface displayed while device 600 is in the standard display mode. While displaying user interface 1802, device 600 determines that device 600 has met the mode-transition criteria (e.g., detecting a wrist-down gesture using, for example, motion sensors; receiving no input of certain types for 15 seconds). In response to the determination that device 600 has met the mode-transition criteria, device 600 begins to transition to a low power display mode, resulting in replacing user interface 1802 with user interface 1804, a lower power consumption user interface. At FIG. 18A, device 600 also displays notification indicator 1840, which indicates that one or more unread notifications are available.

As part of the transition from user interface 1802 to user interface 1804, device 600 ceases to display (e.g., fades out, blurs out) current time 1802b and changes the brightness of user interface 1802 (e.g., including title 1802a and graphical elements 1802c) such that they are less bright, as shown in user interface 1804 of FIG. 18B. For example, device 600 changes some (or all) white elements, such as title 1802, to a gray color, thereby reducing the amount of power the elements consume and reducing the risk of burn-in on the display. Concurrently with reducing the brightness of user interface 1802, device 600 reduces the size of user interface 1802, while optionally maintaining a center of user interface 1802, as shown in user interface 1804 of FIG. 18B. Further, device 600 applies a first level of blur to elements of user interface 1802, as shown in user interface 1804 of FIG. 18B. As a result, device 600 provides an animation of user interface 1802 moving backwards in z-space and blurring out while the display reduces in brightness. While transitioning from the interface of FIG. 18A to that of FIG. 18B, device 600 maintains the size, location, color, and overall look of notification indicator 1840 (e.g., no blurring). As noted by brightness scale 630, the overall brightness of the display of device 600 is higher while displaying user interface 1802 than while displaying user interface 1804.

The transition continues, with device 600 animating changes from user interface 1804 to user interface 1806. Device 600 displays (e.g., fades in, blurs in) current time 1806b and changes the brightness of user interface 1804 (e.g., including title 1802a and graphical elements 1802c) such that user interface 1806 is less bright as compared to user interface 1804 and 1802, as shown in FIG. 18C. For example, device 600 changes some (or all) gray elements, such as title 1802a, to a darker gray color, thereby reducing the amount of power the elements consume and reducing the risk of burn-in on the display. Concurrently with reducing the brightness of user interface 1804, device 600 further reduces the size of user interface 1804 while optionally maintaining a center of user interface 1804, as shown in user interface 1806 of FIG. 18C. Further, device 600 applies a second (additional) level of blur to elements of user interface 1804, as shown in user interface 1806 of FIG. 18C. As a result, device 600 provides a further animation of user interface 1804 moving further backwards in z-space and blurring out more while the display further reduces in brightness. While transitioning from the interface of FIG. 18B to that of FIG. 18C, device 600 continues to maintain the size, location, color, and overall look of notification indicator 1840 (e.g., no blurring). As noted by brightness scale 630, the overall brightness of the display of device 600 is higher while displaying user interface 1804 than while displaying user interface 1806. Thus, the device consumes less power while displaying user interface 1806.

Current time 1806b at FIG. 18C is displayed in white and is larger than current time 1802b at FIG. 18A. The location of current time 1806b is different as compared to that of current time 1802b. For example, current time 1806b is further from the edge of the display as compared to current time 1802b. For another example, current time 1806b is closer to the center of the display as compared to current time 1802b.

Figure 18D:
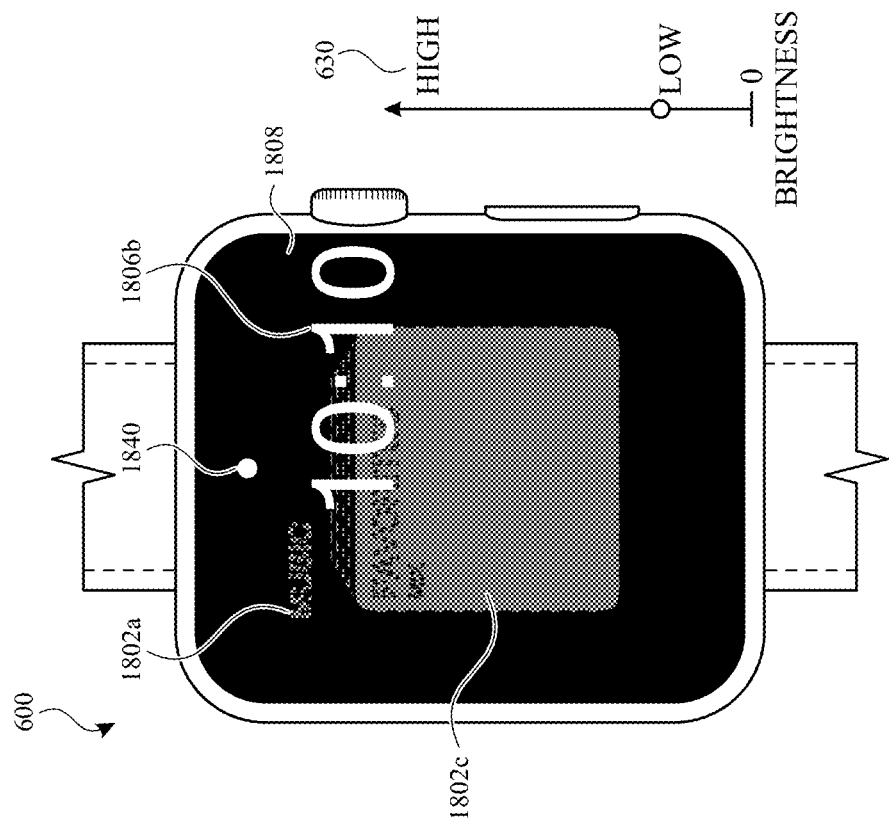
Figure 18C:
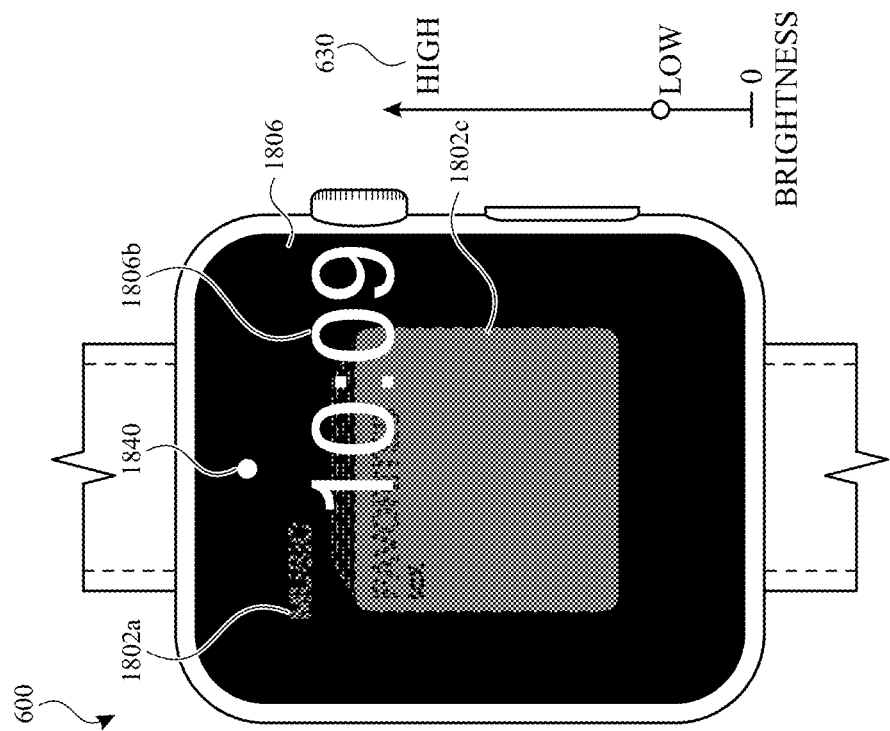
Figure 18F:
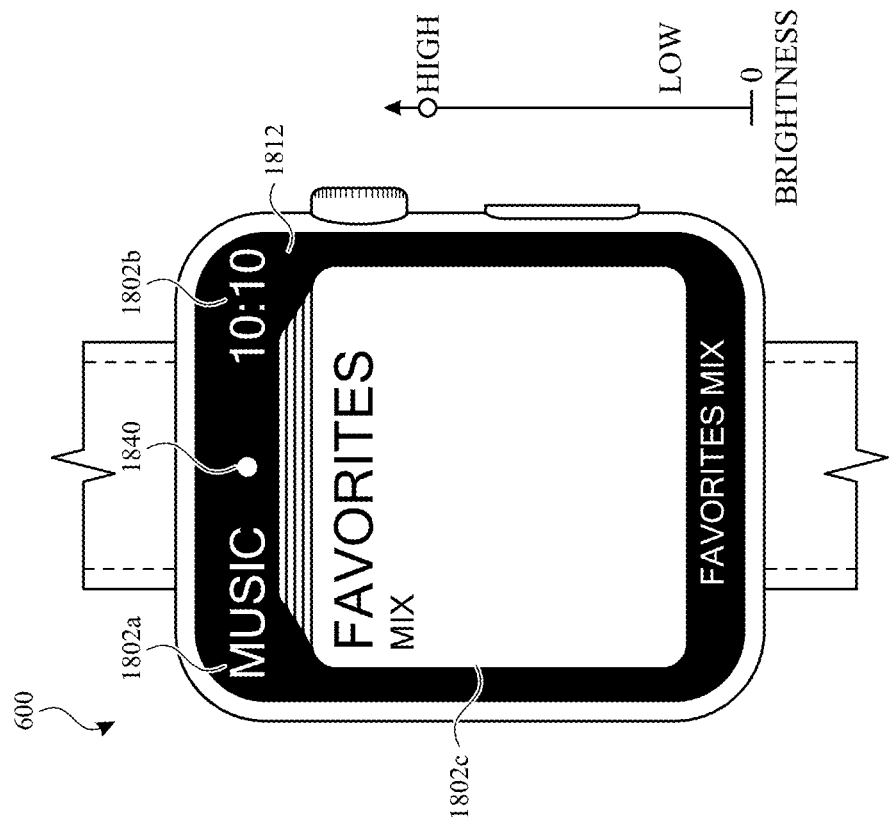

At FIGS. 18C-18D, device 600 is in the low power display mode and is displaying aspects of user interfaces 1802 at a reduced size and brightness, which include blurred out elements of the music application (e.g., 1802a, 1802c), and current time 1806b, which are not blurred out. As time elapses, current time 1806b is updated, as illustrated in the transition between FIGS. 18C and 18D. In some embodiments, the location, size, and/or color of current time 1806b changes (e.g., changes as time progresses) between user interface 1806 and user interface 1808 in FIGS. 18C and 18D, thereby reducing the likelihood of burn-in of the display. In some embodiments, the blurred out contents of the user interface of the music application remain static (e.g., the contents do not update, even as the music application executes) while the device is in the low power display mode.

While displaying user interface 1808 at FIG. 18D and while device 600 is in the low power display mode, device 600 receives a request (e.g., detects a wrist raise gesture, detects a tap on the display of device 600) to transition to the standard display mode. In response to receiving the request to transition to the standard display mode, device 600 animates a transition between user interface 1808 of FIG. 18D to user interface 1812 of FIG. 18F.

Figure 18E:
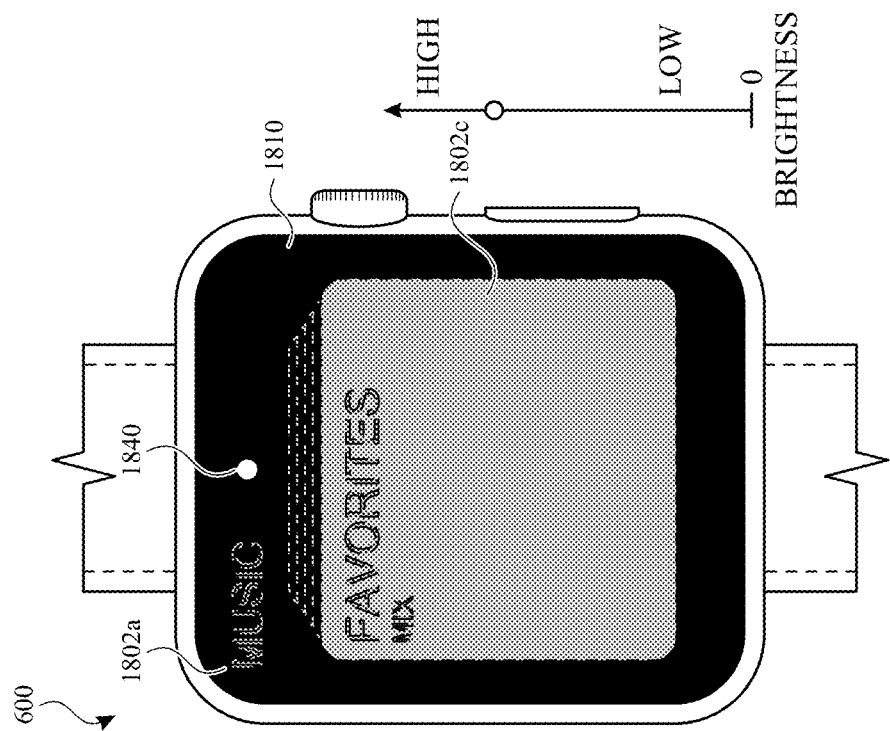

As part of the animated transition to display user interface 1812, device 600 ceases to display (e.g., fades out, blurs out) current time 1806b, as illustrated in user interface 1810 of FIG. 18E. At FIG. 18E, the overall brightness of the display has increased as compared to the display of device 600 at FIG. 18D. Title 1802a and graphical elements 1802c become larger, brighter, and less blurred as compared to user interface 1808. Dark gray elements become less dark (e.g., light gray). While transitioning from the interface of FIG. 18D to that of FIG. 18E, device 600 maintains the size, location, color, and overall look of notification indicator 1840 (e.g., no blurring). As the animation continues, at FIG. 18F, device 600 displays (e.g., fades in, blurs in) current time 1802b (e.g., at the same location as previously displayed current time 1802b in user interface 1802). At FIG. 18F, the overall brightness of the display has increased as compared to the display of device 600 at FIG. 18E. In user interface 1812, title 1802a and graphical elements 1802c become larger, brighter, and are no longer blurred. In some examples, user interface 1812 returns to not being monochrome (having various colors).

Figure 18H:
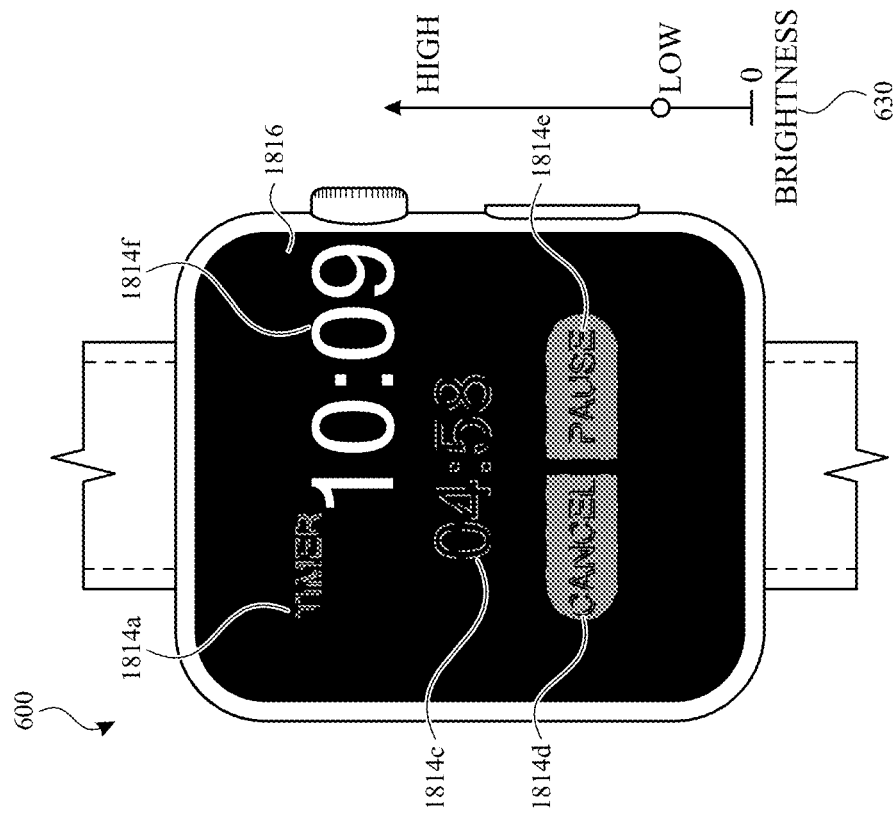
Figure 18G:
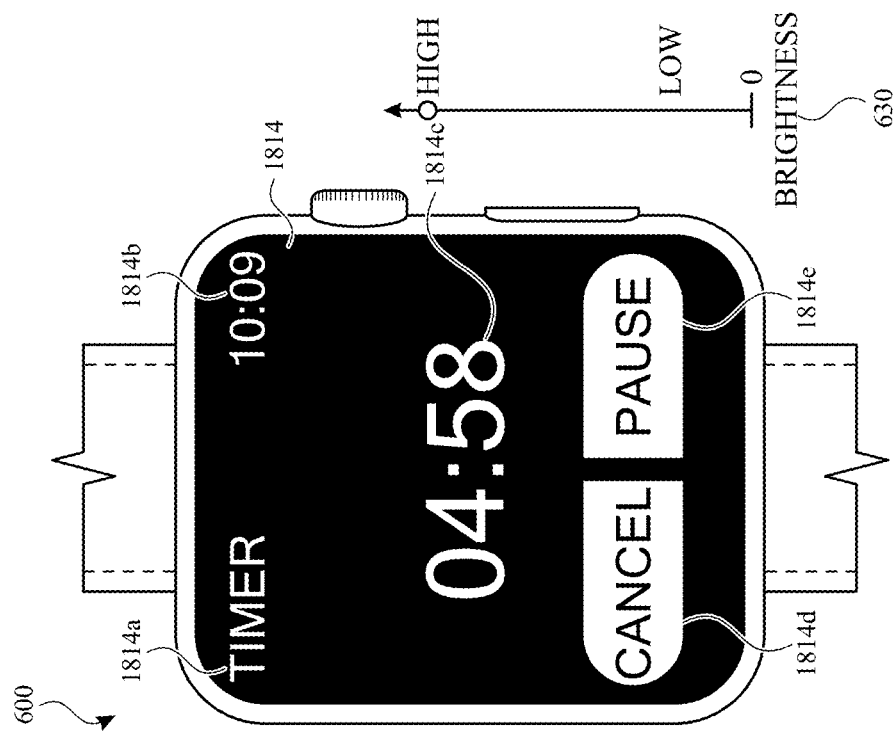

FIGS. 18G-18H illustrate a transition from a higher power consumption user interface (e.g., FIG. 18G) to a lower power consumption user interface (e.g., FIG. 18H) for a user interface of a timer application. In some embodiments, the timer application is the same as that described with reference to FIGS. 14A and 14B. For example, user interface 1814 corresponds to user interface 1402.

FIG. 18G illustrates electronic device 600 in the standard display mode and displaying user interface 1814 for a timer application. User interface 1814 includes title 1814a ("Timer") of the timer application, current time 1814b, a countdown timer 1814c, cancel affordance 1814d, and pause affordance 1814e. Countdown timer 1814c indicates that there are 4 minutes and 58 seconds left in the timer, at which point device 600 will provide an alert (visual, audio, and/or tactile) that the timer has expired. Title 1814a is displayed in a color (e.g., orange) different from the color (e.g., white) of current time 1814b and color (e.g., white) of countdown timer 1814*c*. Cancel affordance 1814*d*, when activated (e.g., via a tap input on cancel affordance 1814*d*), causes the countdown of countdown timer 1814*c* to be canceled. Pause affordance 1814*e*, when activated (e.g., via a tap input on pause affordance 1814*e*), causes the countdown of countdown timer 1814*c* to be paused. The background of user interface 1814 is black.

User interface 1814 is a higher power consumption user interface displayed while device 600 is in the standard display mode. While displaying user interface 1814, device 600 determines that device 600 has met the mode-transition criteria (e.g., detecting a wrist-down gesture using, for example, motion sensors; no input of certain types for 15 seconds). In response to the determination that device 600 has met the mode-transition criteria, device 600 begins to transition to a low power display mode, resulting in replacing user interface 1814 with user interface 1816, a lower power consumption user interface.

As part of the transition from user interface 1814 to user interface 1816, device 600 ceases to display (e.g., fades out, blurs out) current time 1802*b* instead displays current time 1814*f* at a larger size and at a different location. Device 600 reduces the brightness of the display when transitioning from user interface 1814 to 1816. Device 600 reduces the brightness at which title 1814*a*, countdown timer 1814*c*, cancel affordance 1814*d*, and pause affordance 1814*e* are displayed. For example, device 600 changes some (or all) white elements, such as title 1802, to a gray color, thereby reducing the amount of power the elements consume and reducing the risk of burn-in on the display. Concurrently with reducing the brightness of the user interface, device 600 reduces the size of the user interface elements, while optionally maintaining a center of the user interface, as shown in the transition between user interface 1814 and 1816. Device 600 blurs elements of the user interface, as shown in user interface 1816 of FIG. 18H. As a result, device 600 provides an animation of the user interface of the timer application moving backwards in z-space, becoming monochrome in color, and blurring out while the display reduces in brightness. As noted by brightness scale 630, the overall brightness of the display of device 600 is higher while displaying user interface 1814 as compared to displaying user interface 1816. Thus, device 600 consumes less power while in the low power display mode and is displaying user interface 1816 as compared to user interface 1814. In some embodiments, while displaying user interface 1814, displayed graphical elements of timer application optionally remain static (e.g., timer 1814*c* does not update) while the current time 1814*f* does update. As illustrated in FIG. 18H, in some embodiments, while displaying user interface 1814, some (or all) displayed graphical elements of timer application update (e.g., with various update intervals, as described above). For example, countdown timer 1814*c* has been updated to reflect that one second has elapsed and thus countdown timer 1814*c* indicates 4 minutes and 57 seconds remaining. While device 600 is in the low power display mode, a process of the timer application continues to execute. For example, device 600 will alert the user once the timer of the timer application expires.

Figure 18J:
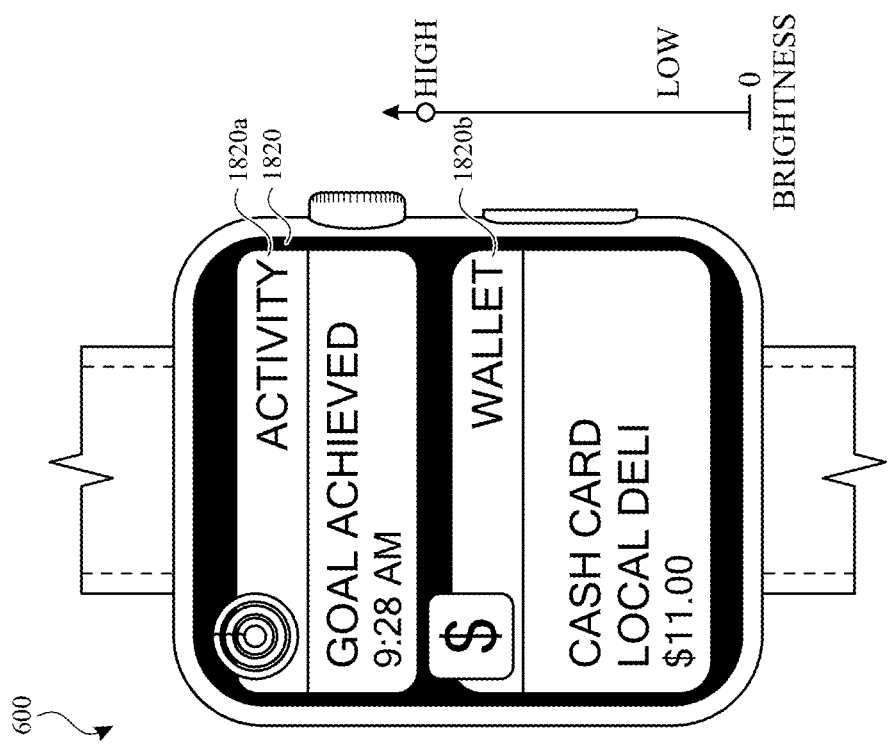
Figure 18I:
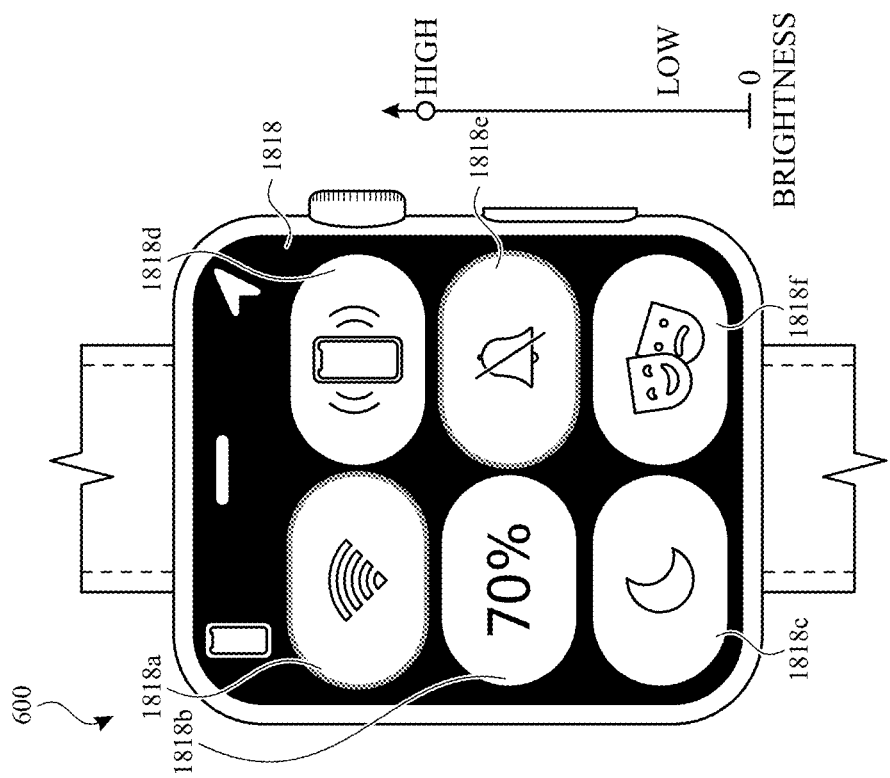

FIGS. 18I and 18J illustrate device 600 operating in a standard display mode while displaying system user interface 1818. System user interface 1818 corresponds to (or is the same as) user interface 608-11, as described above. In FIG. 18I, device 600 is displaying system settings user interface 1818, which provides the user with an easy way to: enable/disable wifi (e.g., by the device detecting a tap gesture on wifi affordance 1818*a*), check battery percentage 1818*b*, turn on Do Not Disturb (e.g., by device 600 detecting a tap gesture on affordance 1818*c*), locating an external device (e.g., by the device detecting a tap gesture on ping affordance 1818*d*), silence device 600 (e.g., by device 600 detecting a tap gesture on silence affordance 1818*e*), turn on theater mode (e.g., by device 600 detecting a tap gesture on theater affordance 1818*f*).

In FIG. 18J, device 600 is displaying system notifications user interface 1820, which provides the user with a listing of received notifications 1820*a*-1820*b*. Notification 1820*a* is a received notification that corresponds to a workout application. When activated (e.g., detecting tap on notification 1820*a*), device 600 displays the workout application. Notification 1820*b* is a received notification that corresponds to a payment application. When activated (e.g., detecting tap on notification 1820*b*), device 600 displays the payment application.

While displaying a system user interface (e.g., 1818, 1820), device 600 determines that device 600 has met the mode-transition criteria (e.g., detecting a wrist-down gesture using, for example, motion sensors; no input of certain types for 15 seconds). In response to the determination that device 600 has met the mode-transition criteria, device 600 begins to transition to a low power display mode and replaces the system user interface (e.g., 1818, 1820) with user interface 1822, a clock face user interface that is a lower power consumption user interface. Thus, in accordance with a determination that the currently displayed user interface is a system interface, device 600 replaces the system interface with user interface 1822, which is a lower power user interface. As noted by brightness scale 630, the overall brightness of the display of device 600 is higher while displaying the system user interface (e.g., 1818, 1820) than while displaying user interface 1822. Thus, device 600 consumes less power while displaying user interface 1822. In some embodiments, in accordance with the determination that the currently displayed user interface is a system interface, device 600 does not reduce down in size and blur out the displayed user interface (e.g., 1818, 1820) when the mode-transition criteria is met (and does when the user interface is not a system interface, described above with respect to 18A-18C and 18G-18H).

Figure 18L:
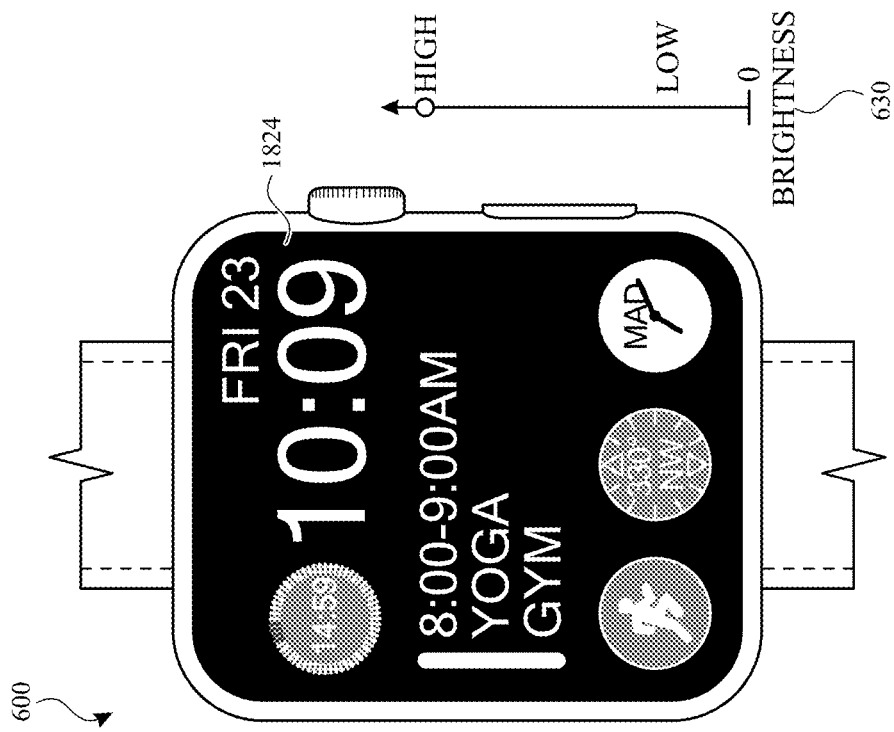
Figure 18K:
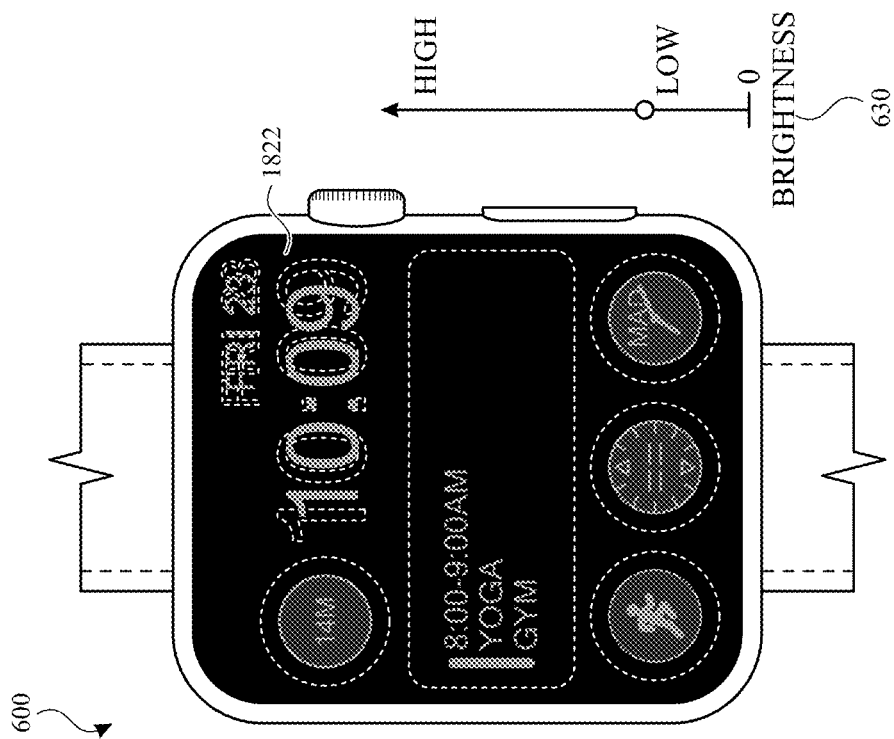

While displaying user interface 1822 at FIG. 18K and while device 600 is in the low power display mode, device 600 receives a request (e.g., detects a wrist raise gesture, detects a tap on the display of device 600) to transition to the standard display mode. In response to receiving the request to transition to the standard display mode, device 600 transitions to the standard display mode and, in accordance with a determination that device 600 entered the low power display mode while device 600 was displaying a user interface that is a system interface, device 600 displays user interface 1824 as shown in FIG. 18L, which is a standard clock face user interface (rather than returning to display of the system interface). Displaying standard clock user interface 1824 is helpful for the user because the user is unlikely to want to return to accessing a system interface (e.g., 1818, 1820) and, in the unlikely scenario that the user does want to re-access the system interface (e.g., 1818, 1820), device 600 provides easy mechanisms (e.g., a single swipe up gesture, a single swipe down gesture) to re-display the system interface (e.g., 1818, 1820). The transition between displaying user interface 1822 (which corresponds to or is the same as user interface 808-4) and 1824 (which corresponds to or is the same as 808-8) is described in greater detail above with respect to the transition between user interface 808-4 of FIG. 8D to user interface 808-8 in FIG. 8H.

FIG. 19 is a flow diagram illustrating a method for managing display usage using an electronic device in accordance with some embodiments. Method 1900 is performed at a device (e.g., 100, 300, 500, 600; a smart watch, a smart phone, a tablet computer) with a display. Some operations in method 1900 are, optionally, combined, the orders of some operations are, optionally, changed, and some operations are, optionally, omitted.

As described below, method 1900 provides an intuitive way for managing display usage. The method reduces power usage and the likelihood of screen burn-in. The method also reduces the cognitive burden on a user for managing display usage, thereby creating a more efficient human-machine interface. For battery-operated computing devices, enabling a device to automatically manage display usage faster and more efficiently conserves power and increases the time between battery charges.

While the electronic device (e.g., 600) is operating in a first mode, the electronic device (e.g., 600) displays (1902), on the display, a first user interface (e.g., 1802, 1814) of (e.g., a higher power consumption interface) an application. The electronic device (e.g., 600) detects (1904) (e.g., while displaying the first user interface) that the electronic device has met criteria for transitioning from the first mode to a second mode.

In response (1906) to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)), the electronic device (e.g., 600) transitions (1908) from the first mode to the second mode. As discussed above in greater detail, the first mode and the second mode are different modes in which the electronic device can operate.

In response (1906) to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)), the electronic device (e.g., 600) replaces (1910), on the display, the first user interface with a second user interface (e.g., 1806, 1808, 1816; a lower power consumption interface) including an obscured representation (e.g., 1802*a*, 802*c*, 1814*a*, 1814*c*, 1814*d*) of at least a portion of the first user interface (e.g., 1802, 1814) of the application (e.g., a representation of the same graphical object including the same data with reduced sharpness (detail) or contrast (e.g., blurred); a representation resulting from applying a non-linear filter to the representation).

In response (1906) to detecting that the electronic device has met the criteria for transitioning from the first mode to the second mode (e.g., criteria that are indicative of reduced user interaction with the electronic device (e.g., timeout expiration, accelerometer data indicating wrist down, touch data indicating palm over gesture)), the electronic device (e.g., 600) displays (1914) a time indicator (e.g., 1806*b*, 1814*f*) at a position on the display overlapping at least a portion of the obscured representation (e.g., 1802*c*, 1814*c*) of the at least a portion of the first user interface (e.g., 1802, 1814) of the application (e.g., time overlay).

Displaying an obscured representation of the interface of the application provides the user with visual feedback that the device is operating in a lower power consumption mode while still providing the user with feedback about the application that was displayed when the device entered the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the obscured representation (e.g., 1802*a*, 802*c*, 1814*a*, 1814*c*, 1814*d*) of at least a portion of the first user interface (e.g., 1802, 1814) of the application is a blurred (1912) representation of at least the portion of the first user interface (e.g., 1802, 1814). In some embodiments, obscuring the representation of the portion of the first user interface for display includes blurring the representation of the portion of the first user interface. Obscuring the representation of the interface of the application provides the user with visual feedback that the device is operating in a lower power consumption mode while still providing the user with feedback about the application that was displayed when the device entered the lower power consumption mode. Further, obscuring the representation of the interface of the application provides the user with additional security, as other users are less able to view the contents of the application. Providing improved visual feedback to the user and improving security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first user interface (e.g., 1802, 1814) of the application while in the first mode includes displaying the portion of the first user interface (e.g., 1802*c*, 1814*c*) of the application at a first size. In some embodiments, replacing the first user interface with the second user interface including the obscured representation of at least the portion of the first user interface of the application includes displaying an obscured representation of the portion of the first user interface of the application at a second size that is smaller than the first size (e.g., as shown in FIGS. 18C, 18D, and 18H). Reducing the display size of representation of the interface of the application provides the user with visual feedback that the device is operating in a lower power consumption mode while still providing the user with feedback about the application that was displayed when the device entered the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first user interface (e.g., 1802, 1814) of the application while in the first mode includes displaying the portion of the first user interface (e.g., 1802, 1814) of the application at a first brightness level. In some embodiments, replacing the first user interface (e.g., 1802, 1814) with the second user interface (e.g., 1806, 1816) including the obscured representation of at least the portion of the first user interface of the application includes displaying an obscured representation of the portion of the first user interface of the application at a second brightness level that is lower than the first brightness level (e.g., as shown in FIGS. 18C, 18D, and 18H). In some embodiments, the first user interface is displayed at a higher brightness level than the second user interface. Dimming the interface of the application provides the user with visual feedback that the device is operating in a lower power consumption mode while still providing the user with feedback about the application that was displayed when the device entered the lower power consumption mode. Additionally, dimming the interface of the application provides the user with additional security, as the contents of the application are less visible. Providing improved visual feedback to the user and improving security enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Additionally, dimming the interface of the application reduces the brightness of the display, which reduces power usage and improves the battery life of the device.

In some embodiments, replacing the first user interface (e.g., 1802, 1814) with the second user interface (e.g., 1806, 1816) includes dimming the display by an amount to reduce the brightness of the display, the amount based on the content of the first user interface (e.g., 1802, 1814). In some embodiments, the electronic device dims the displays more when the content of the first user interface is brighter (e.g., includes brighter images) than when the content of the first user interface is less bright (e.g., includes less bright images). In some embodiments, the amount by which the electronic device dims the brightness of the display is based on a requirement to meet a threshold APL when the second user interface is displayed. Dimming the interface of the application by an amount based on the content of the interface enables the device to, for example, dim brighter user interface more and dim less-brighter user interfaces less, thereby achieving a threshold reduced APL, which reduces power usage and improves the battery life of the device.

In some embodiments, replacing the first user interface (e.g., 1802, 1814) with the second user interface (e.g., 1806, 1816) includes dimming the display by an amount to reduce the brightness of the display, the amount based on an environmental brightness level (e.g., ambient light level). In some embodiments, the amount of dimming increases as the environmental brightness increases and the amount of dimming decreases as the environmental brightness decreases (e.g., based on a magnitude of change in the environmental brightness level). In some embodiments, the amount of dimming decreases as the environmental brightness increases and the amount of dimming increases as the environmental brightness decreases (e.g., based on a magnitude of change in the environmental brightness level). Dimming the display based on environmental brightness levels allows the contents of the display to be more easily visible in bright ambient light environments, thereby providing the user with improved visual feedback, while reducing battery usage in reduced ambient light environments. Providing improved visual feedback to the user enhances the operability of the device and makes the user-device interface more efficient (e.g., by helping the user to provide proper inputs and reducing user mistakes when operating/interacting with the device). Reducing the display brightness reduces power usage and improves the battery life of the device.

In some embodiments, replacing, on the display, the first user interface (e.g., 1802, 1814) with a second user interface (e.g., 1806, 1816) including the obscured representation of at least a portion of the first user interface (e.g., 1802, 1814) of the application includes displaying a first animation of the at least a portion of the first user interface transitioning from an unobscured state to the obscured state. In some embodiments, displaying the time indicator (e.g., 1806b, 1814f) at the position on the display overlapping at least a portion of the obscured representation (e.g., 1802c, 1814c) of the at least a portion of the first user interface of the application includes displaying a second animation of the time indicator becoming displayed (e.g., an animation of the time indicator appearing (e.g., transitioning from being not displayed to displayed; moving from a previous position to the final position) at the position on the display overlapping at least a portion of the obscured representation of the at least a portion of the first user interface of the application). In some embodiments, at least a portion of the first animation occurs concurrently with at least a portion of the second animation. In some embodiments, the first animation and the second animation are synchronized (e.g., synchronized to start at the same time and/or end at the same time). In some embodiments, time indicator displayed in the first user interface fades out while the time indicator at the position on the display overlapping the at least portion of the obscured representation of the user interface of the application fades in. In some embodiments, the time indicator at the first position fades out and time indicator at the position on the display overlapping the at least portion of the obscured representation of the user interface of the application fades in to cause a visual cross-fade transition over time.

In some embodiments, displaying the first user interface (e.g., 1802, 1814) includes displaying the time indicator (e.g., 1802b, 1814b) at a first display size and at a first position on the display that is different from the position on the display overlapping the at least portion of the obscured representation of the application in the second mode. In some embodiments, displaying the time indicator (e.g., 1806b, 1814f) at the position on the display overlapping at least a portion of the obscured representation of the user interface of the application includes displaying an animation of: the time indicator expanding from the first display size (e.g., as in 1802b, 1814b) to a second display size (e.g., as in 1806b, 1814f) that is different from the first display size, and the time indicator translating from the first position on the display (e.g., as in 1802b, 1814b) to the position on the display (e.g., as in 1806b, 1814f) overlapping the at least portion of the obscured representation of the application. In some embodiments, the first position is adjacent to an edge of the display (e.g., a top edge) and translating to the position on the display overlapping the at least portion of the obscured representation of the application includes translating the time indicator away from the edge of the display.

In some embodiments, while the electronic device (e.g., 600) is in the second mode and the time indicator (e.g., 1806b, 1814f) is displayed at the position on the display overlapping at least portion of the obscured representation of the at least portion of the first user interface of the application (e.g., time overlay), the electronic device (e.g., 600) detects a first user input (e.g., a wrist raise gesture, a tap gesture on a touch-sensitive surface of the displays). In response to detecting the first user input, the electronic device (e.g., 600) ceases to display the time indicator (e.g.,

1806*b*, 1814*f*) at the position on the display overlapping at least a portion of the obscured representation of the at least a portion of the first user interface of the application (e.g., ceasing to display the time indicator altogether; displaying the time indicator at another position).

In some embodiments, while the electronic device (e.g., 600) is in the second mode and the time indicator (e.g., 1806*b*, 1814*f*) is displayed at the position on the display overlapping the at least portion of the obscured representation of the at least portion of the first user interface of the application (e.g., time overlay), the electronic device (e.g., 600) detects a first user input (e.g., a wrist raise gesture, a tap gesture on a touch-sensitive surface of the displays). In response to detecting the first user input, the electronic device (e.g., 600) replaces, on the display, the second user interface (e.g., 1806, 1808, 1816, a lower power consumption interface) including the obscured representation of the at least portion of the first user interface of the application with the first user interface (e.g., 1812). In some embodiments, in response to detecting the first user input, the electronic device ceases to obscure the user interface of the application.

In some embodiments, the obscured representation (e.g., 1802*a*, 1802*c* in FIGS. 18C and 18D, 1814*c*-1814*e* in FIG. 18H) of at least a portion of the first user interface (e.g., 1802, 1814) of the application is a static representation of the first user interface of the application (e.g., the representation does not update over time). In some embodiments, the second user interface is a snapshot of a user interface of the application with the time indicator updating.

In some embodiments, one or more processes for the application are being processed by one or more processors of the electronic device (e.g., 600), while the electronic device (e.g., 600) is operating in the second mode. In some embodiments, the application is a timer application and one or more processes for the timer application continue to be processed such that the timer continues to run and can alert the user when a timing condition is met. In some embodiments, the application is an alarm clock application and one or more processes of the alarm clock application continue to be processed such that alarm times continue to be monitored and can alert the user when an alarm condition (e.g., alarm time is reached) is met.

In some embodiments, while displaying the second user interface (e.g., 1806, 1808, 1816, in the second mode), the electronic device (e.g., 600) detects that the electronic device has met a timeout criteria (e.g., a predetermined duration of time has lapsed since the electronic device is displaying the second user interface without receiving a qualifying user input, such as a wrist raise or a tap input on a touch-sensitive surface). In response to detecting that the electronic device has met the timeout criteria, the electronic device (e.g., 600) replaces display of the second user interface with display of a first watch face user interface (e.g., as shown in FIG. 14D at 1416*b*) that includes a second time indicator (while maintaining the electronic device in the second mode) without displaying the obscured representation of the portion of the first user interface of the application. In some embodiments, the first watch face user interface is a lower power consumption interface displayed in the second mode (e.g., a lower power consumption mode), such as described with respect to method 700 of FIG. 7 and the corresponding description and method 900 of FIG. 9 and the correspond description. In some embodiments, when the electronic device has not met the timeout criteria, the electronic device continues to display the second user interface without displaying the first watch face user interface that includes the second time indicator (while maintaining the electronic device in the second mode). In some embodiments, the second time indicator is different from the first time indicator in one or more of: a size, a location, and/or a color.

In some embodiments, while displaying the first watch face user interface (e.g., as shown in FIG. 14D at 1416*b*) that includes the second time indicator in accordance with the determination that the timeout condition has occurred, the electronic device (e.g., 600) detects a wrist raise gesture. In response to detecting the wrist raise gesture, the electronic device (e.g., 600) replaces display of the first watch face user interface (e.g., as shown in FIG. 14B at FIG. 14D at 1416*b*) that includes the second time indicator with a second watch face user interface (e.g., as shown in FIG. 14D at 1416*d*) that includes a third time indicator. The second watch face user interface is displayed at a higher brightness level (e.g., average pixel luminance (APL)) than the first watch face user interface. In some embodiments, the first watch face user interface and the second watch face user interface do not include graphical elements of the application.

In some embodiments, the display, while displaying the first user interface of (e.g., 1802, 1814, a higher power consumption interface) the application in the first mode, has a first display brightness (e.g., average pixel luminance (APL), average lumen output, total lumen output, average illuminance, or total illuminance of the indicator on the display; brightness expressed in nits, lux, or lumens) and the display, while displaying the second user interface (e.g., 1806, 1808, 1816, a lower power consumption interface) including an obscured representation of at least a portion of the first user interface of the application (e.g., in the second mode), has a second display brightness that is lower than the first display brightness.

In some embodiments, the electronic device (e.g., 600) receives (e.g., via wireless communication) a notification. Subsequent to (e.g., in response to receiving) receiving the notification, the electronic device (e.g., 600) displays a first notification user interface (e.g., 1820) corresponding to the notification (e.g., including content received in the notification). While displaying the first notification user interface (e.g., 1820) corresponding to the notification, the electronic device (e.g., 600) detects a wrist down gesture (detecting that the user has moved their wrist that is wearing the electronic device from a raised position to a non-raised position). In response to detecting the wrist down gesture: the electronic device (e.g., 600) replaces, on the display, the notification user interface (e.g., 1820) with a second notification user interface (e.g., a lower power consumption interface) including an obscured representation of at least a portion of the first notification user interface (e.g., 1820) corresponding to the notification (e.g., a representation of the same graphical object including the same data with reduced sharpness (detail) or contrast (e.g., blurred); a representation resulting from applying a non-linear filter to the representation), and the electronic device (e.g., 600) displays a time indicator at a position on the display overlapping at least a portion of the obscured representation of the first notification user interface (e.g., time overlay). In some embodiments, obscuring includes blurring, scaling down/reducing in size, and/or dimming. Obscuring a representation of the first notification user interface provides the user with visual feedback that the device is operating in a lower power consumption mode while still providing the user with feedback about the notification user interface that was displayed when the device entered the lower power consumption mode. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1900 (e.g., FIG. 19) are also applicable in an analogous manner to the methods described above. For example, methods 700, 900, 1100, 1300, 1500, and 1700 optionally include one or more of the characteristics of the various methods described above with reference to method 1900. For example, the first mode is the same mode throughout these methods and the second mode is the same mode throughout these methods. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve device user interfaces. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, calendar or scheduling data, or any other identifying or personal information.

The present disclosure recognizes that the use of such personal information data, in the present technology, can be used to the benefit of users. For example, the personal information data can be used to automatically display helpful or useful information (e.g., content of interest to a user) that may otherwise be cumbersome to access manually. Accordingly, use of such personal information data enables users to have convenient access to a wider variety of content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying private data such as calendar data or health-related data on user interfaces, the present technology can be configured to allow users to select to "opt in" or "opt out" of participation in the collection of personal information data during registration for services or anytime thereafter. In another example, users can select not to provide private data such as calendar data of health-related data for automated display (e.g., delivery). In yet another example, users can select to limit the length of time private data such as calendar data or health-related data is maintained or entirely prohibit the development of data models or profiles derived from such data mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and displayed to users by inferring preferences based on non-personal information data or a bare minimum amount of personal information, such as the content being requested by the device associated with a user, other non-personal information available to the device, or publicly available information.

What is claimed is:

1. An electronic device, comprising:
a display;
one or more processors; and
memory storing one or more programs configured to be executed by the one or more processors, the one or more programs including instructions for:
displaying a watch face user interface that includes a plurality of concurrently displayed user interface elements, including:
a time indicator;
a graphical representation of a first type of information that is associated with a first application and that is different from the time indicator; and
a graphical representation of a second type of information that is associated with a second application and that is different from the time indicator, wherein the second application is different from the first application;
while the electronic device is in a first mode in which the watch face user interface is a currently selected watch face for the electronic device:
updating an appearance of the graphical representation of the first type of information over time with a first update interval;
updating an appearance of the graphical representation of the second type of information over time with a second update interval; and
after updating the appearance of the graphical representation of the first type of information over time one or more times at the first update interval and after updating the appearance of the graphical representation of the second type of information over time one or more times at the second update interval, detecting that the electronic device has met criteria for transitioning from the first mode to a second mode;
in response to detecting that the electronic device has met the criteria for transitioning from the first mode to the second mode in which the watch face user interface remains the currently selected watch face for the electronic device, transitioning the electronic device from the first mode to the second mode; and
while the electronic device is in the second mode in which the watch face user interface remains the currently selected watch face for the electronic device, and while concurrently displaying the graphical representation of the first type of information and the graphical representation of the second type of information:
updating the appearance of the graphical representation of the first type of information over time with a third update interval that is longer than the first update interval; and
forgoing updating the appearance of the graphical representation of the second type of information over time.

2. The electronic device of claim 1, the one or more programs further including instructions for:
while the electronic device is operating in the first mode, updating the time indicator over time with a fourth update interval; and
while the electronic device is operating in the second mode, updating the time indicator over time with a fifth update interval that is different from the fourth update interval.

3. The electronic device of claim 1, wherein the graphical representation of the first type of information displayed in the first mode has one or more visual characteristics that are different from the graphical representation of the first type of information displayed in the second mode.

4. The electronic device of claim 1, wherein:
the first mode is a higher power consumption mode,
the second mode is a lower power consumption mode, and
the electronic device consumes more power in the higher power consumption mode than in the lower power consumption mode.

5. The electronic device of claim 1, wherein the first update interval is based on an activity level of the first application.

6. The electronic device of claim 1, wherein updating the appearance of the graphical representation of the first type of information includes displaying an animation.

7. The electronic device of claim 1, wherein a first display brightness of the display while the electronic device is in the first mode is higher than a second display brightness of the display while the electronic device is in the second mode.

8. The electronic device of claim 1, the one or more programs further including instructions for:
while the electronic device is in the second mode, displaying an indication that the update interval of the graphical representation of the first type of information has changed.

9. The electronic device of claim 1, the one or more programs further including instructions for:
in response to detecting that the electronic device has met the criteria for transitioning from the first mode to the second mode, computing animation frames for the graphical representation of the first type of information to be displayed while the electronic device is in the second mode.

10. A non-transitory computer-readable storage medium storing one or more programs configured to be executed by one or more processors of an electronic device with a display, the one or more programs including instructions for:
displaying a watch face user interface that includes a plurality of concurrently displayed user interface elements, including:
a time indicator;
a graphical representation of a first type of information that is associated with a first application and that is different from the time indicator; and
a graphical representation of a second type of information that is associated with a second application and that is different from the time indicator, wherein the second application is different from the first application;

while the electronic device is in a first mode in which the watch face user interface is a currently selected watch face for the electronic device:
  updating an appearance of the graphical representation of the first type of information over time with a first update interval;
  updating an appearance of the graphical representation of the second type of information over time with a second update interval; and
  after updating the appearance of the graphical representation of the first type of information over time one or more times at the first update interval and after updating the appearance of the graphical representation of the second type of information over time one or more times at the second update interval, detecting that the electronic device has met criteria for transitioning from the first mode to a second mode;
in response to detecting that the electronic device has met the criteria for transitioning from the first mode to the second mode in which the watch face user interface remains the currently selected watch face for the electronic device, transitioning the electronic device from the first mode to the second mode; and
while the electronic device is in the second mode in which the watch face user interface remains the currently selected watch face for the electronic device and while concurrently displaying the graphical representation of the first type of information and the graphical representation of the second type of information:
  updating the appearance of the graphical representation of the first type of information over time with a third update interval that is longer than the first update interval; and
  forgoing updating the appearance of the graphical representation of the second type of information over time.

11. The non-transitory computer-readable storage medium of claim 10, the one or more programs further including instructions for:
  while the electronic device is operating in the first mode, updating the time indicator over time with a fourth update interval; and
  while the electronic device is operating in the second mode, updating the time indicator over time with a fifth update interval that is different from the fourth update interval.

12. The non-transitory computer-readable storage medium of claim 10, wherein the graphical representation of the first type of information displayed in the first mode has one or more visual characteristics that are different from the graphical representation of the first type of information displayed in the second mode.

13. The non-transitory computer-readable storage medium of claim 10, wherein:
  the first mode is a higher power consumption mode,
  the second mode is a lower power consumption mode, and
  the electronic device consumes more power in the higher power consumption mode than in the lower power consumption mode.

14. The non-transitory computer-readable storage medium of claim 10, wherein the first update interval is based on an activity level of the first application.

15. The non-transitory computer-readable storage medium of claim 10, wherein updating the appearance of the graphical representation of the first type of information includes displaying an animation.

16. The non-transitory computer-readable storage medium of claim 10, wherein a first display brightness of the display while the electronic device is in the first mode is higher than a second display brightness of the display while the electronic device is in the second mode.

17. The non-transitory computer-readable storage medium of claim 10, the one or more programs further including instructions for:
  while the electronic device is in the second mode, displaying an indication that the update interval of the graphical representation of the first type of information has changed.

18. The non-transitory computer-readable storage medium of claim 10, the one or more programs further including instructions for:
  in response to detecting that the electronic device has met the criteria for transitioning from the first mode to the second mode, computing animation frames for the graphical representation of the first type of information to be displayed while the electronic device is in the second mode.

19. A method, comprising:
at an electronic device having a display:
  displaying a watch face user interface that includes a plurality of concurrently displayed user interface elements, including:
    a time indicator;
    a graphical representation of a first type of information that is associated with a first application and that is different from the time indicator; and
    a graphical representation of a second type of information that is associated with a second application and that is different from the time indicator, wherein the second application is different from the first application;
  while the electronic device is in a first mode in which the watch face user interface is a currently selected watch face for the electronic device:
    updating an appearance of the graphical representation of the first type of information over time with a first update interval;
    updating an appearance of the graphical representation of the second type of information over time with a second update interval; and
    after updating the appearance of the graphical representation of the first type of information over time one or more times at the first update interval and after updating the appearance of the graphical representation of the second type of information over time one or more times at the second update interval, detecting that the electronic device has met criteria for transitioning from the first mode to a second mode;
  in response to detecting that the electronic device has met the criteria for transitioning from the first mode to the second mode in which the watch face user interface remains the currently selected watch face for the electronic device, transitioning the electronic device from the first mode to the second mode; and
  while the electronic device is in the second mode in which the watch face user interface remains the currently selected watch face for the electronic device and while concurrently displaying the graphical representation of the first type of information and the graphical representation of the second type of information:

updating the appearance of the graphical representation of the first type of information over time with a third update interval that is longer than the first update interval; and forgoing updating the appearance of the graphical representation of the second type of information over time.

20. The method of claim 19, further comprising:

while the electronic device is operating in the first mode, updating the time indicator over time with a fourth update interval; and while the electronic device is operating in the second mode, updating the time indicator over time with a fifth update interval that is different from the fourth update interval.

21. The method of claim 19, wherein the graphical representation of the first type of information displayed in the first mode has one or more visual characteristics that are different from the graphical representation of the first type of information displayed in the second mode.

22. The method of claim 19, wherein:

the first mode is a higher power consumption mode, the second mode is a lower power consumption mode, and the electronic device consumes more power in the higher power consumption mode than in the lower power consumption mode.

23. The method of claim 19, wherein the first update interval is based on an activity level of the first application.

24. The method of claim 19, wherein updating the appearance of the graphical representation of the first type of information includes displaying an animation.

25. The method of claim 19, wherein a first display brightness of the display while the electronic device is in the first mode is higher than a second display brightness of the display while the electronic device is in the second mode.

26. The method of claim 19, further comprising:

while the electronic device is in the second mode, displaying an indication that the update interval of the graphical representation of the first type of information has changed.

27. The method of claim 19, further comprising:

in response to detecting that the electronic device has met the criteria for transitioning from the first mode to the second mode, computing animation frames for the graphical representation of the first type of information to be displayed while the electronic device is in the second mode.

* * * * *